United States Patent
Yamaguchi

(10) Patent No.: US 6,496,852 B1
(45) Date of Patent: Dec. 17, 2002

(54) ELECTRONIC MAIL SYSTEM AND ELECTRONIC MAIL PROCESSING METHOD

(75) Inventor: Yoshito Yamaguchi, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/297,348

(22) PCT Filed: Sep. 22, 1998

(86) PCT No.: PCT/JP98/04261

§ 371 (c)(1),
(2), (4) Date: Apr. 29, 1999

(87) PCT Pub. No.: WO99/16217

PCT Pub. Date: Apr. 1, 1999

(30) Foreign Application Priority Data

| Sep. 22, 1997 | (JP) | 9-273349 |
| Sep. 22, 1997 | (JP) | 9-273350 |
| Oct. 7, 1997 | (JP) | 9-289250 |
| Nov. 22, 1997 | (JP) | 9-337702 |

(51) Int. Cl.[7] ............................................. G06F 15/16
(52) U.S. Cl. .................................... 709/206; 709/207
(58) Field of Search ............................. 709/206, 207, 709/200, 201, 248, 249

(56) References Cited

U.S. PATENT DOCUMENTS 5,325,310 A  * 6/1994 Johnson et al. ............ 364/514
5,428,784 A  * 6/1995 Cahill, Jr.

FOREIGN PATENT DOCUMENTS

| EP | 0 371 605 | * 6/1990 | ........... H04L/12/54 |
| JP | 2-86420 | 3/1990 | |
| JP | 6-350642 | 12/1994 | |
| JP | 8-163269 | 6/1996 | |
| WO | WO 93/07566 | 4/1993 | |

OTHER PUBLICATIONS

IBM Technical Disclosure Bulletin, vol. 37, No. 3, Mar., 1994; Mail Delegation Pre–Notification.

IBM Technical Disclosure Bulletin, vol. 37, No. 1, Jan. 1994; Reply–After Preference Communication Mechanism.

* cited by examiner

Primary Examiner—Ario Etienne
(74) Attorney, Agent, or Firm—Frishauf, Holtz, Goodman & Chick, P.C.

(57) ABSTRACT

There are stored a plurality of electronic mails each for use in an absence notice, composed of those of an ordinary notice and the other clearly indicating an emergency contact place. If an electronic mail is received, it is determined whether or not the electronic mail is of emergency. If the electronic mail is of emergency, an electronic mail clearly indicating an emergency contact place is transmitted and when not of emergency, a response electronic mail of an ordinary notice which notices the absence is transmitted.

45 Claims, 126 Drawing Sheets

RECEPTION DISPLAY SCREEN IMAGE

| | | | | | |
|---|---|---|---|---|---|
| ABSENCE | DELETE | MAIL CREATION | ADDRESS INPUT | UNSEAL | CANCEL |

| | | | |
|---|---|---|---|
| ◎ | Sato Ichiro | SUBJECT OF CONFERENCE AT MARCH 1ST | 97/01/30 10:30 |
| ◎ | Tanaka Taro | PRELIMINARY MEETING | 97/01/27 9:00 |
| | Suzuki Yoshiro | ALUMNI MEETING | 97/01/25 3:00 |
| | Furuya Makoto | CONGRATULATION ! | 97/01/12 17:00 |
| | ⋮ | ⋮ | ⋮ |
| | Inamoto Masuo | HOW DO YOU DO ? | 97/01/3 9:00 |

FIG.6

RECEIVED MAIL DISPLAY SCREEN IMAGE

| FROM | Sato Ichiro | CANCEL |
|---|---|---|
| TO | Yamaguchi Yoshito | |
| SUBJECT | SUBJECT OF CONFERENCE AT MARCH 1ST | |

PLEASE ATTEND THE CONFERENCE,
WHICH WILL BE HELD IN THE FOLLOWING SCHEDULE
DETAILS

DATE AND TIME : MARCH 1ST (SATURDAY) AM 10:00 TO 12:00
PLACE : CONFERENCE ROOM NO.1
AENDA : REPORT ON PROGRESS OF THEME XXXXX
EXPECTED ATTENDEES : XX, YY, ZZ, ···

FIG.8

MAIL CREATION SCREEN IMAGE

| FROM | Yamaguchi Yoshito | ADDRESS LIST | CANCEL |
|------|-------------------|--------------|--------|
| TO | | TRANSMISSION | |
| SUBJECT | | | |

FIG.11

ADDRESS LIST SCREEN IMAGE

| NEW INPUT | DELETE | OK | | CANCEL |
|---|---|---|---|---|

| | |
|---|---|
| Sato Ichiro | i-Sato@ ··· |
| Tanaka Taro | t-Tanaka@ ··· |
| Yamada Taro | t-Yamada@ ··· |
| Furukawa Yasuo | y-Furukawa@ ··· |
| | |
| Suzuki Yoshiko | y-Suzuki@ ··· |

FIG.13

ADDRESS INPUT SCREEN IMAGE

| NAME | | CANCEL |
| ADDRESS | | |
| TYPE | | |

ABSENCE SETTING PROCESSING SCREEN IMAGE

CANCEL

START DATE AND TIME

END DATE AND TIME

MAIL "A" CREATION | MAIL "B" CREATION | OK

FIG.19

FIXED FORM MAIL SCREEN IMAGE (MAIL "A")

| FROM | Yamaguchi Yoshito | PASSWORD | CANCEL |
| TO | | | |
| SUBJECT | MATTER OF ABSENCE | OK | |

THANK YOU FOR YOUR MESSAGE.
SORRY, I WILL BE OUT ON BUSINESS TRIP
FROM yy-mm-dd TO YY-MM-DD.
IF IN EMERGENCY, PLEASE SEND A MAIL
WITH WORDS "xxxx" WRITTEN THEREON AGAIN.

FIG.24A

FIXED FORM MAIL SCREEN IMAGE (MAIL "B")

| | | CANCEL |
| FROM | Yamaguchi Yoshito | |
| TO | | |
| SUBJECT | MATTER OF EMERGENCY CONTACT PLACE | OK |

PLEASE CONTACT ME AT THE FOLLOWING PHONE NUMBER;
TEL xxxx-yy-zzz (NOT MY PHONE)

FIG.24B

ABSENCE SETTING PROCESSING SCREEN IMAGE

| | |
|---|---|
| | CANCEL |

START DATE AND TIME [              ]

END DATE AND TIME [              ]

[ MAIL CREATION ]  [ TRANSFER ADDRESS INPUT ]  [ OK ]

FIG.30

TRANSFER ADDRESS INPUT SCREEN IMAGE

| CANCEL |

ADDRESS

TYPE

ABSENCE SETTING PROCESSING SCREEN IMAGE

```
                                              CANCEL

START
   DATE AND TIME   [_____]

END
   DATE AND TIME   [_____]

[ADDRESS      ] [MAIL "A"  ] [MAIL "B"  ] [ OK ]
   [DESIGNATION  ] [CREATION  ] [CREATION  ]
```

FIG.41

ADDRESS LIST DISPLAY
(IN ADDRESS DESIGNATION)

| OK | ALL | CANCEL |
|---|---|---|

| | |
|---|---|
| Sato Ichiro | i-Sato |
| Tanaka Taro | t-Tanaka |
| Yamada Taro | t-Yamada |
| Furukawa Yasuo | y-Furukawa |
| | |
| Suzuki Yoshiko | y-Suzuki |

FIG.43

FIXED FORM MAIL "A" SCREEN IMAGE

| FROM | Yamaguchi Yoshito | CANCEL |
|---|---|---|
| TO | | |
| SUBJECT | MATTER OF ABSENCE | OK |

THANK YOU FOR YOUR MESSAGE.
SORRY, I WILL BE OUT ON BUSINESS TRIP
FROM yy-mm-dd TO YY-MM-DD.
PLEASE CONTACT ME AGAIN LATER.

FIG.45A

FIXED FORM MAIL "B" SCREEN IMAGE

| FROM | Yamaguchi Yoshito | CANCEL |
|---|---|---|
| TO | | |
| SUBJECT | MATTER OF EMERGENCY CONTACT PLACE | OK |

THANK YOU FOR YOUR MESSAGE.
SORRY, I WILL BE OUT ON BUSINESS TRIP
FROM yy-mm-dd TO YY-MM-DD.
IF IN EMERGENCY, PLEASE CONTACT ME AT THE
FOLLOWING PHONE NUMBER:
TEL xxxx-yy-zzz (NOT MY PHONE)

FIG.45B

MAIL CREATION SCREEN IMAGE

| FROM | Yamaguchi Yoshito | ADDRESS LIST | CANCEL |
| TO | | | |
| SUBJECT | | TRANSMISSION | EMERGENCY |

FIG.51

ABSENCE SETTING PROCESSING SCREEN IMAGE

| CANCEL |

START DATE AND TIME

END DATE AND TIME

| ADDRESS DESIGNATION | TRANSFER ADDRESS | MAIL CREATION | OK |

FIG.59

ABSENCE SETTING PROCESSING SCREEN IMAGE

CANCEL

START DATE AND TIME

END DATE AND TIME

MAIL CREATION | TRANSFER ADDRESS INPUT | OK

FIG.65

RECEPTION SCREEN IMAGE

| ABSENCE | DELETE | ORDINARY MAIL CREATION | RESPONCE DATE AND TIME DESIGNATED MAIL CREATION | ADDRESS INPUT | UNSEAL | CANCEL |
|---|---|---|---|---|---|---|
| ◎ | Sato Ichiro | | MATTER OF 2/26 CONFERENCE | 97/01/30 10:30 | | ! |
| ◎ | Tanaka Taro | | PRELIMINARY MEETING | 97/01/27 9:00 | | |
| | Suzuki Yoshiro | | ALUMNI MEETING | 97/01/25 15:00 | | ! |
| | Furuya Makoto | | CONGRATULATION ! | 97/01/12 17:00 | | |
| | | | | | | |
| | Inamoto Masao | | HOW DO YOU DO ? | 97/01/03 9:00 | | |

FIG.71

MAIL DISPLAY SCREEN IMAGE
(RESPONSE DATE AND TIME DESIGNATED)

| | | CANCEL |
|---|---|---|
| FROM | Yamaguchi Yoshito | |
| TO | Sato Ichiro | |
| SUBJECT | MATTER OF CONFERENCE TO BE HELD | |

PLEASE BE ADVISED THAT ABC CONFERENCE WILL BE HELD AT THE FOLLOWING DATE AND TIME

DETAILS

MONTH MM, DATE DD, AM 10:00

WHEN IN ANY INCONVENIENCE, PLEASE NOTIFY ME BY THE DATE AND TIME SHOWN AT THE BOTTOM

RESPONSE DATE AND TIME | MONTH mm, DATE dd

FIG.73

RESPONSE DESIGNATED MAIL CREATION SCREEN IMAGE

| FROM | Yamaguchi Yoshito | ADDRESS LIST | CANCEL |
| TO | Sato Ichiro | | |
| SUBJECT | MATTER OF CONFERENCE TO BE HELD | TRANSMISSION | |

PLEASE BE ADVISED THAT ABC CONFERENCE WILL BE HELD AT THE FOLLOWING DATE AND TIME

DETAILS

MONTH MM, DATE DD, AM 10:00

WHEN IN ANY INCONVENIENCE, PLEASE NOTIFY ME BY THE DATE AND TIME SHOWN AT THE BOTTOM

RESPONSE DATE AND TIME | MONTH mm, DATE dd

FIG.77

ABSENCE SETTING PROCESSING SCREEN IMAGE

| | |
|---|---|
| | CANCEL |

START DATE AND TIME

END DATE AND TIME

| RESPONSE DATE AND TIME MAIL CREATION | MAIL "A" CREATION | MAIL "B" CREATION | OK |

FIG.81

REQUEST FOR CHANGE OF RESPONSE MAIL
CREATION SCREEN IMAGE

| FROM | Yamaguchi Yoshito | PASSWORD | CANCEL |
| TO | | | |
| SUBJECT | MATTER OF ABSENCE | OK | |

THANK YOU FOR YOUR MESSAGE.
SORRY, I WILL BE OUT ON BUSINESS TRIP
FROM yy-mm-dd TO YY-MM-DD.
I WILL RESPOND TO YOU ON THE DATE AND TIME
WRITTEN AT THE BOTTOM. IS IT ALL RIGHT FOR YOU ?
PLEASE TRANSMIT CHARACTERS "XXXX" IN A MAIL WHEN
YOU CAN ACCEPT IT. IF NOT, PLEASE INFORM ME
WHEN I SHOULD RESPOND TO YOU

RESPONSE DATE AND TIME | 1997-6-23

FIG.85

ABSENCE SETTING PROCESSING SCREEN IMAGE

CANCEL

START DATE AND TIME

END DATE AND TIME

RESPONSE DATE AND TIME MAIL CREATION | MAIL CREATION | TRANSFER ADDRESS INPUT | OK

FIG.94

FIXED FORM MAIL "A" SCREEN IMAGE

| FROM | Yoshito Yamaguchi | CANCEL |
|---|---|---|
| TO | Yamada Taro | |
| SUBJECT | MATTER OF ABSENCE | OK |

THANK YOU FOR YOUR MESSAGE.
SORRY, I WILL BE OUT ON BUSINESS TRIP
FROM yy-mm-dd TO YY-MM-DD.
PLEASE SEND ME A MAIL AGAIN AFTER I AM BACK.

FIG.110

FIXED FORM MAIL "B" SCREEN IMAGE

| FROM | Yoshito Yamaguchi | CANCEL |
|---|---|---|
| TO | Yamada Taro | |
| SUBJECT | MATTER OF ABSENCE | OK |

THANK YOU FOR YOUR MESSAGE.
SORRY, I WILL BE OUT ON BUSINESS TRIP
FROM yy-mm-dd TO YY-MM-DD.
PLEASE ASK MR. SATO FOR INSTRUCTIONS
IN THE PERIOD.

MAIL ADDRESS : i-sato@ · · ·

FIG.112

ADDRESS LIST SCREEN IMAGE

| | |
|---|---|
| Sato Ichiro | i-sato |
| Tanaka Taro | t-tanaka |
| Yamada Juro | j-yamada |
| Furukawa Yasuo | y-furukawa |
| . . . | . . . |
| Suzuki Yoshiko | y-suzuki |

OK   CANCEL

FIG.116

FIXED FORM MAIL "C" SCREEN IMAGE

FROM: Yamaguchi Yoshito

TO:

SUBJECT: MATTER OF YYY

CANCEL

OK

THANK YOU FOR YOUR MESSAGE.
SORRY, I WILL BE OUT ON BUSINESS TRIP
FROM yy-mm-dd TO YY-MM-DD.
PLEASE ASK MR. SUZUKI FOR INSTRUCTIONS
ABOUT MATTER OF YYY IN THE PERIOD.

MAIL ADDRESS : suzuki@ ···

FIG.120

FIXED FORM MAIL "D" SCREEN IMAGE

| PASSWORD | △△△△ | ADDRESS LIST | CANCEL |
|----------|------|--------------|--------|
| FROM | Yamaguchi Yoshito | NEXT MAIL | |
| TO | Kawaguchi Hitoshi | | |
| SUBJECT | MATTER OF xxxx, | OK | |

THANK YOU FOR YOUR MESSAGE.
SORRY, I WILL BE OUT ON BUSINESS TRIP
FROM yy-mm-dd TO YY-MM-DD
PLEASE, HANDLE THE ABOVE REFERENCED MATTER
ACCORDING TO YOUR JUDGMENT.

FIG.124

ELECTRONIC MAIL SYSTEM AND ELECTRONIC MAIL PROCESSING METHOD

DESCRIPTION

1. Technical Field

The present invention relates to an electronic mail system for transmission and reception of an electronic mail and a storage medium storing a program for electronic mail processing in transmission and reception of an electronic mail.

2. Background Art

An electronic mail system for transmission and reception of an electronic mail has widely been spread in the society together with the rapidly increasing utilization of an electronic mail through an Internet and a personal computer communication network. In conventional electronic mail systems, there has been available a service in which a transmitter is noticed of the absence of a receiver to whom an electronic mail is transmitted. Therefore, the transmitter can confirm whether or not a transmitted electronic mail has reached the receiver.

However, among electronic mails there is one which has to be urgently delivered to a receiver who leaves from a computer. In such a case, there is a problem that the electronic mail cannot be delivered to the receiver unless either whereabouts of the receiver or an emergency contact place thereof is known. On the other hand, if the emergency contact place is noticed to all who are concerned with the receiver, there is a problem that inconveniences frequently arise in the receiver's privacy and other aspects.

DISCLOSURE OF INVENTION

It is an object of the present invention to facilitate a receiver to be delivered an electronic mail of emergency when the receiver is absent without any inconvenience occurred to the receiver in terms of privacy and other aspects.

According to a first aspect of the present invention, there is provided an electronic mail system comprising:

mail receiving means for receiving an electronic mail;

absence mode setting means for setting an absence mode indicating the state of absence of a receiver of the electronic mail;

mail transmitting means for transmitting a predetermined fixed form mail responding to a first electronic mail received by the mail receiving means in the absence mode; and control means for making the mail transmitting means to transmit the predetermined fixed form mail when the control means determines that a second electronic mail from a receiver responding to the predetermined fixed form mail satisfies a specific condition.

According to a second aspect of the present invention, there is provided an electronic mail system comprising:

mail receiving means for receiving an electronic mail;

absence mode setting means for setting an absence mode indicating the state of absence of a receiver of the electronic mail;

mail transmitting means for transmitting a predetermined fixed form mail responding to a first electronic mail received by the mail receiving means in the absence mode; and mail transfer means for making the mail transmitting means to transfer the first electronic mail to a predetermined address when the mail receiving means receives a second electronic mail responding to the predetermined fixed form mail from the receiver and when the mail transfer means determines that the second electronic mail satisfies a specific condition.

According to a third aspect of the present invention, there is provided an electronic mail system comprising:

mail storage means for storing a plurality of fixed form mails;

mail receiving means for receiving an electronic mail;

address designating means for designating an address of a specific receiver;

mail determining means for determining whether or not a transmitter address of the received electronic mail is an address designated by the address designating means when it detects that the electronic mail is received by the mail receiving means;

mail selecting means for selecting one of the fixed form mails from the mail storage means based on a determination result by the mail determining means; and mail transmitting means for transmitting the fixed form mail selected by the mail selecting means to the same address as a transmitter address of the received electronic mail.

According to a fourth aspect of the present invention, there is provided an electronic mail system comprising:

mail storage means for storing a plurality of fixed form mails;

mail receiving means for receiving an electronic mail;

mail determining means for determining whether or not identification information is included in the electronic mail when it detects that the electronic mail is received by the mail receiving means;

mail selecting means for selecting one of fixed form mails stored in the mail storage means based on a determination result by the mail determining means; and mail transmitting means for transmitting the fixed form mail selected by the mail selecting means to the same address as a transmitter address of the received electronic mail.

According to a fifth aspect of the present invention, there is provided an electronic mail system comprising:

mail receiving means for receiving an electronic mail;

address designating means for designating an address of a specific receiver;

mail determining means for determining whether or not a transmitter address of the received electronic mail is the address designated by the address designating means when it detects that the electronic mail is received by the mail receiving means;

mail transmitting means for transmitting a fixed form mail to the same address as the transmitter address of the received electronic mail when a determination result by the mail determining means is not the designated address; and mail transfer means for transferring the received electronic mail to a predetermined address when a determination result by the mail determining means is the designated address.

According to a sixth aspect of the present invention, there is provided an electronic mail system comprising:

mail receiving means for receiving an electronic mail;

mail determining means for determining whether or not a password is included in the electronic mail when it detects that the electronic mail is received by the mail receiving means;

mail transmitting means for transmitting a fixed form mail to the same address as a transmitter address of the received electronic mail when the mail determining means determines that the password is not included; and mail transfer means for transferring the received electronic mail to a predetermined address when the mail determining means determines that the password is included.

According to a seventh aspect of the present invention, there is provided an electronic mail system comprising:

mail receiving means for receiving an electronic mail;

date and time setting means for setting a specific period of time;

reception date and time determining means for determining whether or not the electronic mail is received during the specific period of time by the mail receiving means;

mail determining means for determining whether or not the electronic mail which is determined to be received during the specific period of time by the reception date and time determining means is a response date and time designated mail which designates the response date and time;

response date and time determining means for determining whether or not the response date and time is in the specific period of time when the electronic mail is determined to be the response date and time designated mail by the mail determining means; and mail transmitting means for transmitting a response mail requesting for a change of the response date and time to a different response data and time except the specific period of time when the response date and time which is determined by the response date and time determining means is in the specific period of time.

According to an eighth aspect of the present invention, there is provided an electronic mail system comprising:

mail receiving means for receiving an electronic mail;

date and time setting means for setting a specific period of time;

reception date and time determining means for determining whether or not the electronic mail is received by the mail receiving means in the specific period of time;

mail determining means for determining whether or not the electronic mail which is determined to be received by the reception date and time determining means in the specific period of time is a response date and time designated mail which designates the response date and time;

response date and time determining means for determining whether or not the response date and time is in the designated period of time when the electronic mail is determined to be the response date and time designated mail by the mail determining means;

mail transmitting means for transmitting a request for a change mail requesting for a change in the response date and time to a different response data and time except the specific period of time when the response date and time which is determined by the response date and time determining means is in the specific period of time;

date and time changing means for changing the response date and time of the response date and time designated mail when the mail receiving means receives a response mail which indicates acceptance of the request for change after the request for change mail is transmitted by the mail transmitting means; and mail transfer means for transferring the response date and time designated mail to a predetermined address when the mail receiving means receives a response mail which refuses the request for change after the request for change mail is transmitted by the mail transmitting means.

According to a ninth aspect of the present invention, there is provided an electronic mail system comprising:

mail receiving means for receiving an electronic mail;

absence setting means for setting an apparatus operation in an absence mode;

fixed form mail storage means for storing a plurality of fixed form mails;

mail determining means for determining attributes of the received electronic mail when the mail receiving means receives the electronic mail in the absence mode;

mail selecting means for selecting one of fixed form mails stored in the mail storage means corresponding to the attributes determined by the mail determining means from; and automatic response means for transmitting the fixed form mail selected by the mail selecting means in response to the same address as a transmitter of the received electronic mail.

According to a tenth aspect of the present invention, there is provided an electronic mail system comprising:

mail receiving means for receiving an electronic mail;

absence setting means for setting an apparatus operation in an absence mode;

absence notice creation means for creating a plurality of response conditions for determining whether or not an absence notice is issued and absence notices having a content corresponding to the plurality of response conditions;

fixed form mail storage means for storing a plurality of response conditions created by the absence notice creation means and a plurality of fixed form mails, one constituting the absence notice corresponding to the plurality of response conditions;

mail attribute determined means for determining which plurality of response conditions stored in the fixed form mail storage means attributes of the received electronic mail satisfy when the mail receiving means receives the electronic mail in the absence mode; and absence notice transmitting means for selecting one of fixed form mails stored in the mail storage means having a content corresponding to satisfied response conditions to read the fixed form mail from the fixed form mail storage means and to transmit the fixed form mail in response to the same address as a transmitter of the received electronic mail as an absence notice when the mail attribute determining means finds the response conditions which satisfy the attributes of the received electronic mail.

According to an eleventh aspect of the present invention, there is provided a computer readable storage medium for storing a program for electronic mail processing, the program comprising:

(i) step of receiving an electronic mail;

(ii) step of setting an absence mode indicating the state of absence of a receiver of the electronic mail;

(iii) step of transmitting a predetermined fixed form mail responding to a first electronic mail received by the step (i) in the absence mode;

(iv) step of determining whether or not a second electronic mail from a receiver responding to the predetermined fixed form mail satisfies a specific condition; and step (v) of transmitting a specific fixed form mail when it is determined by the step (iv) that the specific condition is satisfied.

According to a twelfth aspect of the present invention, there is provided a computer readable storage medium for storing a program for electronic mail processing, the program comprising:

(i) step of receiving an electronic mail;

(ii) step of setting an absence mode indicating the state of absence of a receiver of the electronic mail;

(iii) step of transmitting a predetermined fixed form mail responding to a first electronic mail received by the step (i) in the absence mode; and (iv) step of making the step (iii) to transfer the first electronic mail to a predetermined address when the it is determined that a second electronic mail satisfies a specific condition when the second electronic mail responding to the predetermined fixed mail from a receiver of thereof is received at the step (i).

According to a thirteenth aspect of the present invention, there is provided a computer readable storage medium for storing a program for electronic mail processing, the program comprising:

(i) step of storing a plurality of fixed form mails;

(ii) step of receiving an electronic mail;

(iii) step of designating an address of a specific receiver;

(iv) step of determining whether or not a transmitter address of the received electronic mail is an address designated by the step (iii) when the electronic mail is received by the step (ii);

(v) step of selecting one of fixed form mails stored in the mail storage means based on a determination result by the step (iv) from the plurality of fixed form mails stored by the step (i); and (vi) step of transmitting the fixed form mail selected by the step (v) to the same address as a transmitter address of the received electronic mail.

According to a fourteenth aspect of the present invention, there is provided a computer readable storage medium for storing a program for electronic mail processing, the program comprising:

(i) step of storing a plurality of fixed form mails;

(ii) step of receiving an electronic mail;

(iii) step of determining whether or not a password is included in the electronic mail when the electronic mail is received by the step (ii);

(iv) step of selecting one of fixed form mails from the plurality of fixed form mails stored by the step (i) based on a determination result by the step (iii); and (v) step of transmitting the fixed form mail selected by the step (iv) to the same address as a transmitter address of the received electronic mail.

According to a fifteenth aspect of the present invention, there is provided a computer readable storage medium for storing a program for electronic mail processing, the program comprising:

(i) step of receiving an electronic mail;

(ii) step of designating an address of a specific receiver;

(iii) step of determining whether or not a transmitter address of the received electronic mail is the address designated by the step (ii) when the electronic mail is received by the step (i);

(iv) step of transmitting a fixed form mail to the same address as the transmitter address of the received electronic mail when a determination result by the step (iii) is not the designated address; and (v) step of transferring the received electronic mail to a predetermined address when a determination result by the step (iii) is the designated address.

According to a sixteenth aspect of the present invention, there is provided a computer readable storage medium for storing a program for electronic mail processing, the program comprising:

(i) step of receiving an electronic mail;

(ii) step of determining whether or not a password is included in the electronic mail when the electronic mail is received by the step (i);

(iii) step of transmitting a fixed form mail to the same address as a transmitter address of the received electronic mail when the step (ii) determines that the password is not included; and (iv) step of transferring the received electronic mail to a predetermined address when the step (ii) determines that the password is included.

According to a seventeenth aspect of the present invention, there is provided a computer readable storage medium for storing a program for electronic mail processing, the program comprising:

(i) step of receiving an electronic mail;

(ii) step of setting a specific period of time;

(iii) step of determining whether or not the electronic mail is received during the specific period of time;

(iv) step of determining whether or not the electronic mail is received during the specific period of time is a response date and time designated mail which designates the response date and time;

(v) step of determining whether or not the response date and time designated by the reception date and time designated mail is in the specific period of time; and (vi) step of transmitting a response mail requesting for a change of the response date and time to a different response data and time except the specific period of time when the response date and time is in the specific period of time.

According to an eighteenth aspect of the present invention, there is provided a computer readable storage medium for storing a program for electronic mail processing, the program comprising:

(i) step of receiving an electronic mail;

(ii) step of setting a specific period of time;

(iii) step of determining whether or not the electronic mail is received during the specific period of time by the step (i);

(iv) step of determining whether or not the electronic mail which is determined to be received during the specific period of time by the step (iii) is a response date and time designated mail which designates the response date and time;

(v) step of determining whether or not the response date and time is in the specific period of time when the electronic mail is determined to be the response date and time designated mail by the step (iv);

(vi) step of transmitting a request for change mail requesting for a change in the response date and time to a different response data and time except the specific period of time when the response date and time determined by the step (v) is in the specific period of time;

(vii) step of changing the response date and time of the response date and time designated mail when a response mail which indicates acceptance of the request for a change is received by the step (i) after the request for change mail is transmitted by the step (vi); and (viii) step of transferring the response date and time designated mail to a predetermined address when a response mail which refuses the request for change is received by the step (i) after the request for change mail is transmitted by the step (vi).

According to a nineteenth aspect of the present invention, there is provided a computer readable storage medium for storing a program for electronic mail processing, the program comprising:

(i) step of receiving an electronic mail;

(ii) step of setting an apparatus operation in an absence mode;

(iii) step of storing a plurality of kinds of fixed form mail to fixed form mail storage means;

(iv) step of determining attributes of the received electronic mail when the electronic mail is received by the step (i) in the absence mode set by the step (ii);

(v) step of selecting one of fixed form mails from the plurality of kinds of fixed form mail stored in the fixed form mail storage means at the step (iii) corresponding to the attributes determined by the step (iv); and (vi) step of transmitting the fixed form mail selected by the step (v) in response to the same address as a transmitter of the received electronic mail.

According to a twentieth aspect of the present invention, there is provided a computer readable storage medium for storing a program for electronic mail processing, the program comprising:

(i) step of receiving an electronic mail;

(ii) step of setting an apparatus operation in an absence mode;

(iii) step of creating a plurality of response conditions for determining whether or not an absence notice is issued and the absence notice having a content corresponding to the plurality of response conditions;

(iv) step of storing a plurality of response conditions produced by the step (iii) and a plurality of fixed form mails constituting the absence notice corresponding to the plurality of response conditions to fixed form mail storage means;

(v) step of determining which plurality of response conditions stored in the fixed form mail storage means attributes of the received electronic mail satisfy when the electronic mail is received in the absence mode by the step (i); and (iv) step of selecting one of fixed form mails stored in the mail storage means having a content corresponding to satisfied response conditions to read the fixed form mail from the fixed form mail storage means and to transmit the fixed form mail in response to the same address as a transmitter of the received electronic mail as an absence notice when the step (v) finds the response conditions which satisfy the attributes of the received electronic mail.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 6 shows a reception display screen image of the first embodiment;

FIG. 8 shows a received mail display screen image of the first embodiment;

FIG. 11 shows a mail creation screen image of the first embodiment;

FIG. 13 shows an address list display screen image of the first embodiment;

FIG. 16 shows an address input screen image of the first embodiment;

FIG. 19 shows an absence setting processing screen image of the first embodiment;

FIG. 24A and FIG. 24B are views showing fixed form mail "A" and fixed form mail "B" screen images of the first embodiment;

FIG. 30 shows an absence setting processing screen image of the second embodiment;

FIG. 34 shows a transfer address input screen image of the second embodiment;

FIG. 41 shows an absence setting processing screen image of the third embodiment;

FIG. 43 shows an address list display in address designation of the third embodiment;

FIG. 45A and FIG. 45B are views showing fixed form mail "A" and fixed form mail "B" screen images of the third embodiment;

FIG. 51 shows a mail creation screen image of the fourth embodiment;

FIG. 59 shows an absence setting processing screen image of the fifth embodiment;

FIG. 65 shows an absence setting processing screen image of the sixth embodiment;

FIG. 71 shows a reception display screen image of the seventh embodiment;

FIG. 73 shows a response date and time designated mail display screen image of the seventh embodiment;

FIG. 77 shows a response designated mail creation screen image of the seventh embodiment;

FIG. 81 shows an absence setting processing screen image of the seventh embodiment;

FIG. 85 shows a request for change of response mail creation screen image of the seventh embodiment;

FIG. 94 shows an absence setting processing screen image of the eighth embodiment;

FIG. 110 shows a fixed form mail "A" screen image of the ninth embodiment;

FIG. 112 shows a fixed form mail "B" screen image of the ninth embodiment;

FIG. 116 shows an address list screen image of the ninth embodiment;

FIG. 119 shows a password input screen image of the ninth embodiment;

FIG. 120 shows a fixed from mail "C" screen image of the ninth embodiment;

FIG. 121 is a flow chart of fixed form mail "D" creation processing of the ninth embodiment;

FIG. 122 is a flow chart of the fixed form mail "D" processing of the ninth embodiment, continued from FIG. 121;

FIG. 123 is a flow chart of the fixed form mail "D" processing of the ninth embodiment, continued from FIG. 122;

FIG. 124 shows a fixed form mail "D" screen image of the ninth embodiment;

FIG. 125 is a flow chart of timer interrupt processing of the ninth embodiment;

FIG. 126 is a flow chart of the timer interrupt processing of the ninth embodiment, continued from FIG. 125; and FIG. 127 is a flow chart of the timer interrupt processing of the ninth embodiment, continued from FIG. 126.

BEST MODE OF CARRYING OUT THE INVENTION

The first to ninth embodiments of the present invention will be described below in reference to FIG. 1 to FIG. 127.

Figure 1:
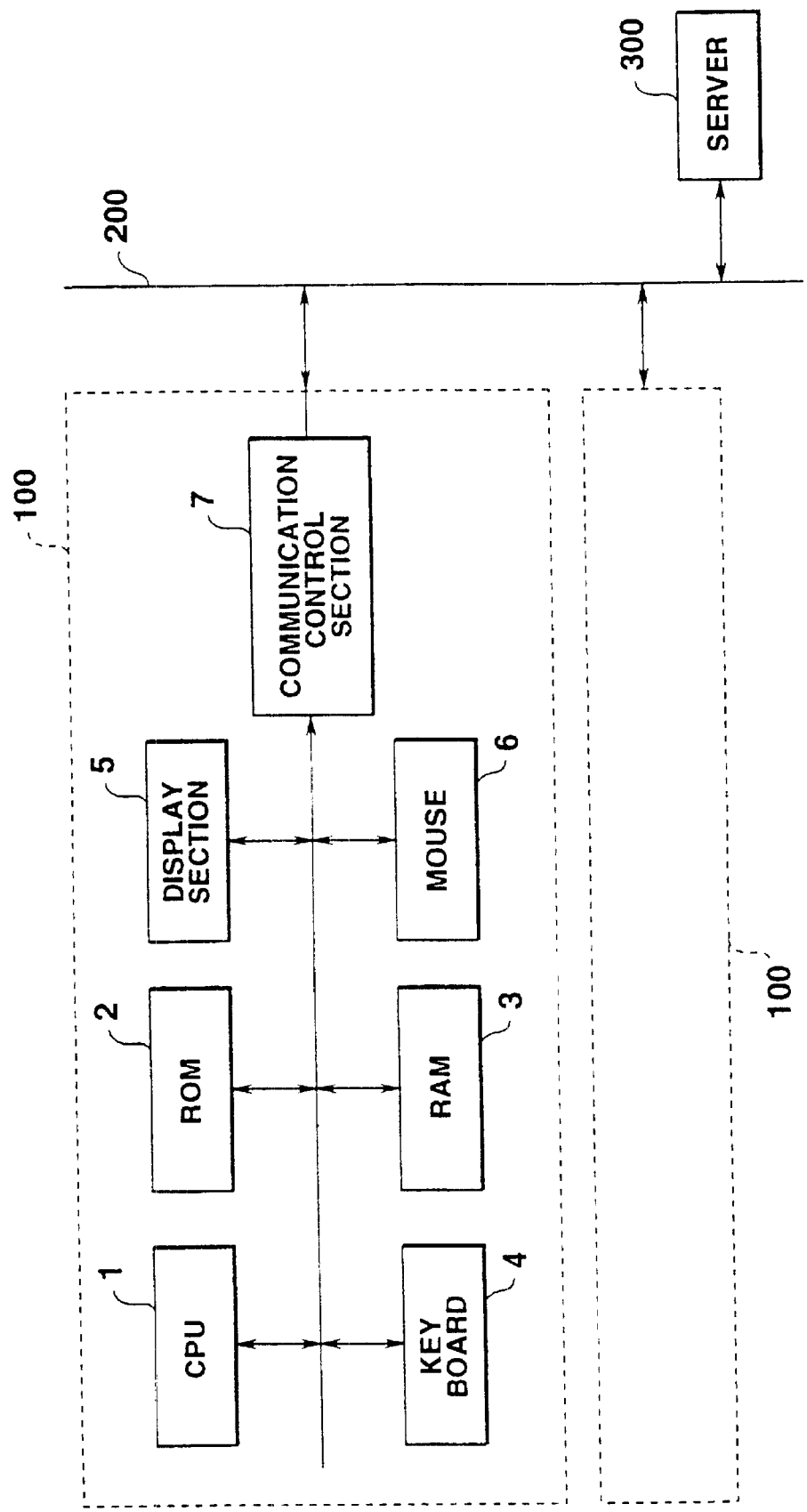
FIG. 1 is a block diagram showing a general system configuration according to the present invention.

FIG. 1 is a block diagram showing a general constitution of an electronic mail system according to the present invention. The embodiments respectively have different constitution of systems and differences will be described in respective descriptions of the embodiments whereas the block diagram is commonly used. A plurality of terminals 100 capable of transmission and reception of an electronic mail are always connected to a server 300 by way of a dedicated communication line 200. Each of the terminals 100 accesses the server 300 in response to timer interrupts occurring at predetermined intervals, inquiries about whether an electronic mail addressed thereto and receives the electronic mail from the server 300 if the mail is arrived there.

In each embodiment, unless otherwise specified, "received mail" indicates a received electronic mail, "transmission mail" an electronic mail to be transmitted, "response mail" an electronic mail in response to a received mail and "transfer mail" an electronic mail to be transferred to a designated address. In addition, "fixed form mail" indicates a response mail created in advance in a predetermined form.

Figure 2:
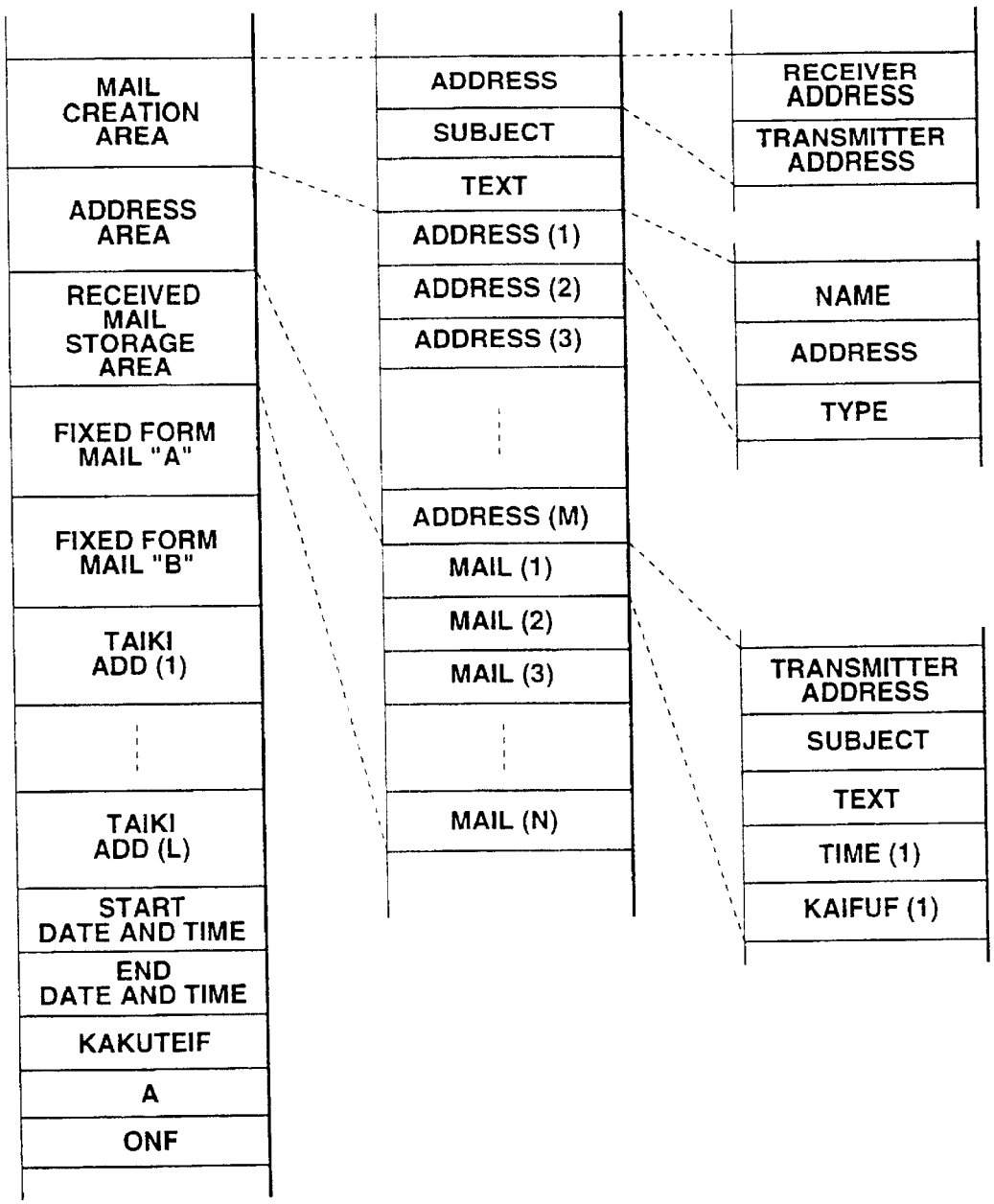
FIG. 2 shows a memory map in a first embodiment.

At each terminal 100, ROM 2, RAM 3, a key board 4, a display section 5, a mouse 6 and a communication control section 7 are mutually connected by way of an internal system bus. The terminal 100 is connected to the dedicated communication line 200 through the communication control section 7. ROM 2 stores initial data for a program and initialization processing to be executed by CPU 1. RAM 3 stores data of electronic mails for transmission input from the key board 4 and data of electronic mails received from the server 300. For this reason, there are provided in RAM 3, as shown in FIG. 2, a mail creation area, an address area, a received mail storage area and other areas. CPU 1 is the core of the terminal 100 and corresponding to mail receiving means, absence mode setting means, mail transmitting means, mail transfer means and the like in the embodiments in cooperation with ROM 2, the keyboard 4, the mouse 6 and the like connected to the internal system bus.

The mail creation area is an area to store an address, a subject and a text which is a content of a transmission mail. Each address consists of a receiver address and a transmitter address (self-address). In the address area, there are registered M addresses of ADDRESS(1) to ADDRESS(M) of the plurality of other terminals 100 which are the other parties of transmission. Each address is composed of name and address of the other party and type of mail. In the received mail storage area, there are included N areas of MAIL(1) to MAIL(N) and the area can store N received mails. Area data of MAIL(1) to MAIL(N) each are data composed of a transmitter address, a subject, a text, TIME indicating date and time of reception and an unseal flag KAIFUF. KAIFUF is "1" for an unsealed condition of an received mail and "0" for a sealed condition of an received mail.

RAM 3 is provided with areas which store respectively two kinds of documents of fixed form mail "A" and fixed form mail "B" to be transmitted. In RAM 3, areas for a plurality of waiting addresses (TAIKI ADD) to store addresses of receivers to which fixed form mails have automatically been transmitted are provided and the addresses are designated by mail numbers "1" to "L". In addition, there are provided areas for a start date and time, an end date and time of an absent period in absence setting, a flag KAIFUTEIF indicating an absence setting condition, a register "A" and an ON flag ONF. The functions of the areas are described later.

In FIG. 1, the key board 4 provides with various kinds of switches (not shown). A mail switch is to start electronic mail processing. A character input switch and a ten key switch are switches for inputting an address of an electronic mail and a transmission text. The display section 5 displays an electronic mail to be transmitted and a received electronic mail. The mouse 6 moves a cursor on the screen image of the display section 5 according to an operation and designates a position of character inputting from the key board 4. The mouse 6 is clicked at the position designated by the cursor to perform various selections.

Operations of the first embodiment will be described in reference to a flow chart to be executed by CPU 1 and a screen image displayed in the display section 5.

Figure 3:
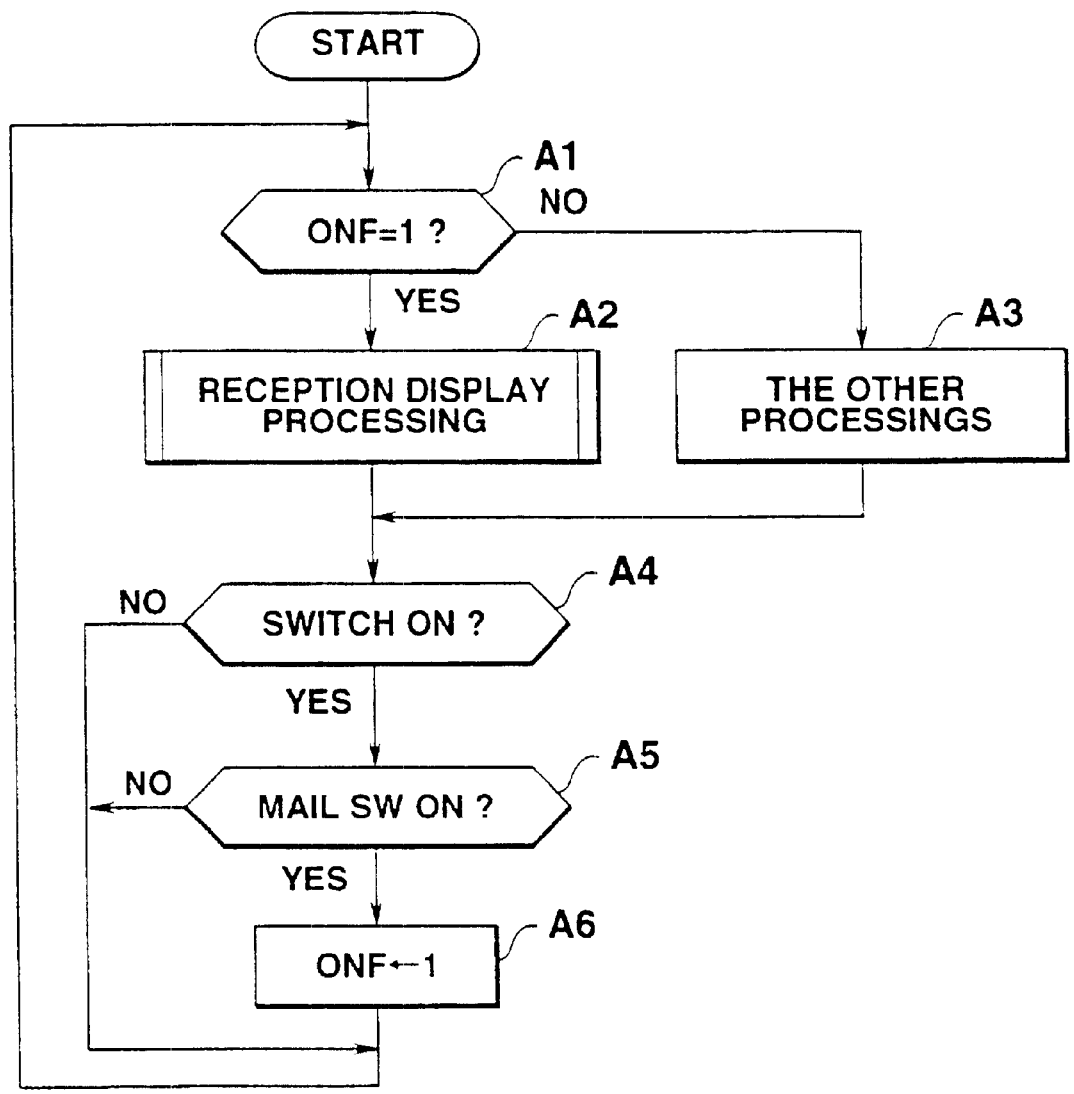
FIG. 3 is a main flow chart of the first embodiment.

FIG. 3 is a flow chart of a main routine of CPU 1. In the flow chart, it is determined whether or not the ON flag ONF indicating processing of an electronic mail (electronic mail processing) is "1" (step A1). If the flag is "1", reception display processing of the electronic mail is executed (step A2) and if the flag is "0", one of the other processing than the electronic mail processing is executed (step A3).

After processing of step A2 or S3, the key board 4 is scanned to determine whether or not switches are turned to the ON states (step A4). If a switch is in the ON state, it is determined whether or not the switch in the ON state is the mail switch (step A5). If the mail switch is in the ON state, the flag ONF is set at "1" (step A6). After the setting of flag ONF, if none of the switches are in the ON state at step A4 or if a switch assuming the ON state at step A5 is not the mail switch, program flow goes to step A1 and the processing mentioned above is repeated.

Figure 4:
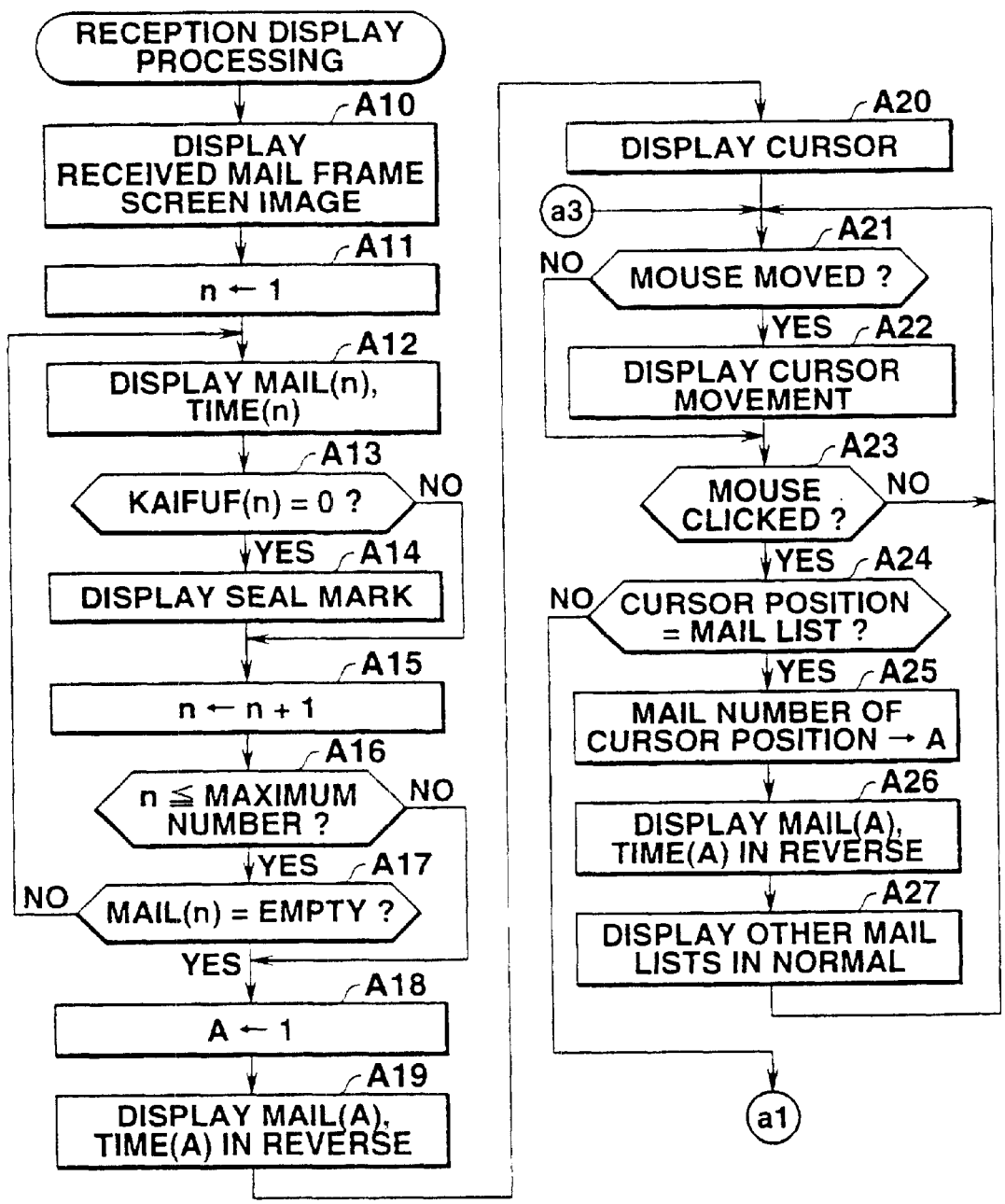
FIG. 4 is a flow chart of reception display processing of the first embodiment.
Figure 5:
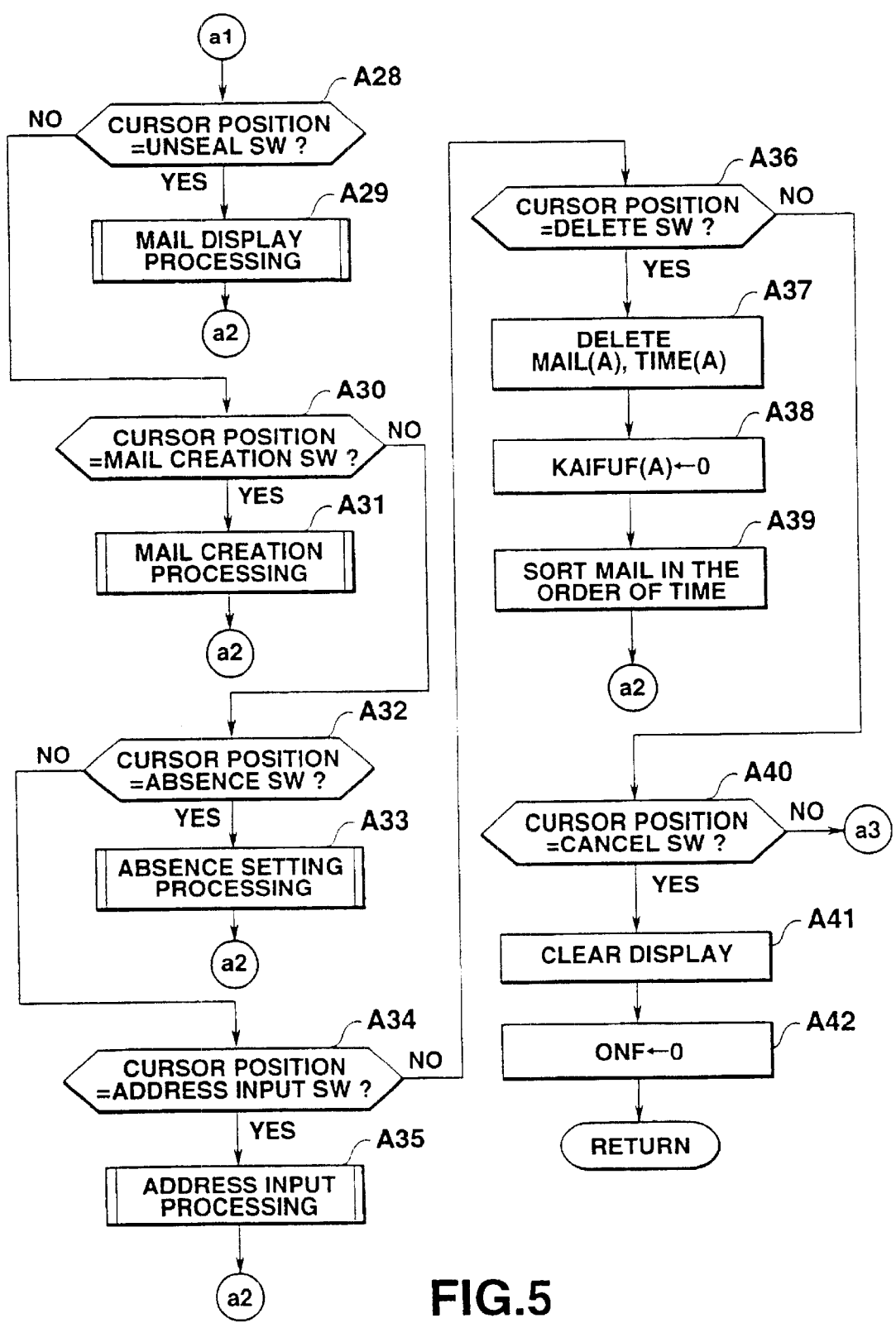
FIG. 5 is a flow chart of the reception display processing of the first embodiment, continued from FIG. 4.

FIGS. 4 and 5 are flow charts showing a routine of reception display processing at step A2 of FIG. 3. FIG. 6 shows a reception display screen image. In the top side of the screen image, a plurality of icons comprising "absence", "delete", "mail creation", "address input", "unsealing" and "cancel" are displayed. If the mouse 6 is clicked when a cursor position is at any one of the icons, processing indicated by the icon is executed. In other words, the icons constitute switches which are actuated to assume the ON state on clicking of the mouse 6. On other display screen images in the first embodiment and on display screen images in the other embodiments as well, switches to be actuated to assume the ON state by clicking of the mouse 6 are displayed.

In FIG. 4, a screen image of a reception mail frame is displayed (step A10), a pointer "n" designating the number of received mails in the received mail storage area 33 of RAM 3 is set at "1" (step A11) and a loop processing from step A12 to step A17 is performed while "n" is incremented, whereby names of transmitters and subjects, reception dates and times and the like are displayed. That is, in the received mail storage area 33 of FIG. 2, a Received mail MAIL(n) designated by "n" and a reception date and time TIME(n) thereof are displayed on the screen image (step A12). Then it is determined whether or not a flag KAIFUF(n) of a displayed received mail is "0" (step A13). If the flag KAIFUF(n) is "0", an unseal mark is displayed in a cell at the left side of a name of a received mail list of FIG. 6 since the received mail is unsealed (step A14). At step A13, when the flag KAIFUF(n) is "1", the seal mark is not displayed since the received mail is already unsealed.

Then parameter "n" is incremented (step A15), it is determined whether or not "n" is the maximum number or less (step A16). If "n" is the maximum number or less, it is determined whether or not a received mail "n" is empty (step A17). If it is not empty, program flow goes to step A12 and the received mail "n" is displayed on the screen image. A loop of step A12 to step A17 is repeated till the received mail "n" area is empty while "n" is incremented and received mails are displayed in succession.

If the pointer "n" is more than the maximum number at step A16, or if a received mail "n" area designated by "n" at step A17 is empty, a register "A" which designates a received mail to be displayed in reverse is set at "1" (step A18), the RECEIVED MAIL(A) and TIME(A) are displayed in reverse on the screen image of FIG. 6 (step A19). Therefore, in the initial stage, the name, and reception date and time of a received mail at the first position of a received mail list are displayed in reverse.

Then a cursor is displayed on the screen image (step A20) and a movement of the mouse 6 is checked (step A21). If the mouse 6 has been moved, a cursor display is moved in accordance with the movement of the mouse 6 (step A22). Then it is determined whether or not the mouse 6 has been clicked (step A23). If the mouse 6 has not been clicked, program goes to step A21 and a movement of the mouse 6 is checked. If the mouse 6 has been clicked, it is determined whether or not a cursor position on the clicking is a position on the screen image of the received mail list (step A24). If the cursor position is any position of the received mail list, the pointer "A" is set at the mail number of the cursor position (step A25). Then a list of RECEIVED MAIL(A) and TIME(A) is displayed in reverse (step A26). The other received mail lists displayed in reverse are displayed in normal (step A27). Thereafter, program goes to step A21 and a movement of the mouse 6 is checked.

At step A24, if a cursor position is not on the screen image of the mail list, program flow goes to a flow of FIG. 5 and it is determined at which of icons of an absence switch, a delete switch, a mail creation switch, an address input switch, an unseal switch and a cancel switch a cursor position in the upper portion of the screen image of FIG. 6 is located.

In the flow of FIG. 5, it is determined whether or not a cursor position is the unseal switch position (step A28) and if the cursor position is this position, mail display processing is executed (step A29). If a cursor position is not the unseal switch position, it is determined whether or not the cursor position is the mail creation switch position (step A30) and if the cursor position is this position, mail creation processing is executed (step A31). If the cursor position is not the mail creation switch position either, it is determined whether or not the cursor position is the absence switch position (step A32) and if the cursor position is this position, absence setting processing is executed (step A33).

If a cursor position is not the absence switch position either, it is determined whether or not the cursor position is the address input switch position (step A34) and if the cursor position is this position, address input processing is executed (step A35). If a cursor position, is not the address input switch position either, it is determined whether or not the cursor position is the delete switch position (step A36) and if the cursor position is this position, the RECEIVED MAIL(A) and the list of TIME(A) are deleted from RAM 4 (step A37) and KAIFUF(A) is reset at "0" (step A38). Then the received mail area is sorted in the order of time when being received (step A39). Thereafter, program flow goes to step A10 of FIG. 4 and display processing of all the received mail list except the deleted received mail list is executed.

At step A36 of FIG. 5, if a cursor position is not the deleted switch position either, it is determined whether or not the cursor position is the cancel switch position (step A40) and if the cursor position is this position, the display of the received mail list is cleared (step A41) and the flag ONF is reset at "0" (step A42). Thereafter, program flow is returned to the main routine of FIG. 3. At step A40, when a cursor position is not the cancel switch position either, that is if a cursor position is not any one of the icon switch positions in the upper portion of the screen image of FIG. 6, program flow goes to step A10 of FIG. 4 and the screen image of FIG. 6 is again displayed.

Figure 7:
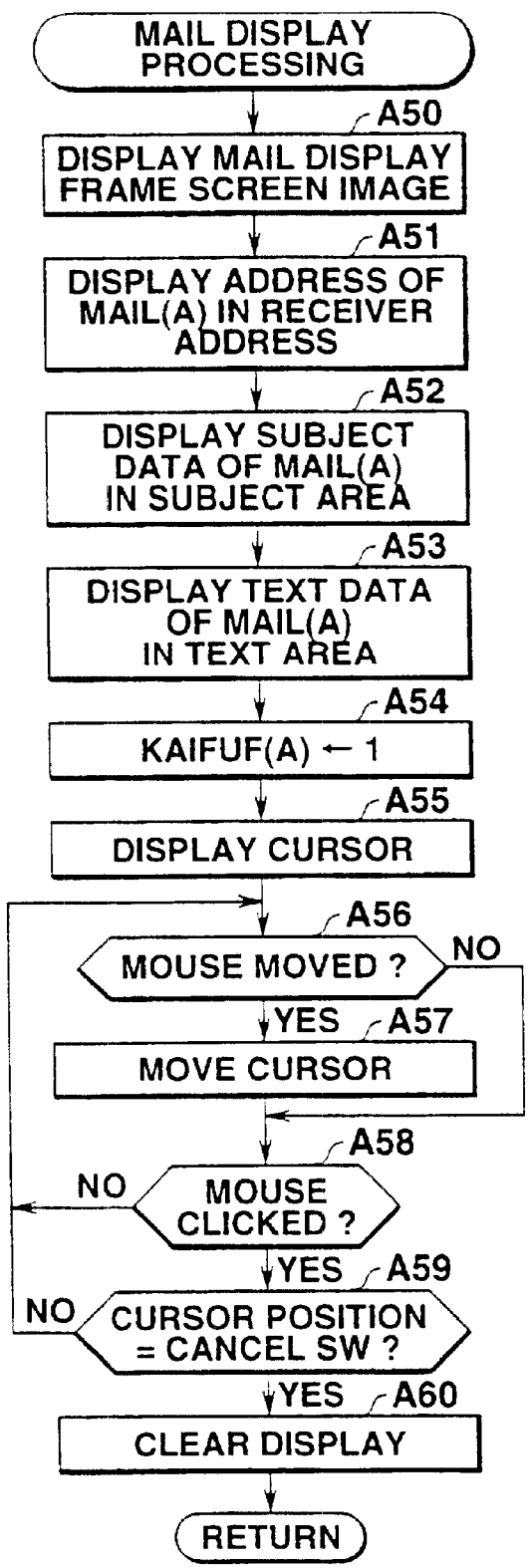
FIG. 7 is a flow chart of mail display processing of the first embodiment.

FIG. 7 is a flow of mail display processing of step A29 of FIG. 5 and FIG. 8 is a display screen image of a received mail designated by reverse display on the screen image of FIG. 6.

In FIG. 7, a mail display frame screen image is displayed (step A50). An address of a RECEIVED MAIL(A) is displayed in a receiver address in the display frame (step A51), subject data of the RECEIVED MAIL(A) is displayed in a subject area (step A52), text data of the RECEIVED MAIL (A) is displayed in a text area (step A53). In response to an unseal instruction, KAIFUF(A) is set at "1" (step A54).

Then, a cursor is displayed on a display screen image of FIG. 8 (step A55) and it is determined whether or not the mouse 6 is moved (step A56). If the mouse 6 has been moved, the cursor is moved in accordance with the movement of the mouse 6 (step A57). It is determined whether or not the mouse 6 has been clicked (step A58). If the mouse 6 has been clicked, it is determined whether or not a cursor position is the cancel switch position (step A59), and if the cursor position is this position, the mail display screen image is cleared (step A60) and program flow goes to step A10 of FIG. 4 to return to the received mail display screen image of FIG. 6. At step A58, if the mouse 6 has not been clicked, or at step A59 if the cursor position is not the cancel switch position, program flow goes to step A56 and a movement of the mouse 6 is checked.

Figure 9:
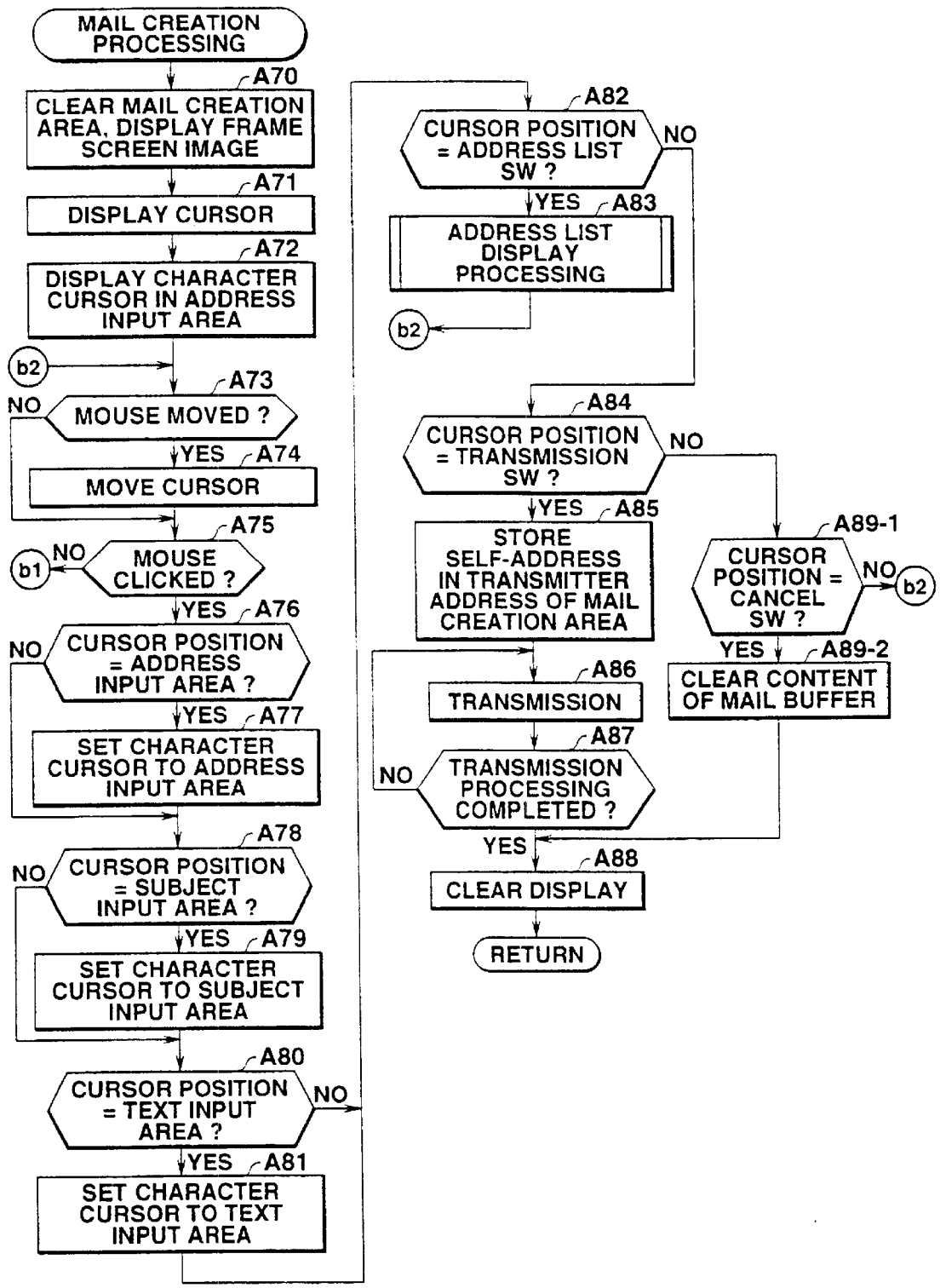
FIG. 9 is a flow chart of mail creation processing of the first embodiment.
Figure 10:
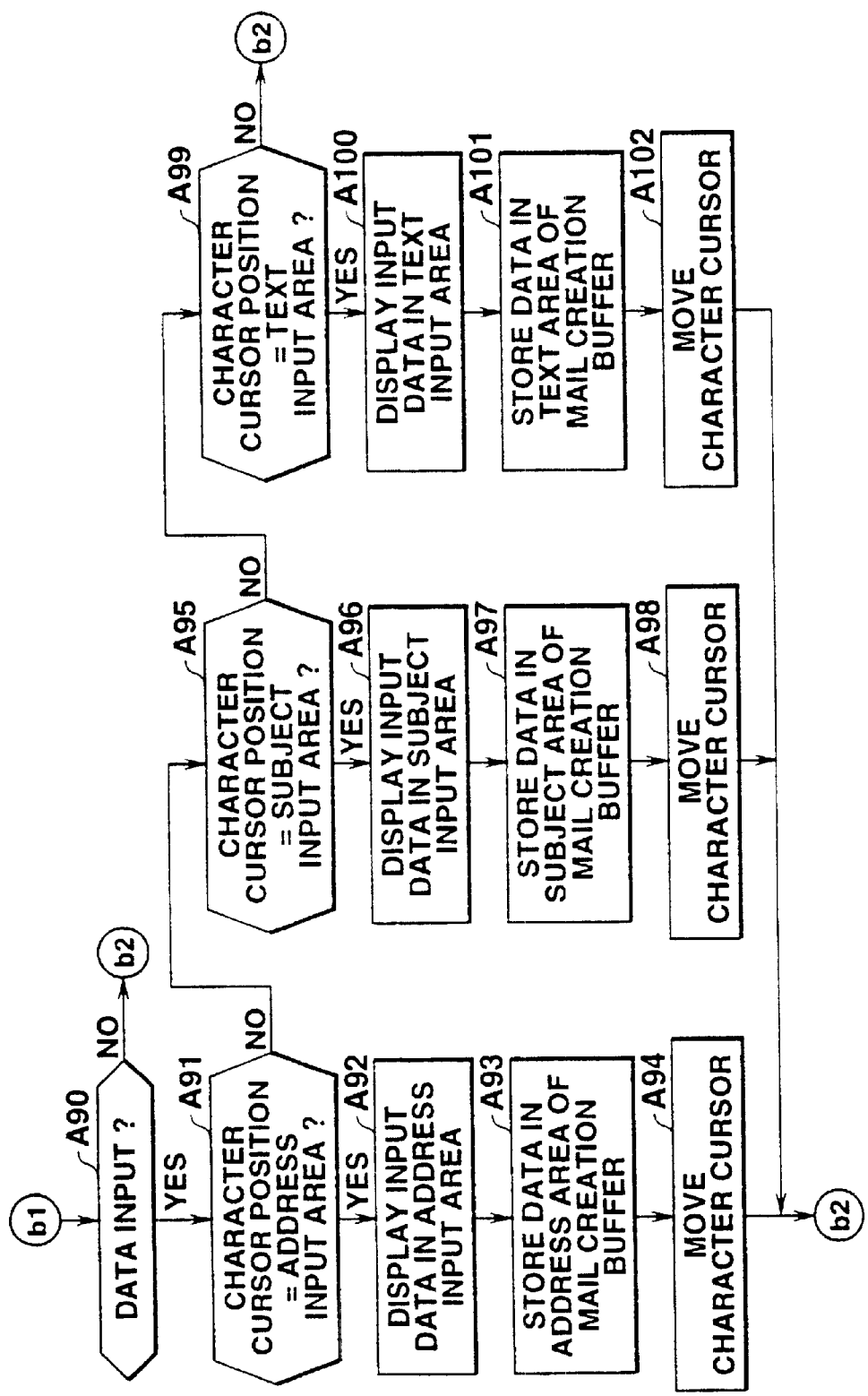
FIG. 10 is a flow chart of the mail creation processing of the first embodiment, continued from FIG. 9.

FIGS. 9 and 10 are flows of mail creation processing of step A31 of FIG. 5 and FIG. 11 is a mail creation screen image.

In FIG. 9, not only is data of the mail creation area of RAM 3 cleared but a mail creation frame screen image is displayed (step A70). A cursor for the mouse 6 is displayed on the screen image of FIG. 11 (step A71) and a character cursor is displayed in the address area (step A72).

Then, it is determined whether or not the mouse 6 has been moved (step A73) and if the mouse 6 has been moved, a cursor position on the screen image is moved in accordance with the movement of the mouse 6 (step A74). It is determined whether or not the mouse 6 is clicked (step A75) and if the mouse 6 has been clicked, processing is executed in accordance with the cursor position in the mail creation screen image of FIG. 11.

It is determined whether or not a cursor position is a position in the address input area (step A76) and if the cursor position is this position, a character cursor is set at the address input area (step A77). If the cursor position is not a position in the address input area, it is determined whether or not the cursor position is a position in the subject input area (step A78) and if the cursor position is this position, the character cursor is set at the subject input area (step A79). If the cursor position is not a position in the subject input area either, it is determined whether or not the cursor position is a position in the text input area (step A80) and the cursor position is this position, the character cursor is set at the text input area (step A81).

If a cursor position is not in the text input area either, it is determined whether or not a cursor position is the address list switch position (step A82), and if the cursor position is this position, address display processing is executed (step A83). If a cursor position is not the address list switch position either, it is determined whether or not the cursor position is the transmission switch position (step A84) and if the cursor position is this position, a self-address is stored in the transmission address of the mail creation area of RAM 3 (step A85) and transmission processing is executed (step A86). Here, the icon switch for transmission of the screen image may be displayed in reverse. Then, it is determined whether or not the transmission processing has been completed (step A87). If the transmission processing has not been completed, the transmission processing of step A86 is continued. If the transmission processing has been completed, the display of the mail creation screen image is cleared (step A88) and program flow goes to step A10 of FIG. 4 and the received mail screen image of FIG. 6 is displayed.

At step A84 of FIG. 9, when a cursor position is not at the transmission switch position, it is determined whether or not the cursor position is the cancel switch position (step A89-1) and if the cursor position is this position, a content of a mail buffer is cleared (step A89-2) and program flow goes to step A10 of FIG. 4 and the received mail screen image of FIG. 6 is displayed.

At step A75, if the mouse 6 has not been clicked, in a flow of FIG. 10, it is determined whether or not data input has been made from the key board 4 (step A90). If the data input has not been made, program flow goes to step A73 of FIG. 9 and a movement of the mouse 6 is checked. If data input has been made, it is determined whether or not a character cursor position is a position in the address input area (step A91). If the character cursor position is this position, input data is displayed in the address input area (step A92) and the input data is stored in the address area of a mail creation buffer of RAM 3 (step A93). Then the character cursor is set at a next character input position (step A94).

At step A91, if a character cursor position is not a position in the address input area, it is determined whether or not the cursor position is a position in the subject input area (step A95). If the cursor position is this position, input data is displayed in the subject input area (step A96) and the input data is stored in a mail creation buffer of RAM 3 (step A97). Then, the character cursor is set at a next character input position (step A98).

At step A95, if a character cursor position is not a position in the subject input area, it is determined whether or not the cursor position is a position in the text input area (step A99). If the character cursor position is this position, input data is displayed in the text input area (step A100) and the input data is stored in a text area of the mail creation buffer of RAM 3 (step A101). Then, the character cursor is set at a next character input position (step A102).

After the character cursor is moved at step A94, step A98 or step A102, program flow goes to step A73 of FIG. 9 and a movement of the mouse 6 is checked.

Figure 12:
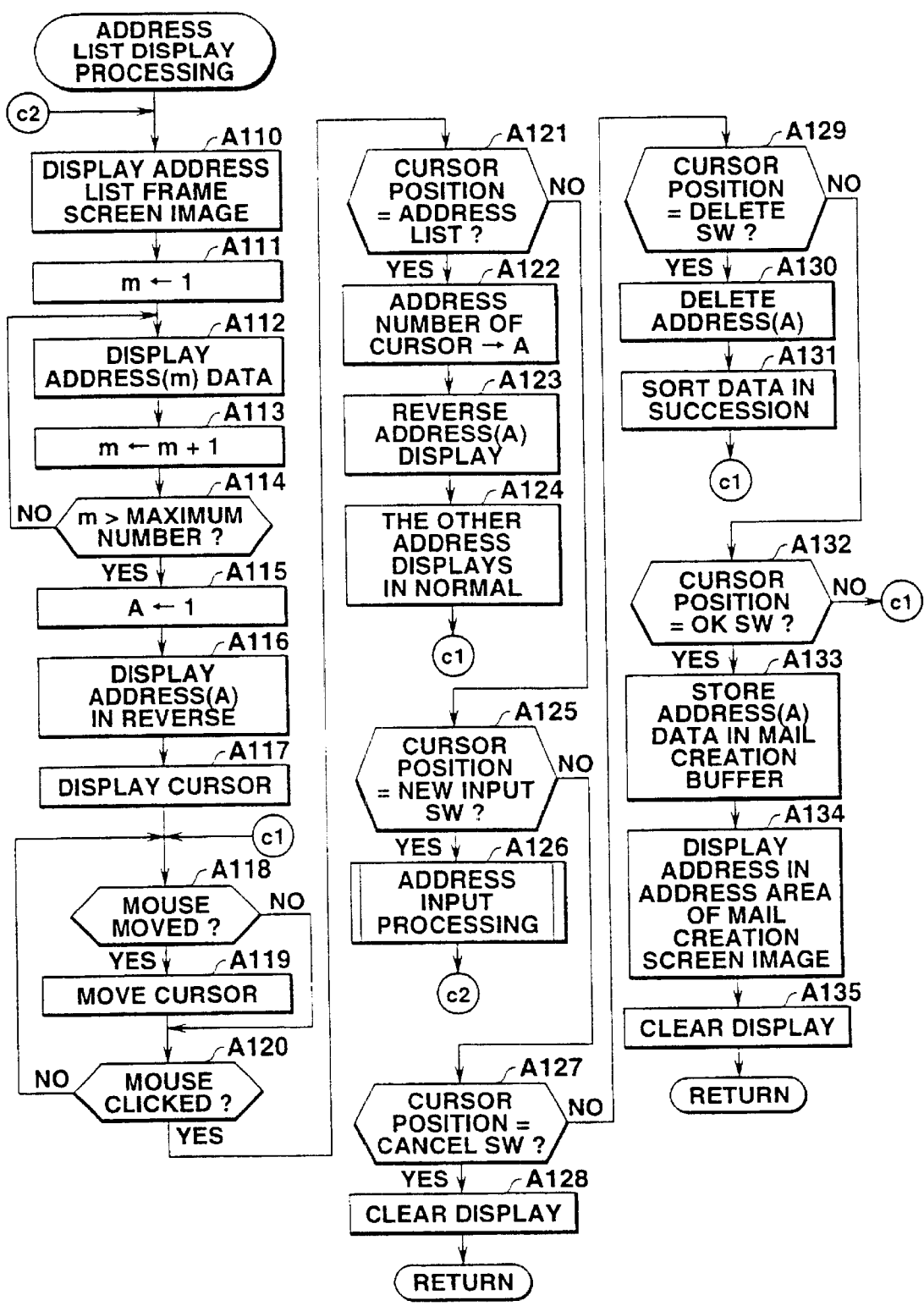
FIG. 12 is a flow chart of address list display processing of the first embodiment.

FIG. 12 is a flow of address list display processing at step A83 of FIG. 9 and FIG. 13 is an address list display screen image.

In FIG. 12, a frame screen image of an address list is displayed (step A110). Then, a pointer "m" indicating an address number is set at "1" (step A111) and data of the ADDRESS(m) designated by "m" is displayed (step A112). Then, pointer "m" is incremented (step A113) and it is determined whether or not "m" exceeds the maximum number (step A114). If "m" is equal to or less than the maximum number, program flow goes to step A112 and data of the ADDRESS(m) is displayed. Then, a loop of steps A112, A113 and A114 is repeated till "m" exceeds the maximum number while "m" is incremented.

At step A114, if "m" exceeds the maximum number, a register "A" is set at "1" (step A115) and an ADDRESS(A) of the first position of the address list is displayed in reverse (step A116). Then, a cursor is displayed on the screen image (step A117) and it is determined whether or not the mouse has been moved (step A118). If the mouse 6 has been moved, a cursor position is moved in accordance with a movement of the mouse 6 (step A119). Then, it is determined whether or not the mouse 6 has been clicked (step A120) and if the mouse 6 has not been clicked, program flow goes to step A118 and a movement of the mouse 6 is checked.

If the mouse 6 has been clicked, it is determined whether or not a cursor position is a position in the address list on the screen image of FIG. 13 (step A121). If the cursor position is this position, an address number of the cursor position is set to register "A" (step A122). Then, the ADDRESS(A) is displayed in reverse (step A123), the other ADDRESSes are displayed in normal (step A124). Then program flow goes to step A118 and a movement of the mouse 6 is checked.

At step A121, if a cursor position is not a position in the address list, it is determined whether or not the cursor position is a new input switch position on the screen image of FIG. 13 (step A125). If the cursor position is this position, address input processing is executed (step A126). After the address input processing is completed, program flow goes to step A110 and the address list screen image is displayed.

At step A125, if a cursor position is not the new input switch position, it is determined whether or not the cursor position is the cancel switch position on the screen image (step A127). If the cursor position is this position, a display of the address list screen image of FIG. 13 is cleared (step A128) and program flow goes to step A73 of FIG. 9 and a movement of the mouse 6 on the mail creation screen image of FIG. 11 is checked.

At step A127 of FIG. 12, if a cursor position is not the cancel switch position, it is determined whether or not the cursor position is the delete switch position on the screen image of FIG. 13 (step A129). If the cursor position is this position, the ADDRESS(A) is deleted from the address area of RAM 3 (step A130) and the address data is sorted in succession (step A131). Then, program flow goes to step A118 and a movement of the mouse 6 is checked.

At step A129, if a cursor position is not the delete switch position, it is determined whether or not the cursor position is the OK switch position on the screen image of FIG. 13 (step A132). If the cursor position is this position, data of the ADDRESS(A) is stored in a mail creation buffer (step A133) and the address is displayed in the address area of a mail creation screen image of FIG. 11 (step A134). Then, the display of the address list screen image of FIG. 13 is cleared (step A135) and program flow goes to step A73 of FIG. 9 and a movement of the mouse 6 on the mail creation screen image of FIG. 11 is checked.

Figure 14:
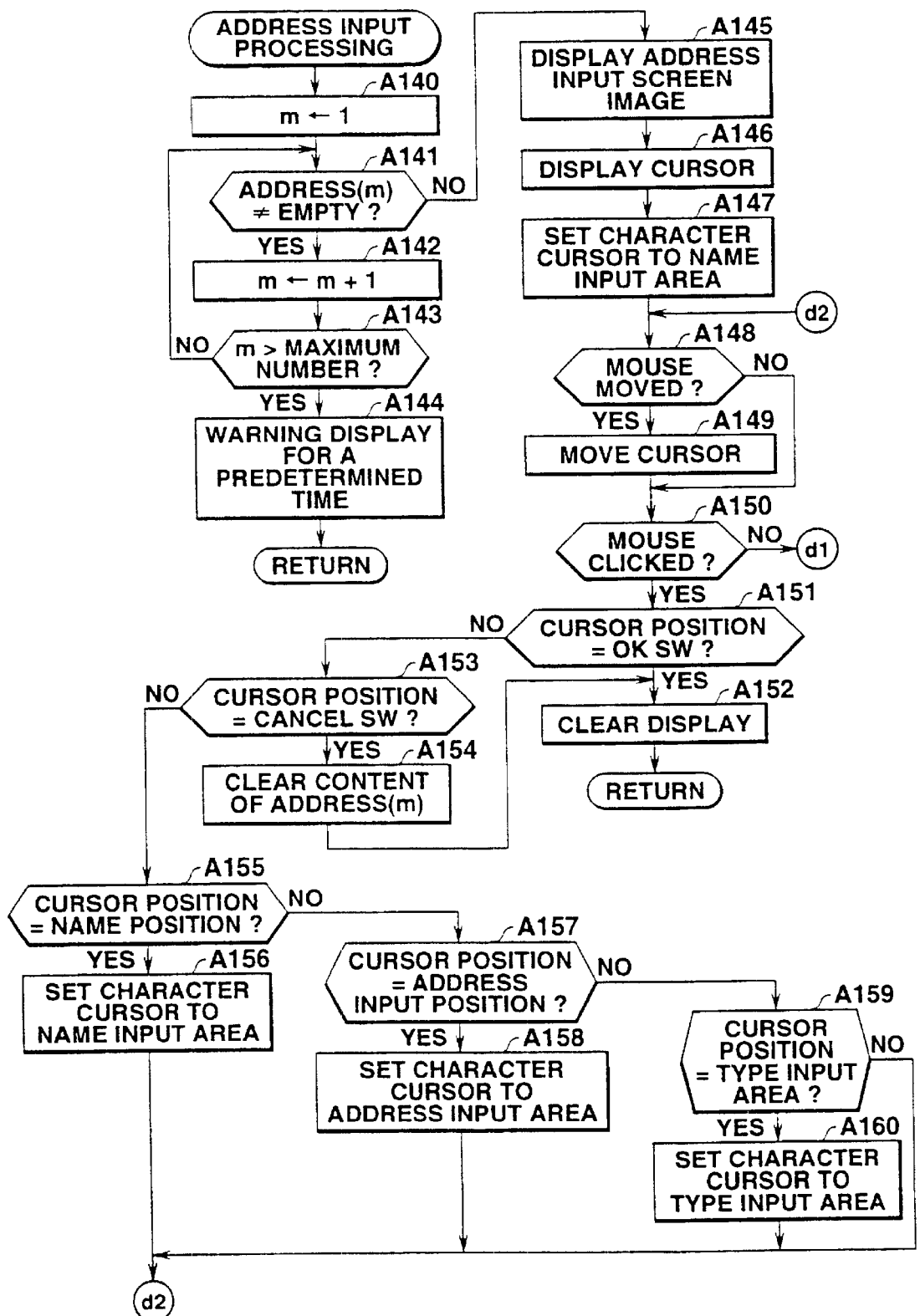
FIG. 14 is a flow chart of address list input processing of the first embodiment.
Figure 15:
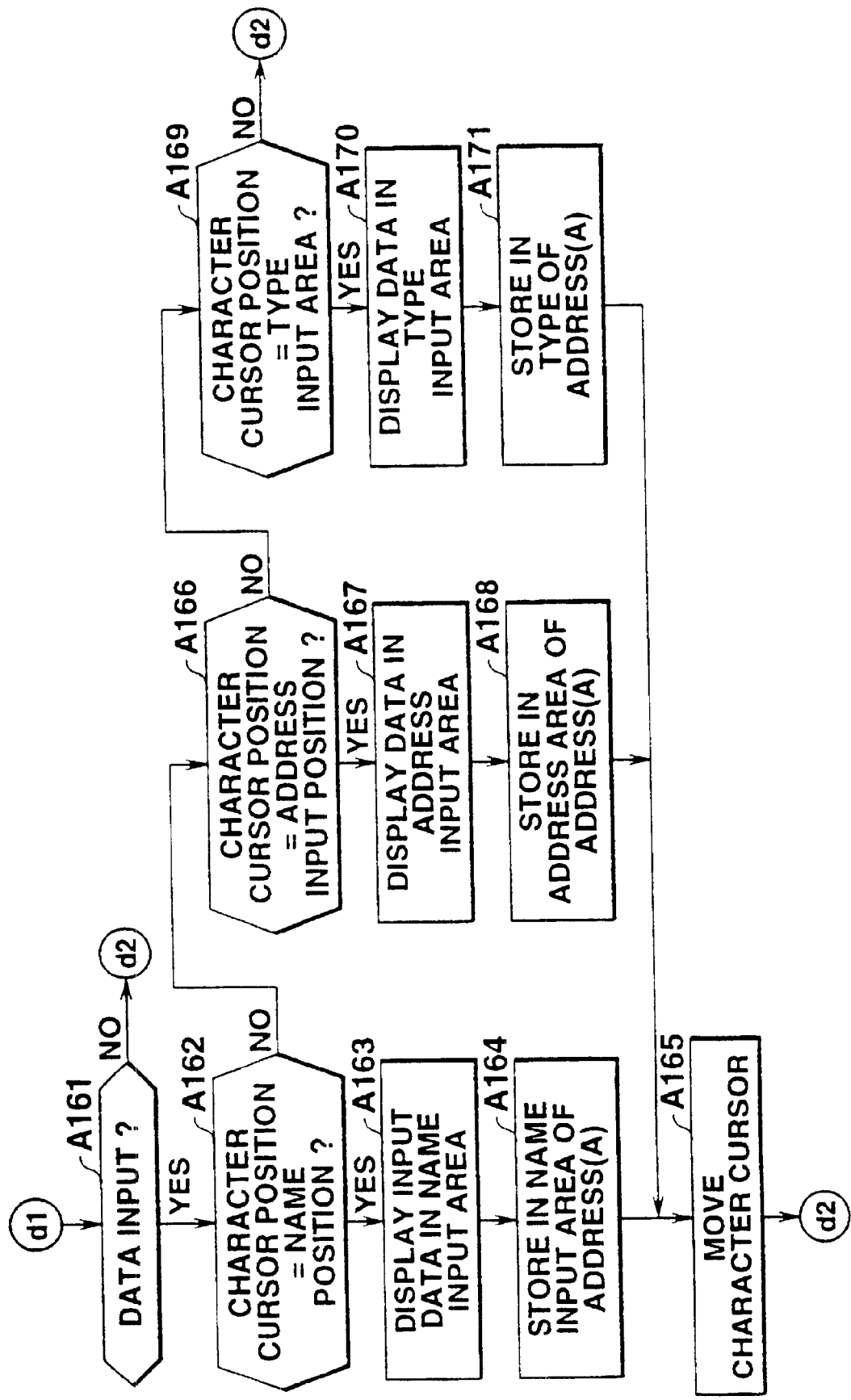
FIG. 15 is a flow chart of the address list processing of the first embodiment, continued from FIG. 14.

FIGS. 14 and 15 are flows of address input processing at step A35 of FIG. 5 and step A126 of FIG. 12 and, if the mouse 6 has been clicked when a cursor is located at the address input switch position on the screen image of FIG. 6, or if the mouse 6 has been clicked when a cursor is located at a new input switch position on the screen image of FIG. 13, program flow goes to the flow of FIG. 14.

In FIG. 14, a pointer "m" indicating an address number is set at "1" (step A140) and it is determined whether or not an area of the ADDRESS(m) is empty (step A141). If the area is not empty, "m" is incremented (step A142) and it is determined whether or not "m" exceeds the maximum number (step A143). If "m" is equal to or less than the maximum number, program flow goes to step A141 and it is determined whether or not the area of the ADDRESS(m) is empty. Then, an empty area is searched by repeating a loop of steps A141, A142 and A143 while "m" is incremented. At step A143, if "m" is the maximum number, a warning display is performed for a predetermined time since there is no empty area (step A144).

At step A141, if there is available an ADDRESS(m) with an empty space, the address input screen image shown in FIG. 16 is displayed (step A145). Not only is a cursor for the mouse 6 displayed on the screen image (step A146) but a character cursor is displayed in a name input area (step A147).

Then, it is determined whether or not the mouse 6 has been moved (step A148) and if the mouse 6 has bene moved, the cursor is moved in accordance with the movement of the mouse 6 (step A149). Then, it is determined whether or not the mouse 6 has been clicked (step A150) and if the mouse 6 has been clicked, it is determined whether or not the cursor position on clicking is the OK switch position of FIG. 16 (step A151). If the cursor position is this position, the address input screen image is cleared (step A152) and program flow goes to step A10 of FIG. 4 and the received mail screen image of FIG. 6 is displayed.

At step A151 of FIG. 14, if the position on clicking is not the OK switch position, it is determined whether or not the cursor position is the cancel switch position on the screen image of FIG. 16 (step A153). If the cursor position is this position, a content of an ADDRESS(m) is cleared (step A154) and the address input screen image is cleared at step A152 and program flow goes to step A10 of FIG. 4 and the received mail screen image of FIG. 6 is displayed.

At step A153 of FIG. 14, the cursor position is not the cancel switch position, it is determined whether or not the cursor position is a name position (step A155). If the cursor position is this position, a character cursor is set at the name input area (step A156). Then, program flow goes to step A148 and a movement of the mouse 6 is checked. At step A155, if a cursor position is not the name position, it is determined whether or not the cursor position is the address input position (step A157). If the cursor position is this position, a character cursor is set at the address input area (step A158). Then, program flow goes to step A148 and a movement of the mouse 6 is checked.

At step A157, if a cursor position is not the address input position, it is determined whether or not the cursor position is a position in the type input area (step A159). If the cursor position is this position, a character cursor is set at the type input area (step A160). Then, program flow goes to step A148 and a movement of the mouse 6 is checked. If a position when the mouse 6 is clicked is not any one of the above mentioned positions, program flow goes to step A148 and a movement of the mouse 6 is checked.

At step A150, if the mouse 6 has not been clicked, program flow goes to the flow of FIG. 15 and it is determined whether or not data input has been made (step A161). If data input has been made, it is determined whether or not a character cursor position is the name position (step A162). If the cursor position is this position, the data input to the name input area is displayed (step A163) and the data input in a name input area of an ADDRESS(A) of RAM 3 in FIG. 2 are stored (step A164). Then, the character cursor position is moved (step A165).

At step A162, if a cursor position is not the name position, it is determined whether or not the character cursor position is the address input position (step A166). If the cursor position is this position, data input in the address input area is displayed (step A167) and data input in an address area of the ADDRESS(A) of RAM 3 are stored (step A168). Then, the character cursor position is moved (step A165).

At step A166, if a character cursor position is not the address input position, it is determined whether or not the character cursor position is a position in the type input area (step A169). If the character cursor position is this position, data input in the type input area are displayed (step A170), data input in the address input area of RAM 3 are displayed (step A171) and data input in the type input area of an ADDRESS(A) of RAM 3 are stored (step A172). Then, the character cursor position is moved (step A165).

At step A165, after the character cursor is moved, or if the character cursor position is not any one of the above mentioned positions of name, address input and type input, or if data input is not made at step A161, program flow goes to step A148 of FIG. 14 and a movement of the mouse 6 is checked.

Figure 17:
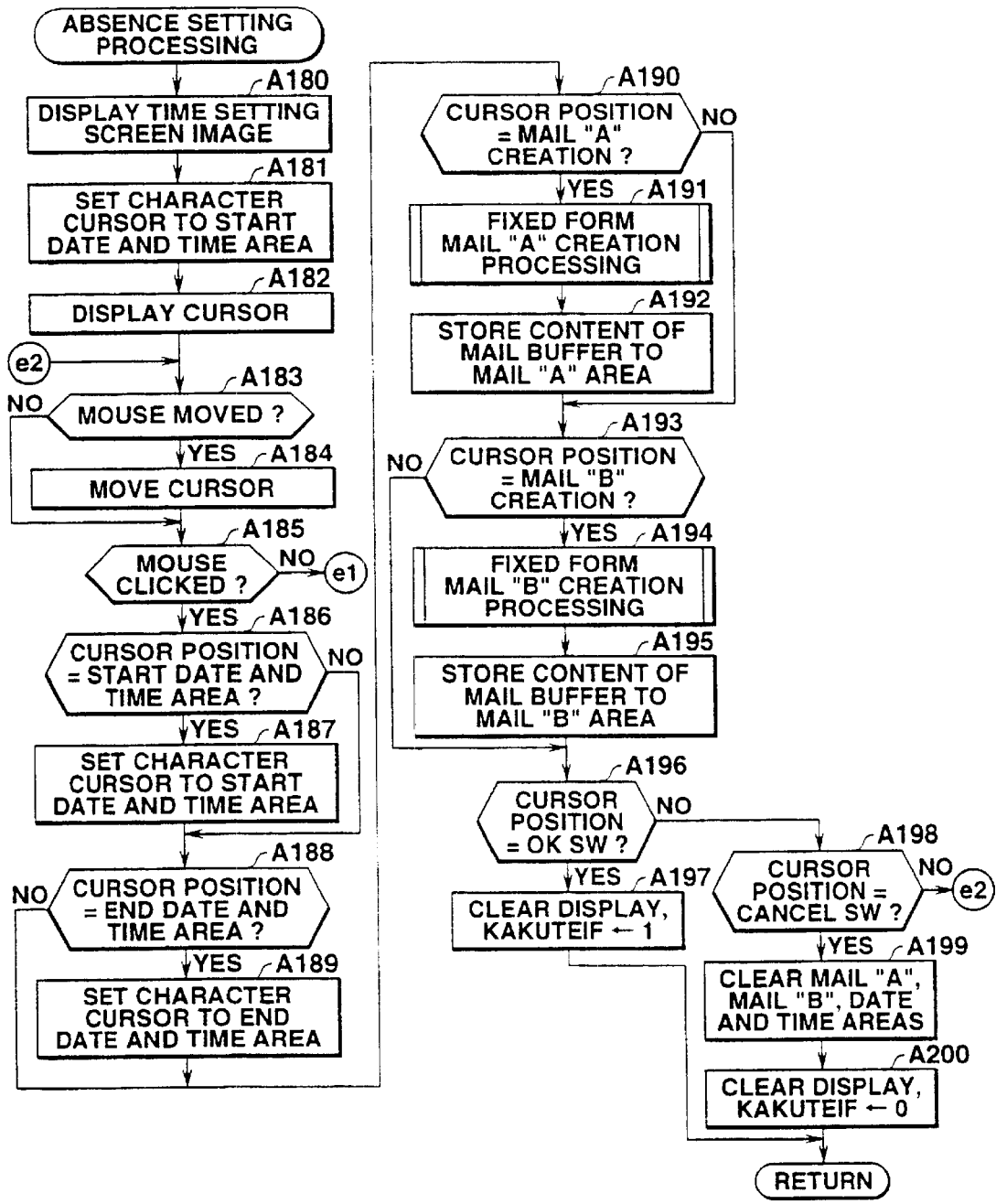
FIG. 17 is a flow chart of absence setting processing of the first embodiment.
Figure 18:
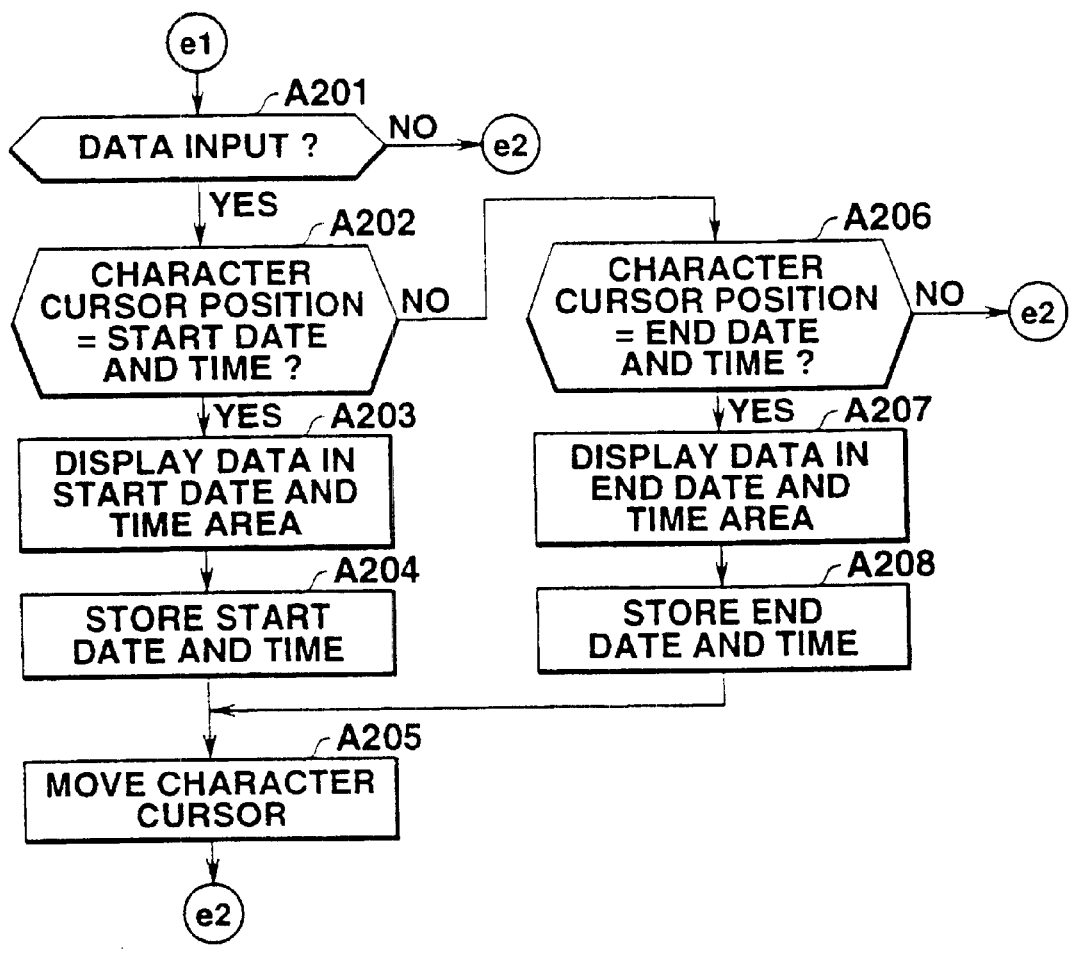
FIG. 18 is a flow chart of the absence setting processing of the first embodiment, continued from FIG. 17.

FIGS. 17 and 18 are flows of absence setting processing at step A33 of FIG. 5 and FIG. 19 is an absence setting processing screen image.

In FIG. 17, a time setting screen image is displayed in the absence setting processing screen image of FIG. 19 (step A180) and a character cursor is set at a start date and time area (step A181). Then, a cursor for the mouse 6 is displayed (step A182). Then, it is determined whether or not the mouse 6 has been moved (step A183) and if the mouse 6 has been moved, the cursor is moved in accordance with the movement of the mouse 6 (step A184). Then, it is determined whether or not the mouse 6 is clicked (step A185). If the mouse 6 has been clicked, it is determined whether or not a cursor position is in the start date and time area (step A186). If the cursor position is this position, a character cursor is set at the start data and time area (step A187).

If a cursor position is not the start date and time area, it is determined the cursor position is in an end date and time area (step A188). If the cursor position is this position, a character cursor is set at the end date and time area (step A189). If a cursor position is not an end date and time area, it is determined whether or not the cursor position is a position of the mail "A" creation switch on the screen image of FIG. 19 (step A190). If the cursor position is this position, a fixed form mail "A" creation processing is executed (step A191). A content of a mail buffer is stored in the fixed form mail "A" area of RAM 3 of FIG. 2 (step A192).

At step A190, if a cursor position is not the mail "A" creation switch position, it is determined whether or not the cursor position is a mail "B" creation switch position on the screen image of FIG. 19 (step A193). If the cursor position is this position, a fixed form mail "B" creation processing is executed (step A194). A content of a mail buffer is stored in the fixed form mail "B" area of RAM 3 of FIG. 2 (step A195).

At step A193, if a cursor position is not the mail "B" creation switch position, it is determined whether or not the cursor position is an OK switch position (step A196). If the cursor position is this position, the absence setting processing screen image of FIG. 19 is cleared and a definite flag KAKUTEIF is set at "1" (step A197). Thereafter, program flow goes to step A10 of FIG. 4 and the received mail screen image of FIG. 6 is displayed.

At step A196, if a cursor position is not the OK switch position, it is determined whether or not the cursor position is the cancel switch position (step A198). If the cursor position is this position, data of a mail "A", a mail "B", and a date and time areas are cleared (step A199), the absence setting processing screen image of FIG. 19 is cleared and the definite flag KAKUTEIF is reset at "0" (step A200). Thereafter, program flow goes to step A10 of FIG. 4 and the received mail screen image of FIG. 6 is displayed.

At step A198, if a cursor position is not the cancel switch position, that is if a cursor position is not any one of the above mentioned positions, or after processing in accordance with a cursor position is completed, program flow goes to step A183 and a movement of the mouse 6 is checked.

At step A185, if the mouse 6 has not been clicked, program flow goes to a flow of FIG. 18 and it is determined whether or not data input has been made from the key board 4 (step A201). If the data input has been made, it is determined a character cursor position is in the start date and time area (step A202). If the cursor position is this position, start date and time data input to the date and time area are displayed (step A203) and the start date and time data are stored in RAM 3 (step A204). The character cursor is moved (step A205).

At step A202, if a character position is not the start date and time position, it is determined whether or not a character cursor position is an end date and time position (step A206). If the character cursor position is this position, end date and time data input to the end date and time area is displayed (step A207) and the data of the end date and time are stored in RAM 3 (step A208). Then, the character cursor is moved (step A205).

After the character cursor is moved at step A205, or if data input has not made at step A201 or if a cursor position is not any one of the start date and time, and end date and time positions, program flow goes to step A183 of FIG. 17 and a movement of the mouse 6 is checked.

Figure 20:
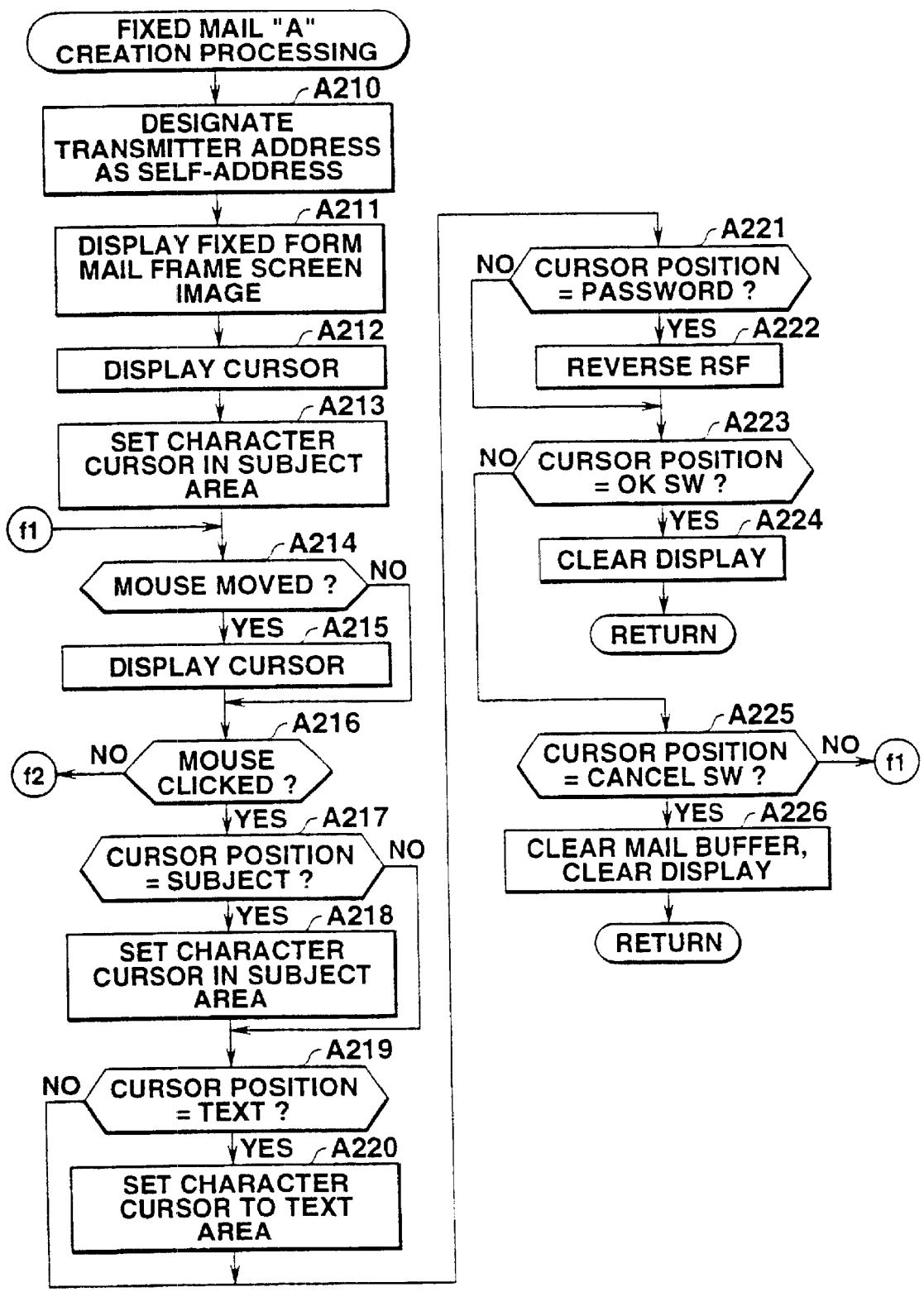
FIG. 20 is a flow chart of fixed form mail "A" creation processing of the first embodiment.
Figure 21:
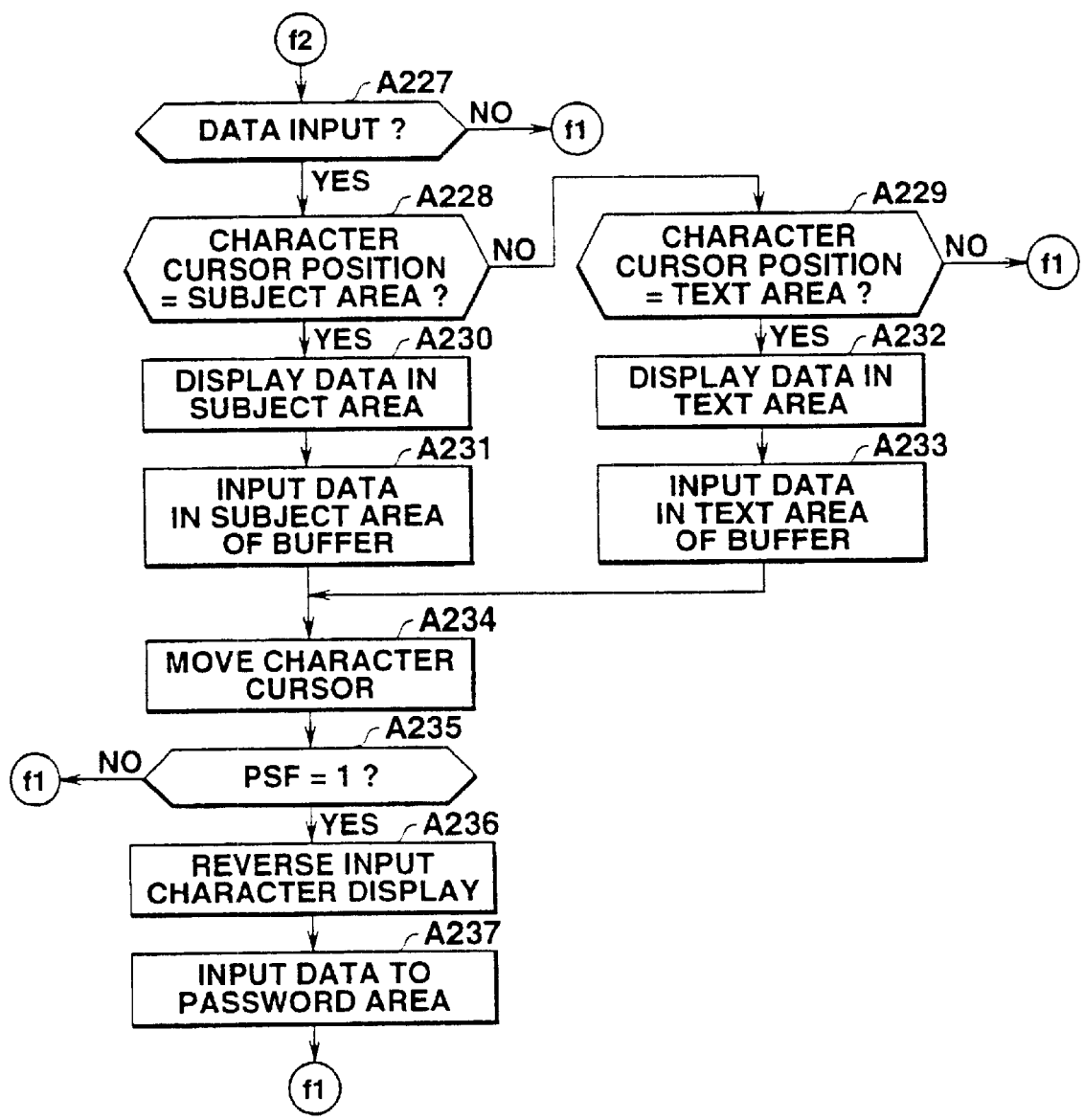
FIG. 21 is a flow chart of the fixed form mail "A" creation processing of the first embodiment, continued from FIG. 20.

FIGS. 20 and 21 are flows of a fixed form mail "A" creation processing at step A191 of FIG. 17 and FIG. 24A is a fixed form mail "A" display screen image. FIG. 24A clearly indicates an absent period and simultaneously an electronic mail clearly indicating an emergency contact place in the absent period. In the screen image, an OK switch, a cancel switch and in addition to them a password switch are provided.

In FIG. 20, a transmitter address is set as a self-address (step A210). Then, a fixed form mail creation frame screen image is displayed (step A211). A cursor for the mouse 6 is displayed (step A212) and a character cursor is displayed in a subject area (step A213).

Then, it is determined whether or not the mouse 6 has been moved (step A214) and if the mouse 6 has been moved, a cursor position on the screen image is moved in accordance with the movement of the mouse 6 (step A215). It is determined whether or not the mouse 6 has been clicked (step A216) and if the mouse 6 has been clicked, processing is executed in accordance with a cursor position in the fixed form mail "A" screen image of FIG. 24A.

It is determined whether or not a cursor position is a position in the subject area (step A217) and if the cursor position is this position, a character cursor is set at the subject area (step A218). If a cursor position is not a position in the subject area, it is determined whether or not the cursor position is a position in the text area (step A219) and if the cursor position is this position, a character cursor is set at the text are (step A220). If a cursor position is not a position in the text area either, it is determined whether or not the cursor position is a password switch position on the screen image (step A221). If the cursor position is this, a password flag PSF is inverted (step A222).

If the cursor position is not the password switch position either, it is determined whether or not the cursor position is an OK switch position (step A223) and if the cursor position is this position, a fixed form mail screen image is cleared (step A224) and program flow is returned to a flow of FIG. 17.

If a cursor position is not the OK switch position, it is determined whether or not the cursor position is a cancel switch position (step A225) and if the cursor position is this position, a password data of a mail buffer is cleared and simultaneously a fixed form mail screen image is cleared (step A226). Program flow is returned to the flow of FIG. 17. If a position when the mouse 6 is clicked is not one of the above mentioned positions, program flow goes to step A241 and a movement of the mouse 6 is checked.

At step A216 of FIG. 20, if the mouse 6 has not been clicked, it is determined whether or not data input has been made from the keyboard 4 in FIG. 21 (step A227). If the data input has been made, it is determined whether or nor a character cursor position is in a subject area (step A228). If the cursor position is not this position, it is determined whether or not a character cursor position is in a text area (step A229).

At step A228, if a character cursor position is the subject area, data input to the subject area is displayed (step A230) and the data are stored by inputting to the subject area of a buffer of RAM 3 (step A231). For example, as shown in FIG. 24A, a subject data of "matter of absence" is displayed. On the other hand, if a character cursor position is in the text area at step A229, data input to the text area are displayed (step A232) and the data are stored in the text area of a buffer of RAM 3 by inputting (step A233). For example, as shown in FIG. 24A, a text data including an absent period and a password is displayed.

At step A231 or step A233, after the data are stored, the character cursor is moved (step A234). Then, it is determined whether or not the password flag PSF is "1" (step A235) and if the flag is "1", an input character display is reversed (step A236) and input data are stored in a password area (step A237). Program flow goes to step A214 of FIG. 20 and a movement of the mouse 6 is checked. At step A227, if the data are not input, if a character cursor position is neither the subject area at step A228 nor the text area at step A229, or if PSF is "0" at step A235, program flow goes to step A214 of FIG. 20 and a movement of the mouse 6 is checked.

Figure 22:
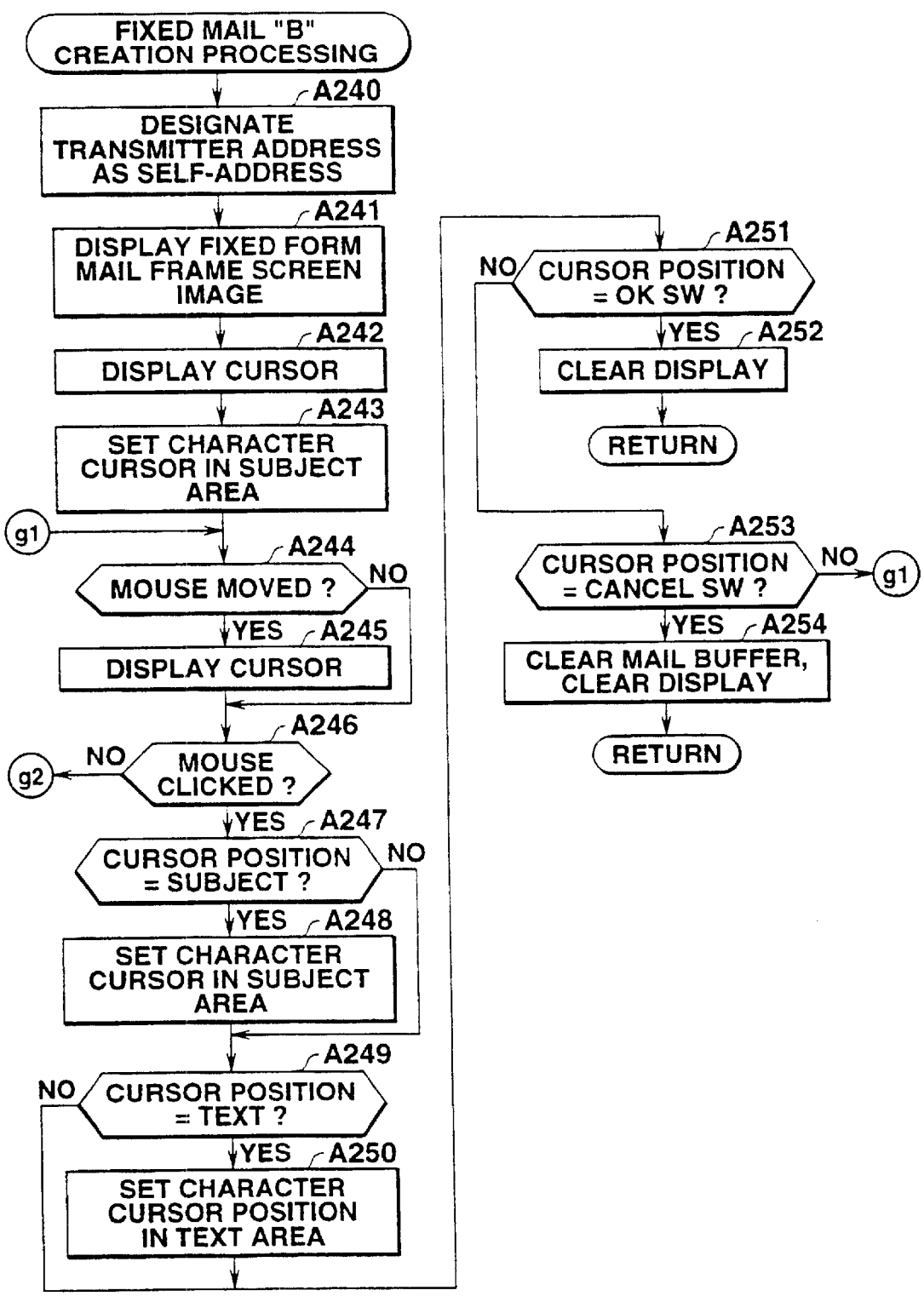
FIG. 22 is a flow chart of fixed form mail "B" creation processing of the first embodiment.
Figure 23:
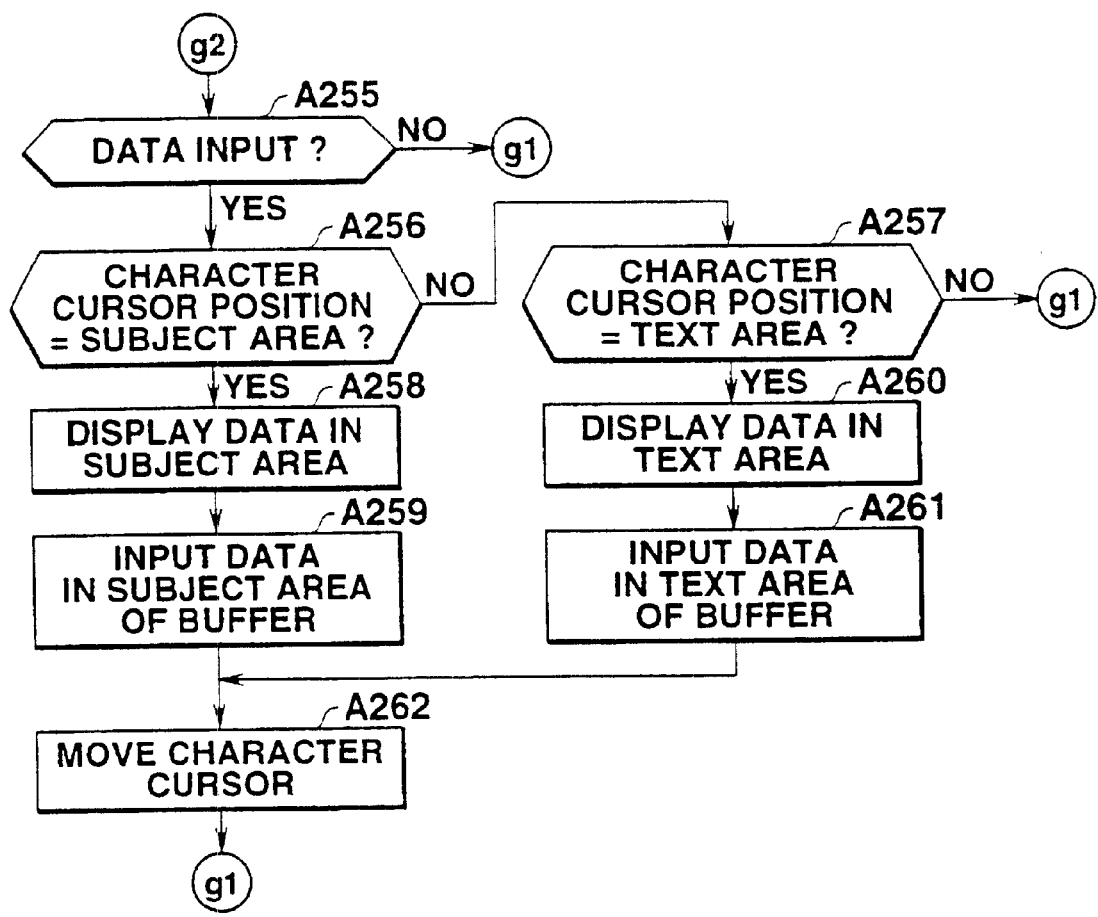
FIG. 23 is a flow chart of the fixed form mail "B" creation processing of the first embodiment, continued from FIG. 22.

FIGS. 22 and 23 are flows of the fixed form mail "B" creation processing at step A194 of FIG. 17 and FIG. 24B is a display screen image of a fixed form mail "B". An electronic mail of FIG. 24A does not indicate an emergency contact place in an absent period through the mail indicates the absent period. While an OK switch and a cancel switch are provided in the screen image, a password switch is not provided, which is different from a fixed form mail "A".

In FIG. 22, a transmitter address is set as a self-address (step A240). Then, a fixed form mail creation frame screen image is displayed (step A241), a cursor for the mouse 6 is displayed (step A242) and a character cursor is displayed in a subject area (step A243).

Then, it is determined whether or not the mouse 6 has been moved (step A244) and if the mouse 6 has been moved, a cursor position on the screen image is moved in accordance with the movement of the mouse 6 (step A245). It is determined whether or not the mouse 6 has been clicked (step A246) and if the mouse 6 has been clicked, processing is executed in accordance with a cursor position in the fixed form mail "B" screen image of FIG. 24B.

It is determined whether or not a cursor position is a position in the subject area (step A247) and if the cursor position is this position, a character cursor is set at the matter area (step A248). If a cursor position is not in the subject area, it is determined whether or not the cursor position is a text area (step A249) and if the cursor position is this position, a character cursor is set at the text area (step A250). If a cursor position is not a position in the text area either, it is determined whether or not the cursor position is an OK switch position (step A251) and if the cursor position is this position, the fixed form mail screen image is cleared (step A252) and program flow is returned to the flow of FIG. 17.

If a cursor position is not the OK switch position, it is determined whether or not the cursor position is a cancel switch position (step A253) and if the cursor position is this position, not only is data of a mail buffer cleared but a fixed form mail screen image is cleared (step A254). Then program flow is returned to the flow of FIG. 17. If a position of the mouse 6 when it is clicked is not any one of the above mentioned positions, program flow goes to step A244 and a movement of the mouse 6 is checked.

At step A246 of FIG. 22, if the mouse 6 has not been clicked, it is determined whether or not data input has been made from the keyboard 4 in FIG. 23 (step A255). If the data input has been made, it is determined whether or not a character cursor position is in a subject area (step A256). If the character cursor position is not this position, it is determined whether or not the character cursor position is in a text area (step A257).

At step A256, if a character cursor position is in the subject area, data input in the subject area is displayed (step A258) and the data are input to and stored in a subject area of a buffer of RAM 3 (step A259). For example, as shown in FIG. 24B, a subject data of "matter of emergency contact place" is displayed. On the other hand, at step A257, if a character cursor position is in a text area, data input to the text area are displayed (step A260) and the data are input to and stored in a text area of the buffer of RAM 3 (step A261). For example, as shown in FIG. 24B, a text data including a telephone number of the emergency contact place and the like is displayed.

At step A259 or step A261, after the data are stored, the character cursor is moved (step A262). Then program flow goes to step A244 of FIG. 22 and a movement of the mouse 6 is checked. At step A255, if the data are not input or if the character cursor is neither in the subject area at step A256 nor in the text area in step A257, program flow goes to step A244 of FIG. 22 and a movement of the mouse 6 is checked.

Figure 25:
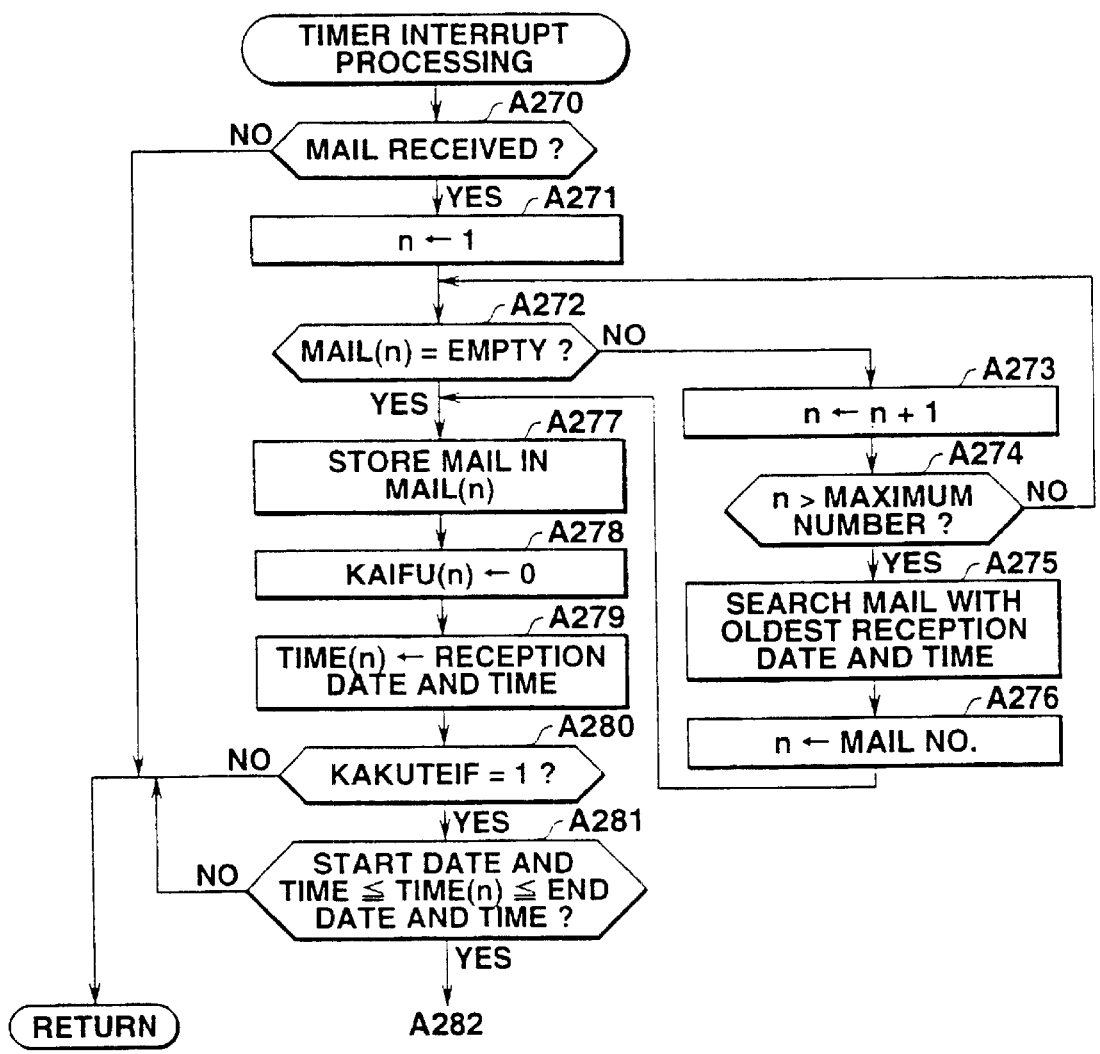
FIG. 25 is a flow chart of timer interrupt processing of the first embodiment.
Figure 26:
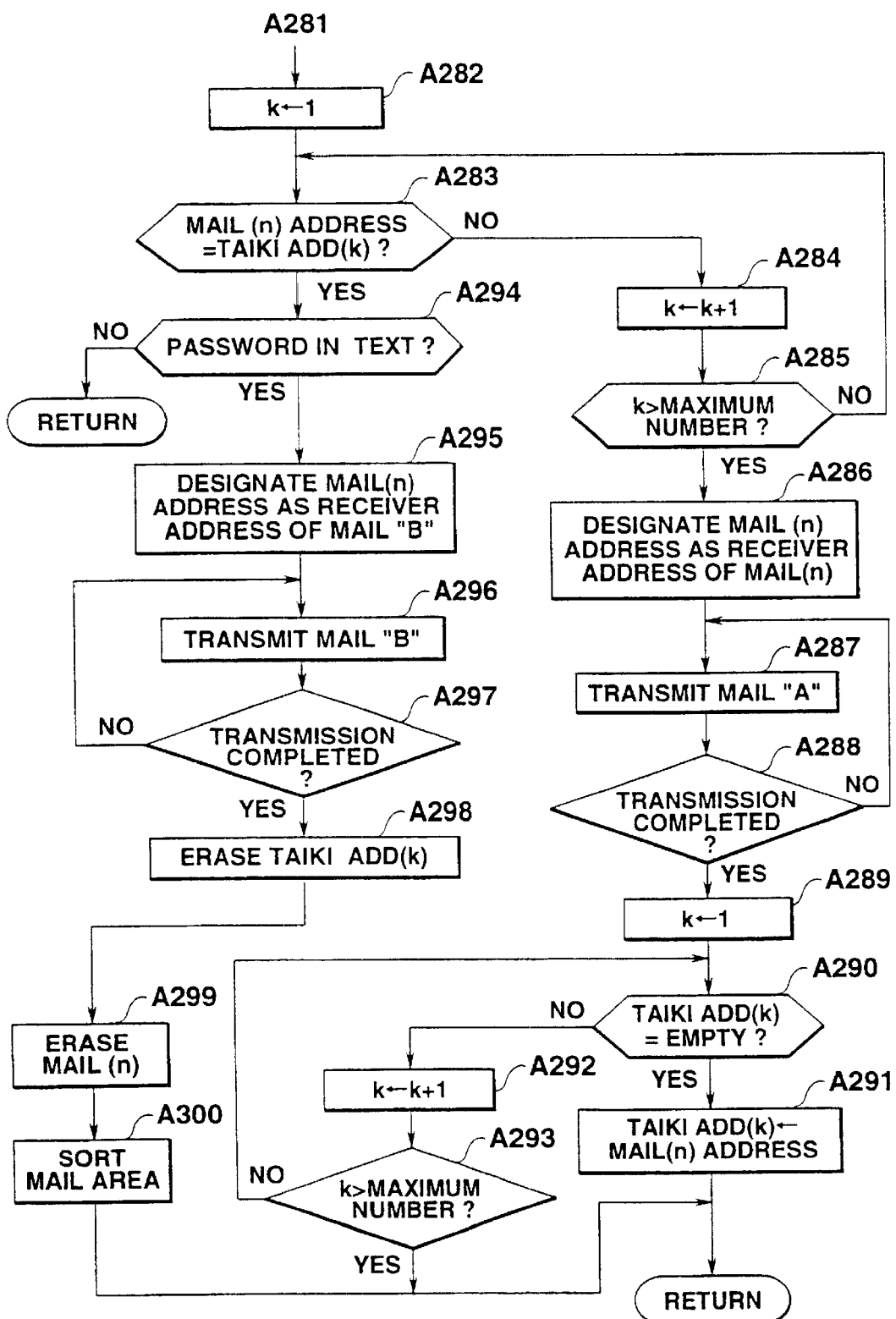
FIG. 26 is a flow chart of the timer interrupt processing of the first embodiment, continued from FIG. 25.

FIGS. 25 and 26 are flows of timer interrupt processing. The timer interrupt processing in the first embodiment and the other embodiments are reception processing of an electronic mail.

When timer interrupts occur at set intervals, the server 300 shown in FIG. 1 is accessed by CPU 1 of a terminal 100. In FIG. 25, it is determined whether or not a received mail is present in a mailbox of the server 300 (step A270). If the received mail is not present, the flow is immediately terminated. IF the received mail is present, a pointer "n" indicating an area number of the MAIL(n) of the received mail storage area 33 of RAM 3 shown in FIG. 2 is set at "1" (step A271). Then, it is determined whether or not an area of a MAIL(n) designated by "n" is empty (step A272).

If a designated area is not empty, "n" is incremented (step A273) and it is determined whether or not "n" exceeds the maximum number (step A274). If "n" has not exceeded the maximum number, program flow goes to step A272 and it is determined whether or not the received mail "n" area is empty. A loop of steps A272, A273 and A274 is repeated while "n" is incremented to search an empty RECEIVED MAIL(n) area. At step A274, if "n" exceeds the maximum number, that is when none of the received mail area of the received mail storage area 33 of RAM 3 is empty, a received mail with the oldest reception data and time is searched (step A275). Then, the pointer "n" is set at a mail number thereof (step A276).

At step A272, if the designated RECEIVED MAIL(n) area is empty or if "n" is set at the mail number with the oldest reception date and time at step A276, a received mail fetched from the server 300 is stored in the received mail (n) area (step A277). Then, the unseal flag KAIFUF(n) is reset at "0" to indicate the seal state (step A278) and TIME(n) is set at a reception date and time (step A279).

Then, it is determined whether or not the definite flag KAKUTEIF set in the absence setting processing of FIG. 17 is "1" (step A280). If the flag is "0", the flow is terminated. If the flag is "1", it is determined whether or not the reception date and time set to TIME(n) is in a period of a start date and time to an end date and time (step A281). If the reception date and time is not in the period, the flow is terminated, but when the reception date and time is in the period, a pointer "k" is set at "1" (step A282). The pointer "k" is the number of a TAIKI ADD(k) of the waiting address area 36 of RAM 3.

Then, it is determined whether or not an address of a RECEIVED MAIL(n) coincides with the TAIKI ADD(k) designated by "k" (step A283). If there is no coincidence therebetween, "k" is incremented (step A284) and it is determined whether or not "k" exceeds the maximum number (step A285). If "k" has not exceeded the maximum number, program flow does to step A283 and it is determined whether or not the address of a MAIL(n) coincides with an address designated by the waiting address area. Then, a loop of steps A283, A284 and A285 is repeated while "k" is incremented to search an address in coincidence.

At step A285, if "k" exceeds the maximum number, that is, when there is not present any address in coincidence, an address of a MAIL(n) is set as a receiver address of a fixed form mail "A" (step A286). Then, the fixed form mail "A" is transmitted (step A287) and it is determined whether or not the transmission has been completed (step A288). If the transmission has not been completed, transmission processing of step A287 is continued. If the transmission has been completed, "k" is set at "1" (step A289).

Then, it is determined whether or not the TAIKI ADD(k) area is empty (step A290) and if the area is empty, an address of a RECEIVED MAIL(n) corresponding to a transmitted fixed form mail "A" is stored in the TAIKI ADD(k) area (step A291). Then program flow is returned to the main routine flow of FIG. 3.

At step A290, if the TAIKI ADD(k) area is not empty, "k" is incremented (step A292) and it is determined whether or not "k" is the maximum number (step A293). If "k" is equal to or less than the maximum number, program flow goes to step A290 and it is determined whether or not the TAIKI ADD(k) area is empty. Then a loop of steps A290, A292 and A293 is repeated while "k" is incremented to search the TAIKI ADD(k) with an empty space. At step A293, if "k" exceeds the maximum number, that is no empty space if available, program flow is returned to the main routine flow of FIG. 3.

At step A283, if an address of a RECEIVED MAIL(n) coincides with a designated address of a waiting address area, it is determined whether or not a password is present in a text of the RECEIVED MAIL(n) (step A294). If the password is not available, program flow is returned to the main routine of FIG. 3. If the password is available, a receiver address of a fixed form mail "B" is set as an address of a RECEIVED MAIL(n) (step A295). Then, the fixed form mail "B" is transmitted (step A296) and it is determined whether or not the transmission has been completed (step A297). If the transmission has not been completed, the transmission processing of step A296 is continued. If the transmission has been completed, the TAIKI ADD(k) is erased (step A298). In addition, the RECEIVED MAIL(n) is erased (step A299) and the received mail area of RAM 3 is sorted (step A300). Then, program flow is returned to the main routine of FIG. 3.

As described above, according to the first embodiment, the terminal 100 shown in FIG. 1 comprises:

mail receiving means for receiving an electronic mail;

absence mode setting means for setting an absence mode indicating the state of absence of a receiver of the electronic mail;

mail transmitting means for transmitting a predetermined fixed form mail responding to a first electronic mail received by the mail receiving means in the absence mode; and control means for making the mail transmitting means to transmit a specific fixed form mail when the control means determines that a second electronic mail from a receiver responding to the predetermined fixed form mail satisfies a specific condition.

If the response mail to the fixed form mail responding to the electronic mail received in the absence satisfies the specific condition, the specific fixed form mail is transmitted.

In the above mentioned first embodiment, there is described an electronic mail system in which a program to receive and transmit electronic mails is stored in ROM 2, but such constitutions may be adopted that a program to execute electronic mail processing is stored in such media as a floppy disk, a compact disk and the like and an apparatus such as a personal computer or a word processor for general purpose use of the like executes the program.

The machine readable storage medium stores a program for electronic mail processing, the program comprising:

(i) step of receiving an electronic mail;

(ii) step of setting an absence mode indicating the state of absence of a receiver of the electronic mail;

(iii) step of transmitting a predetermined fixed form mail responding to a first electronic mail received by the step (i) in the absence mode;

(iv) step of determining whether or not a second electronic mail from a receiver responding to the predetermined fixed form mail satisfies a specific condition; and (v) step of transmitting a specific fixed form mail when the step (iv) determines that the specific condition is satisfied.

The program is executed by an apparatus such as a personal computer or a word processor for general purpose use, or the like.

Other embodiments of the electronic mail system according to the present invention will be described. The same portions as those of the first embodiment will be indicated in the same reference numerals and their detailed description will be omitted.

Figure 27:
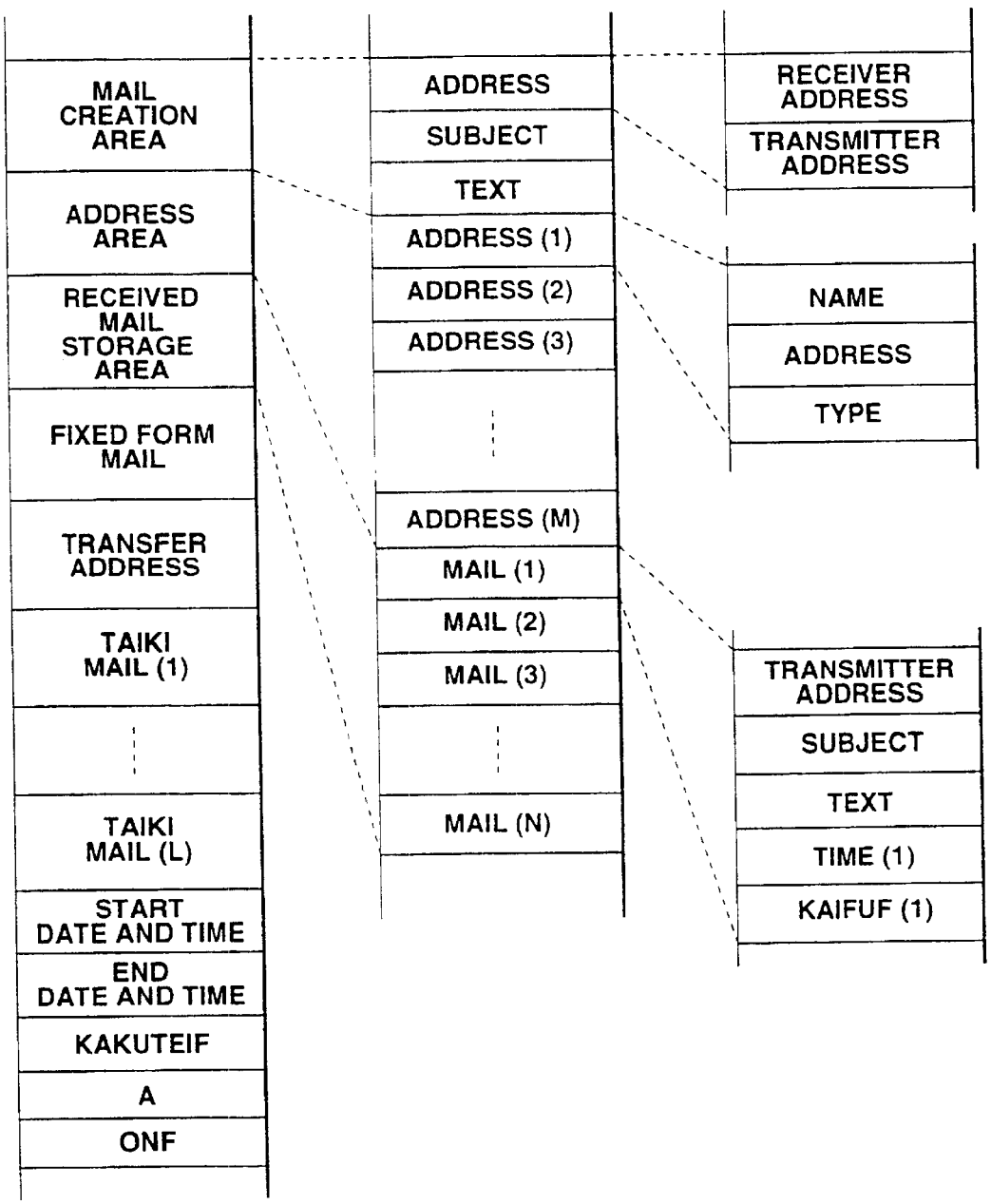
FIG. 27 shows a memory map of a second embodiment.

The second embodiment will be described. FIG. 27 shows a constitution of a data area of RAM 3, that is a memory map, in the second embodiment. In the figure, while a mail creation area, an address area, a received mail area, a start date and time, an end date and time a flag KAKUTEIF, a register "A" and an ON flag ONF are the same as those in the first embodiment, the other areas are different from those in the first embodiment. In the fixed form mail area, a single kind of fixed form mail is stored. The fixed form mail is the same as the fixed form mail "A" shown in FIG. 24A in the first embodiment. In other words, in the case of emergency, a fixed form mail requesting for a response mail including a password is included. Besides, in RAM 3, there are provided an area to store a transfer address and areas of TAIKI MAIL(1) to TAIKI MAIL(L) to store a plurality of waiting mails. In the case where a fixed form mail is transmitted to the other party of a received mail requiring a response, the waiting mail means the received mail.

Then, while operations of the second embodiment will be described, description on the duplicate operations of those in the first embodiment is omitted. Operations of the second embodiment different from those of the first embodiment are those in absence setting processing and timer interrupt processing (reception processing).

Figure 28:
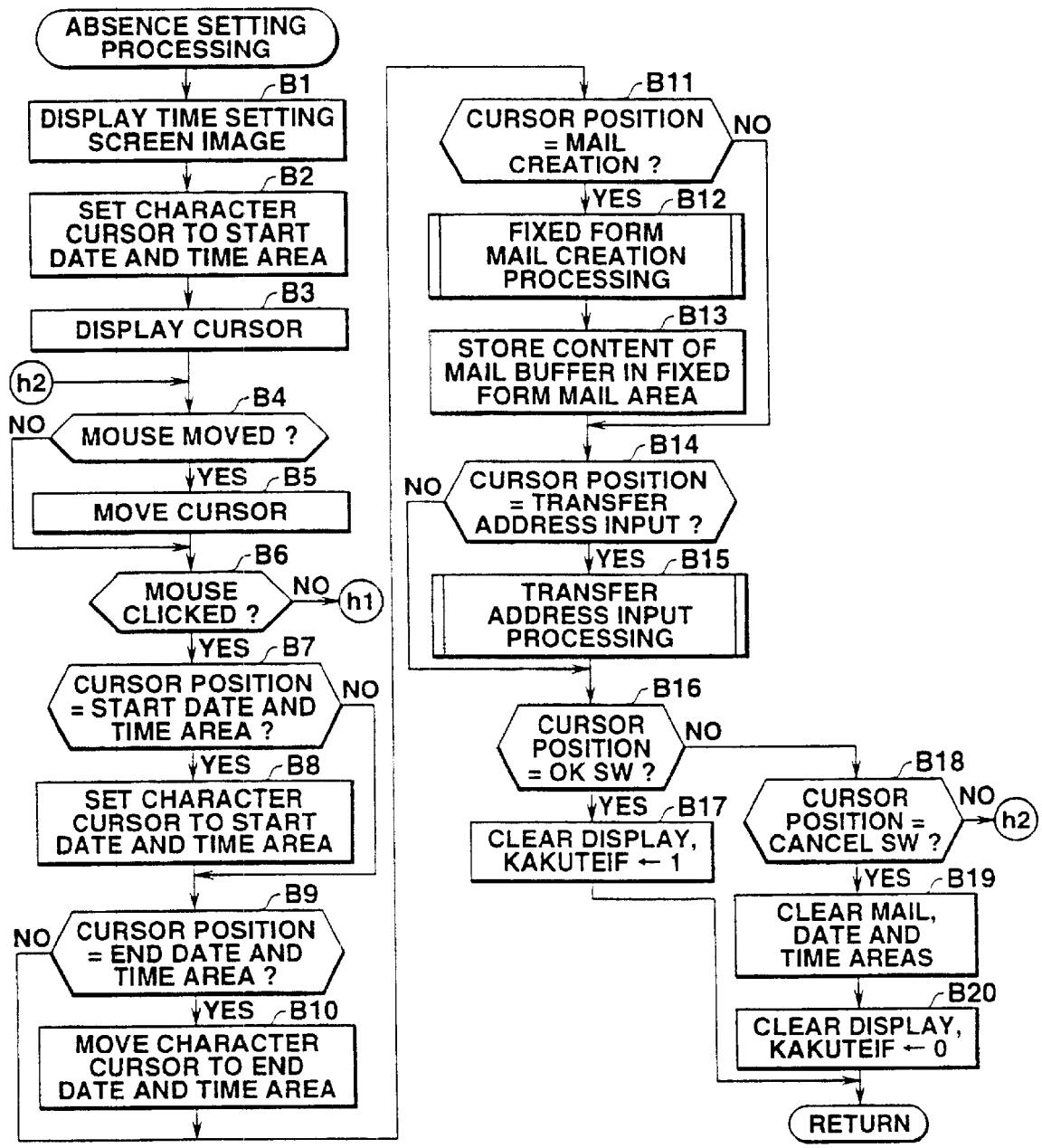
FIG. 28 is a flow chart of absence setting processing of the second embodiment.
Figure 29:
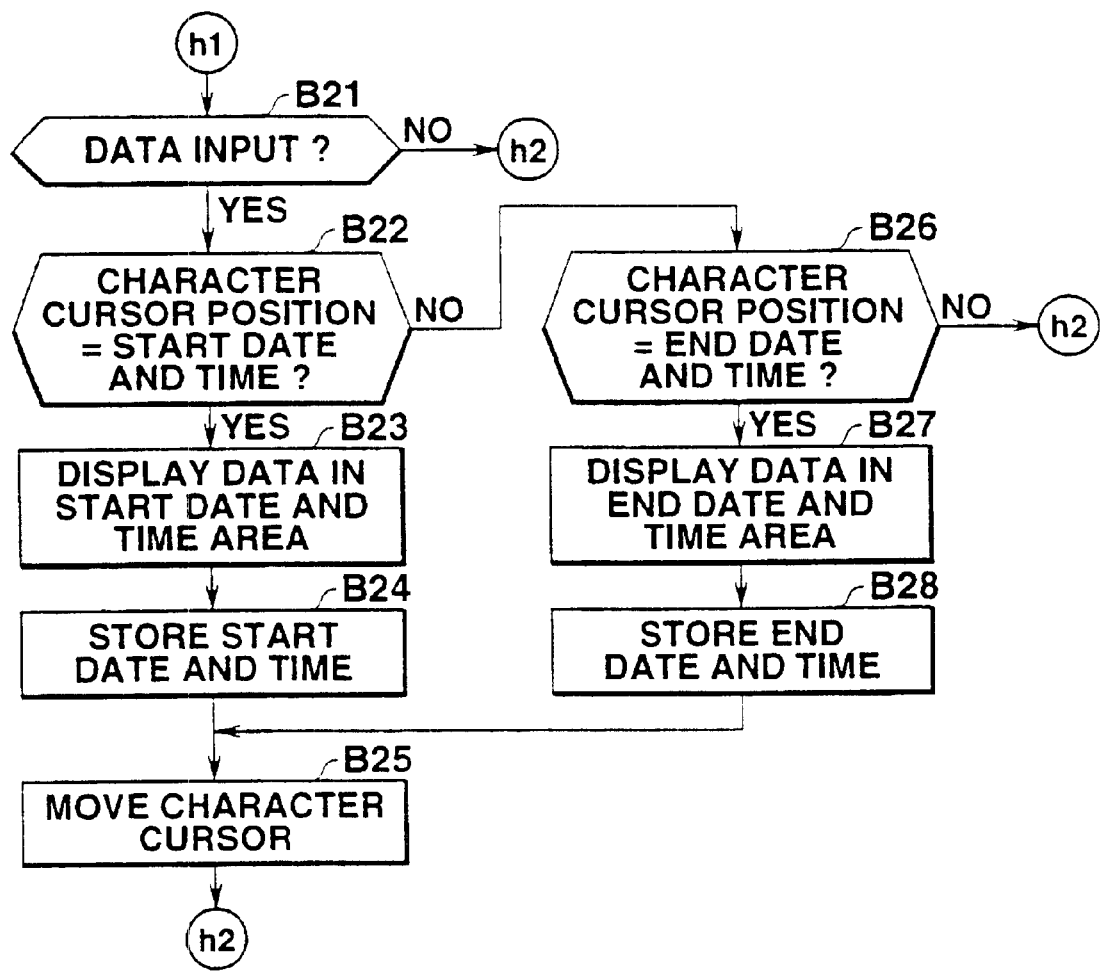
FIG. 29 is a flow chart of the absence setting processing of the second embodiment, continued from FIG. 28.

FIGS. 28 and 29 are flows of absence setting processing in the second embodiment and FIG. 30 is an absence setting processing screen image.

In FIG. 28, a time setting screen image is displayed in the absence setting processing screen image of FIG. 30 (step B1), a character cursor is set at a start date and time area (step B2). A cursor for the mouse 6 is displayed (step B3). It is determined whether or not the mouse 6 has been moved (step B4) and if the mouse 6 has been moved, the cursor is moved in accordance with the movement of the mouse 6 (step B5). Then it is determined whether or not the mouse 6 has been clicked (step B6). If the mouse 6 has been clicked, it is determined whether or not a cursor position is in a start date and time area (step B7). If the cursor position is this position, a character cursor is set at the start date and time area (step B8).

If the cursor position is not in the start date and time area, it is determined whether or not the cursor position is in an end date and time area (step B9). If the cursor position is this position, a character cursor is set at the end date and time area (step B10). If the cursor position is not in the end date and time area, it is decided whether or not the cursor position is a mail creation switch position (step B11). If the cursor position is this position, fixed form mail creation processing is executed (step B12). The fixed form mail creation processing is the same as the flow of the first embodiment shown in FIGS. 20 and 21 and the fixed form mail shown in FIG. 24A is created. After the fixed form mail creation processing, a content of a mail buffer is stored in the fixed form mail area of RAM 3 (step B13).

At step B11, if the cursor position is not the mail creation switch, it is determined whether or not the cursor position is a transfer address input switch position on the screen image of FIG. 30 (step B14). If the cursor position is this position, transfer address input processing is executed (step B15). The transfer address input processing would be further described later. At step B14, if the cursor position is not the transfer address input switch position, it is determined whether or not the cursor position is an OK switch position (step B16). If the cursor position is this position, the absence setting processing screen image of FIG. 30 is cleared and the definite flag KAKUTEIF is set at "1" (step B17). Then the flow is terminated.

At step B16, if the cursor is not the OK switch position, it is determined whether or not the cursor position is a cancel switch position (step B18). If the cursor position is this position, data in the mail area, and date and time area are cleared, the absence setting processing screen image of FIG. 30 is cleared and the definite flag KAKUTEIF is set at "0" (step B20). Then the flow is terminated.

At step B18, if the cursor position is not the cancel switch position, that is, if the cursor position is not any one of the above mentioned positions, or after processing corresponding to a cursor position is completed, program flow goes to step B4 and a movement of the mouse 6 is checked.

At step B6, if the mouse has not been clicked, program flow goes to a flow of FIG. 29 and it is determined whether or not data input is made from the key board 4 (step B21). If the data input has been made, it is determined whether or not a character cursor position is in the start date and time area (step B22). If the character cursor position is this position, the data of the start date and time input to the start date and time area are displayed (step B23) and the data of the start date and time are stored in RAM 3 (step B24). Then, the character cursor is moved (step B25).

At step B22, if the character cursor position is not the start date and time position, it is determined whether or not the character cursor position is an end date and time position (step B26). If the character cursor position is this position, the data of the end date and time input to the end date and time area are displayed (step B27) and the data of the end date and time are stored in RAM 3 (step B28). Then, the character cursor is moved (step B28).

After the character cursor is moved at step B25, or if the data input is not made at step B21 or if the character cursor position is not any one of the start date and time, and the end date and time positions, program flow goes to step B24 of FIG. 28 and a movement of the mouse 6 is checked.

Figure 31:
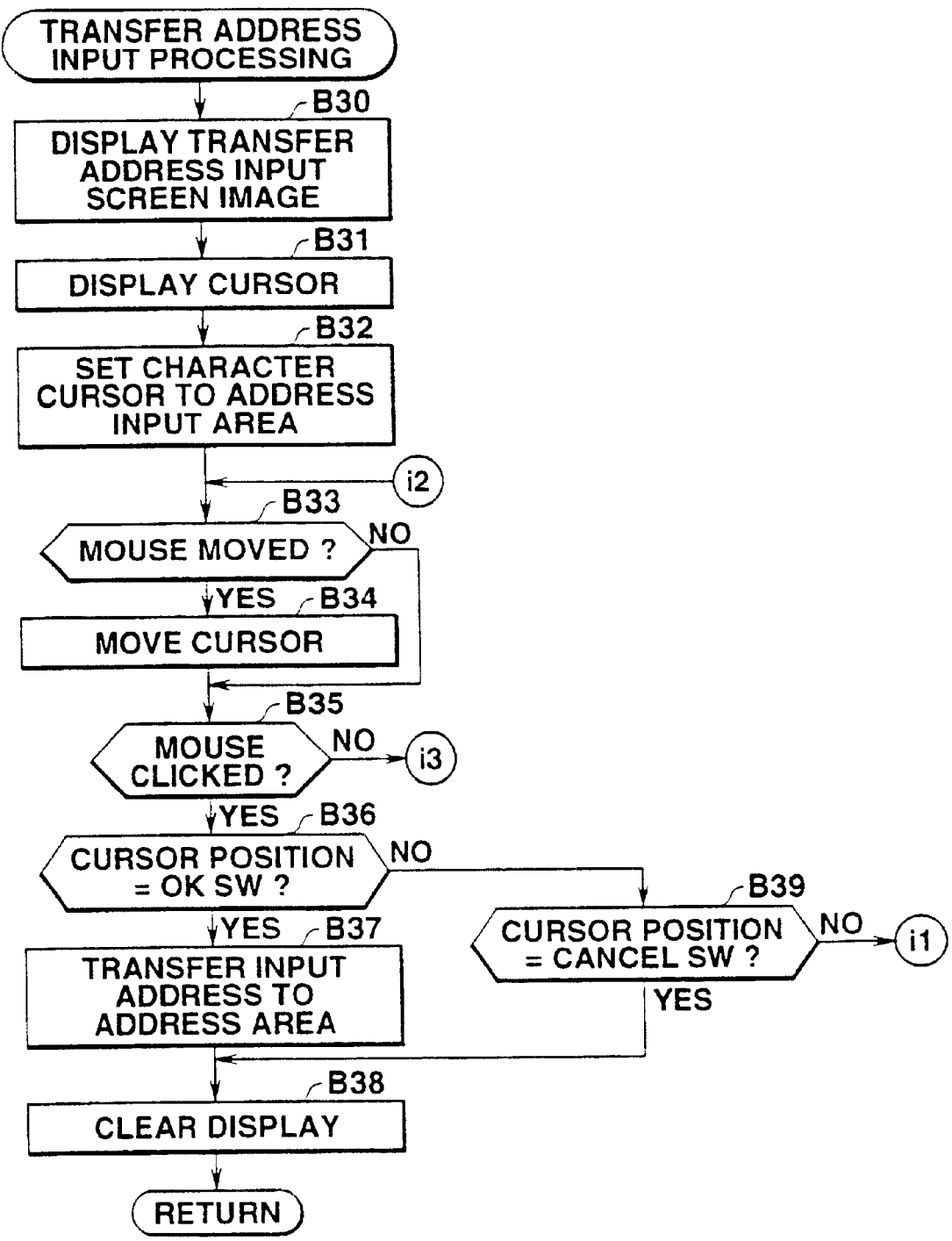
FIG. 31 is a flow chart of transfer address input processing of the second embodiment.
Figure 32:
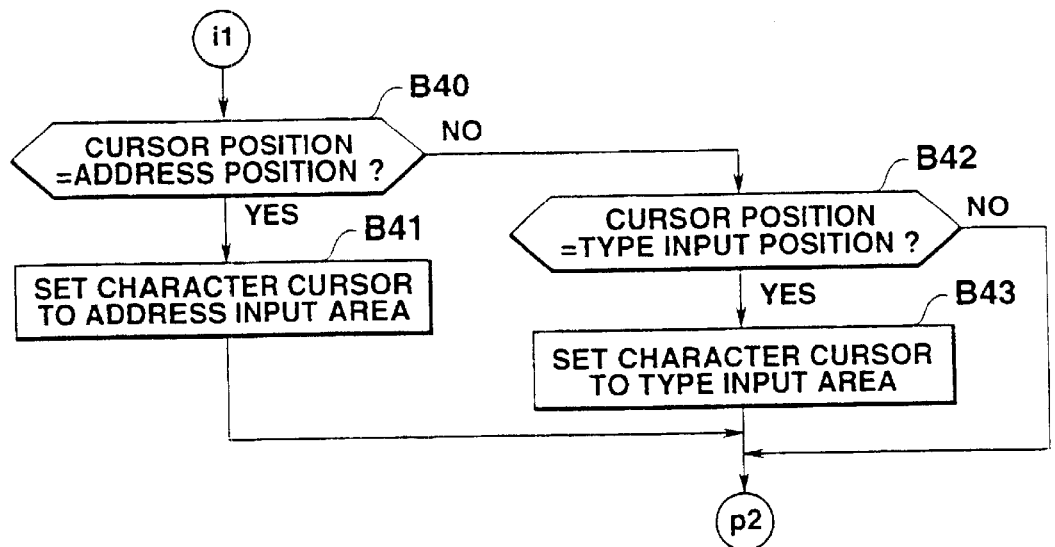
FIG. 32 is a flow chart of the transfer address input processing of the second embodiment, continued from FIG. 31.
Figure 33:
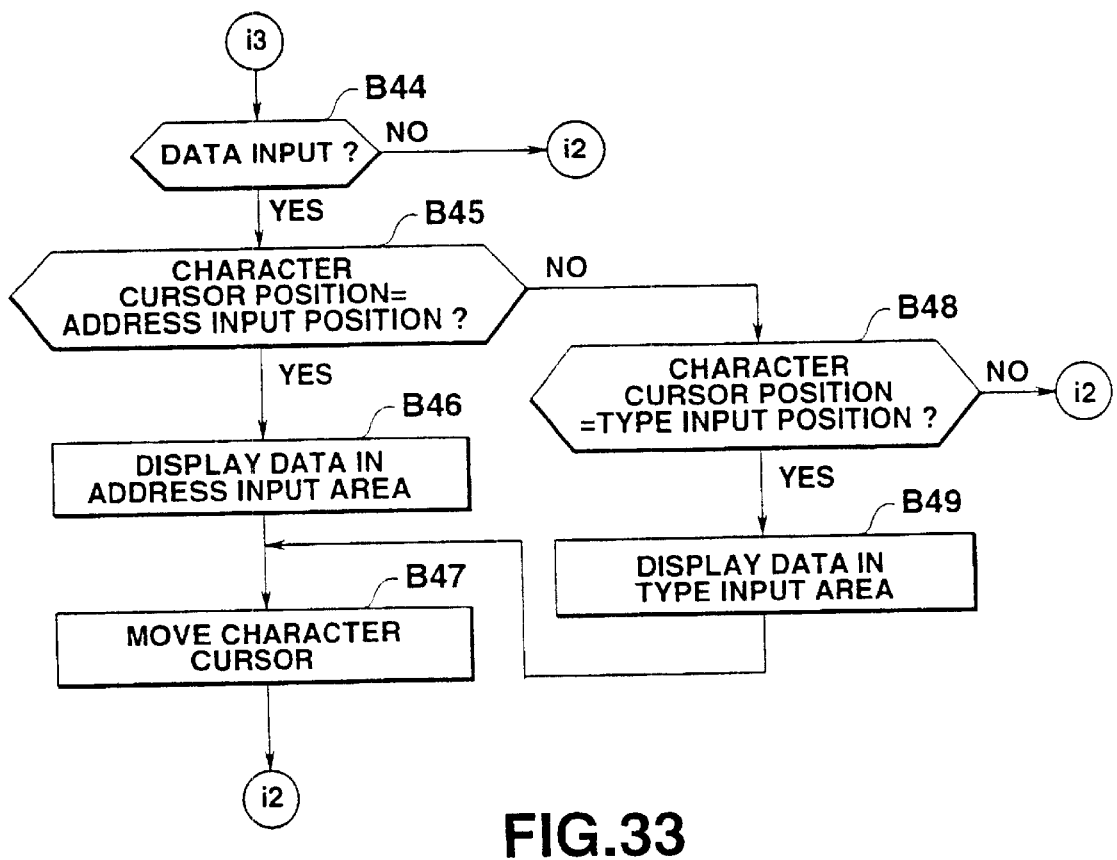
FIG. 33 is a flow chart of transfer input processing of the second embodiment, continued from FIG. 31.

FIGS. 31 to 33 are flows of transfer address input processing at step B15 of FIG. 28 and FIG. 34 is the transfer address input screen image. In the screen image, an address-input area, a type input area, and in addition an OK switch and a cancel switch are displayed.

In FIG. 31, a transfer address input screen image of FIG. 34 is displayed (step B30) and a cursor is displayed (step B31). Then a character cursor is displayed in the address-input area (step B32). Then, it is determined whether the mouse 6 is moved (step B33).

When the mouse 6 is moved, a cursor position is moved (step B34). Then, it is determined whether or not the mouse 6 is clicked (step B35). If the mouse 6 is clicked, a cursor position on the clicking is checked. It is determined whether or not a cursor position is an OK switch position (step B36). If the cursor position is this position, an address input in the screen is stored in the transfer address area shown in FIG. 27 (step B37). Then, the display is cleared (step B38) and the flow is terminated. At step B36, if a cursor position is not the OK switch position, it is determined whether or not the cursor position is a cancel switch position (step B39). If the cursor position is this position, the display is cleared (step B38) and the flow is terminated.

At step B39, if a cursor position is not the cancel switch position, it is determined whether or not the cursor position is a position in the address input area in a flow of FIG. 32 (step B40). If the cursor position is this position, a character cursor is set at the address-input area (step B41). At step B40, if a cursor position is not the address-input area, it is determined whether or not the cursor position is a position in the type-input area (step B42). If the cursor position is this position, a character cursor is set at the type-input area (step B43). After the character cursor is moved, program flow goes to step B33 of FIG. 31 and a movement of the mouse 6 is checked.

At step B35 of FIG. 31, if the mouse 6 has not been clicked, it is determined whether or not data input has been made from the keyboard 4 in a flow of FIG. 33 (step B44). If the data input has been made, it is determined whether or not a character cursor position is a position in the address-input area (step B45). IF the character cursor position is an address-input position, data input in the address input area are displayed (step B46). Then, the character cursor is moved for next data input (step B47).

At step B45, if a character cursor position is not the address input position, it is determined the character cursor position is in a type input area (step B48). If the character cursor position is a position in the type-input area, data input to the type input area is displayed (step B49). Then, the character cursor is moved for a next data input (step B47). After the character cursor is moved, or if the character cursor position is not in any one of the address input area and the type input area, program flow goes to step B33 of FIG. 31 and a movement of the mouse 6 is checked.

Figure 35:
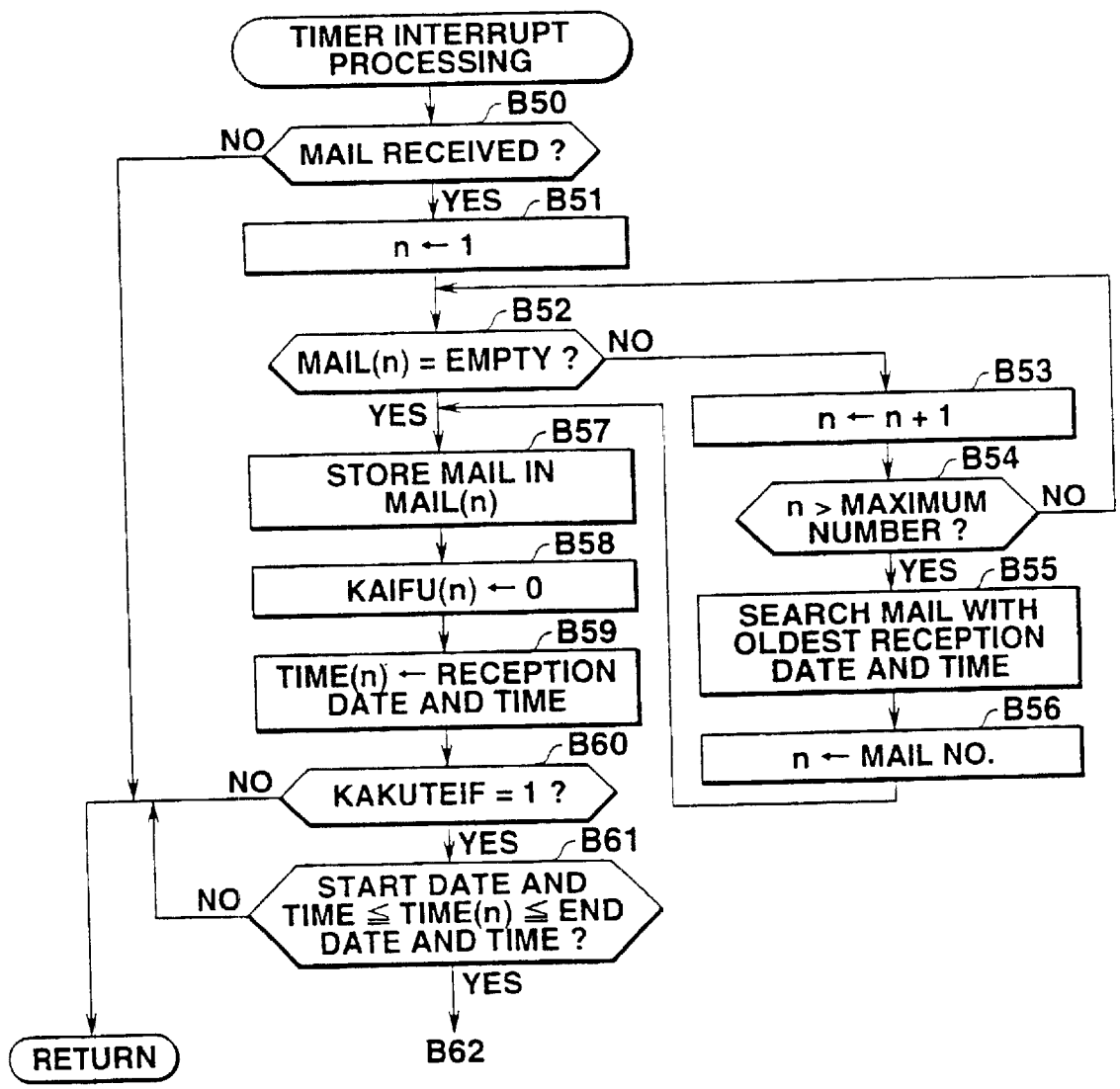
FIG. 35 is a flow chart of timer interrupt processing of the second embodiment.
Figure 36:
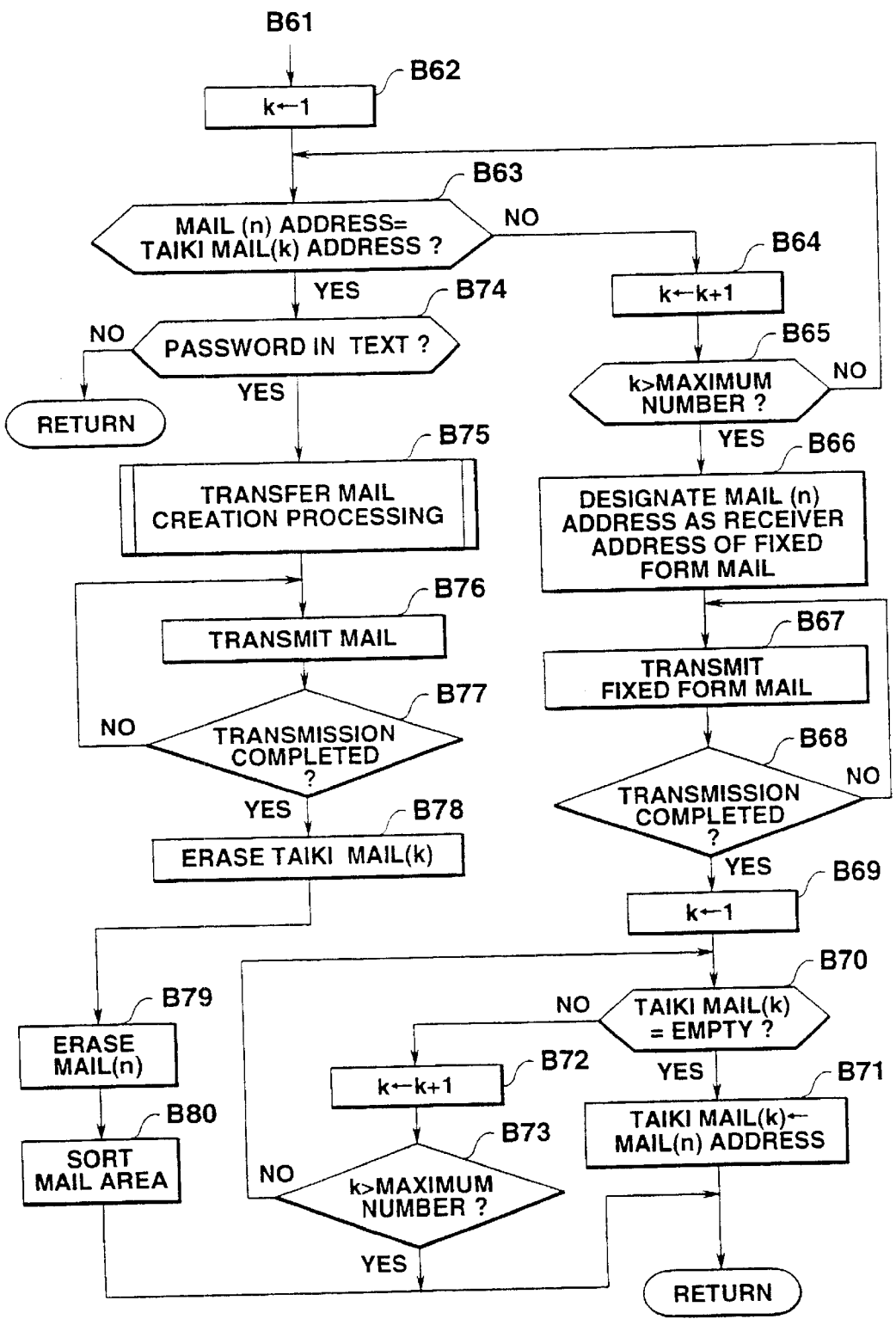
FIG. 36 is a flow chart of the timer interrupt processing of the second embodiment, continued from FIG. 35.
Figure 37:
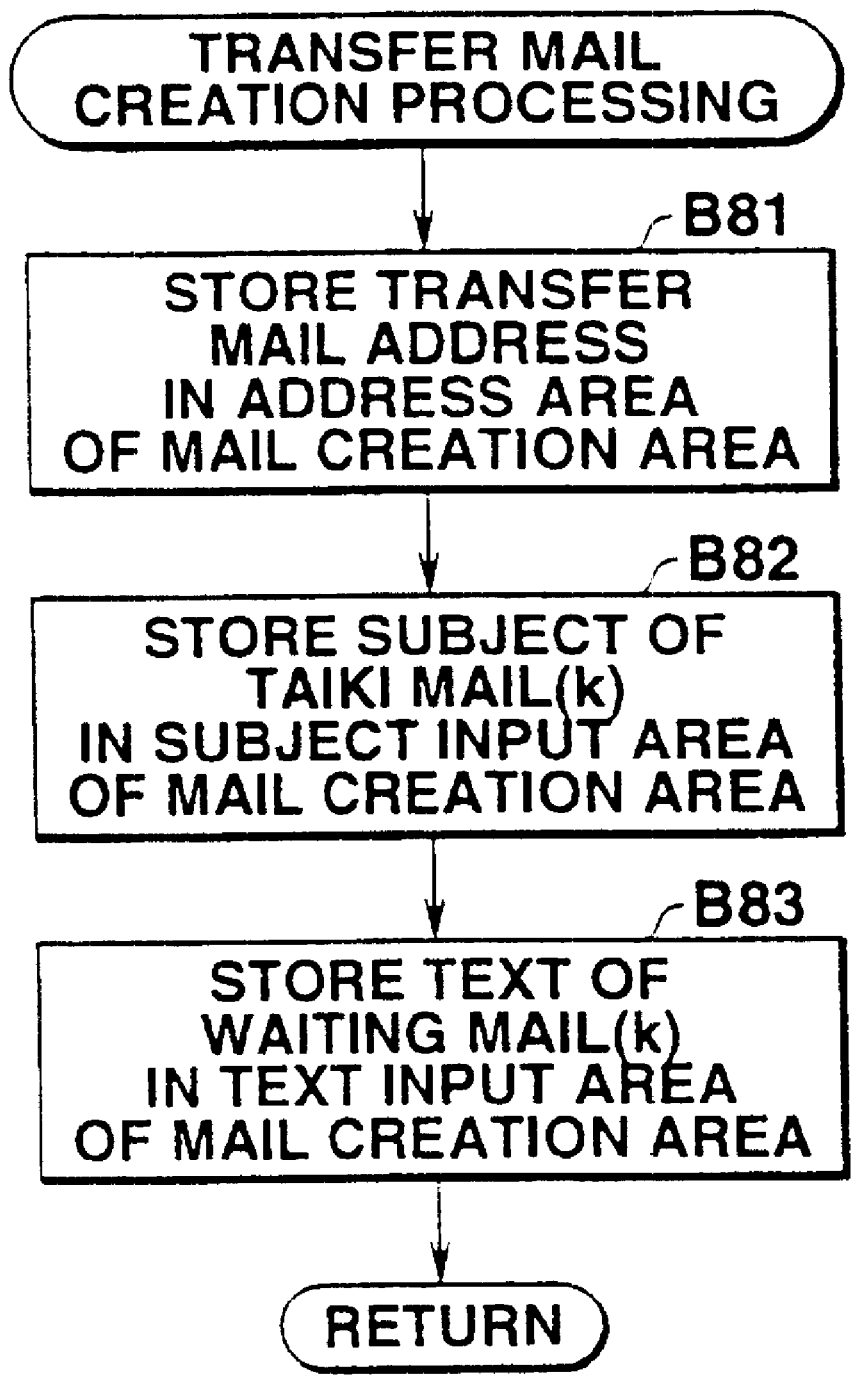
FIG. 37 is a flow chart of transfer mail creation processing of the second embodiment.

FIGS. 35 to 37 are flowcharts of timer interrupt processing (reception processing).

When timer interrupts occur at set intervals, the server 300 shown in FIG. 1 is accessed by CPU 1 of a terminal 100. In FIG. 35, it is determined whether or not a received mail is present in a mailbox of the server 300 (step B50). If a received mail is not present, the flow is immediately terminated. If a received mail is present, a pointer "n" indicating an area number of the MAIL(1) to MAIL(N) of the received mail storage area of RAM 3 shown in FIG. 27 is set at "1" (step B51). Then, it is determined whether or not an area of a RECEIVED MAIL (n) designated by "n" is empty (step B52).

If a designated area is not empty, "n" is incremented (step B53) and it is determined whether or not "n" exceeds the maximum number (step B54). If has not exceeded the maximum number, program flow goes to step B52 and it is determined whether or not the RECEIVED MAIL(n) area is empty. A loop of steps B52, B53 and B54 is repeated while "n" is incremented to search a RECEIVED MAIL(n) area with an empty space. At step B54, if "n" exceeds the maximum number, that is when none of the MAIL(1) to MAIL(N) of the received mail storage area of RAM 3 is empty, a received mail with the oldest reception data and time is searched (step B55). Then, the pointer "n" is set at a mail number thereof (step B56).

At step B52, if the designated RECEIVED MAIL(n) area is empty or at step B56 when "n" is set at the mail number with the oldest reception date and time, a received mail fetched from the server 300 is stored in the RECEIVED MAIL(n) area (step B57). Then, the unseal flag KAIFUF(n) is reset at "0" so as to indicate the seal state (step B58) and TIME(n) is set at a reception date and time (step B59).

Then, it is determined whether or not the definite flag KAKUTEIF set in the absence setting processing of FIG. 28 is "1" (step B60). If the flag is "0", the flow is terminated since the absence setting is not made. If the flag is "1" (absence setting), it is determined whether or not the reception date and time set to TIME(n) is in a period of a start date and time to an end date and time (step B61). If the reception date and time is not in the period, the flow is terminated, but when the reception date and time is in the period, it means that a mail is received in the absent period. In this case, a pointer "k" is set at "1" (step B62). The pointer "k" is a number of the TAIKI MAIL(1) to TAIKI MAIL(L) in the waiting mail area of RAM 3 shown in FIG. 27.

Then, it is determined whether or not an address of a RECEIVED MAIL(n) coincides with the TAIKI MAIL(k) designated by "k" (step B63). If there is no coincidence therebetween, "k" is incremented (step B64) and it is determined whether or not "k" exceeds the maximum number (step B65). If "k" has not exceeded the maximum number, program flow goes to step B63 and it is determined whether or not the transmitter address of a RECEIVED MAIL(n) coincides with an address of a waiting mail with a designated waiting mail are. Then, a loop of steps B63, B64 and B65 is repeated while "k" is incremented to search an address in coincidence.

At step B65, if "k" exceeds the maximum number, that is when there is not present any waiting mail in coincidence, a transmitter address of the RECEIVED MAIL(n) is designated as a receiver address of a fixed form mail (step B66). Then the same fixed form mail as that in the first embodiment shown in FIG. 24A is transmitted (step B67) and it is determined whether or not the transmission has been completed (step B68). If the transmission has not been completed, transmission processing of step B67 is continued, "k" is set a "1" (step B69).

Then, it is determined whether or not a TAIKI MAIL(k) area is empty (step B70) and if the area is empty, a RECEIVED MAIL(n) corresponding to a transmitted fixed form mail is stored in the TAIKI MAIL(k) area (step B71). Then, the flow is terminated. That is, if a RECEIVED MAIL(n) to require a response is received and when a fixed form mail has been transmitted to the other party transmitting the received mail, the RECEIVED MAIL(n) is stored in the TAIKI MAIL(k) area as a waiting mail.

At step B70, if the TAIKI MAIL(k) area is not empty, "k" is incremented (step B72) and it is determined whether or not "k" is the maximum number (step B73). If "k" is equal to or less than the maximum number, program flow goes to step B70 and it is determined whether or not the TAIKI MAIL(k) area is empty. Then a loop of steps B70, B72 and B73 is repeated while "k" is incremented to search a TAIKI MAIL(k) area with an empty space. At step B73, if "k" exceeds the maximum number, that is when an empty space is not available, the flow is terminated.

At step B73, if an address of a RECEIVED MAIL(n) coincides with a designated address of a waiting mail of the TAIKI MAIL(k) area, it is determined whether or not a password is present in a text of the RECEIVED MAIL(n) (step B74). If a password is not present, program flow is returned to the main routine. If a password is present, transfer mail creation processing is executed (step B75). Then, a created transfer mail is transmitted (step B76) and it is determined whether or not the transmission has been completed (step B77). If the transmission has not been completed, the transmission processing of step B76 is continued. If the transmission has been completed, a waiting mail in the TAIKI MAIL(k) area is erased (step B78). Then, the RECEIVED MAIL(n) is erased (step B79) and the receive mail area of RAM 3 is sorted (step B80). Then, program flow is returned to the main routine.

FIG. 37 is a flow of transfer mail creation processing at step B75 of FIG. 36. In the processing, an address of a transfer mail is stored in an address area of the mail creation area (step B81). Then, a subject of a TAIKI MAIL(k) area is stored in a subject input area of the mail creation area (step B82). Then, a text in the TAIKI MAIL(k) area is stored in a text input area of the mail creation area (step B83). Then, program flow goes to step B76 of FIG. 36 and a created transfer mail is transmitted. As an address of a transfer mail, there is considered mail addresses of a portable terminal carried by a receiver on the road, a personal computer in home use of the same receiver and the like.

According to the second embodiment, the terminal 100 of FIG. 1 comprises:

mail receiving means for receiving an electronic mail;

absence mode setting means for setting an absence mode indicating the state of absence of a receiver of the electronic mail;

mail transmitting means for transmitting a predetermined fixed form mail responding to a first electronic mail received by the mail receiving means in the absence mode; and mail transfer means for making the mail transmitting means to transfer the first electronic mail to a predetermined address when the mail transfer means determines that a second electronic mail satisfies a specific condition when the mail receiving means receives the second electronic mail responding to the predetermined fixed form mail from a receiver of thereof.

If a response mail received from the other party in response to the fixed form mail transmitted in response to the electronic mail received in the absence satisfies the specific condition, the electronic mail received for the first time in this communication is transferred to the designated address of the same electronic mail.

In the above mentioned second embodiment, there is described an electronic mail system in which a program to receive and transmit electronic mails is stored in ROM 2, but such constitutions may be adopted that a program to transmit or receive an electronic mail is stored in such media as a floppy disk, a compact disk and the like and an apparatus such as a personal computer or a word processor for general purpose use or the like executes the program.

The machine readable storage medium stores a program for electronic mail processing, the program comprising:

(i) step of receiving an electronic mail;

(ii) step of setting an absence mode indicating the state of absence of a receiver of the electronic mail;

(iii) step of transmitting a predetermined fixed form mail responding to a first electronic mail received by the step (i) in the absence mode; and (iv) step of making the step (iii) to transfer the first electronic mail to a predetermined address when the step (iv) determines that a second electronic mail satisfies a specific condition when the step (i) receives the second electronic mail responding to the predetermined fixed form mail from a receiver of thereof.

An apparatus such as a personal computer or a word processor for general-purpose use, or the like executes the program.

Figure 38:
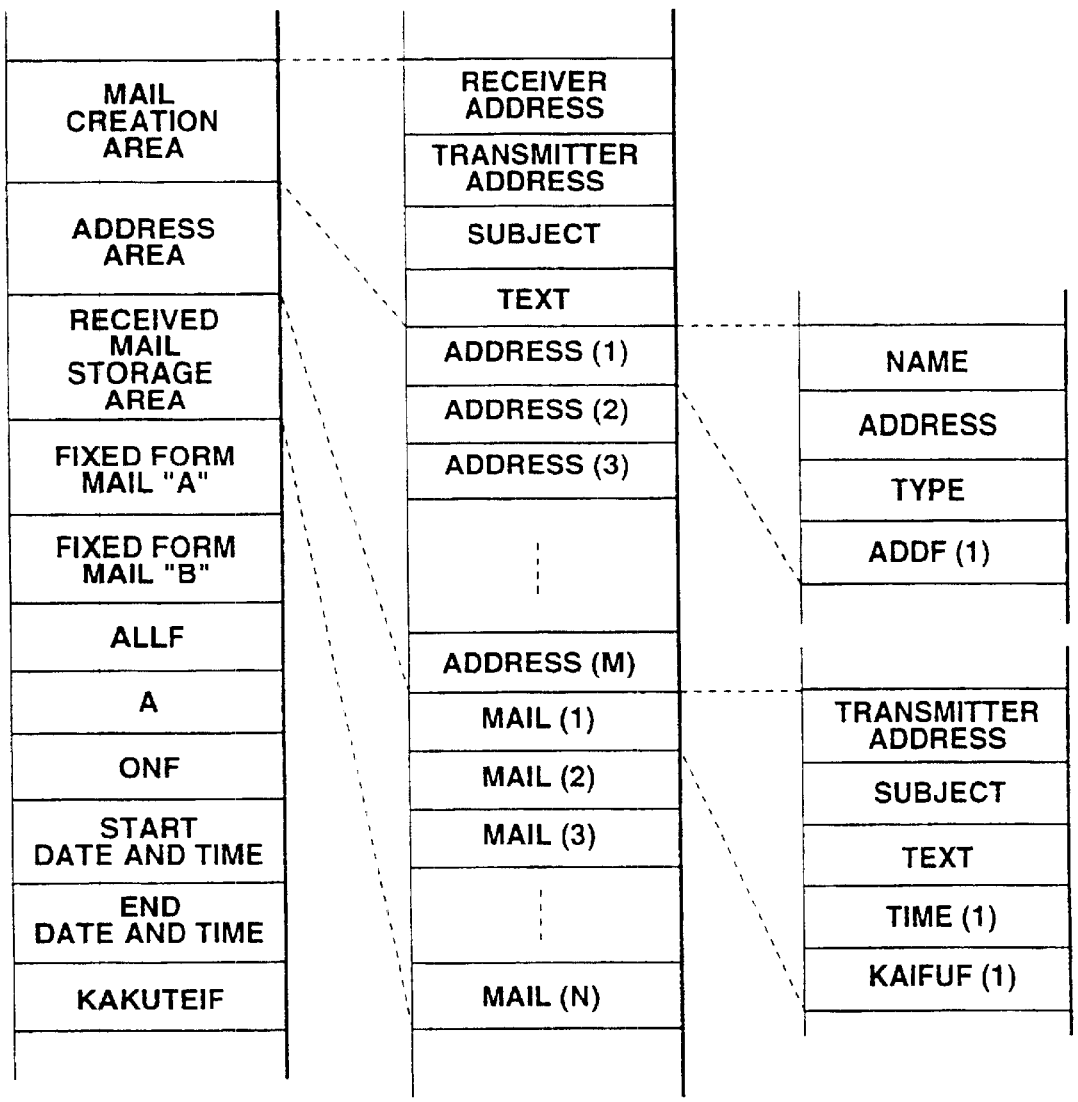
FIG. 38 shows a memory map of a third embodiment.

The third embodiment will be described. FIG. 38 shows a constitution of data area of RAM 3, that is a memory map, in the third embodiment. In this figure, the followings are the same as those of the first embodiment: a mail creation area, an address area, a received mail area, a fixed form mail "A" area, a fixed form mail "B" area, a start date and time and an end date and time in an absent period, an absence setting flag KAKUTEIF, a register "A" and an ON flag ONF. In addition, in the third embodiment, an area of a flag ALLF is provided. The function of the flag is described later.

Then, while operations of the third embodiment will be described, description on the duplicate operations of those in the first embodiment is omitted. Operations of the third embodiment different from those of the first embodiment are those in absence setting processing, address designation processing and timer interrupt processing (reception processing).

Figure 39:
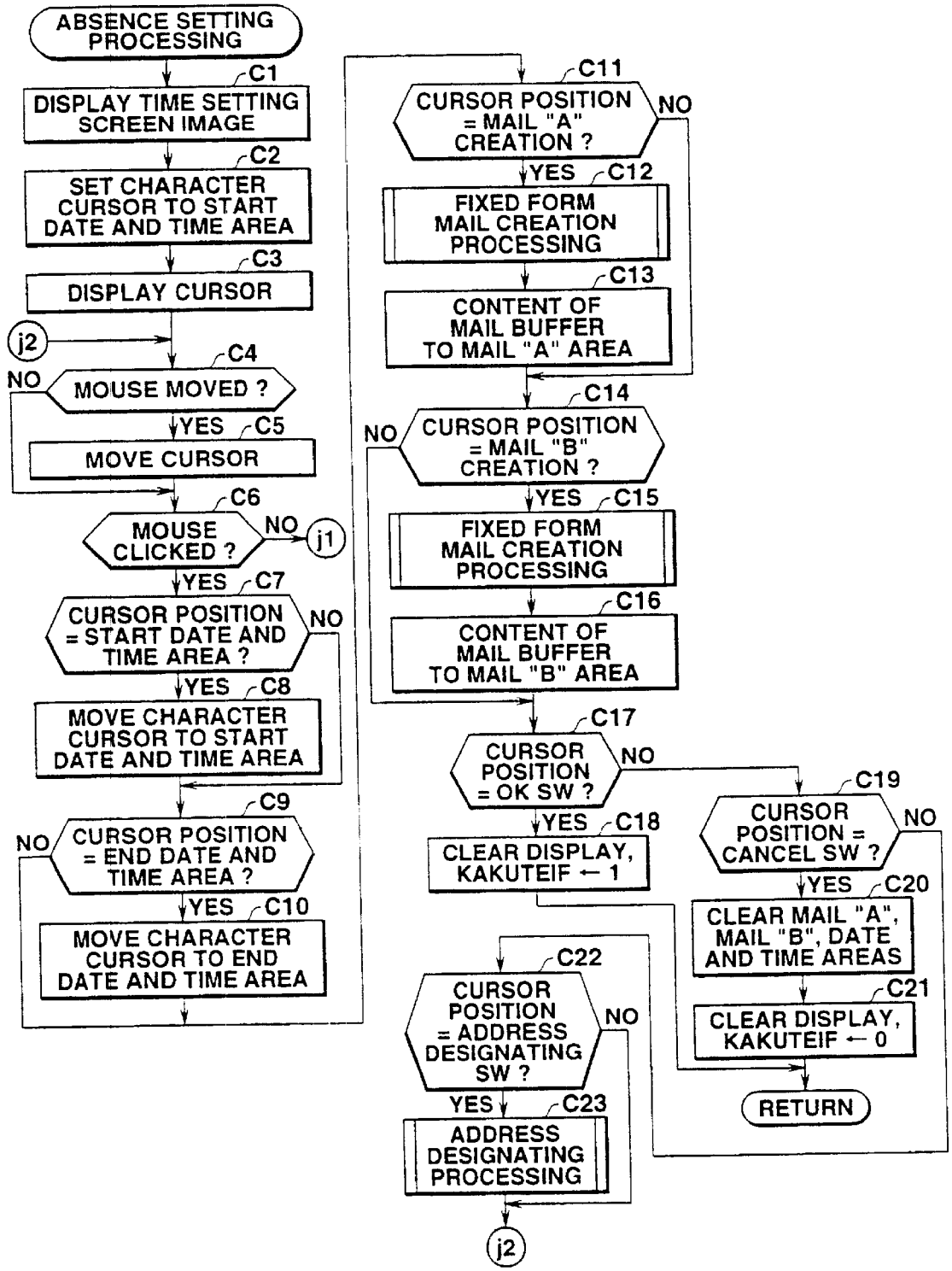
FIG. 39 is a flow chart of absence setting processing of the third embodiment.
Figure 40:
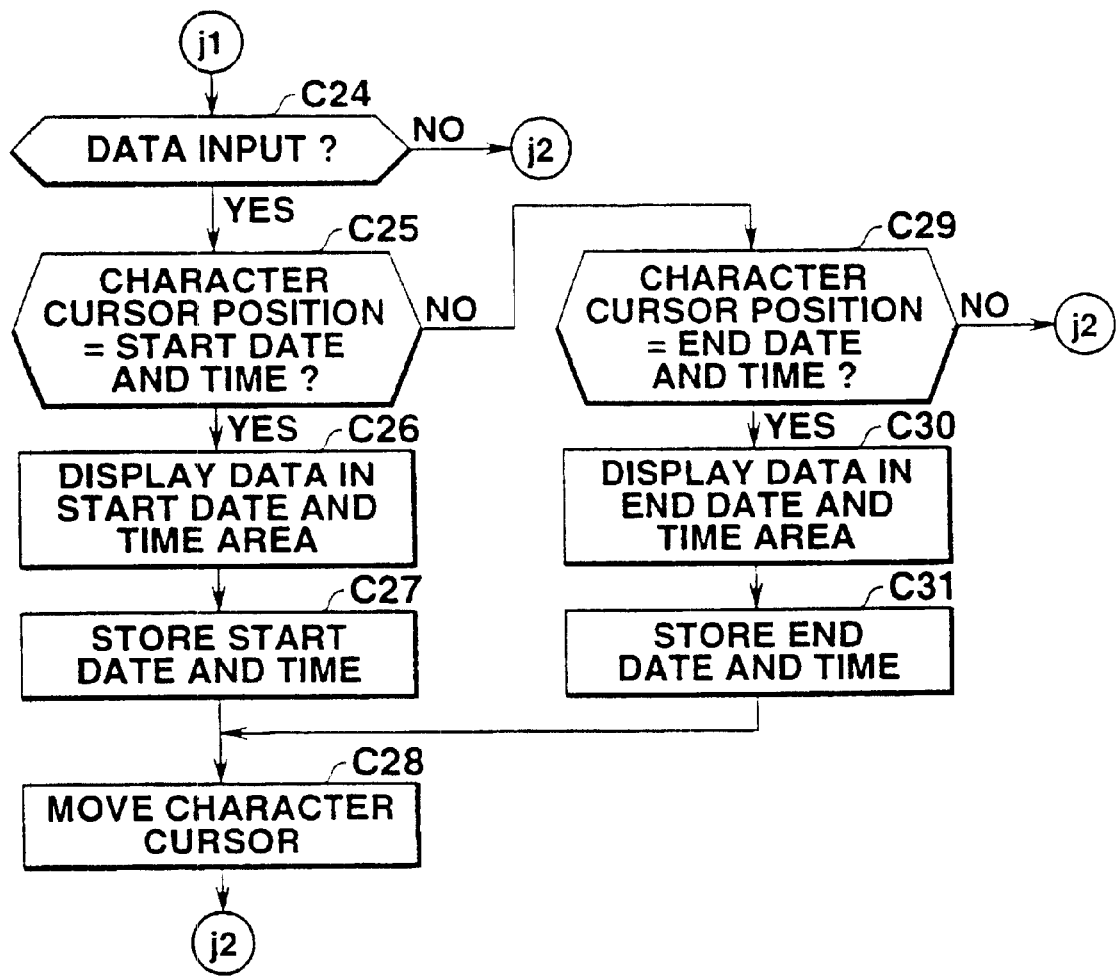
FIG. 40 is a flow chart of absence setting processing of the third embodiment, continued from FIG. 39.

FIGS. 39 and 40 are flows of absence setting processing and FIG. 41 is an absence setting screen image. In FIG. 39, a time setting screen image is displayed in the absence setting screen image of FIG. 41 (step C1), a character cursor is set at the start date and time area (step C2). Then, a cursor for the mouse 6 is displayed (step C3) Then it is determined whether or not the mouse 6 has been moved (step C4) and if the mouse 6 has been moved, the cursor is moved in accordance with the movement of the mouse 6 (step C5). Then, it is determined whether or not the mouse 6 has been clicked (step C6). If the mouse 6 has been clicked, it is determined whether or not a cursor position is in the start data and time area (step C7). If the cursor position is this position, a character cursor is set at the start date and time area (step C8).

If a cursor position is not in the start date and time area, it is determined whether or not the cursor positions is in the end date and time area (step C9). If the cursor position is this position, a character cursor is set at the end date and time area (step C10). If a cursor position is not in the end date and time area, it is determined whether or not the cursor position is a small "A" creation switch position (step C11). If the cursor position is this position, fixed form mail creation processing is executed (step C12). The fixed form mail creation processing is further described later. Then, a content of a mail buffer is stored in the fixed form mail "A" area of RAM 3 (step C13).

At step C11, if a cursor position is not the mail "A" creation switch position, it is determined whether or not the cursor position is a mail "B" creation switch position (step C14). If the cursor position is this position, then also the same fixed form mail creation processing as step C12 is executed (step C15). Then, a content of a mail buffer is stored in the fixed form mail "B" area of RAM 3 (step C16).

At step C14, if a cursor position is not the mail "B" creation switch position, it is determined whether or not the cursor position is an OK switch position (step C17). If the cursor position is this position, an absence setting screen image of FIG. 41 is cleared and the definite flag KAKUTEIF is set at "1" (step C18). Then, the flow is terminated.

At step C17, if a cursor position is not the OK switch position, it is determined whether or not the cursor position is a cancel switch position (step C19). If the cursor position is this position, data of date and time area of the fixed form mail "A" and fixed form mail "B" are cleared (step C20) and the absence setting processing screen image of FIG. 19 is cleared and the definite flag KAKUTEIF is reset at "0" (step C21). Then, the low is terminated.

At step C19, if a cursor position is not the cancel position, it is determined whether or not the cursor position is an address designating switch position on the screen image of FIG. 41 (step C22). If the cursor position is this position, address-designating processing is executed (step C23). The address designating processing is further described later.

If a cursor position is not any one of the above mentioned positions, or after processing corresponding to a cursor position is completed, program flow goes to step C4 and a movement of the mouse 6 is checked.

At step C6, if the mouse 6 has not been clicked, program flow goes to a flow of FIG. 40 and it is determined whether or not data input has been made from the key board 4 (step C24). If the data input has been made, it is determined whether or not a character cursor position is in a start date and time area (step C25). If the character cursor position is this position, the data of the start date and time input in the start date and time area are displayed (step C26) and the data of the start date and time are stored in RAM 3 (step C27). Then, the character cursor is moved (step C28).

At step C25, if a character cursor position is not the start date and time position, it is determined whether or not the character cursor position is an end date and time position (step C29). If the character cursor position is this position, data of the end date and time input to the end date and time area are displayed (step C30) and the data of the end date and time are stored in RAM 3 (step C31). Then, the character cursor is moved (step C28).

After the character cursor is moved in step C28, or if the data input is not made in step C24 or if the character cursor position is not at any one of the start date and time, and the end date and time positions, program flow goes to step C4 of FIG. 39 and a movement of the mouse 6 is checked.

Figure 42:
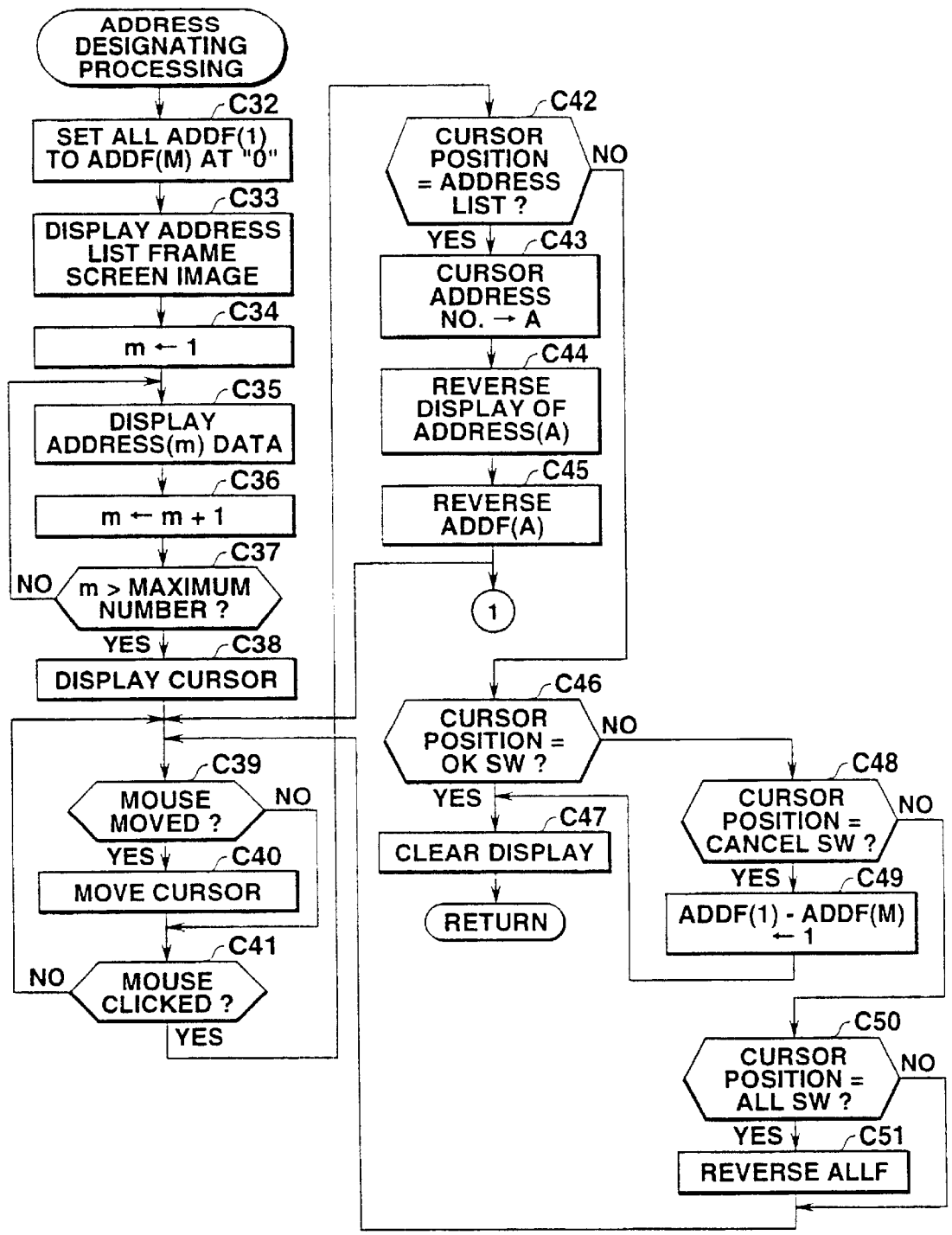
FIG. 42 is a flow chart of address designating processing of the third embodiment.

FIG. 42 is a flow of address designation processing at step C23 of FIG. 39 and FIG. 43 is an address list display screen image on designating the address.

In FIG. 42, the address flags ADDF(1) to ADDF(M) of each address in the address area of RAM 3 are all set at "0" (step C32) and a screen image of address list frame is displayed (step C33). Then, a pointer "m" indicating an address number is set at "1" (step C34) and an ADDRESS (m) designated by "m" is displayed (step C35). Then, "m" is incremented (step C36) and it is determined whether or not "m" exceeds the maximum number (step C37). If "m" is equal to or less than the maximum number, program flow goes to step C35 to display data of the ADDRESS(m). Then, a loop of steps C35, C36 and C37 is repeated while "m" is incremented till "m" exceeds the maximum number. Then, all the data of addresses are displayed.

At step C37, if "m" exceeds the maximum number, a cursor is displayed on the screen image (step C38) and it is determined whether or not the mouse has been moved (step C39). If the mouse has been moved, a cursor position is moved in accordance with the movement (step C40). Then, it is determined whether or not the mouse 6 has been clicked (step C41) and if the mouse 6 has not been clicked, program flow goes to step C39 and the movement of the mouse 6 is checked.

If the mouse 6 has been clicked, it is determined whether or not a cursor position is an address list position on the screen image of FIG. 43 (step C42). If the cursor position is this position, a register "A" is set at an address number of the cursor position (step C43). Then, an address "A" is displayed in reverse (step C44) and the flag ADDF(A) is inverted (step C45). Then, program flow goes to step C39 and a movement of the mouse 6 is checked.

At step C42, if a cursor position is not the address list position, it is determined whether or not a cursor position is an OK switch position on the screen image of FIG. 43 (step C46). If the cursor position is this position, a screen image of FIG. 43 is cleared (step C47) and the flow is terminated and it is determined whether or not the mouse 6 is moved on the screen image of FIG. 41 (step C4 of FIG. 39).

At step C46, if a cursor position is not the OK switch position, it is determined whether or not the cursor position is a cancel switch position (step C48). If the cursor position is this position, the flags ADDF(1) to ADDF(M) are all reset at "0" (step C49) and a screen image of FIG. 43 is cleared (step C47) and the flow is terminated and a movement of the mouse 6 is checked (step C4 of FIG. 39).

At step C48, if a cursor position is not the cancel switch position, it is determined whether or not the cursor position is an ALL switch position on the screen image of FIG. 43 (step C50). If the cursor position is this position, the flag ALLF is inverted (step C51).

If a cursor position when the mouse 6 is clicked is not any one of the above mentioned positions, or after a processing according to each cursor position has been completed, program flow goes to step C39 and a movement of the mouse 6 is checked.

Figure 44:
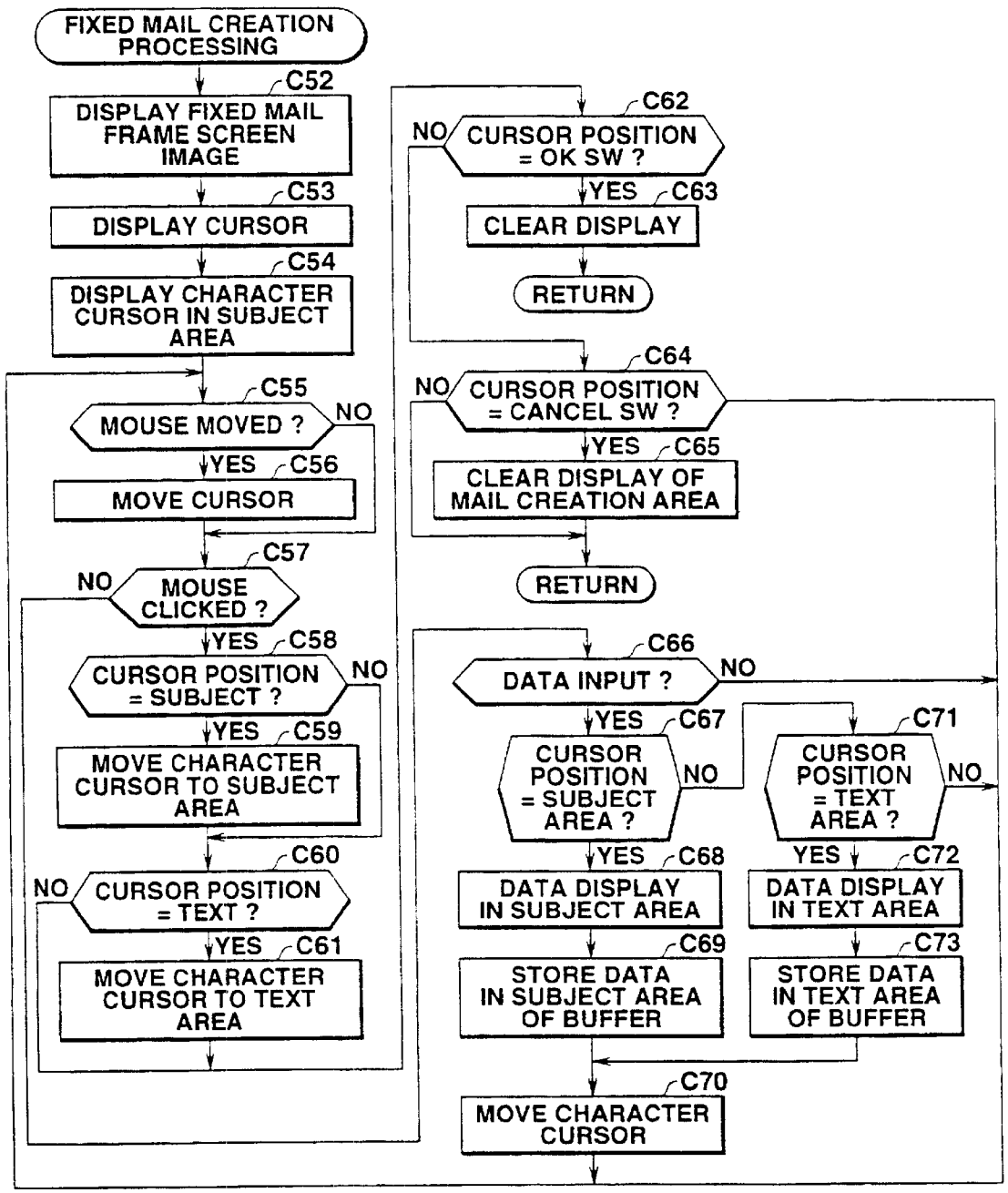
FIG. 44 is a flow chart of fixed form mail creation processing of the third embodiment.

FIG. 44 is a flow of fixed form mail creation processing at steps C12 and C15 of FIG. 39. FIG. 45A is a screen image of the fixed form mail "A" clearly indicating only an absent period and FIG. 45B is a screen image of the fixed form mail "B" clearly indicating not only an absent period but an emergency contact place in the absent period.

In FIG. 44, a screen image of a fixed form mail creation frame is displayed (step C52). Then a cursor for the mouse 6 is displayed (step C53) and a character cursor is displayed in the subject area (step C54).

Then, it is determined whether or not the mouse 6 has been moved (step C55) and if the mouse 6 has been moved, a cursor position on the screen image is moved in accordance with the movement of the mouse 6 (step C56). Then, it is determined whether or not the mouse 6 has been clicked (step C57) and if the mouse 6 has been clicked, processing executed in accordance with a cursor position on a fixed form mail "A" screen image of FIG. 45A or a cursor position on a fixed form mail "B" screen image of FIG. 45B.

It is determined whether or not a cursor position is a position in the subject area (step C58) and if the cursor position is this position, a character cursor is set at the subject area (step C59). If a cursor position is not a position in the subject area, it is determined whether or not the cursor position is a position in the text area (step C60) and if the cursor position is this position, a character cursor is set at the text area (step C61). If a cursor position is not a position in the text area either, it is determined whether or not the cursor position is an OK switch position on the screen image (step C62) and if the cursor position is this position, a fixed form mail screen image is cleared (step C63) and the flow is terminated.

If a cursor position is not the OK switch position, it is determined whether or not the cursor position is a cancel switch position (step C64) and if the cursor position is this position, not only are data of a fixed form mail creation area cleared but a fixed form mail screen image is cleared (step C65). Then, the flow is terminated.

At step C57 of FIG. 44, if the mouse 6 has not been clicked, it is determined whether or not data input has been made from the key board 4 (step C66). If the data input has been made, it is determined whether or not a cursor position is in a subject area (step C67). If the cursor position is this position, data input in the subject area are displayed (step C68) and the data is stored in a subject area of a buffer of RAM 3 (step C69). Then, the character cursor is moved (step C70).

At step C67, if a character cursor position is not in the subject area, it is determined whether or not the character cursor position is in a text area (step C71). If the character cursor position is this position, data signal in the text area are displayed (step C72) and the data are stored in a text area of a buffer of RAM 3 (step C73). Then, the character cursor is moved (step C70).

At step C64, if a cursor position is not the cancel switch position, that is when a cursor position is not at any positions which are objects to be processed, if the data input is not made at step C66, if a character cursor position is not the text area or after the character cursor is moved at step C70, program flow goes to step C55 and a movement of the mouse 6 is checked.

Figure 46:
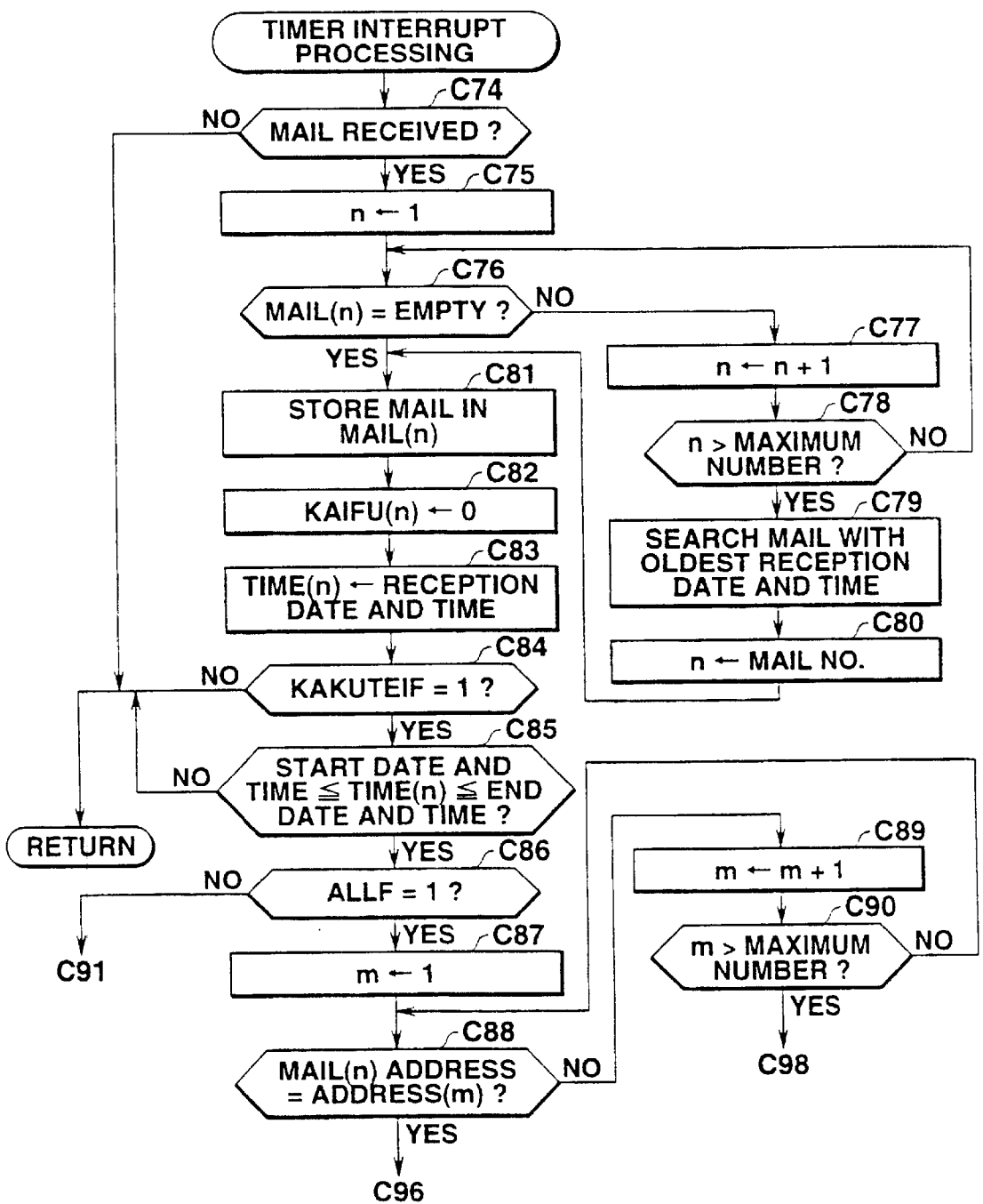
FIG. 46 is a flow chart of timer interrupt processing of the third embodiment.
Figure 47:
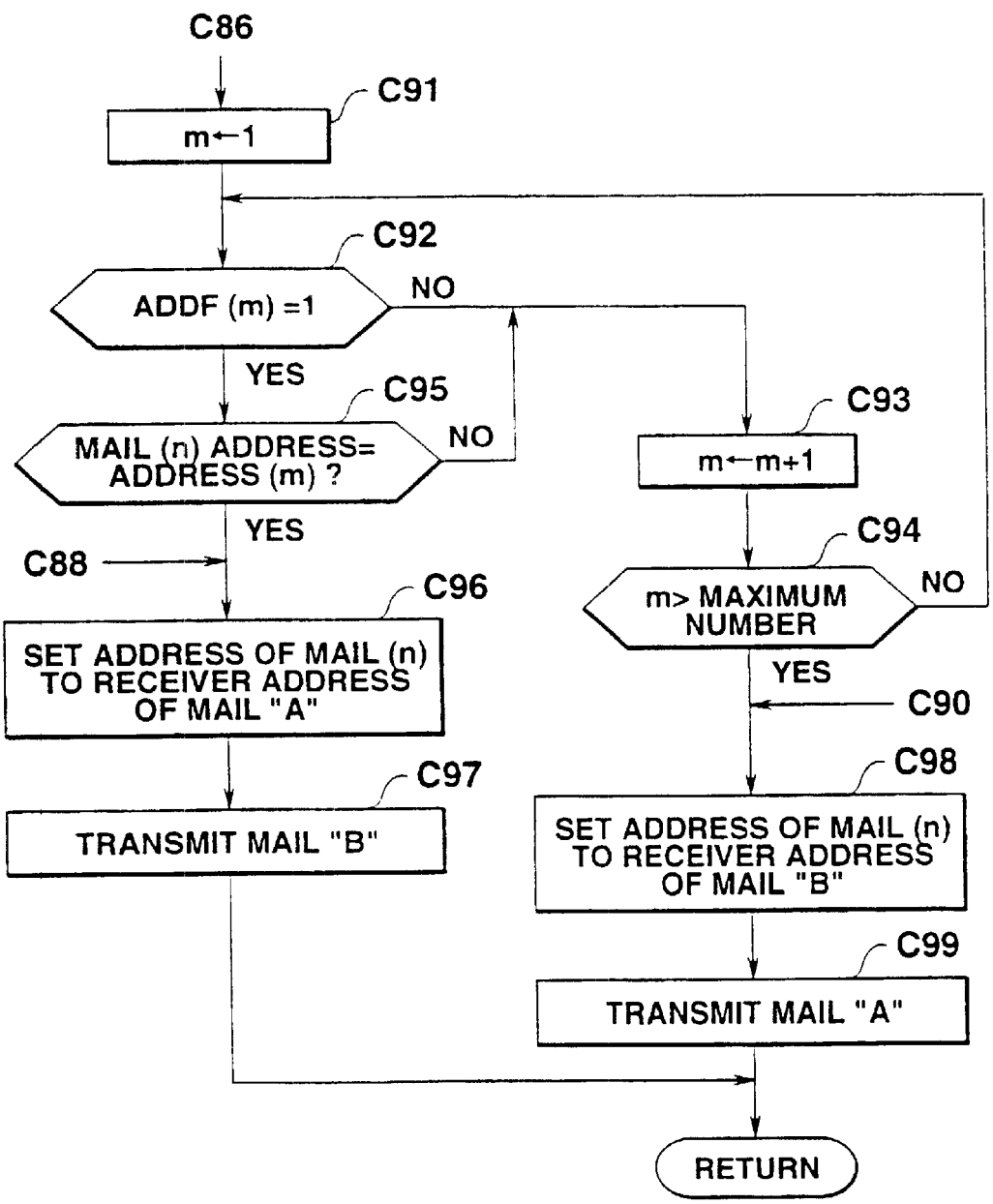
FIG. 47 is a flow chart of the timer interrupt processing of the third embodiment, continued from FIG. 46.

FIGS. 46 and 47 are flows of timers interrupt processing.

When timer interrupts occur at set intervals, the server 300 shown in FIG. 1 is accessed by CPU 1 of a terminal 100. In FIG. 46, it is determined whether or not a received mail is present in a mail box of the server 300 (step C74). If the received mail is not present, the flow is immediately terminated. If the received mail is present, a pointer "n" indicating the number of a RECEIVED MAIL(n) area indicated by the MAIL(n) of the received mail storage area of RAM 3 is set at "1" (step C75). Then, it is determined whether or not a RECEIVED MAIL(n) area designated by "n" is empty (step C76).

If a designated area is not empty, "n" is incremented (step C77) and it is determined whether or not "n" exceeds the maximum number (step C78). If "n" has not exceeds the maximum number, program flow goes to step C76 and it is determined whether or not the RECEIVED MAIL(n) area is empty. A loop of steps C76, C77 and C78 is repeated while "n" is incremented to search a RECEIVED MAIL(n) area with an empty space. At step C79, if "n" exceeds the maximum number, that is when none of the area of the RECEIVED MAIL(1) to MAIL(M) of the received mail storage area of RAM 3 is empty, a received mail with the oldest reception data and time is searched (step C79). Then, the pointer "n" is set at a mail number thereof (step C80).

At step C76, if the designated RECEIVED MAIL(n) area is empty or at step C80 when "n" is set at the mail number with the oldest reception data and time, a received mail fetched from the server 300 is stored in the RECEIVED MAIL(n) area (step C81), Then, an unseal flag KAIFUF(n) is reset at "0" to indicate the seal state (step C82) and TIME(n) is set at a reception date and time (step C83).

Then, it is determined whether or not the definite flag KAKUTEIF set in the absence setting processing of FIG. 39 is "1" (step C84). If the flag is "0", the flow is terminated. If the flag is "1", it is determined whether or not the reception date and time set to TIME(n) is in a period of a start date and time to an end date and time in the absence (step C85). If the reception date and time is not in the period, the flow is terminated, but when the reception date and time is in the period, it is determined whether or not the flag ALLF is "1", that is it is determined whether or not all the addresses are designated in the address area of RAM 3 (step C86).

If all the addresses are designated, a pointer "m" indicating an address number of the address area is set 1 (step C87). Then, it is determined whether or not a transmitter address of a RECEIVED MAIL(n) and an ADDRESS(m) designated by "m" coincide with each other (step C88). If there is no coincidence therebetween, "m" is incremented (step C89) and it is determined whether or not "m" exceeds the maximum number (step C90). If "m" does not exceed the maximum number, program flow goes to step C88 and it is determined whether or not a transmitter address of the RECEIVED MAIL(n) and a designated ADDRESS(m) of the address area coincide with each other and a loop of steps C88, C89 and C90 is repeated while "m" is incremented to search an address in coincidence.

At step C86, if the ALLF is "0", a pointer "m" is set at "1" in a flow of FIG. 47 (step C91) and it is determined whether or not the designated flag ADDF(m) is 1, that it is determined whether or not the designated flag ADDF(m) is a designated address (step C92). If the flag is "0", "m" is incremented, a next address is designated (step C93) and it is determined whether or not "m" exceeds the maximum number (step C94). If "m" has not exceeded the maximum number, program flow goes to step C92 and it is determined whether or not ADDF(m) is 1. Then, a loop of steps C92, C93 and C94 is repeated while "m" is incremented to search an address with ADDF of "1".

At step C92, if the ADDF(m) is 1, it is determined whether or not an address of a RECEIVED MAIL(n) coincides with an ADDRESS(m) (step C95). If there is no coincidence therebetween, a loop of steps C95, C93, C94 and C92 is repeated while "m" is incremented to search an address in coincidence. At step C96, if there is an ADDRESS(m) which coincides with the address of a RECEIVED MAIL(n), the address of a RECEIVED MAIL(n) is set as an address of a fixed form mail "B" (step C96) and the fixed form mail "B" which clearly indicates an emergency contact place is transmitted (step C97).

At step C88 of FIG. 46, if there is an ADDRESS(m) which coincides with a transmitter address of a RECEIVED MAIL(n) among the addresses which are all designated, program flow goes to step C96 of FIG. 47, the transmitter address of a RECEIVED MAIL(n) is set as an address of a fixed form mail "B" and the fixed form mail "B" with an emergency contact place clearly indicated is transmitted (step C97).

At step C92 of FIG. 47, if ADDF(m) is not "1" or at step C95, if there is no coincidence between a transmitter address of a RECEIVED MAIL(n) and an ADDRESS(m), then "m" is incremented, and as a result, if "m" exceeds the maximum number at step C94, the transmitter address of a RECEIVED MAIL(n) is set as an address of a fixed form mail "A" (step C98) and the fixed form mail "A" which indicates only the state of absence is transmitted (step C99).

At step C88 of FIG. 46, if there is not an ADDRESS(m) which coincides with a transmitter address of a RECEIVED MAIL(n) among the addresses which are all designated, "m" is incremented, and as a result, if "m" exceeds the maximum number at step C90, program flow goes to step C98, the transmitter address of a RECEIVED MAIL(n) is set as an address of a fixed form mail "A" and the fixed form mail "A" which indicates only the state of absence is transmitted (step C99).

As described above, according to the above mentioned third embodiment, the terminal 100 of FIG. 1 comprises:

mail storage means for storing a plurality of fixed form mails;

mail receiving means for receiving an electronic mail;

address designating means for designating an address of a specific receiver;

mail determining means for determining whether or not a transmitter address of the received electronic mail is an address designated by the address designating means when it detects that the electronic mail is received by the mail receiving means;

mail selecting means for selecting one of fixed form mails stored in said mail storage means based on a determination result by the mail determining means; and main transmitting means for transmitting the fixed form mail selected by the mail selecting means to the same address as a transmitter address of the received electronic mail.

If the received electronic mail has an address of a specific receiver, transmitted is a specific fixed form mail, different from an ordinary fixed form mail which is transmitted to one of other receivers.

In the above mentioned third embodiment, there is described an electronic mail system in which a program to receive and transmit electronic mails is stored in ROM 2, but such constitutions may be adopted that a program to transmit or receive an electronic mail is stored in such storage media as a floppy disk, a compact disk and the like and an apparatus such as a personal computer or a word processor for general purpose use or the like executes the program.

The machine readable storage medium stores a program for electronic mail processing, the program comprising:

(i) step of storing a plurality of fixed form mails;

(ii) step of receiving an electronic mail;

(iii) step of designating an address of a specific receiver;

(iv) step of determining whether or not a transmitter address of the received electronic mail is an address designated by the step (iii) when it detects that the electronic mail is received by the step (ii);

(v) step of selecting one of fixed form mails stored in said mail storage means based on a determination result by the step (iv) from the plurality of fixed form mails stored by the step (i); and (vi) step of transmitting the fixed form mail selected by the step (v) to the same address as a transmitter address of the received electronic mail.

The program is executed by an apparatus such as a personal computer or a word processor for general purpose use, or the like.

The fourth embodiment of the present invention will be described.

Figure 48:
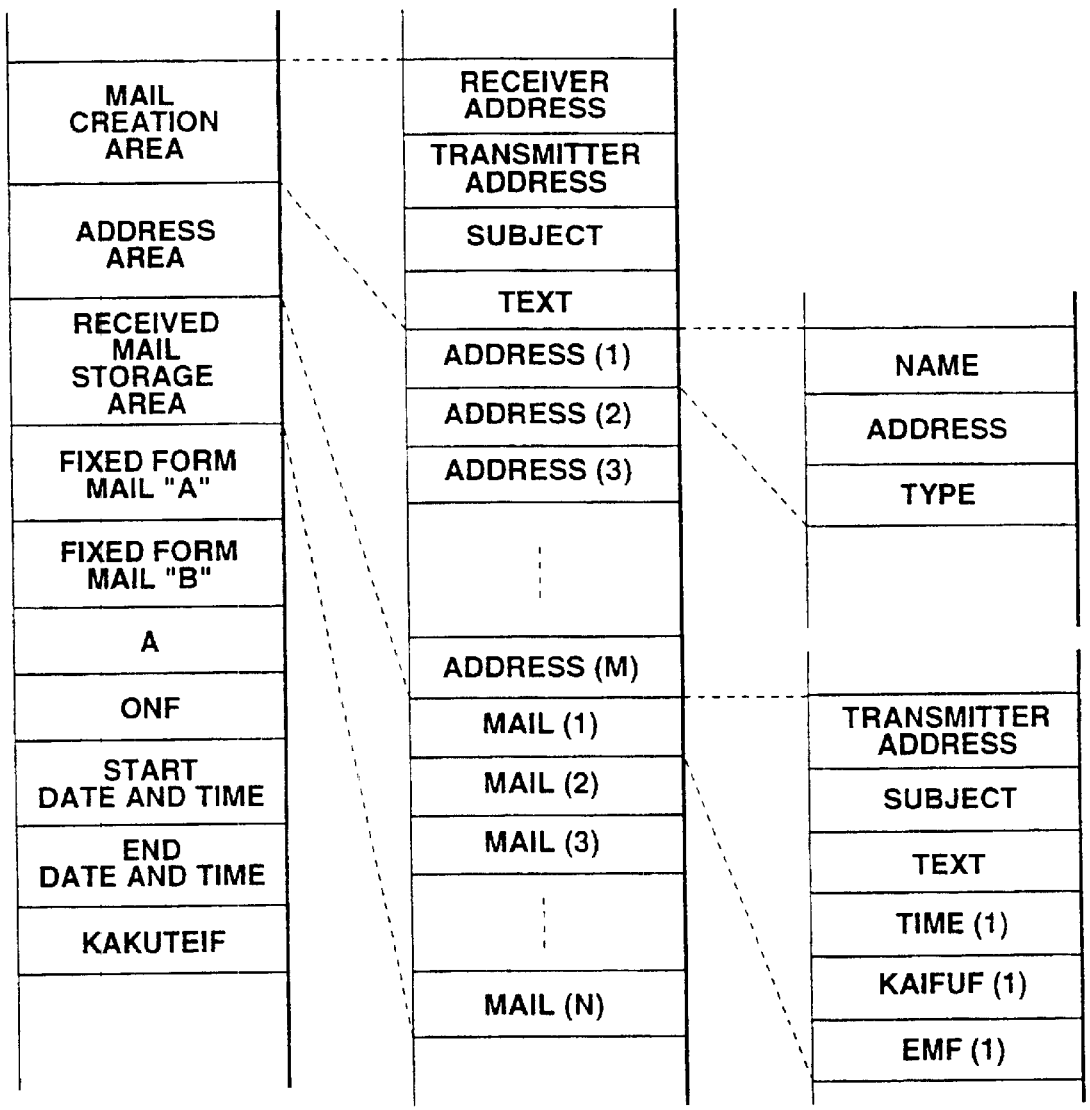
FIG. 48 shows a memory map of a fourth embodiment.

FIG. 48 is a memory map of RAM 3 in the fourth embodiment. As can be made easier in the figure, at each ADDRESS(1) to ADDRESS(M) in the address area, there is provided no flag ADDF which designates individually each address to which a fixed form mail "A" is transmitted, which is different from the third embodiment. Besides, there is provided no flag ALLF which designates by one operation all the addresses to which fixed form mail "A" is transmitted. On the other hand, emergency flags EMF are respectively provided in the RECEIVED MAIL(1) to RECEIVED MAIL(N) of the received mail storage area. The other parts are the same as the memory map of the third embodiment shown in FIG. 38. The emergency flag is described later.

Figure 49:
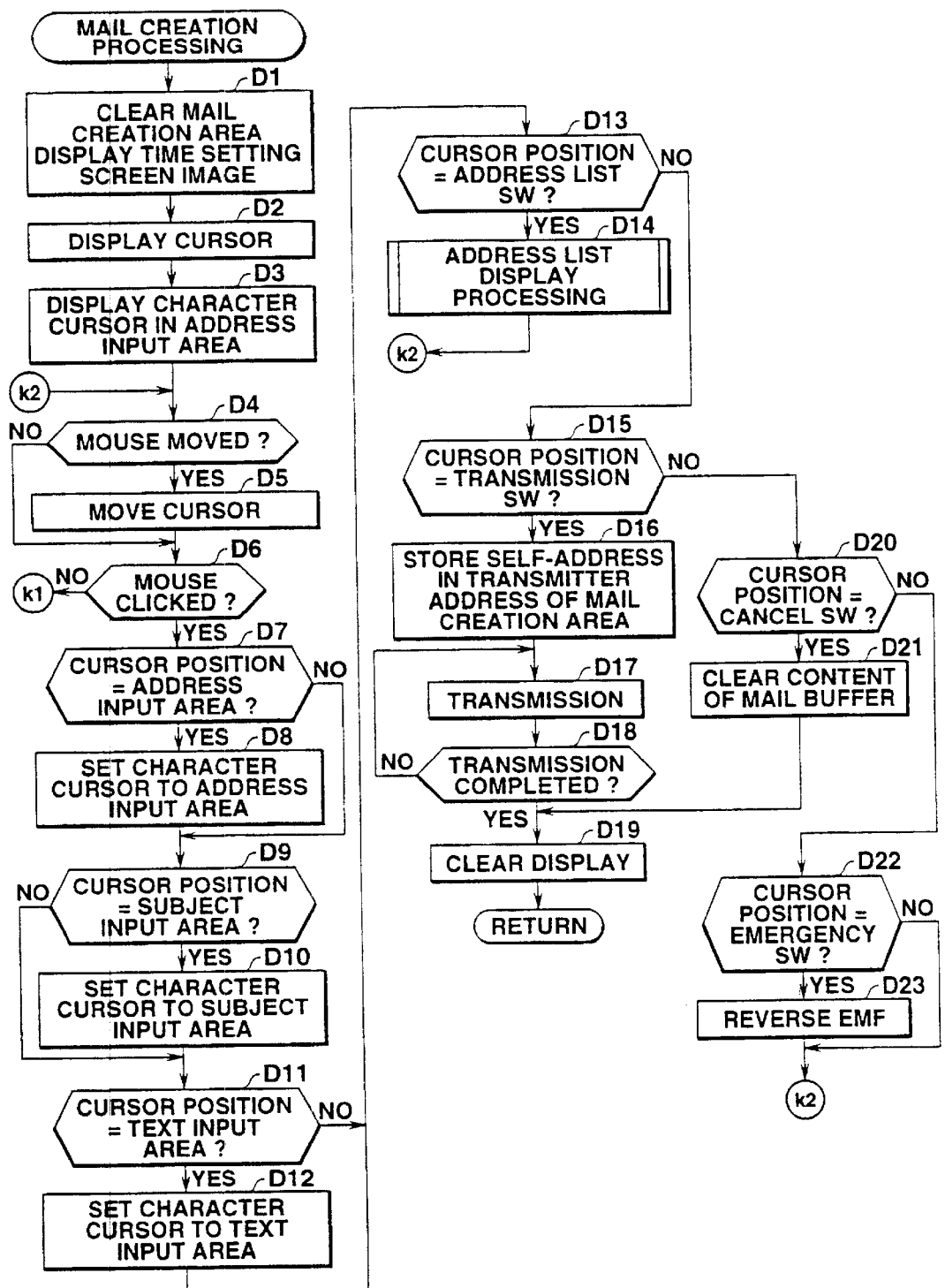
FIG. 49 is a flow chart of mail creation processing of the fourth embodiment.
Figure 50:
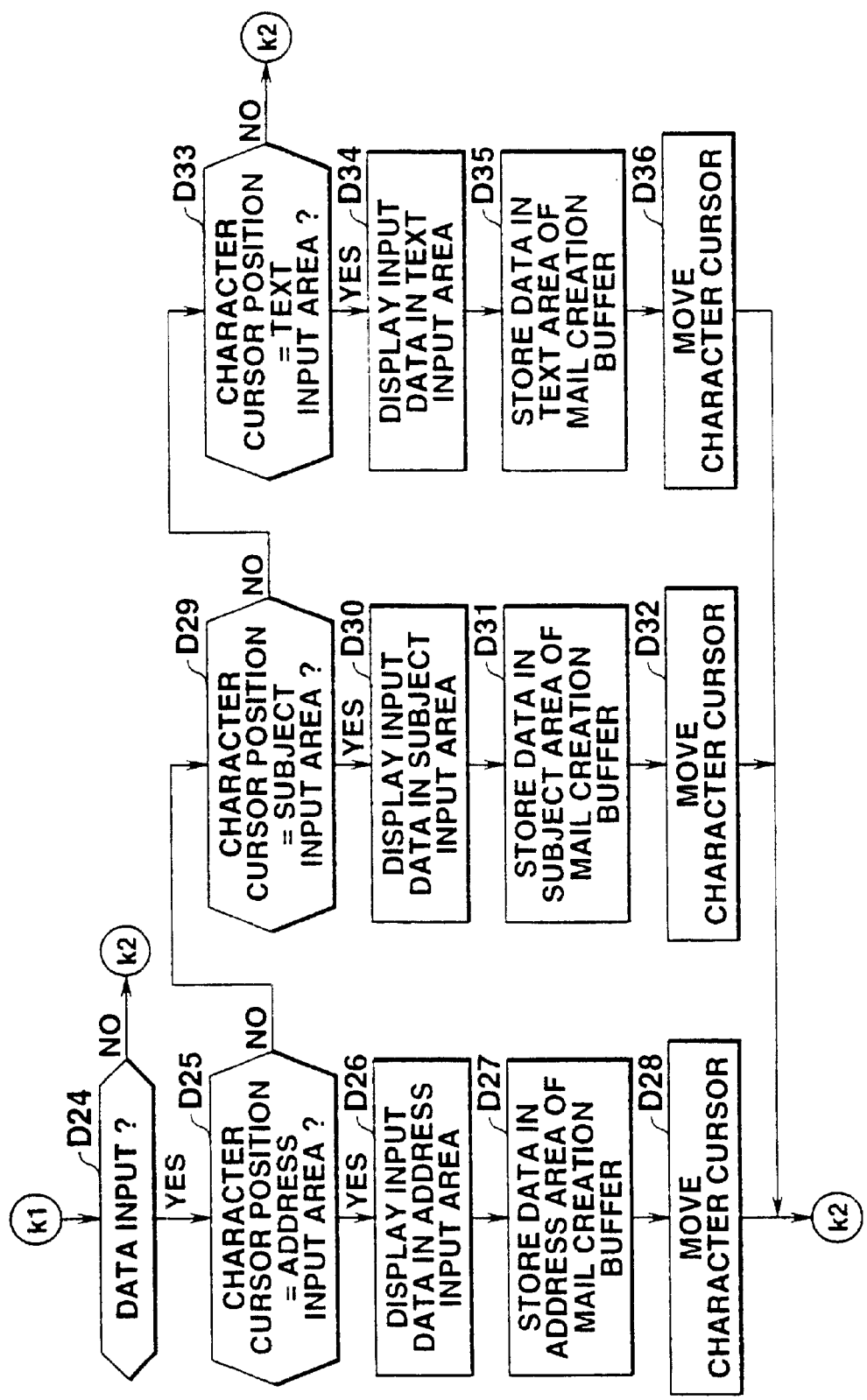
FIG. 50 is a flow chart of mail creation processing of the fourth embodiment, continued from FIG. 49.

FIGS. 49 and 50 are flows of mail creation processing in the fourth embodiment and FIG. 51 is a mail creation screen image therefor. In the screen image, there are provided an address list switch and a transmission switch on the mail creation screen image of the first embodiment shown in FIG. 11, and in addition an emergency switch. In FIG. 49, not only are data of the mail creation area of RAM 3 cleared but a mail creation frame screen image is displayed (step D1). A cursor for the mouse 6 is displayed on the screen image of FIG. 51 (step D2) and a character cursor is displayed in the address area (step D3).

Then, it is determined whether or not the mouse 6 has been moved (step D4) and if the mouse 6 has been moved, a cursor position on the screen image is moved in accordance with the movement step D5). Then, it is determined whether or not the mouse 6 has been clicked (step D6) and if the mouse 6 has been clicked, processing is executed in accordance with a cursor position on the mail creation screen image of FIG. 51.

It is determined whether or not a cursor position is in an address input area (step D7) and the cursor position is this position, a character cursor is set at the address input area (step D8). If a cursor position is not in the address input area, it is determined whether or not the cursor position is in a subject input area (step D9) and the cursor position is this position, a character cursor is set at the subject input area (step D10). If a cursor position is not in the subject input area either, it is determined whether or not the cursor position is in a text input area (step D11) and if the cursor position is this position, a character cursor is set at the text input area (step D12).

If a cursor position is not in the text input area either, it is determined whether or not the cursor position is an address list switch position (step D13) and if the cursor position is this position, address display processing is executed (step D14). The address display processing is the same flow as that of the first embodiment shown in FIG. 12 and an address list display screen image is also the same as shown in FIG. 13. If a cursor position is not the address list switch position either, it is determined whether or not the cursor position is a transmission switch position (step D15) and the cursor position is this position, a self-address is stored in a transmission address of the mail creation area of RAM 3 (step D16) and transmission processing is executed (step D17). At this point, it is allowed that an icon switch of transmission on the screen image is displayed in reverse and the processing is indicated to be during transmitting. Then, it is determined whether or not the transmission processing has been completed (step D18). If the transmission processing has not been completed, the transmission processing of step D17 is continued. If the transmission processing has been completed, the display of the mail creation screen image is cleared (step D19) and the flow is terminated and a received mail screen image is displayed.

At step D15, if a cursor position is not the transmission switch position, it is determined whether or not the cursor position is a cancel switch position (step D20) and if the cursor position is this position, a content of a mail buffer is cleared (step D21) and the flow is terminated and the received mail screen image is displayed. If a cursor position is not the cancel switch position, it is determined whether or not the cursor position is an emergency switch position (step D22). If the cursor position is this position, a emergency flag EMF is inverted (step D23).

At step D6, if the mouse 6 has not been clicked, it is determined whether or not data input has been made from the key board 4 in a flow of FIG. 50 (step D24). If the data input has not been made, program flow goes to step D4 of FIG. 49 and a movement of the mouse is checked. If the data input has been made, it is determined whether or not a character cursor position is a position in the address input area (step D25). If the character cursor position is this position, input data is displayed in the address input area (step D26) and the input data are stored in an address area of a mail creation buffer of RAM 3 (step D27). Then, the character cursor is set at a next character input position (step D28).

At step D25, if a character cursor position is not a position in the address input area, it is determined whether or not the character cursor is a position in the subject input area (step D29). If the character cursor position is this position, input data are displayed in the subject input area (step D30) and the input data are stored in the subject area of the mail creation buffer of RAM 3 (step D31). Then, a character cursor is set at a next character input position (step D32). At step D29, if a character cursor position is not in the subject input area, it is determined whether or not the character cursor position is a position in the text input area (step D33). If the character cursor position is this position, input data are displayed in the text input area (step D34) and the input data are stored in the text area of a mail creation buffer of RAM 3 (step D35). Then, the character cursor is set at a next character input position (step D36).

After the character cursor is moved at steps D28, D32 or D36, program flow goes to step D4 of FIG. 49 and a movement of the mouse 6 is checked. After address list display processing is executed at step D14, after EMF is inverted at step D23 or after the data input processing is completed at step D25, program flow goes to step D4 and a movement of the mouse 6 is checked. At step D22 of FIG. 49, if a cursor position is an emergency switch position on the screen image of FIG. 51, EMF of FIG. 48 is inverted, but at this point, it is allowed that the icon of the emergency switch is reversed and it is clearly indicated whether or not a current mode is an emergency mode.

Figure 52:
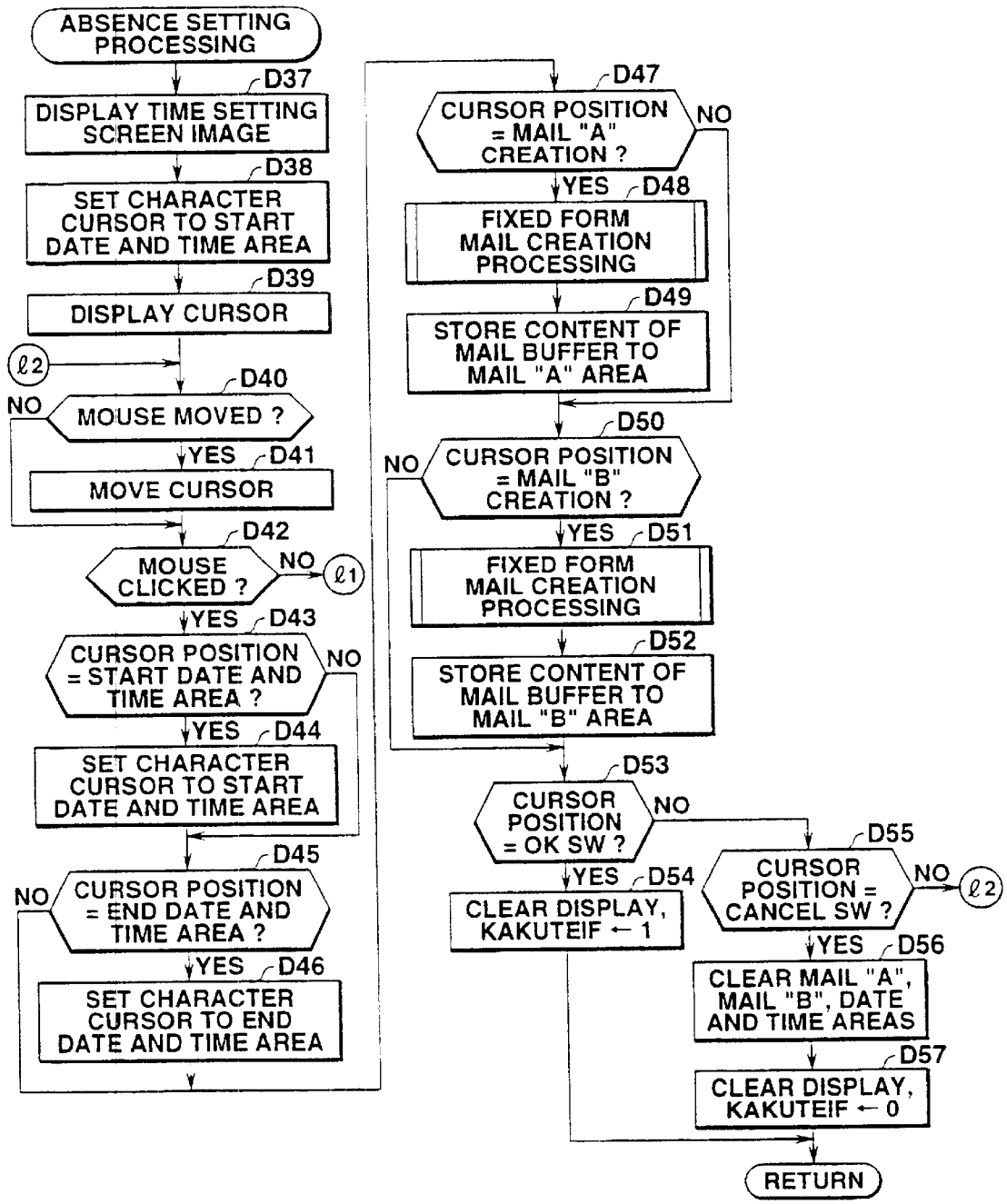
FIG. 52 is a flow chart of absence setting processing of the fourth embodiment.
Figure 53:
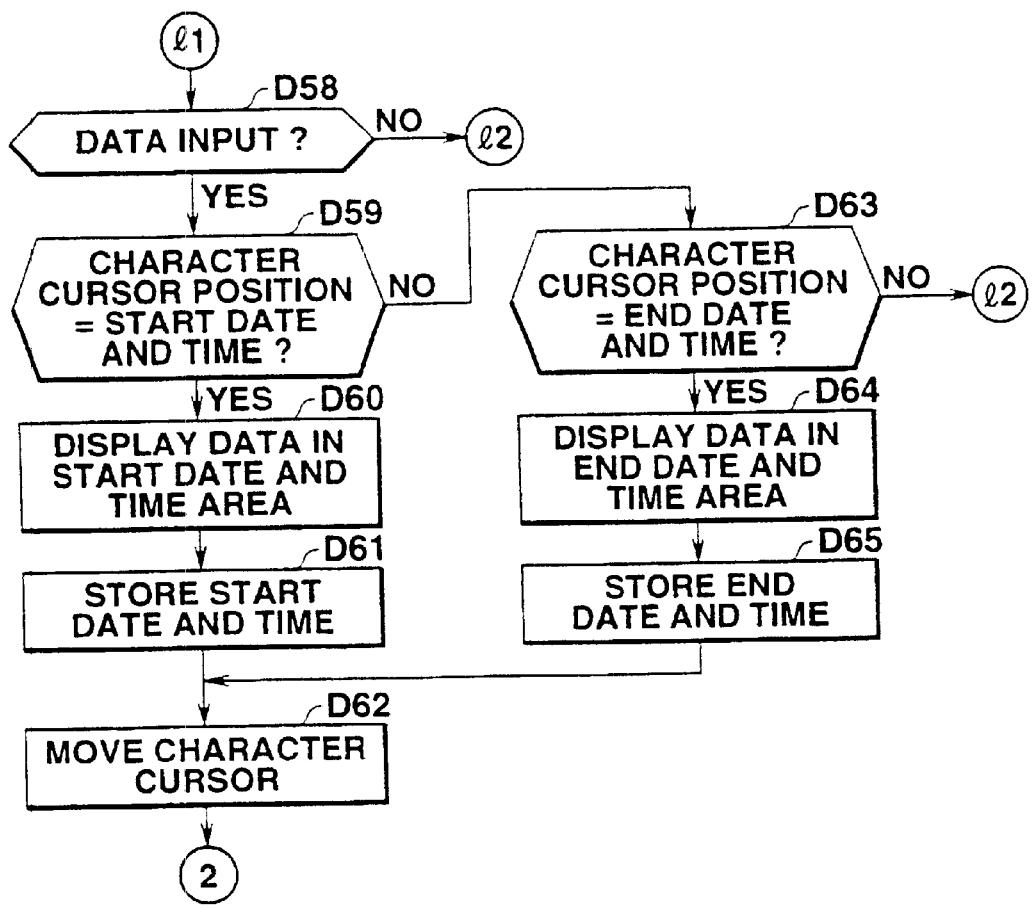
FIG. 53 is a flow chart of the absence setting processing of the fourth embodiment, continued from FIG. 52.

FIGS. 52 and 53 are flows of the absence setting processing. An absence setting screen image is the same as that of the first embodiment shown in FIG. 19. In FIG. 52, a time setting screen image is displayed in the absence setting screen image (step D37) and a character cursor is set at a start date and time area (step D38). A cursor for the mouse 6 is displayed (step D39). Then it is determined whether or not the mouse 6 has been moved (step D40) and if the mouse 6 has been moved, the cursor is moved in accordance with the movement of the mouse 6 (step D41). Then, it is determined whether or not the mouse 6 has been clicked (step D42). If the mouse 6 has been clicked, it is determined whether or not a cursor position is in a start date and time area (step D43). If the cursor position is this position, a character cursor is set at the start date and time area (step D44).

If a cursor position is not in the start date and time area, it is determined whether or not the cursor position is in an end date and time area (step D45). If the cursor position is this position, a character cursor is set at the end date and time area (step D46). If a cursor position is not in the end data and time area, it is determined whether or not the cursor position is a mail "A" creation switch position on the absence setting screen image (step D47). If the cursor position is this position, fixed form mail creation processing is executed (step D48). The fixed form mail creation processing is the same flow as that of the third embodiment shown in FIG. 44. Then, a content of a mail buffer is stored in the fixed form mail "A" area of RAM 3 (step D49).

At step D47, if a cursor position is not the mail "A" creation switch position, it is determined whether or not the cursor position is a mail "B" creation switch position on the screen image (step D50). If the cursor position is this position, then also the same fixed form mail creation processing as that of step D48 is executed (step D51). Then, a content of the mail buffer is stored in the fixed form mail "B" area of RAM 3 (step D52).

At step D50, if a cursor position is not the mail "B" creation switch position, it is determined whether or not the cursor position is an OK switch position (step D53). If the cursor position is this position, the absence setting screen image is cleared and the definite flag KAKUTEIF is set at "1" (step D54). Then, the flow is terminated.

At step D53, if a cursor position is not the OK switch position, it is determined whether or not the cursor position is a cancel switch position (step D55). If the cursor position is this position, the data of the date and time of mails "A" and "B" are cleared (step D56) and the absence setting processing screen image is cleared and the definite flag KAKUTEIF is reset at "0" (step D57). Then, the flow is terminated.

At step D55, if a cursor position is not the cancel switch position, that is when a cursor position is not any one of the above mentioned positions, or after processing according to a cursor position is executed, program flow goes to step D40 and a movement of the mouse 6 is checked.

At step D42, If the mouse 6 has not been clicked, program flow goes to a flow of FIG. 53 and it is determined whether or not data input has been made from the key board 4 (step D58). If the data input has been made, it is determined whether or not a character cursor position is in the start date and time area (step D59). If the character cursor position is this position, the data of the start date and time input in the start date and time area are displayed (step D60) and the data of the start date and time are stored in RAM 3 (step D61). Then the character cursor is moved (step D62).

At step D59, if a character cursor position is not the start date and time position, it is determined whether or not the character cursor position is an end date and time position (step D63). If the character cursor position is this position, the data of the end date and time input in the end date and time area are displayed (step D64) and the data of the end date and time are stored in RAM 3 (step D65). Then the character cursor is moved (step D62).

After the character cursor is moved at step D62, or if data input is not made at step D58 or if a character cursor position is not any one of the start date and time, and end date and time positions, program flow goes to step D40 of FIG. 52 and a movement of the mouse 6 is checked.

Figure 54:
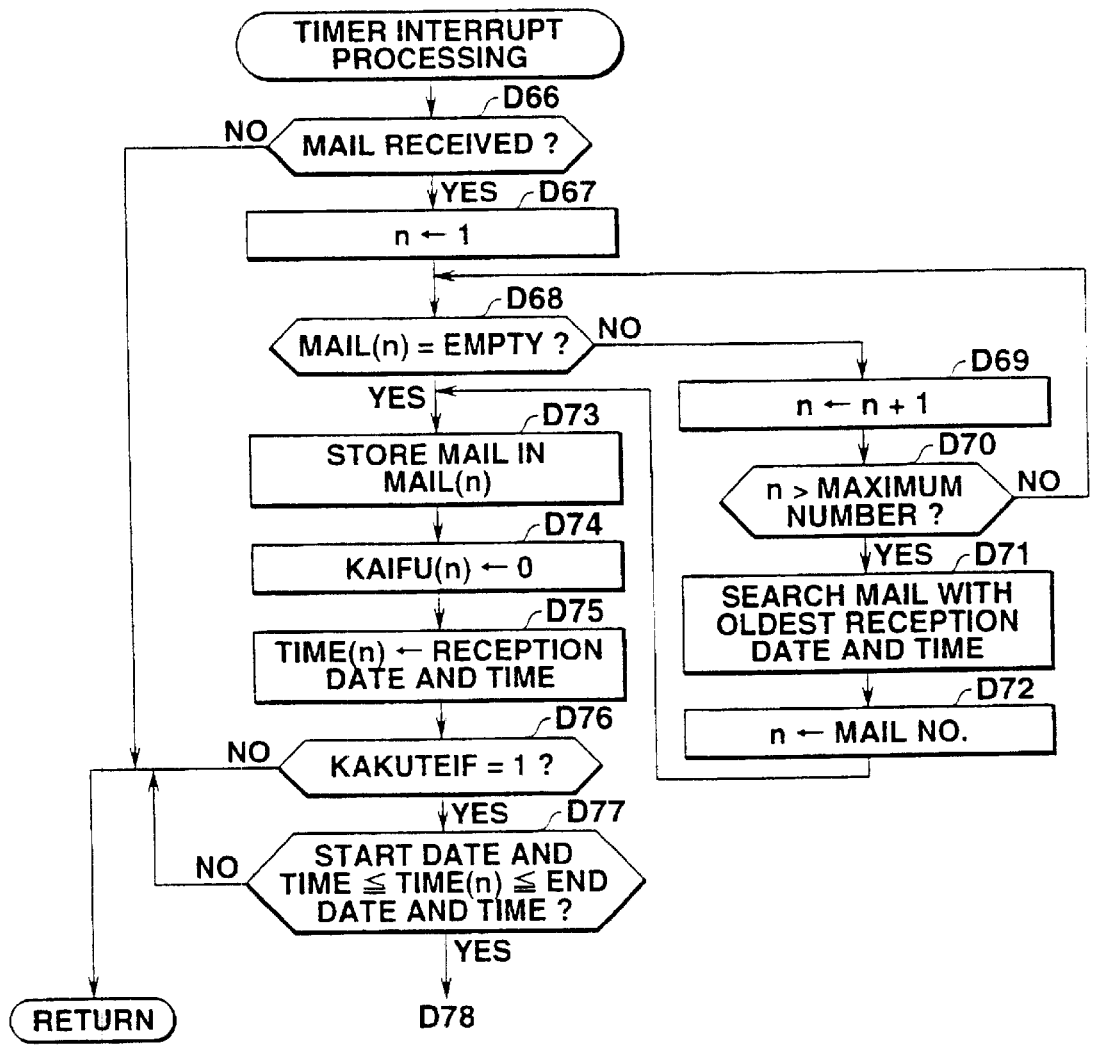
FIG. 54 is a flow chart of timer interrupt processing of the fourth embodiment.
Figure 55:
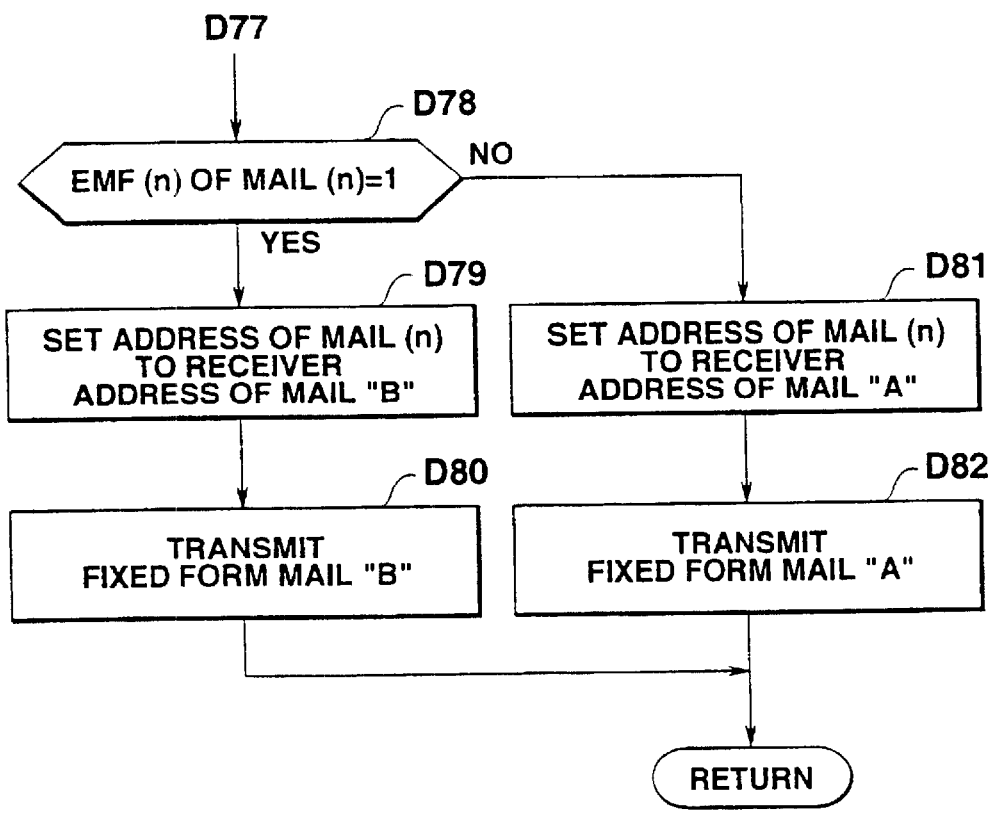
FIG. 55 is a flow chart of the timer interrupt processing of the fourth embodiment, continued from FIG. 54.

FIGS. 54 and 55 are flows of timer interrupt processing.

When timer interrupts occur at set intervals, the server 300 shown in FIG. 1 is accessed by CPU 1 of a terminal 100. In FIG. 54, it is determined whether or not a received mail is present in a mail box of the server 300 (step D66). If the received mail is not present, the flow is immediately terminated. If the received mail is present, a pointer "n" indicating the number of a RECEIVED MAIL(n) area of the received mail storage area of RAM 3 is set at "1" (step C67). Then, it is determined whether or not a RECEIVED MAIL(n) area designated by "n" is empty (step D68).

If a designated area is not empty, "n" is incremented (step D69) and it is determined whether or not "n" exceeds the maximum number (step D70). If "n" has not exceed the maximum number, program flow goes to step D68 and it is determined whether or not the RECEIVED MAIL(n) area is empty. A loop of steps C68, C69 and C70 is repeated while "n" is incremented to search a RECEIVED MAIL(n) area with an empty space. At step D70, if "n" exceeds the maximum number, that is when none of the RECEIVED MAIL(1) to RECEIVED MAIL(N) of the received mail area of RAM 3 is empty, a received mail with the oldest reception data and time is searched (step D71). Then, the pointer "n" is set at a mail number thereof (step D72).

At step D68, if the designated RECEIVED MAIL(n) area is empty or at step D72 when "n" is set at the mail number with the oldest reception date and time, a received mail fetched from the server 300 is stored in the RECEIVED MAIL(n) area (step D73). Then, an unseal flag KAIFUF(n) is reset at "0" to indicate the seal state (step D74) and TIME(n) is set at a reception date and time (step D75).

Then, it is determined whether or not the definite flag KAKUTEIF set in the absence setting processing of FIG. 52 is "1" (step D76). If the flag is "0", the flow is terminated. If the flag is "1", it is determined whether or not the reception date and time set to TIME(n) is in a period of a start date and time to en end date and time in the absence (step D77). If the reception date and time is not in the period, the flow is terminated.

If the reception date and time set to TIME(n) is in the period, it is determined whether or not the emergency flag EMF(n) of a RECEIVED MAIL(n) is "1" (step D78). If the EMF(n) is "1" (emergency), a transmitter address of the RECEIVED MAIL(n) is set as an address of a fixed form mail "B" (step D79) and the fixed form mail "B" with an emergency contact place clearly indicated is transmitted to the address in the same way as in the case of the third embodiment shown in FIG. 45B (step D80). At step D78, of the EMF(n) is "0" (non-emergency), a transmitter address of a RECEIVED MAIL(n) is set as an address of a fixed form mail "A" (step D81) and an ordinary fixed form mail "A" which notices only the state of absence is transmitted to the address in the same way as in the case of the third embodiment shown in FIG. 45A (step D82).

As described above, according to the above mentioned fourth embodiment, the terminal 100 of FIG. 1 comprises:

mail storage means for storing a plurality of fixed form mails;

mail receiving means for receiving an electronic mail;

mail determining means for determining whether or not specific identification information is included in the electronic mail when it detects that the electronic mail is received by the mail receiving means;

mail selecting for selecting one of fixed form mails stored in said mail storage means based on a determination result by the mail determining means; and mail transmitting means for transmitting the fixed form mail selected by the mail selecting means to the same address as a transmitter address of the received electronic mail.

If specific identification information is included in a received electronic mail, a specific fixed form mail is transmitted and when specific identification information is not included, an ordinary fixed form mail is transmitted.

In the above mentioned fourth embodiment, there is described an electronic mail system in which a program to receive and transmit electronic mails is stored in ROM 2, but such constitutions may be adopted that a program to transmit or receive an electronic mail is stored in such storage media as a floppy disk, a compact disk and the like and an apparatus such as a personal computer or a word processor for general purpose use, or the like executes the program.

The machine readable storage medium stores a program for electronic mail processing, the program comprising:

(i) step of storing a plurality of fixed form mails;
(ii) step of receiving an electronic mail;
(iii) step of determining whether or not specific identification information is included in a received electronic mail when it detects that the electronic mail is received by the step (ii);
(iv) step of electronic one of fixed form mails stored in said mail storage means based on a determination result by the step (iii) from the plurality of fixed form mails stored by the step (i); and
(v) step of transmitting the fixed form mail selected by the step (iv) to the same address as a transmitter address of the received electronic mail.

The program is executed by an apparatus such as a personal computer or a word processor for general purpose use, or the like.

The fifth embodiment will be described.

Figure 56:
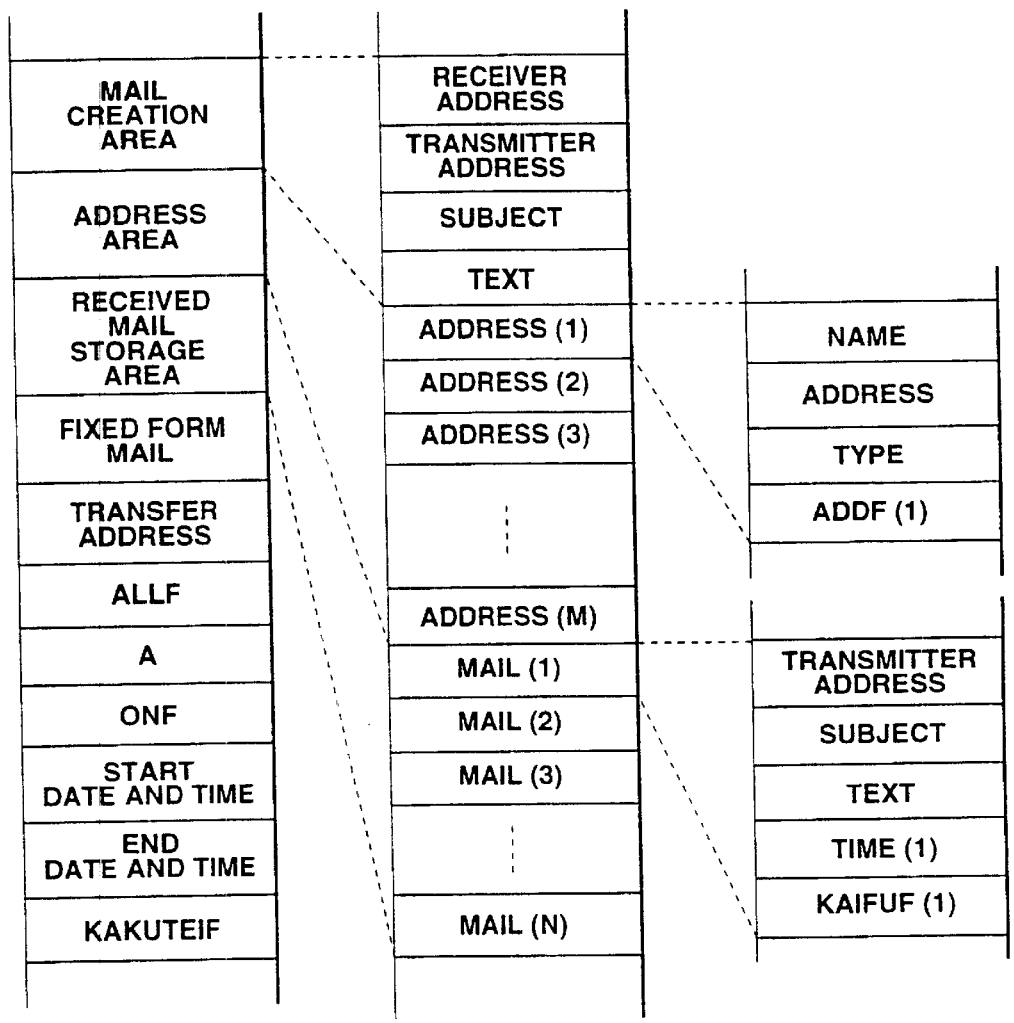
FIG. 56 shows a memory map of a fifth embodiment.

FIG. 56 is a memory map of RAM 3 in the fifth embodiment. As is made clear in the figure, a single kind of fixed form mail area is provided and an area in which there is stored the same as a fixed form mail which indicates the state of absence in the third embodiment shown in FIG. 45A is provided. An area of a transfer address for use in transferring a received mail is provided. The other parts are the same as those of the memory map of the third embodiment shown in FIG. 38. Flows, which CPU 1 executes, are same as those of the first embodiment except absence setting processing and timer interrupt processing, and figures and description are omitted.

Figure 57:
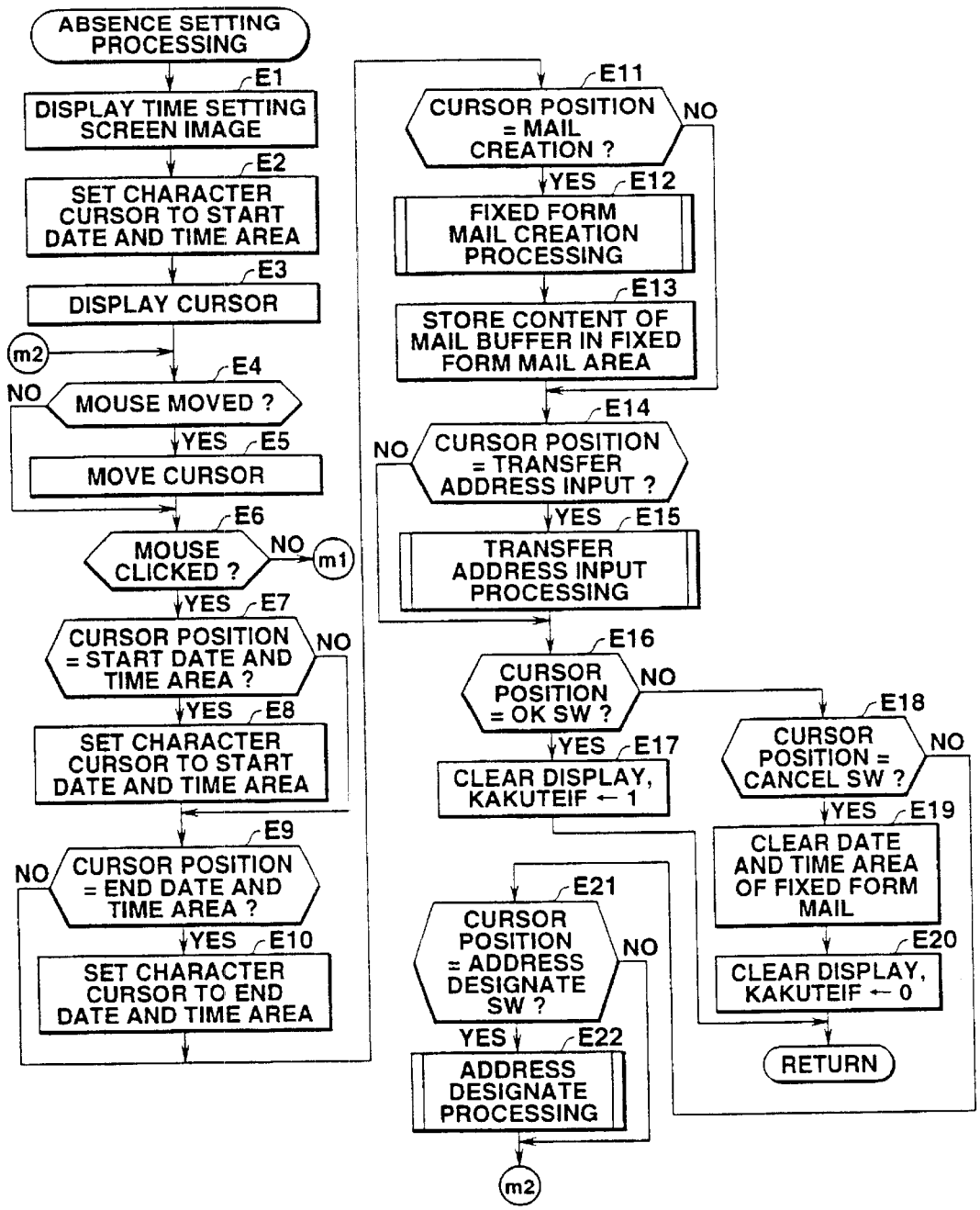
FIG. 57 is a flow chart of absence setting processing of the fifth embodiment.
Figure 58:
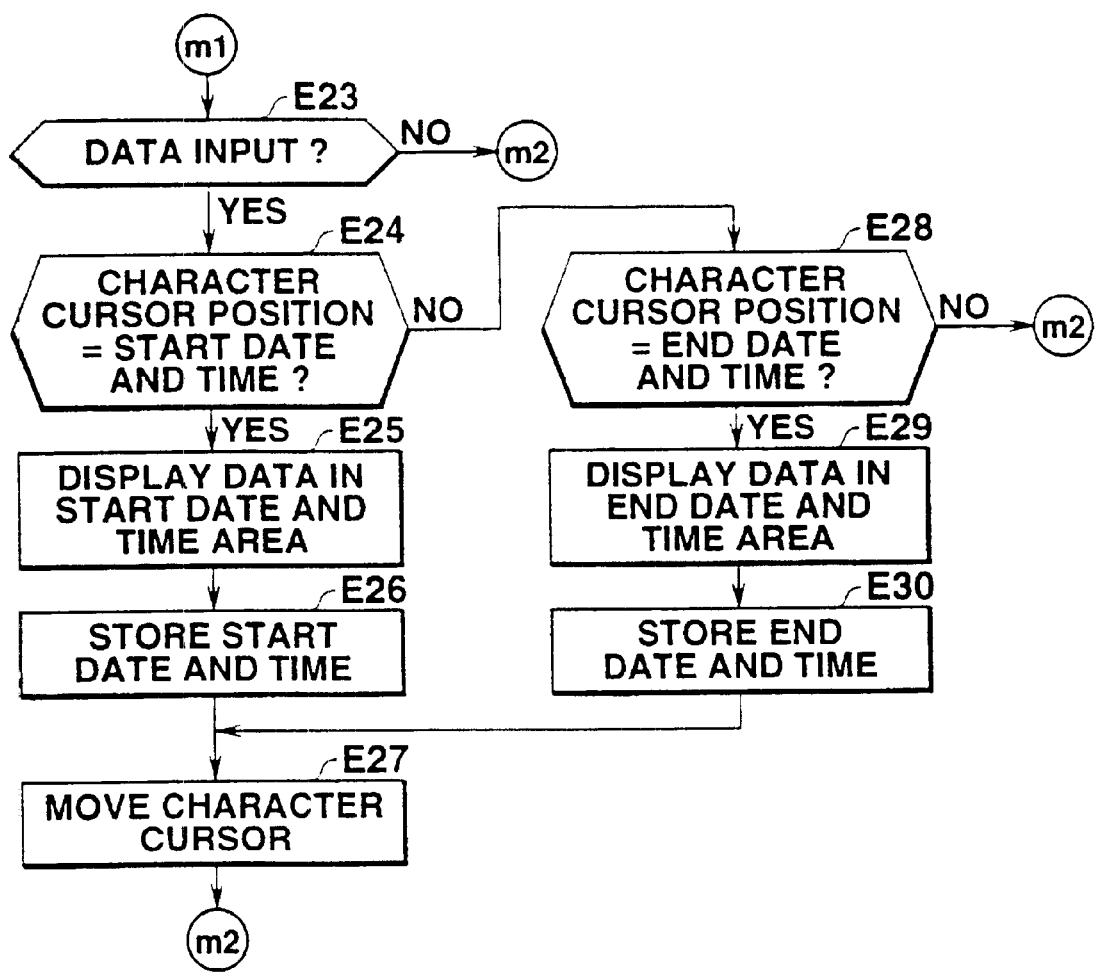
FIG. 58 is a flow chart of the absence setting processing of the fifth embodiment, continued from FIG. 57.

FIGS. 57 and 58 are flows of absence setting processing and FIG. 59 shows an absence setting screen image. There are displayed in the screen image areas of a start date and time and an end date and time in the absence, an address designation switch, a transfer address switch, a mail creation switch, an OK switch. In FIG. 57, a time setting screen image is displayed in the absence setting screen image ((v) step 1), a character cursor is set at the start date and time area (step E2). And a cursor for the mouse 6 is displayed (step E3). Then, it is determined whether or not the mouse 6 has been moved (step E4) and if the mouse 6 has been moved, a cursor position is moved in accordance with the movement of the mouse 6 (step E5). Then, it is determined whether or not the mouse 6 has been clicked (step E6). If the mouse 6 has been clicked, it is determined whether or not a cursor position is in the start date and time area (step E7). If the cursor position is this position, a character cursor is set at the start date and time area (step E8).

If a cursor position is not in the start date and time area, it is determined whether or not the cursor position is in the end date and time area (step E9). If the cursor position is this position, a character cursor is set at the end date and time area (step E10). If a cursor position is not in the end date and time area, it is determined whether or not a cursor position is a mail creation switch position (step E11). If the cursor position is this position, fixed form mail creation processing is executed (step E12). The fixed form mail creation processing is same as that of the third embodiment shown in FIG. 44. Then, a content of a mail buffer is stored in the fixed form mail area of RAM 3 (step E13).

At step E11, if a cursor position is not the mail creation switch position, it is determined whether or not the cursor position is a transfer address input switch position on the screen image (step E14). If the cursor position is this position, transfer address input processing is executed (step E15). The transfer address input processing is same as the flow in the second embodiment shown in the flows of FIGS. 31 to 33. At step E14, if a cursor position is not the transfer address input switch position, it is determined whether or not the cursor position is an OK switch position (step E16). If the cursor position is this position, an absence setting screen image is cleared and the definite flag KAKUTEIF is set at "1" (step E17). Then, the flow is terminated.

At step E16, if a cursor position is not the OK switch position, it is determined whether or not the cursor position is an cancel switch position (step E18). If the cursor position is this position, data of a date and time area of a fixed form mail is cleared (step E19), an absence setting screen image is cleared and the definite flag KAKUTEIF is reset at "0" (step E20).

Then the flow is terminated. At step E18, if a cursor position is not the cancel switch position, it is determined whether or not the cursor position is an address designation switch position (step E21). If the cursor position is this position, address designation processing is executed (step E22). The address designation processing is same as the flow of the third embodiment shown in FIG. 42 and an address list display screen image is same as the screen image of FIG. 43. If the cursor position is not any one of the above mentioned positions or after processing according to a cursor position is executed, program flow goes to step E4 and a movement of the mouse is checked.

At step E6, if the mouse 6 has not been clicked. Program flow goes to a flow of FIG. 58 and it is determined whether or not data input has been made from the key board 4 (step E23). If the data input has been made, it is determined whether or not a character cursor position is in the start date and time area (step E24). If the character cursor position is this position, the data of the start date and time input in the start date and time area are displayed (step E25), the data of the start date and time are stored in RAM 3 (step E26). Then, a character cursor is moved (step E27).

At step E24, if a character cursor is not the start data and time position, it is determined whether or not the character cursor position is an end date and time position (step E28). If the character cursor position is this position, the data of the end date and time input in the end date and time area are displayed (step E29) and the data of the end date and time are stored in RAM 3 (step E30). Then, a character cursor is moved (step E27). After the character cursor is moved at step E27, or if the data input is not made in step E23 or if a character cursor position is not any one of the start date and time, and end date and time positions, program flow goes to step E4 of FIG. 57 and a movement of the mouse 6 is checked.

Figure 60:
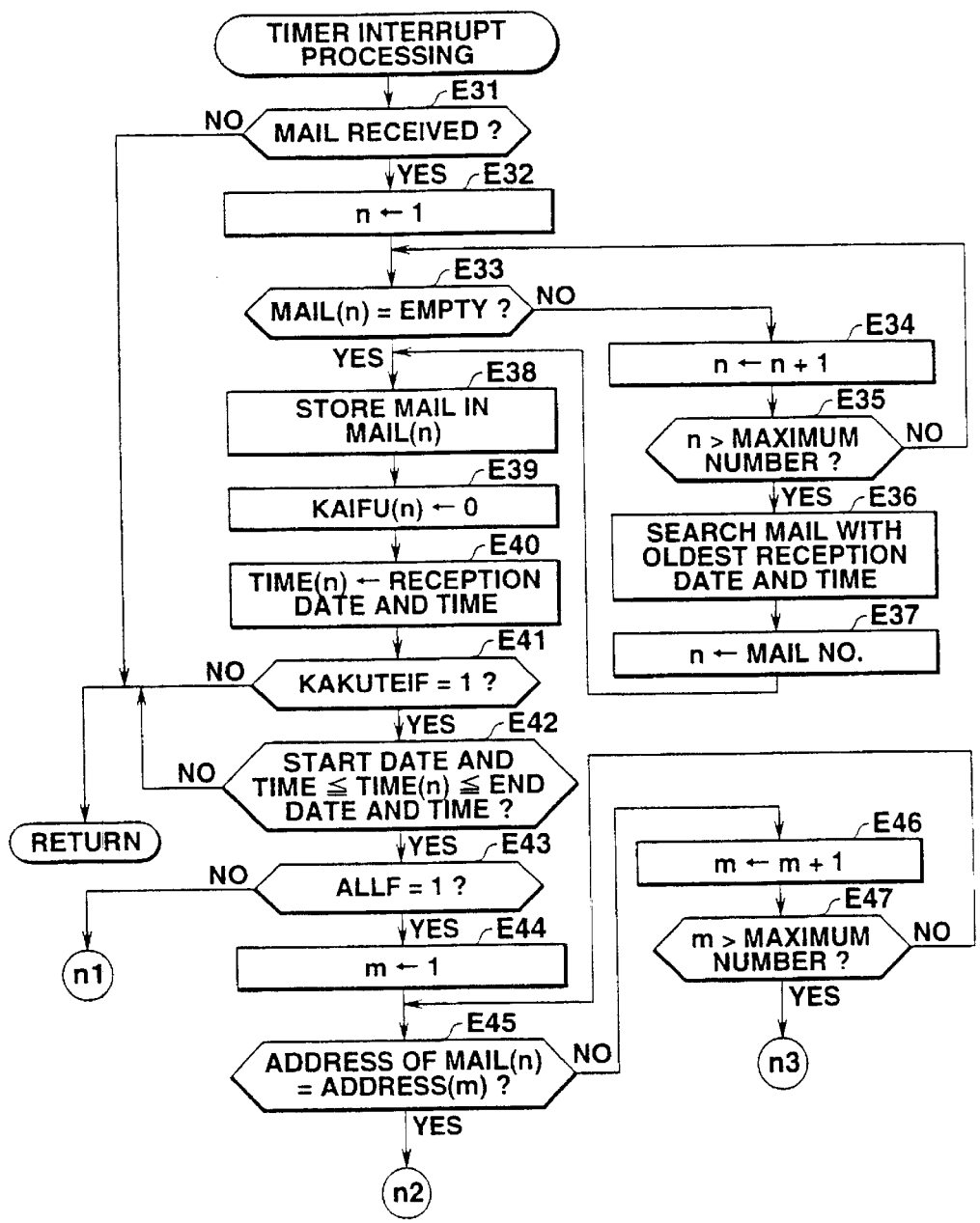
FIG. 60 is a flow chart of timer interrupt processing of the fifth embodiment.
Figure 61:
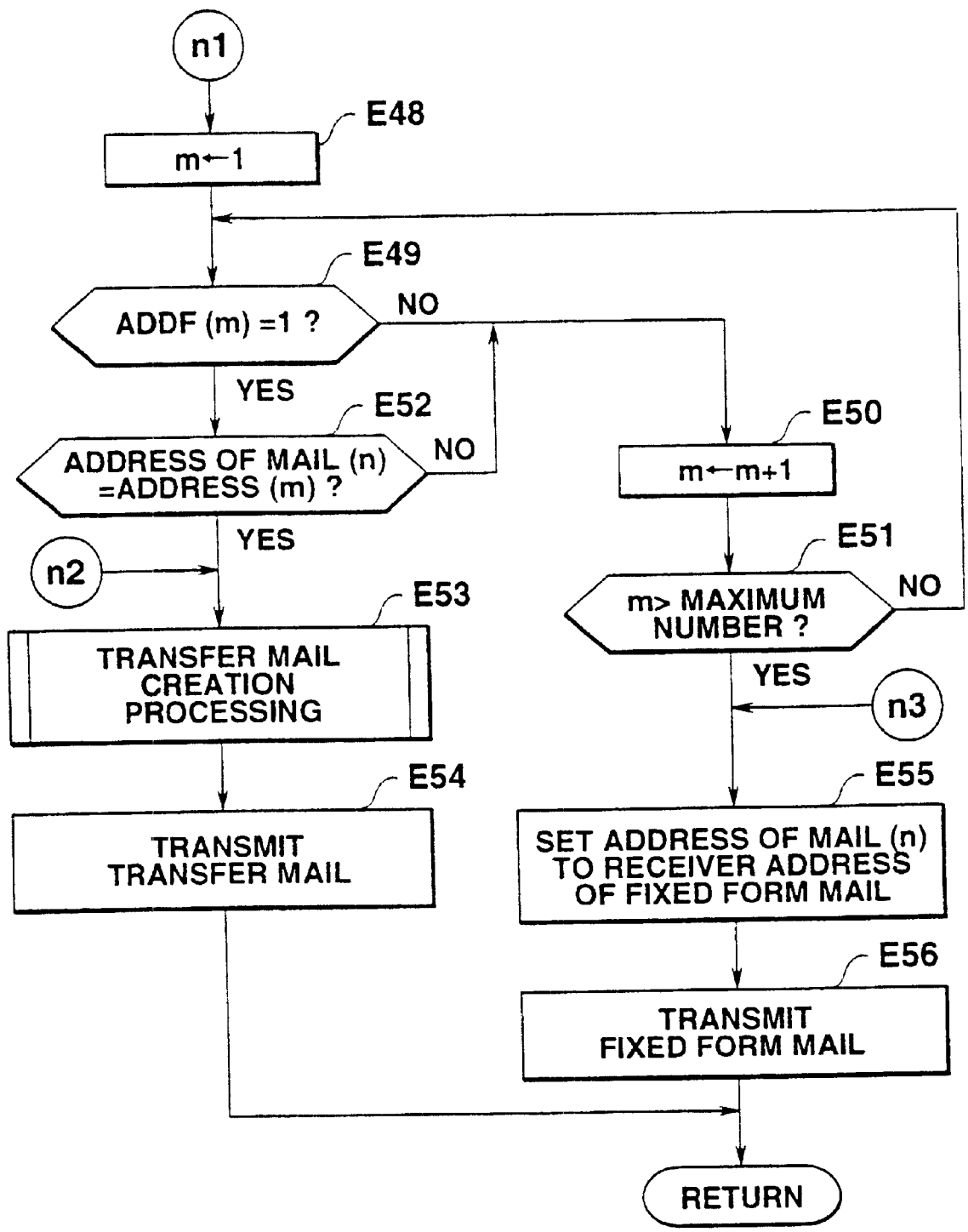
FIG. 61 is a flow chart of the timer interrupt processing of the fifth embodiment, continued from FIG. 60.

FIGS. 60 and 61 are flows of timer interrupt processing.

When timer interrupts occur at set intervals, the server 300 shown in FIG. 1 is accessed by CPU 1 of a terminal 100. In FIG. 60, it is determined whether or not a received mail is present in a mail box of the server 300 (step E31). If the received mail is not present, the flow is immediately terminated. If the received mail is present, a pointer "n" indicating the number of a RECEIVED MAIL(n) area of the received mail storage area of RAM 3 is set at "1" (step E32). Then, it is determined whether or not a RECEIVED MAIL(n) area designated by "n" is empty (step E33).

If a designated area is not empty, "n" is incremented (step E34) and it is determined whether or not "n" exceeds the maximum number (step E35). If "n" has not exceeded the maximum number, program flow goes to step E33 and it is determined whether or not the RECEIVED MAIL(n) area is empty. A loop of steps E33, E34 and E35 is repeated while "n" is incremented to search a RECEIVED MAIL(n) area with an empty space. At step E35, if "n" exceeds the maximum number, that is when none of the RECEIVED MAIL(1) to RECEIVED MAIL(N) areas of the received mail storage area of RAM 3 is empty, a received mail with the oldest reception data and time is searched (step E36). Then, the pointer "n" is set at a mail number thereof (step E37).

At step E33, if the designated RECEIVED MAIL(n) area is empty or at step E37 when "n" is set at the mail number with the oldest reception data and time, a received mail fetched from the server 300 is stored in the RECEIVED MAIL(n) area (step E38). Then, an unseal flag KAIFUF(n) is reset at "0" so as to indicate the seal state (step E39) and TIME(n) is set at a reception date and time (step E40).

Then, it is determined whether or not the definite flag KAKUTEIF set in the absence setting processing of FIG. 57 is "1" (step E41). If the flag is "0", the flow is terminated since there is not absence setting. If the flag is "1" (absence setting), it is determined whether or not the reception date and time set as TIME(n) is in a period of a start date and time to an end date and time in the absence (step E42). If the reception date and time is not in the period, the flow is terminated.

If the reception date and time being set as the TIME(n) is in the period, it is determined whether or not the flag ALLF is "1", that is it is determined whether or not all the addresses are designated in the address area of RAM 3 (step E43). If all the addresses are designated, a pointer "m" indicating an address number of the address area is set at "1" (step E44). Then, it is determined whether or not a transmitter address of a RECEIVED MAIL(n) and an ADDRESS(m) designated by "m" coincide with each other (step E45). If there is no coincidence, "m" is incremented (step E46) and it is determined whether or not "m" exceeds the maximum number (step E47). If "m" does has not exceeded the maximum number, program flow goes to step E45, and it is determined whether or not a transmitted address of a RECEIVED MAIL(n) and a designated ADDRESS(m) of the address area coincide with each other. Then, a loop of steps E45, E46 and E47 is repeated while "m" is incremented to search in ADDRESS(m) in coincidence.

At step E43, if the ALLF is "0", a pointer "m" is set at "1" in a flow of FIG. 61 (step E48) and it is determined whether or not the designated flag ADDF(m) is "1", that is, it is determined whether or not the designated flag ADDF(m) is a designated address (step E49). If the flag is "0", "m" is incremented and a next address is designated (step E50) and it is determined whether or not "m" exceeds the maximum number (step E51). If "m" has not exceeded the maximum number, program flow goes to step E49 and it is determined whether or not the ADDF(m) is "1". Then a loop of steps E49, E50 and E51 is repeated while "m" is incremented to search an address with ADDF of 1.

At step E49, if the ADDF(m) is "1", it is determined whether or not an address of a RECEIVED MAIL(n) and an ADDRESS(m) coincides with each other (step E52). If there is no coincidence, a loop of steps E52, E50, E51 and E49 is repeated while "m" is incremented to search an address in coincidence. At step E52, if there is an ADDRESS(m) which coincides with an address of a RECEIVED MAIL(n), transfer mail creation processing is executed (step E53). The transfer mail creation processing is same as the flow of the second embodiment shown in FIG. 37. Then, the transfer mail is transmitted to an predetermined address (step E54). For example, a transfer mail is transmitted to addresses of a portable terminal carried by a receiver on the road who has made absence setting or a personal computer in home use of the same receiver and the like.

At step E45 of FIG. 60, if there is an ADDRESS(m) which coincides with transmitter address of a RECEIVED MAIL (n) among all the designated addresses, program flow goes to step E53 of FIG. 61 to prepare a transfer mail and the transfer mail is transmitted (step E54).

At step E49 of FIG. 61, if the ADDF(m) is not "1", or at step E52 when a transmitter address of a RECEIVED MAIL(n) does not coincide with an ADDRESS(m), "m" has been incremented, and as a result, if "m" exceeds the maximum number, the transmitter address of a RECEIVED MAIL(n) is set as an address of a fixed form mail (step E55) and the fixed form mail is transmitted as response (step E56).

At step E45 of FIG. 60, if there is no ADDRESS(m) which coincides with a transmitter address of a RECEIVED MAIL(n) among all the designated addresses, "m" has been incremented and as a result, if "m" exceeds the maximum number at step E47, program flow goes to step E55 of FIG. 60, a transmitter address of a RECEIVED MAIL(n) is set as an address of a fixed form mail and the fixed form mail is transmitted (step E56).

As described above, according to the above mentioned fifth embodiment, the terminal 100 of FIG. 1 comprises:

mail receiving means for receiving an electronic mail;

address designating means for designating an address of a specific receiver;

mail determining means for determining whether or not a transmitter address of the received electronic mail is the address designated by the address designating means when it detects that the electronic mail is received by the mail receiving means;

mail transmitting means for transmitting a fixed form mail to the same address as the transmitter address of the received electronic mail when a determination result by the mail determining means is not the designated address; and mail transfer means for transferring the received electronic mail to a predetermined address when a determination result by the mail determining means is the designated address.

If a transmitter address of a received mail is a designated address, the received electronic mail is transferred to the designated address. On the other hand, if a transmitted address of a received mail is not a designated address, a fixed form mail is transmitted to the same address as a transmission address of the received electronic mail.

In the above mentioned fifth embodiment, there is described an electronic mail system in which a program to received and transmit electronic mails is stored in ROM 2, but such constitutions may be adopted that a program to transmit or receive an electronic mail is stored in such storage media as a floppy disk, a compact disk and the like and an apparatus such as a personal computer or a word processor for general purpose use, or the like executes the program.

The machine readable storage medium stores a program for electronic mail processing, the program comprising:

(i) step of receiving an electronic mail;

(ii) step of designating an address of a specific receiver;

(iii) step of determining whether or not a transmitter address of the received electronic mail is an address designated by the address designating means when it detects that the electronic mail is received by the step (i);

(iv) step of transmitting a fixed form mail to the same address as the transmitter address of the received electronic mail when a determination result by the step (iii) is not the designated; and (v) step of transferring the received electronic mail to a predetermined address when a determination result by the step (iii) is the designated address.

The program is executed by an apparatus such as a personal computer or a word processor for general purpose use, or the like.

The sixth embodiment will be described.

Figure 62:
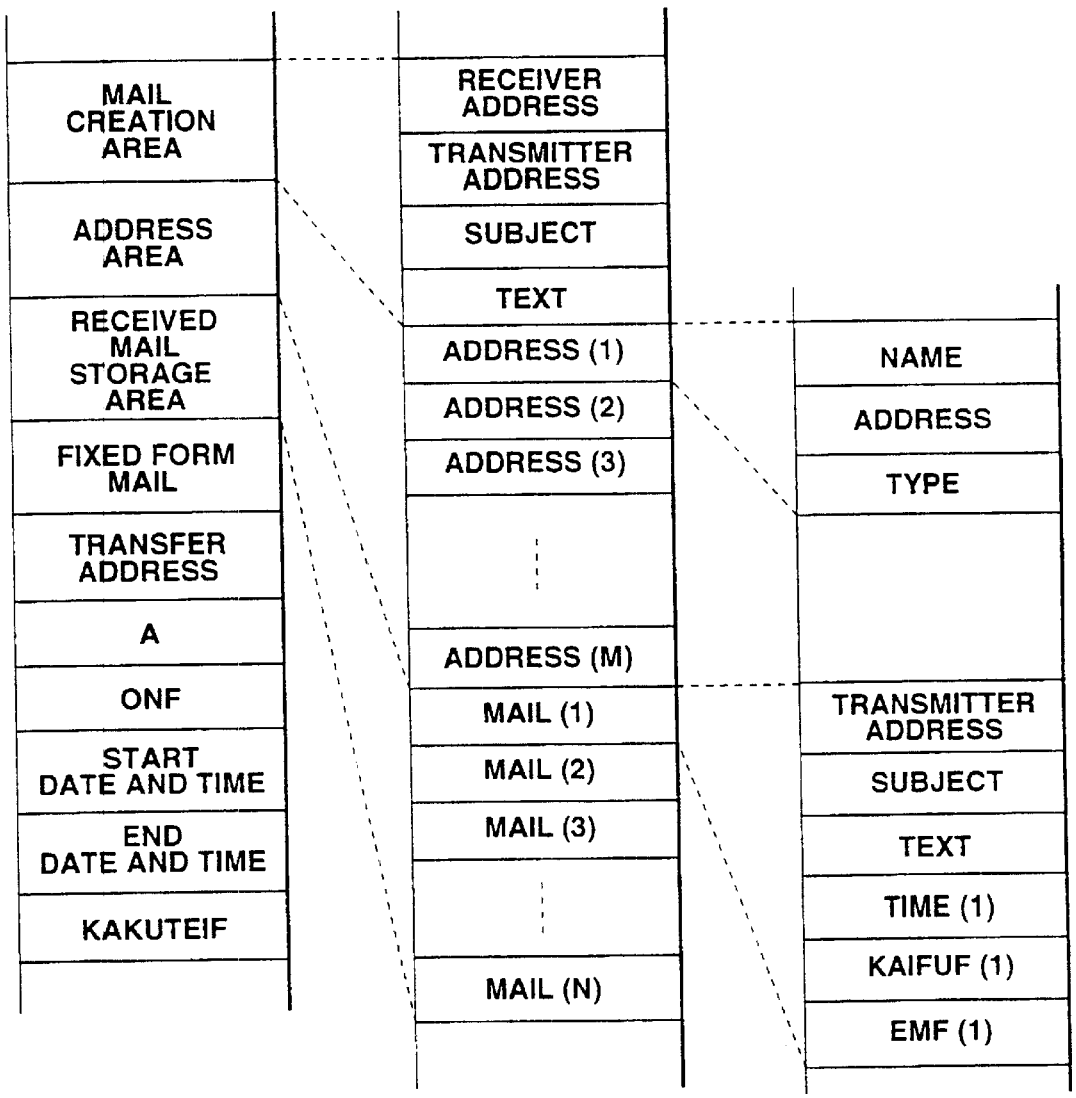
FIG. 62 shows a memory map of a sixth embodiment.

FIG. 62 is a memory map of RAM 3 in the sixth embodiment. As is made clear in the figure, a single kind of fixed form mail area is provided and an area in which there is stored the same as a fixed form mail which indicates the state of absence in the third embodiment shown in FIG. 45A is provided. An area of a transfer address for use in transferring a received mail is provided. The other parts are the same as those of the memory map of the fourth embodiment shown in FIG. 48. Flows which CPU 1 executes are same as those of the first embodiment except absence setting processing and timer interrupt processing, and figures and description are omitted.

Figure 63:
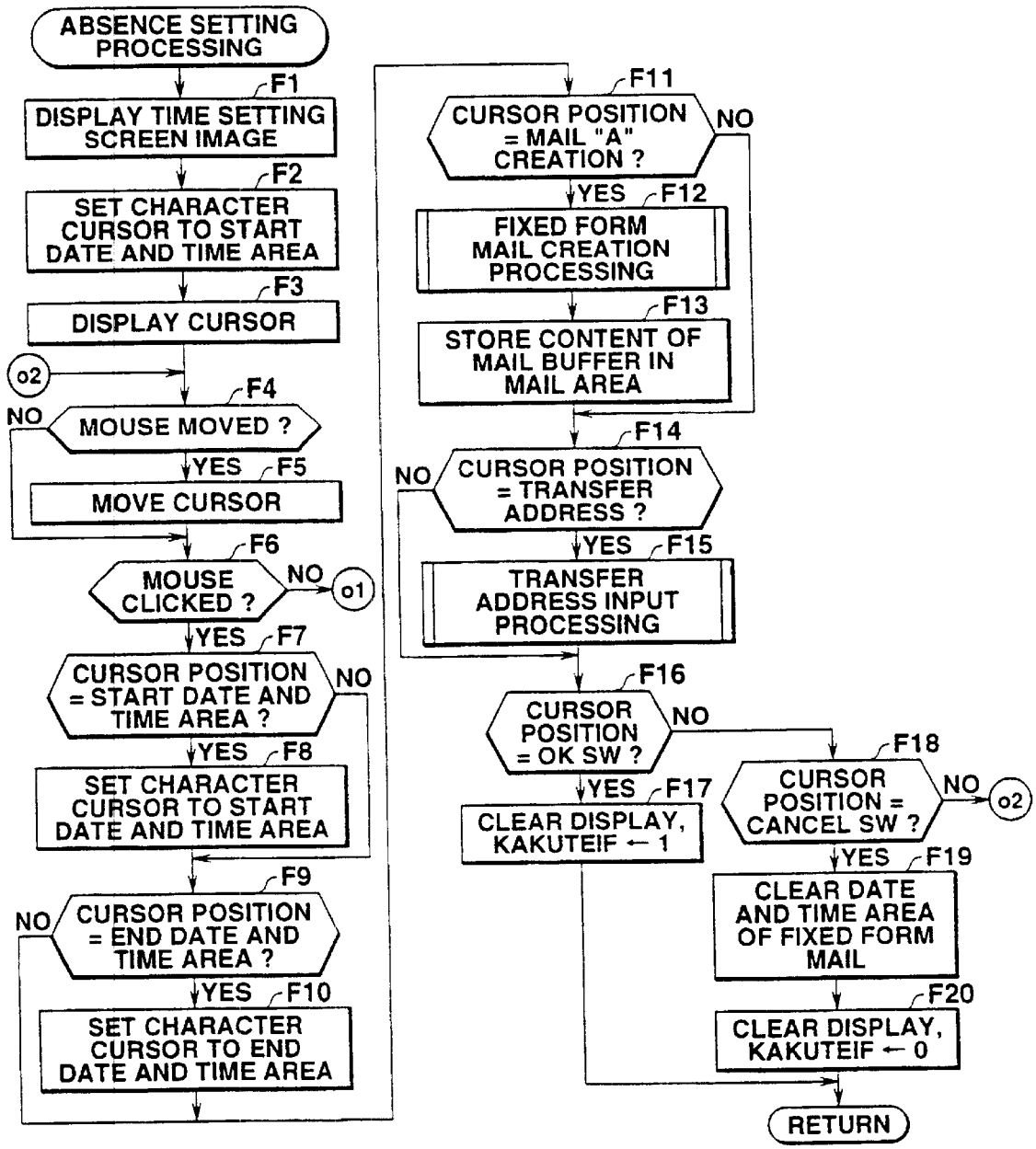
FIG. 63 is a flow chart of absence setting processing of the sixth embodiment.
Figure 64:
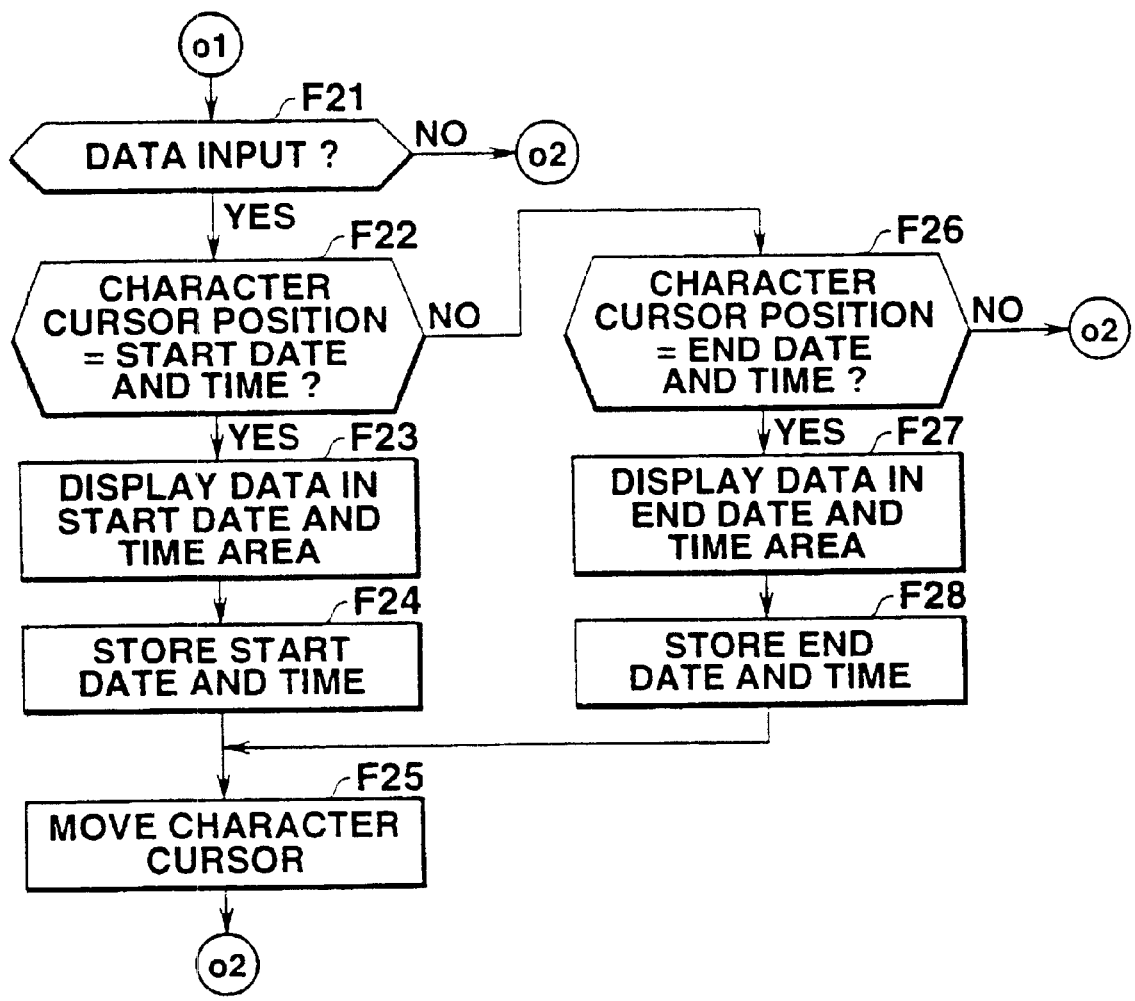
FIG. 64 is a flow chart of the absence setting processing of the sixth embodiment, continued from FIG. 63.

FIGS. 63 and 64 are flows of absence setting processing and FIG. 65 shows an absence setting screen image. There are displayed in the screen image areas of a start date and time, and an end date and time in the absence, a transfer address switch, a mail creation switch, an OK switch. In FIG. 63, a time setting screen image is displayed in the absence setting screen image (step F1), a character cursor is set at the start date and time area (step F2) and a cursor for the mouse 6 is displayed (step Fe). Then, it is determined whether or not the mouse 6 has been moved (step F4) and if the mouse 6 has been moved, a cursor position is moved in accordance with the movement of the mouse 6 (step F5). Then, it is determined whether or not the mouse 6 has been clicked (step F6). If the mouse 6 has been clicked, it is determined whether or not a cursor position is in the start date and time area (step F7). If the cursor position is this position, a character cursor is set at the start date and time area (step F8).

If a cursor position is not in the start date and time area, it is determined whether or not a cursor position is in the end date and time area (step F9). If the cursor position is this position, a character cursor is set at the end date and time area (step F10). If a cursor position is not in the end date and time area, it is determined whether or not the cursor position is the mail creation switch position in the absence setting screen image (step F11). If the cursor position is this position, fixed form mail creation processing is executed (step F12). Then, a content of a mail buffer is stored in the fixed mail area of RAM 3 shown in FIG. 62 (step F13).

At step F11, if a cursor position is not the mail creation switch position, it is determined whether or not the cursor position is the transfer address input switch position on the screen image (step F14). If the cursor position is this position, transfer address input processing is executed (step F15). The transfer address input processing is the same as the flow in the second embodiment shown in FIGS. 31 to 33.

At step F14, if a cursor position is not the transfer address input switch position, it is determined whether or not the cursor position is the OK switch position (step F16). If the cursor position is this position, the absence screen image is cleared and the definite flag KAKUTEIF is set at "1" (step F17). Then, the flow is terminated.

At step F16, if a cursor position is not the OK switch position, it is determined whether or not the cursor position is the cancel switch position (step F18). If the cursor position is this position, the data of a date and time area of the fixed form mail is cleared (step F19) and the absence setting processing screen image is cleared and the definite flag KAKUTEIF is reset at "0" (step F20). Then, the flow is terminated.

At step F18, if a cursor position is not the cancel switch position, that is, if a cursor position is not any one of the above mentioned positions or after processing in accordance with a cursor position has been completed, program flow goes to step F4 and a movement of the mouse 6 is checked.

At step F6, if the mouse 6 has not clicked, program flow goes to a flow of FIG. 64 and it is determined whether or not data input has been made (step F21). If the data input has been made, it is determined whether or not a character cursor position is in the start date and time area (step F22). If the character cursor position is this position, the data of the start date and time input in the start date and time area are displayed (step F23) and the data of the start date and time are stored in RAM 3 (step F24). Then, the character cursor is moved (step F25).

At step F22, if a character cursor position is not the start date and time position, it is determined whether or not the character cursor position is the end date and time position (step F26). If the character cursor position is this position, the data of the end date and time input in the end date and time area are displayed (step F27) and the data of the end date and time are stored in RAM 3 (step F28). Then, the character cursor is moved (step F25).

At step F25, after the character cursor is moved, or if the data input has not been made or if a character cursor position is not any one of the start date and time and end date and time positions, program flow goes to step F4 of FIG. 63 and a movement of the mouse 6 is checked.

Figure 66:
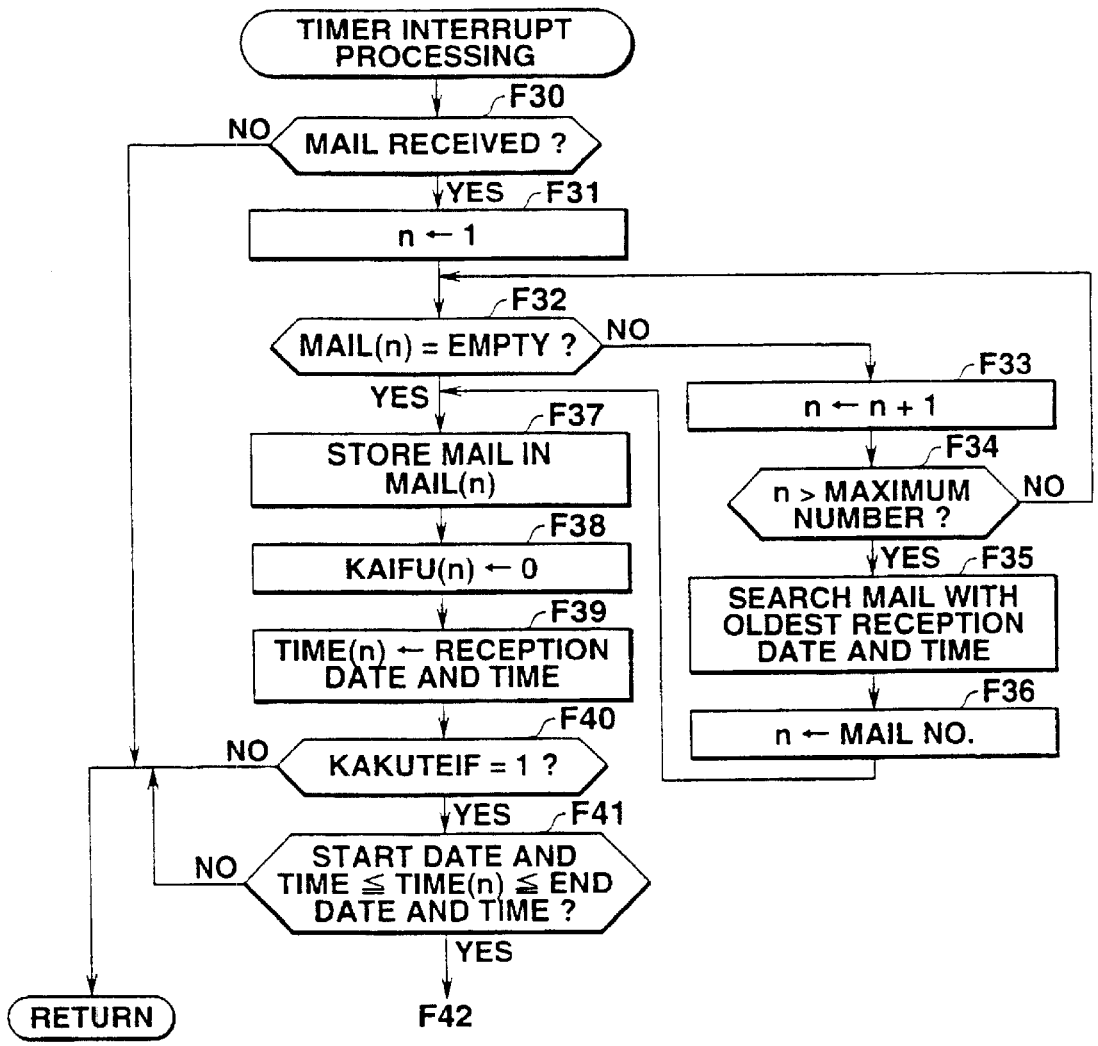
FIG. 66 is a flow chart of timer interrupt processing of the sixth embodiment.
Figure 67:
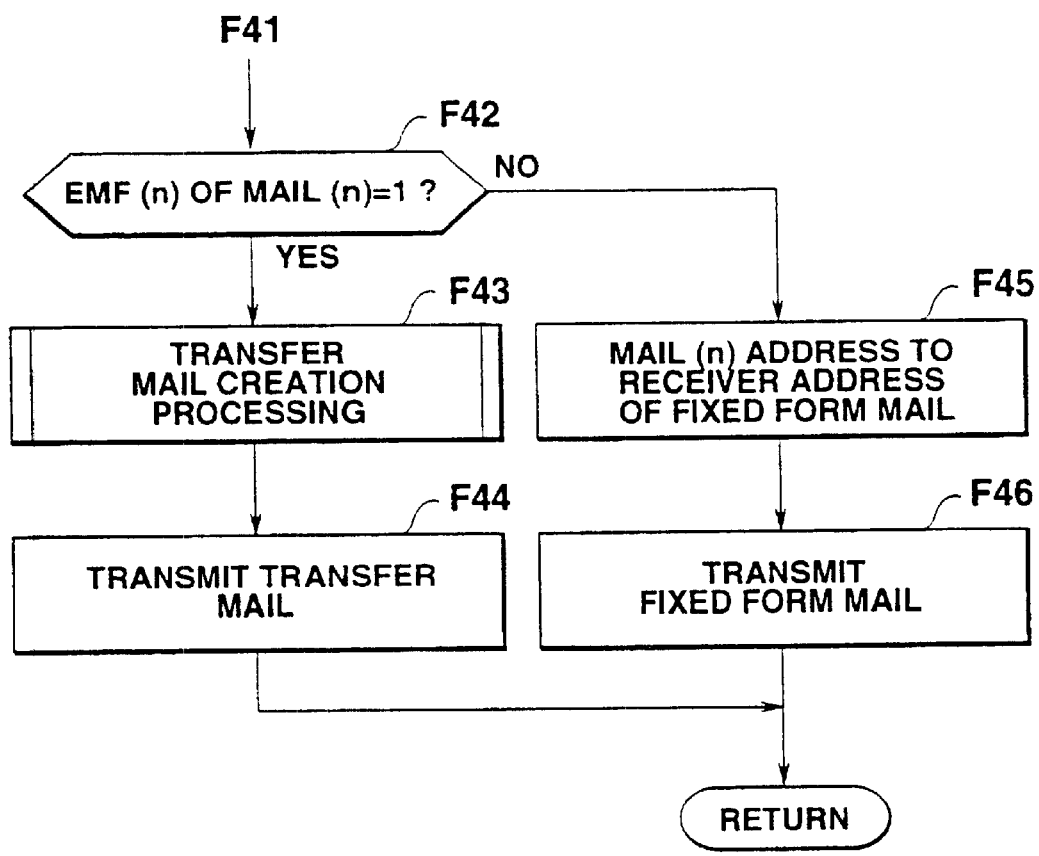
FIG. 67 is a flow chart of the timer interrupt processing of the sixth embodiment, continued from FIG. 66.

FIGS. 66 and 67 are flows of timer interrupt processing.

When timer interrupts occur at set intervals, the server 300 shown in FIG. 1 is accessed by CPU 1 of a terminal 100. In FIG. 66, it is determined whether or not a received mail is present in a mail box of the server 300 (step F30). If the received mail is not present, the flow is immediately terminated. If the received mail is present, a pointer "n" indicating the number of a RECEIVED MAIL(n) area of the received mail storage area of RAM 3 is set at "1" (step F31). Then, it is determined whether or not a RECEIVED MAIL(n) area designated by "n" is empty (step F32).

If the designated area is not empty, "n" is incremented (step F33) and it is determined whether or not "n" exceeds the maximum number (step F34). If "n" has not exceeded the maximum number, program flow goes to step F32 and it is determined whether or not the RECEIVED MAIL(n) area is empty. A loop of steps F32, F33 and F34 is repeated while "n" is incremented to search a RECEIVED MAIL(n) area with an empty space. At step F34, if "n" exceeds the maximum number, that is, if none of the RECEIVED MAIL(1) to RECEIVED MAIL(N) of the received mail storage area of RAM 3 is empty, a received mail with the oldest reception data and time is searched (step F35). Then, the pointer "n" in set at a mail number thereof (step 36).

At step F32, if the designated RECEIVED MAIL(n) area is empty or at step F36 when "n" is set at the mail number with the oldest reception date and time, a received mail fetched from the server 300 is stored in the RECEIVED MAIL(n) area (step F37). Then, an unseal flag KAIFUF(n) is reset at "0" in order to indicate the sealed state (step F38) and TIME(n) is set at the reception date and time (step F39).

Then, it is determined whether or not the definite flag KAKUTEIF set in the absence setting processing of FIG. 63 is "1" (step E40). If the flag is "0", the flow is terminated since there is no absence setting. If the flag is "1" (absence setting), it is determined whether or not the reception date and time at which TIME(n) is set is in a period of a start date and time to an end date and time in the absence (step F41). If the reception date and time is not in the period, the flow is terminated.

If the reception date and time at which TIME(n) is set is in the period, it is determined whether or not the emergency flag EMF(n) is "1" in a flow of FIG. 67 (step F42). If the EMF(n) is "1" (emergency), transfer mail creation processing is executed (step F43). The transfer mail creation processing is the same as the flow of the second embodiment shown in FIGS. 31 to 33. Then, a created transfer mail is transmitted to a predetermined address (step F44). For example, the transfer mail is transmitted to addresses of a portable terminal carried by a receiver on the road who has made absence setting or a personal computer in home use of the same receiver. At step F42, if the EMF(n) is "0" (non-emergency), a transmitter address of a RECEIVED MAIL(n) is set an address of a fixed form mail (step F45) and an ordinary fixed form mail which notices only the state of absence is transmitted to the address in the same way as in the case of the third embodiment shown in FIG. 45A (step F46).

As described above, according to the above mentioned sixth embodiment, the terminal 100 of FIG. 1 comprises:

mail receiving means for receiving an electronic mail;

mail determining means for determining whether or not specific identification information is included in the electronic mail when it detects that the electronic mail is received by the mail receiving means;

mail transmitting means for transmitting a fixed form mail to the same address as a transmitter address of the received electronic mail when the mail determining means determines that the specific identification information is not included; and mail transfer means for transferring the received electronic mail to a predetermined address when the mail determining means determines that the specific identification information is included.

If a transmitter address of a received electronic mail is a designated transmitter address, the received electronic mail is transmitted to a designated receiver address. On the other hand, if a transmitter address of a received electronic mail is not a designated transmitter address, a fixed form mail is transmitted to the transmitter address of the received electronic mail.

In the above mentioned sixth embodiment, there is described an electronic mail system in which a program to receive and transmit electronic mails is stored in ROM 2, but such constitutions may be adopted that a program to transmit or receive an electronic mail is stored in such media as a floppy disk, a CD and the like and an apparatus such as a personal computer or a word processor for general purpose use, or the like executes the program.

The machine readable storage medium stores a program for electronic mail processing, the program comprising:

(i) step of receiving an electronic mail;

(ii) step of designating an address of a specific receiver;

(iii) step of determining whether or not a transmitter address of the received electronic mail is an address designated by the address designating means when it detects that the electronic mail is received by the step (i);

(iv) step of transmitting a fixed form mail to the same address as the transmitter address of the received electronic mail when a determination result by the step (iii) is not the designated address; and (v) step of transferring the received electronic mail to a predetermined address when a determination result by the step (iii) is the designated address.

The program is executed by an apparatus such as a personal computer or a word processor for general purpose use, or the like.

The seventh embodiment will be described.

Figure 68:
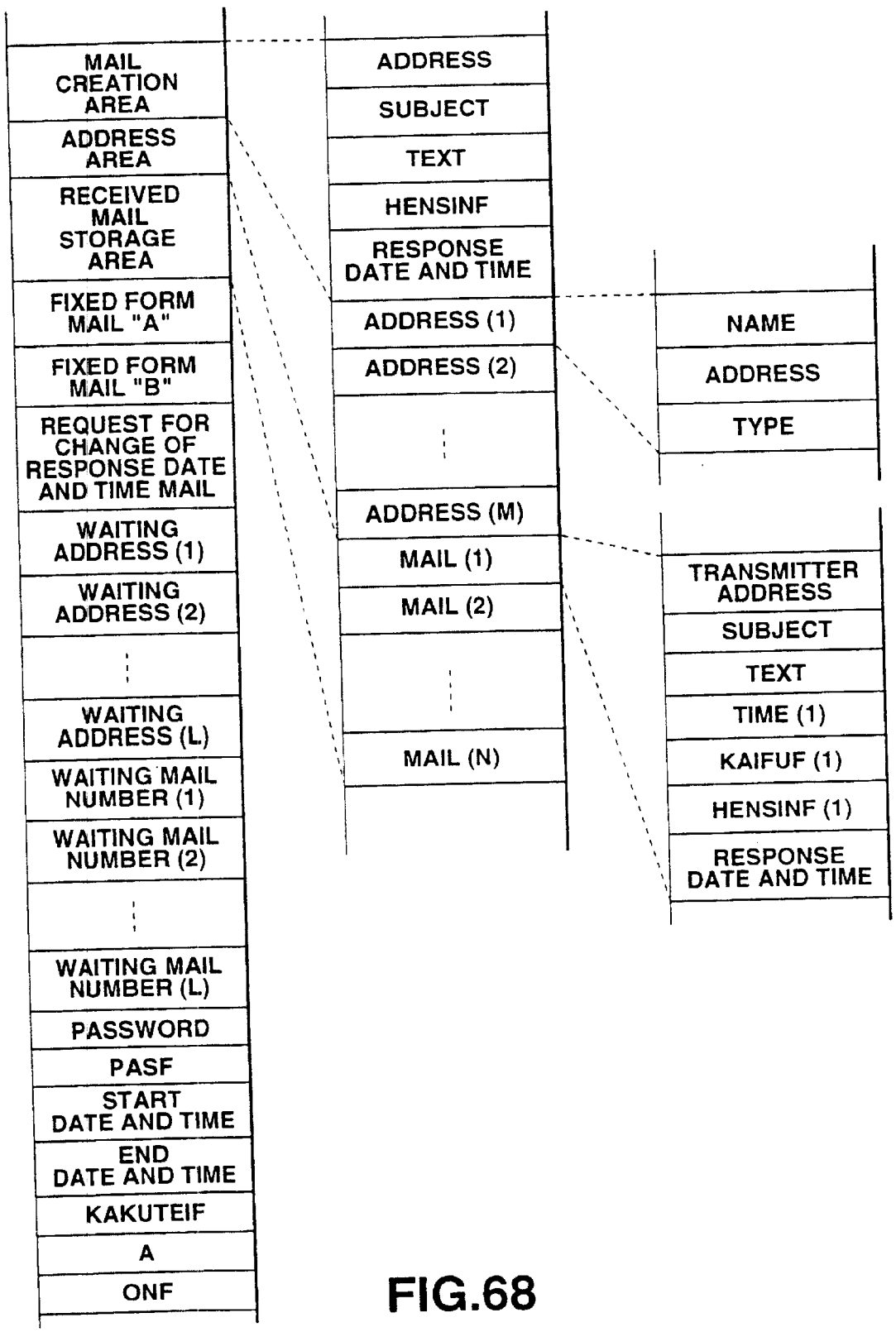
FIG. 68 shows a memory map of a seventh embodiment.

FIG. 68 is a memory map of RAM 3 in the seventh embodiment. As shown in the figure, there is provided a mail creation area, an address area, a received mail storage area and other areas.

The mail creation is an area in which the data of an electronic mail to be transmitted is stored and the area comprises a receiver address, a subject, a text, a response flag HENSINF indicating that an electronic mail to be transmitted is a mail which designates a response date and time and a data of the response date and time. In an address area, there is registered M addresses comprising ADDRESS (1) to ADDRESS(M) of a plurality of other terminals 100 to which transmission is conducted. Each address comprises a name and address of a designated party and a mail type. The received mail storage area comprises areas of RECEIVED MAIL(1) to RECEIVED MAIL(n) and N received mails can be stored. Each data of the RECEIVED MAIL(1) to RECEIVED MAIL(N) comprises a transmitter address, a subject, a text, a register TIME storing a reception date and time, an unseal flag KAIFUF indicating whether or not a received mail is unsealed, a response flag HENSINF indicating whether a response date and time is designated and a data of response date and time. The KAIFUF is set at "1" when a received electronic mail is unsealed and set at "0" when is kept sealed. The HENSINF is set at "1" when a received mail is a mail that designates a response date and time and set at "0" when a received mail is a mail, which does not designate a response, date and time.

In addition, RAM 3 is provided with an area 34 which stores documents of two kinds of fixed form mail "A" and fixed form mail "B" to be transmitted, an area for a mail of a request for a change of response date and time mail, an area for WAITING ADDRESS(1) to ADDRESS(L) of receiver sides waiting for an electronic mail responding to a response mail and an area for WAITING MAIL NUMBER (1) to NUMBER(L) having the respective waiting addresses, an area for passwords indicating whether or not a mail of a request for change of response date and time is admitted and an area for a flag PASF corresponding to the password, and areas for a start date and time, and end date and time of a specific period of time such as an absent period or the like.

Figure 69:
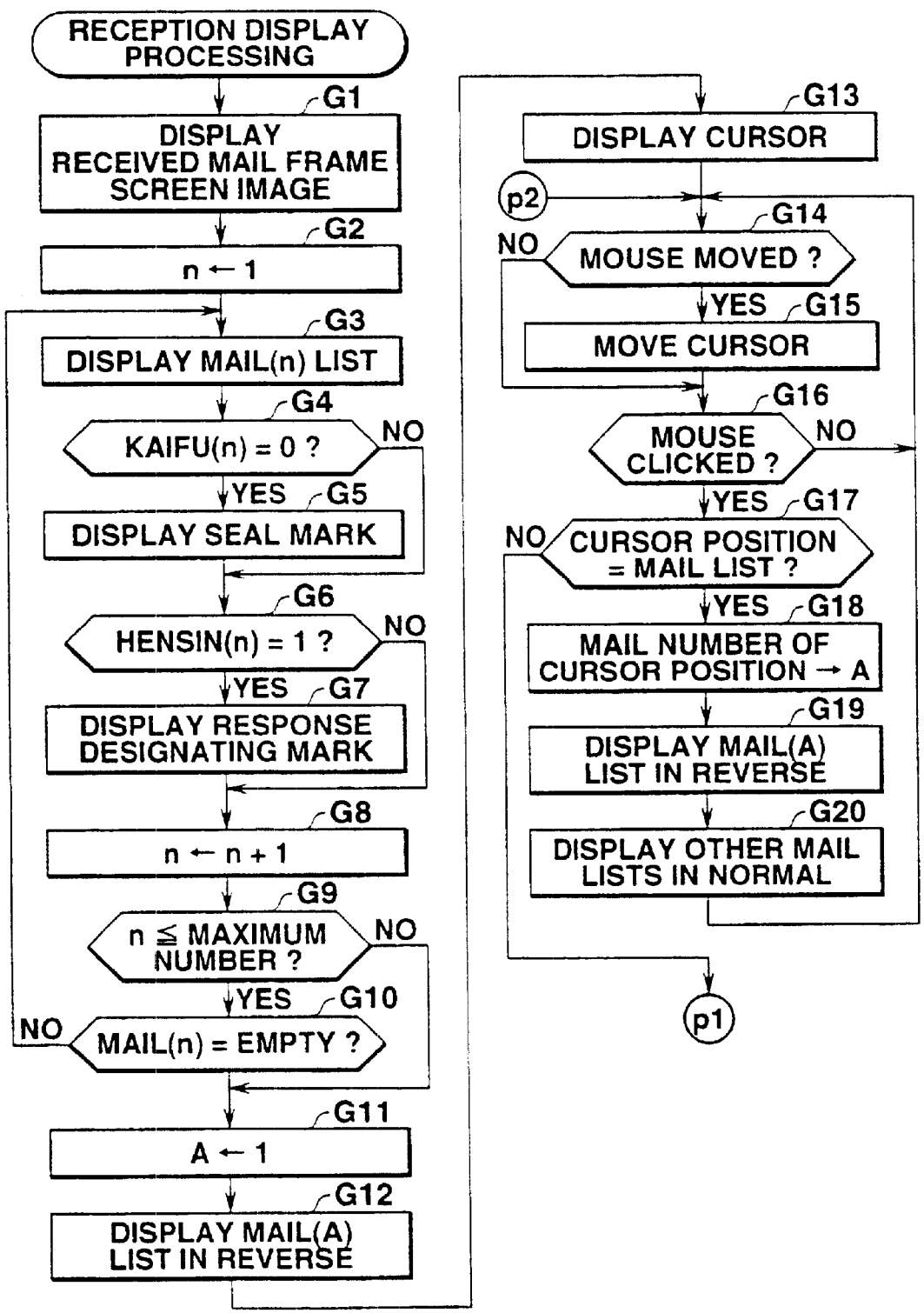
FIG. 69 is a flow chart of reception display processing of the seventh embodiment.
Figure 70:
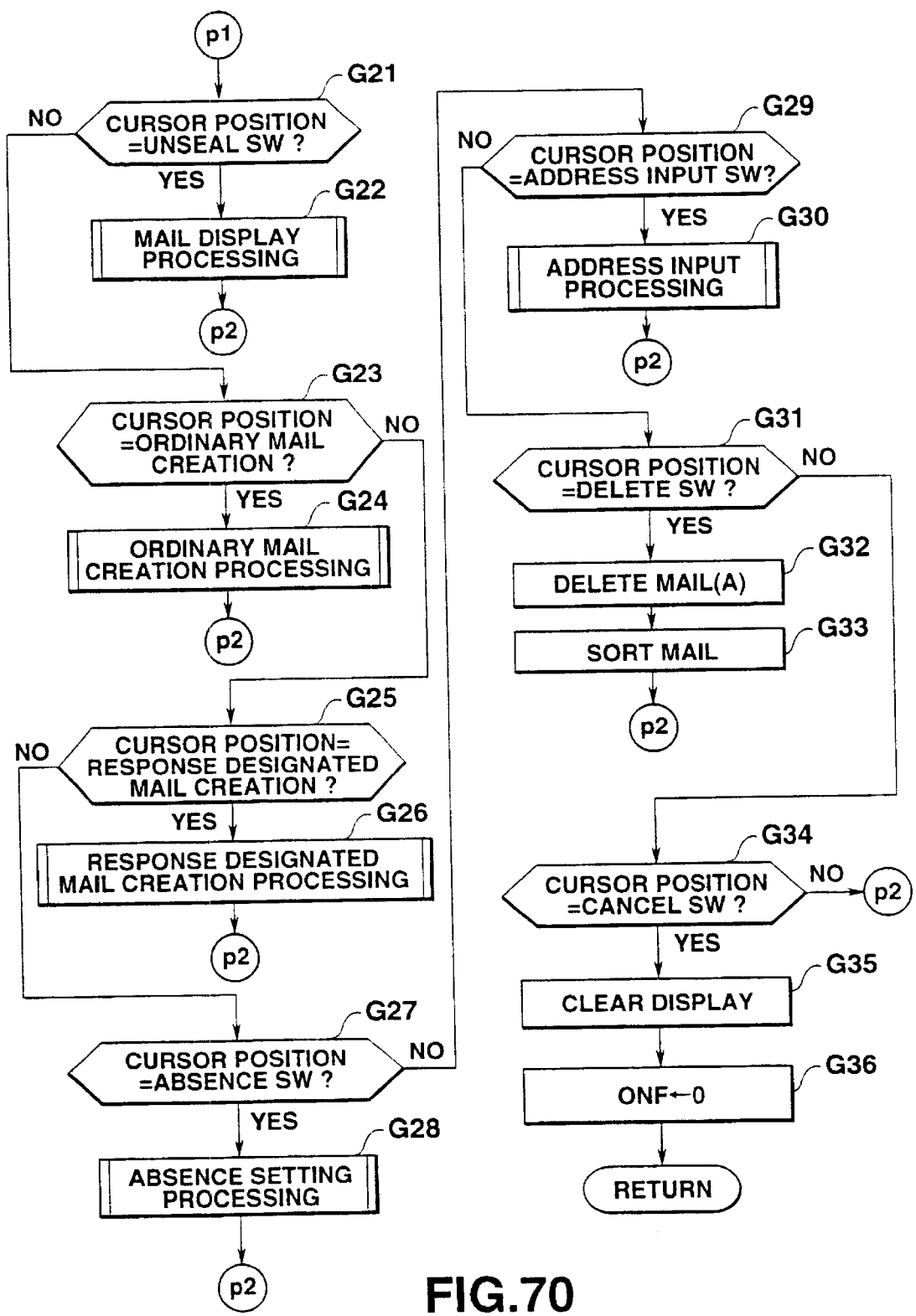
FIG. 70 is a flow chart of the reception display processing of the seventh embodiment, continued from FIG. 69.

FIGS. 69 and 70 are flow charts showing a routine of reception display processing. FIG. 71 shows a reception display screen image.

In FIG. 69, a received mail frame screen image is displayed (step G1) and a pointer "n" designating RECEIVED MAIL(1) to RECEIVED MAIL(N) in the received mail storage area of RAM 3 is set as 1 (step G2) and a loop processing of step G3 to step G10 is executed while "n" is incremented to display the name of a transmitter, a subject, a reception date and time and the like.

In other words, in the received mail storage area of FIG. 68, a RECEIVED MAIL(n) designated by "n" and the reception date and time TIME(n) thereof are displayed on the screen image (step G3). Then, it is determined whether or not a flag KAIFUF(n) of a displayed received mail is "0" (step G4). If the flag is "0", a seal mark indicated by a concentric double circle is displayed in a space at the left side of a name of a received mail list of FIG. 71, since the received mail is sealed (step G5). At step G4, if the flag is "1", a seal mark is not displayed since the received mail has already unsealed.

Then, it is determined whether or not a response date and time designating flag HENSINF(n) of a received mail is "1" (step G6) and if the flag is "1", a response date and time designating mark (exclamation mark !) is displayed in a space at the side of a reception date and time on the screen image of FIG. 71 (step G7). If the flag is "0", a response date and time designating mark is not displayed. Then, "n" is incremented (step G8) and it is determined whether or not "n" is less than or equal to the maximum number (step G9). If "n" is less than or equal to the maximum number, it is determined whether or not a MAIL(n) is empty (step G10). If the MAIL(n) is not empty, program flow goes to step G3 and the MAIL(n) is displayed on the screen image. Then, a loop of step G3 to step G10 is repeated while "n" is incremented to display received mails successively till MAIL(n) is empty.

At step G9, if a pointer "n" is larger than the maximum number, or if a MAIL(n) designated by "n" is empty at step G10, register "A" which designates a received mail to be displayed in reverse is set at "1" (step G11) and a MAIL(A) list is displayed in reverse on the screen image of FIG. 6 (step G12). Therefore, at first, the name and reception date and time of a received mail at the first position of a received mail list are displayed in reverse.

Then, a cursor is displayed in the screen image (step F13) and a movement of the mouse 6 is checked (step G14). If the mouse 6 is moved, a cursor display is moved in accordance with the movement (step F15). Then, it is determined whether or not the mouse 6 has been clicked (step G16). If the mouse 6 is not clicked, program flow goes to step G14 and a movement of the mouse 6 is checked. If the mouse 6 has been clicked, it is determined whether or not the cursor position on the clicking is a position on the screen image of the received mail list (step G17). If a cursor position is any one of the positions, a pointer "A" is set at a mail number of a cursor position (step G18). Then, a MAIL(A) list is displayed in reverse (step G19). The other mail lists displayed in reverse are made normal (step G20). Thereafter, program flow goes to step G14 and a movement of the mouse 6 is checked.

At step G17, if a cursor position is not on the screen image of a mail list, program flow goes to a flow of FIG. 70 and it is determined at which of an absence switch, a delete switch, an ordinary mail creation switch, a response data and time designated mail creation switch, an address input switch, an unseal switch and a cancel switch among icon switches in the top portion of the screen image of FIG. 71 the cursor position is or not.

It is determined whether or not a cursor position is the unseal switch position (step G21) and if the cursor position is this position, mail display processing is executed (step G22). The mail display processing is further described later. If a cursor position is not the unseal switch position, it is determined whether or not the cursor position is at the ordinary mail creation switch (step G23) and if the cursor position is this position, ordinary mail creation processing is executed (step G24). If a cursor position is not the ordinary mail creation switch position, it is determined whether or not the cursor position is the response date and time designated mail creation switch position (step G25) and if the cursor position in this position, the response date and time designated mail creation processing is executed (step G26). The response data and time designated mail creation processing is further described later. If a cursor position is not the response data and time designated mail creation switch position, it is determined whether or not the cursor position is the absence switch position (step F27) and if the cursor position is this position, absence setting processing is executed (step G28). The absence setting processing is further described later.

If a cursor position is not the absence switch position, it is determined whether or not the cursor position is the address input switch position (step G29) and if the cursor position is this position, the address input processing is executed (step G30). If a cursor position is not the address switch position, it is determined whether or not the cursor position is the delete switch position (step G31) and if the cursor position is this position, MAIL(A) is deleted from RAM 4 (step G32) and the other received mails are sorted in the order of time at which the mails are received (step G33).

If a cursor position is not the delete switch position, it is determined whether or not the cursor position is the cancel switch position (step G34). If the cursor position is this position, a received mail display is cleared (step G35) and the flag ONF is reset at "0" (step G36). Then, the flow is terminated. After processing at step G22, G24, G26, G28, G30, G33 or G36, or if a cursor position is not at any one of the icon switches in the top portion of the screen image of FIG. 71, program flow goes to step G14 of FIG. 69 and a movement of the mouse 6 is checked on the screen image of FIG. 71.

Since the ordinary mail creation processing of G24 in reception display processing of FIG. 70 and the address input processing of G30 are respectively the same as the flows of them ail creation processing of FIGS. 9 and 10, and the address input processing of FIGS. 14 and 15 in the first embodiment, figures and description are omitted.

Figure 72:
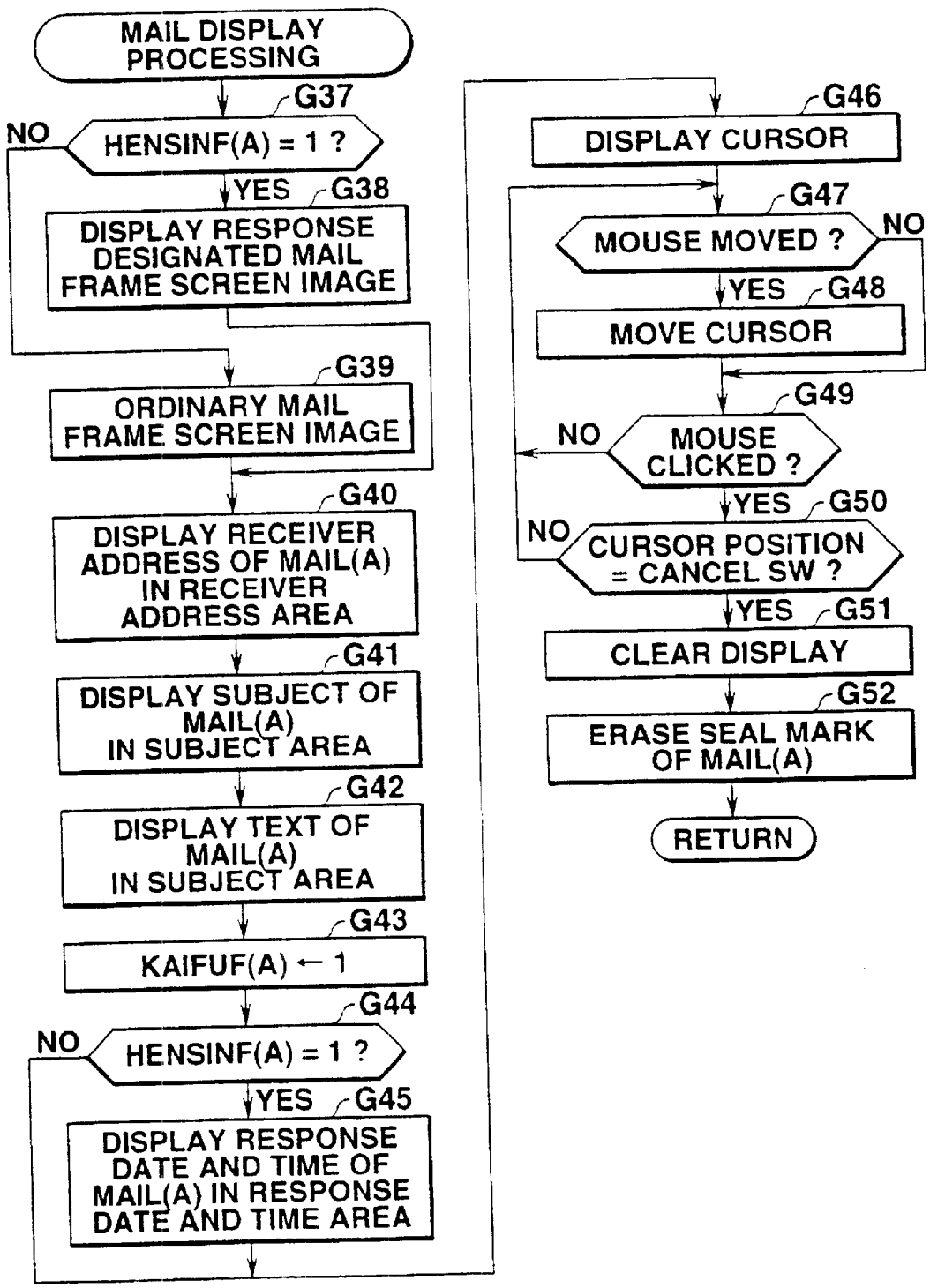
FIG. 72 is a flow chart of mail display processing of the seventh embodiment.

FIG. 72 is a flow of mail display processing at step G22 of FIG. 70. FIG. 73 is a display screen image of a response data and time designated mail. In FIG. 72, it is determined whether or not the flag HENSINF(A) is "1" (step G37). In other words, it is determined by the flag whether or not a RECEIVED MAIL(A) is a mail which designates a response date and time thereof. If the HENSINF is "1", a frame screen image of a response date and time designated mail of FIG. 73 is displayed (step G38). On the other hand, if the HENSINF is "0", a frame screen image of an ordinary mail is displayed (step G39). The ordinary mail is the same as the mail shown in FIG. 8 in the first embodiment.

In the displayed frame screen image, the address of a RECEIVED MAIL(A) is displayed in an receiver address area (step G40), subject data of the MAIL(A) are displayed in a subject area (step G41) and text data of the RECEIVED MAIL(A) are displayed in a text area (step G42). In addition, in accordance with an unseal indication, the KAIFUF(A) is set at "1" (step G43). Further, it is determined whether or not the HENSINF(A) is "1" (step G44) and if the flag is "1", response date and time of a RECEIVED MAIL(A) is displayed in a response date and time area on the screen image of FIG. 73 (step G45).

Then, a cursor is displayed in display screen image of an ordinary mail, not shown, or a response date and time designated mail (step G46) and it is determined whether or not the mouse 6 has been moved (step G47). If the mouse 6 has been moved, a cursor is moved in accordance with the movement (step G48). Then, it is determined whether or not the mouse has been clicked (step G49). If the mouse 6 has been clicked, it is determined whether or not a cursor position is a cancel switch position (step G50), if the cursor position is this position, the mail display screen image is cleared (step G51) and a seal mark of the RECEIVED MAIL(A) is erased (step G52). Then, the flow is terminated. At step G49, if the mouse 6 has not been clicked, of if a cursor position is not the cancel switch position at step G50, program flow goes to step G47 and a movement of the mouse 6 is checked.

Figure 74:
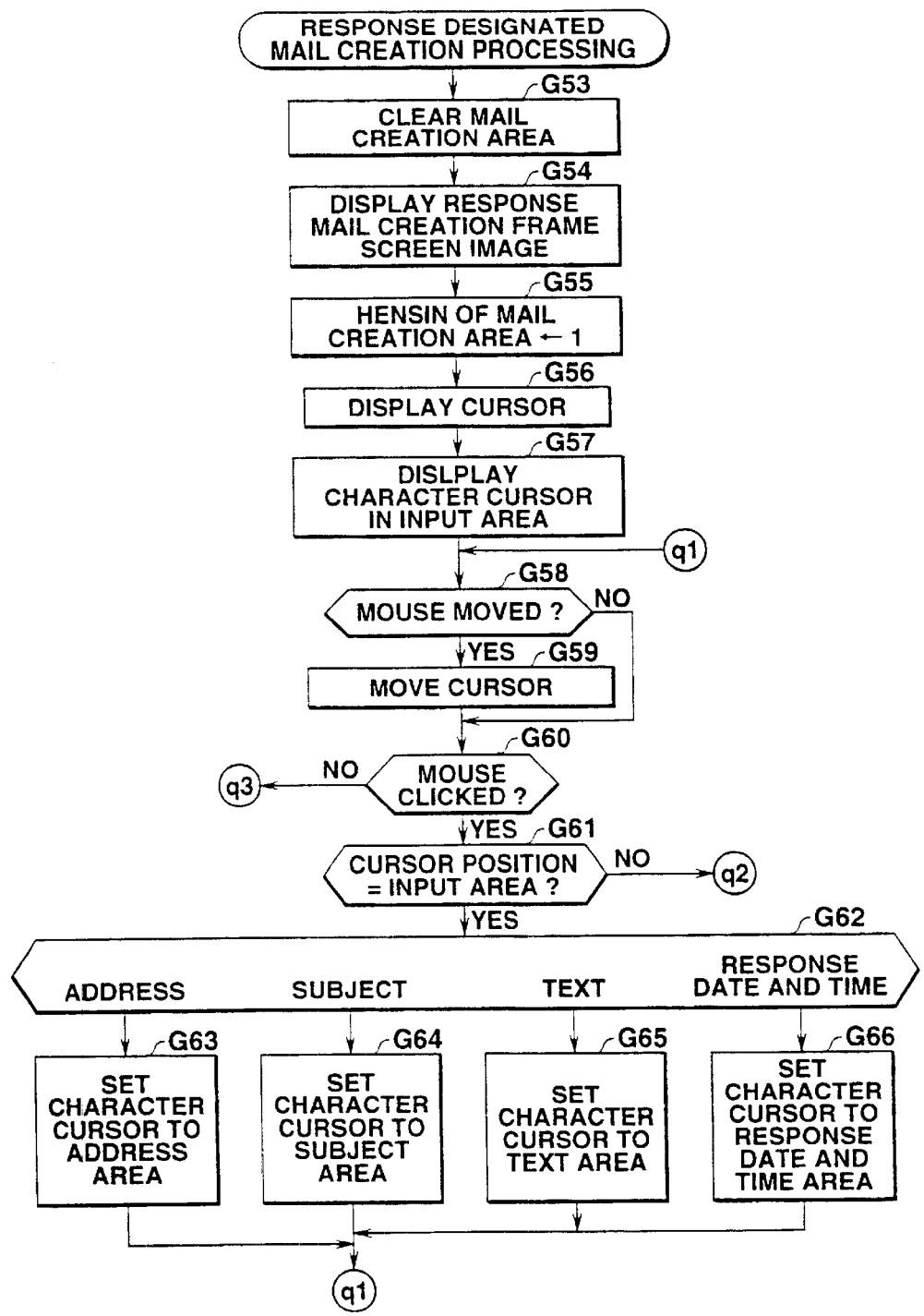
FIG. 74 is a flow chart of response designated mail creation processing of the seventh embodiment.
Figure 75:
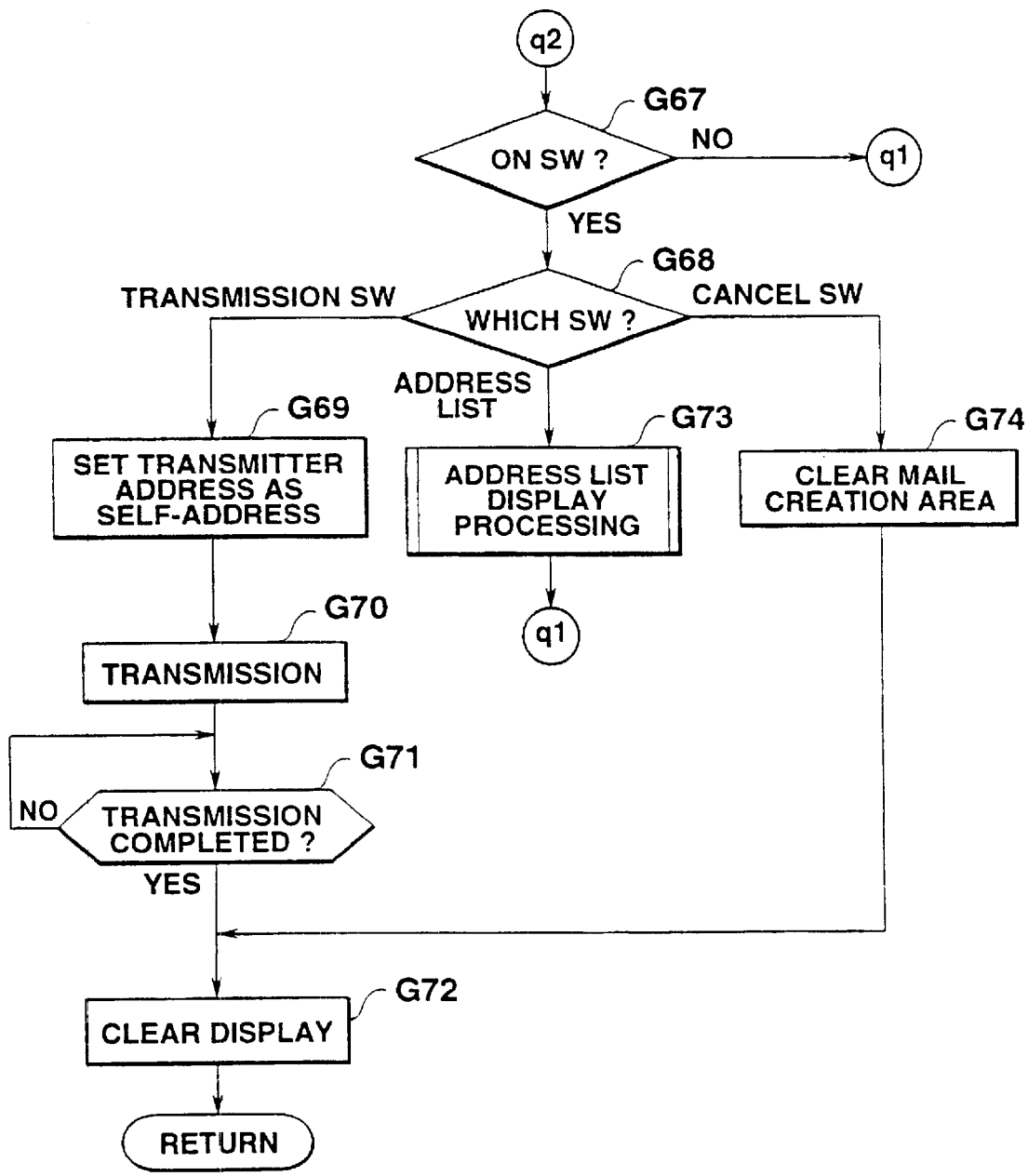
FIG. 75 is a flow chart of the response designated mail creation processing of the seventh embodiment, continued from FIG. 74.
Figure 76:
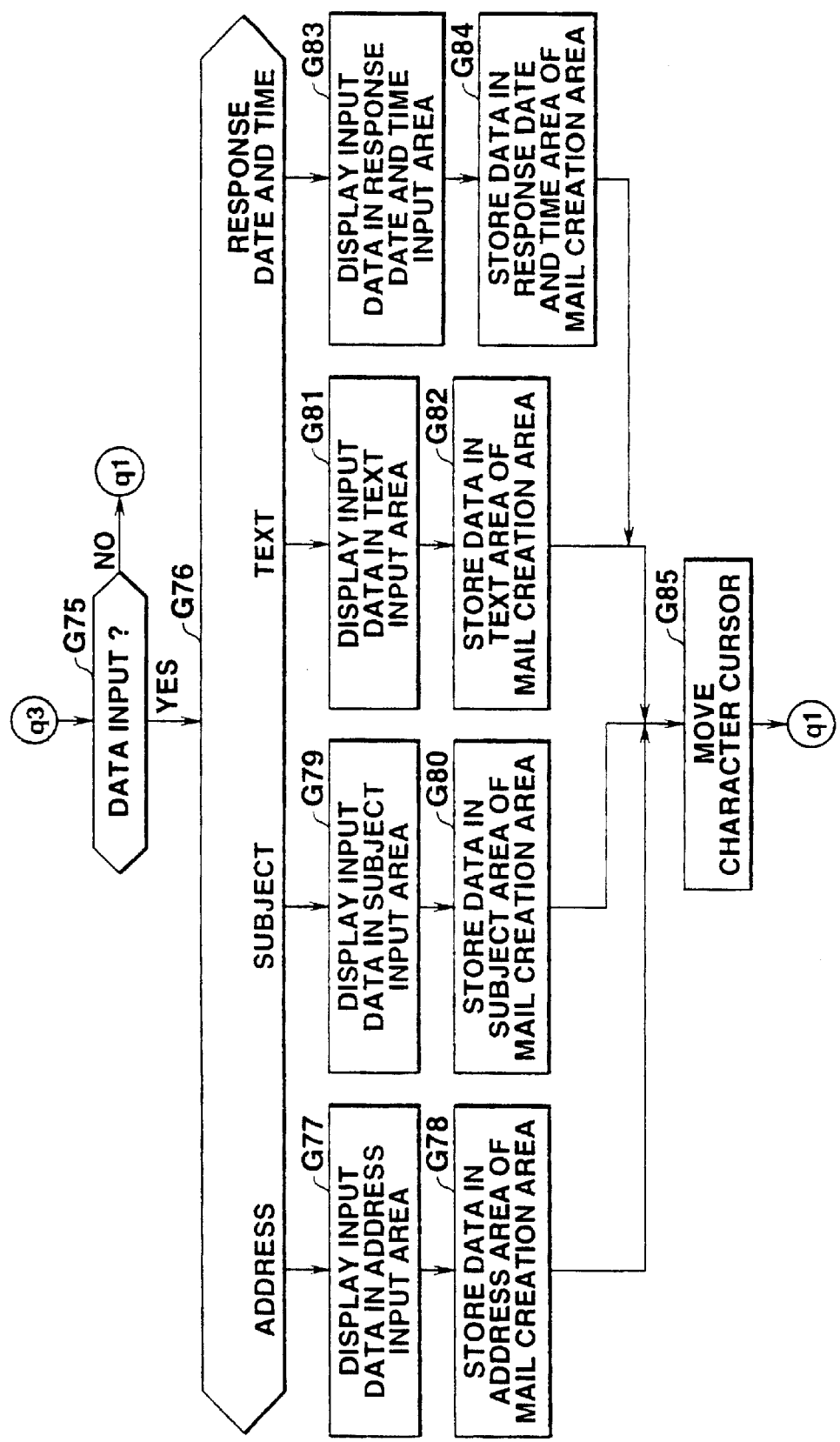
FIG. 76 is a flow chart of the response designated mail creation processing of the seventh embodiment, continued from FIG. 74.

FIGS. 74 to 76 are flows of response designated mail creation processing at step G26 of FIG. 70 and FIG. 77 is a response designated mail creation screen image.

In FIG. 74, the mail creation area of RAM 3 is cleared (step G53) and a frame screen image of a response designated mail (step G54). Then, the flag HENSINF in the mail creation area is set at "1" (step G55). Then, not only is a cursor for the mouse 6 displayed (step G56) but a character cursor for character inputting is displayed in an address input area (step G57).

Then, it is determined whether or not the mouse 6 has been moved (step G58). If the mouse 6 has been moved, a cursor is moved in accordance with the movement (step G59). Then, it is determined whether or not the mouse 6 has been clicked (step G60) and if the mouse 6 has been clicked, it is determined whether or not a cursor position is in an input area of FIG. 77 in which a character is input (step G61). If the cursor position is in the input area, it is determined which of a subject area, a text area or a response date and time area the input area is (step G62).

If a cursor position is in the address area, the character cursor is set at the address area (step G63). If a cursor position is in the subject area, the character cursor is set at the subject area (step G64). If a cursor position is in the text area, the character cursor is set at the text area (step G65). If a cursor position is in the response date and time area, the character cursor is set at the response date and time area (step G66). Then, after the character cursor is moved, program flow goes to step G58 and a movement of the mouse 6 is checked.

At step G61, if a cursor position is not in the input area, program flow goes to FIG. 75 and it is determined whether or not the cursor position is on any one of the icon switches on the screen image of FIG. 77 (step G67). If a cursor position is on an icon switch, it is determined on which the cursor position is, an address list switch, a transmission switch or a cancel switch (step G68).

If a cursor position is on the transmission switch, a transmitter address of the mail creation area of RAM 3 is set as a self-address (step G69), transmitting processing is executed (step G70). Then, it is determined whether or not transmission has been completed (step G71) and if the transmission has not been completed, the transmitting processing at step G70 is continued. If the transmission has been completed a display of a response designated mail creation screen image of FIG. 77 is cleared (step G72) and the flow is terminated.

At step G68, if a cursor position is on the address list switch, address list display processing is executed (step G73). The address list display processing is the same as the flow of the first embodiment shown in FIG. 12. After this processing, program flow goes to step G58 of FIG. 74 and a movement of the mouse 6 is checked.

At step G68 of FIG. 75, if a cursor position is on the cancel switch, the mail creation area of RAM 3 is cleared (step G74) and a display of a response designated mail creation screen image is cleared (step G72). Then, the flow is terminated. At step G67, if a cursor position is not on any one of the icon switches, program flow goes to step G58 of FIG. 74 and a movement of the mouse 6 is checked.

At step G60 of FIG. 74, if the mouse is not clicked, program flow goes to FIG. 76 and it is determined whether or not data input has been made from the key board 4 (step G75). If the data input has been made, it is determined in which a character cursor position is, an address-input area, a subject-input area, a text input area or a response date and time area (step G76).

If a character cursor position is in the address input area, input data are displayed in the address input area on the screen image (step G77) and the input data are stored in an address area of the mail creation area of RAM 3 (step G78). If a character cursor position is in the subject input area, input data are stored in a response date and time area of the mail creation area of RAM 3 (step G84).

After the input data are stored at step G78, G80, G82 or G84, a character cursor is moved (step G85). Then, after the character cursor is moved, or if data input has not made ate step G75, program flow goes to step G58 and a movement of the mouse 6 is checked.

Figure 78:
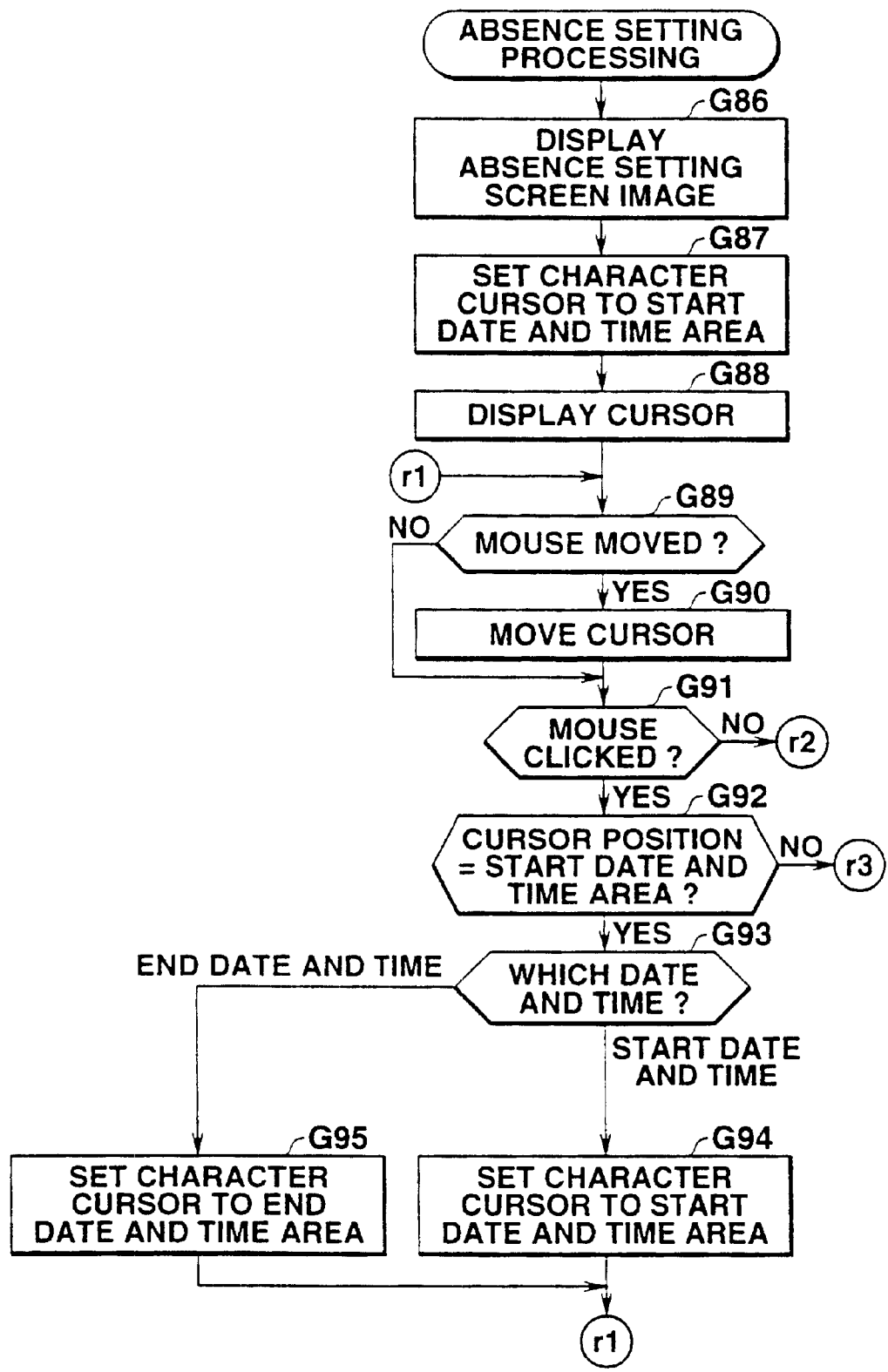
FIG. 78 is a flow chart of absence setting processing of the seventh embodiment.
Figure 79:
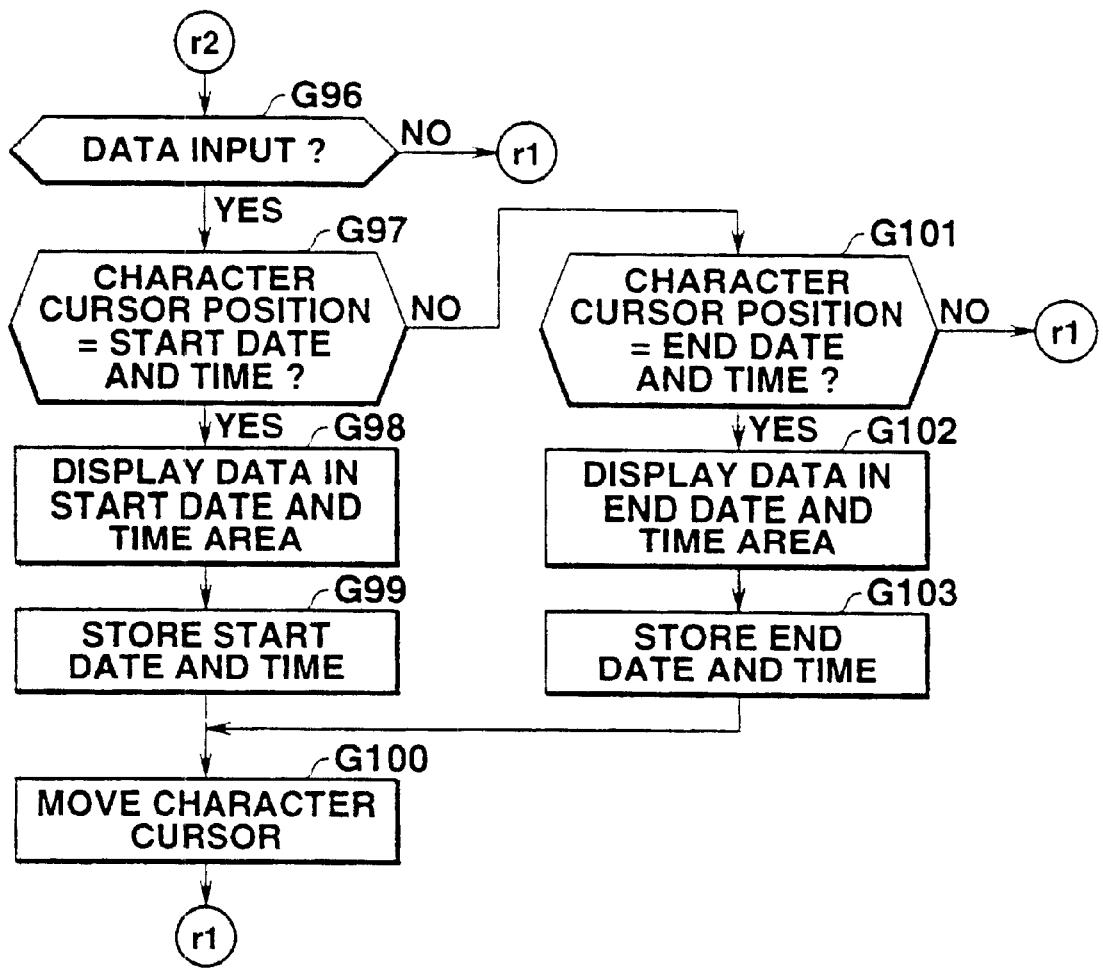
FIG. 79 is a flow chart of the absence setting processing of the seventh embodiment, continued from FIG. 78.
Figure 80:
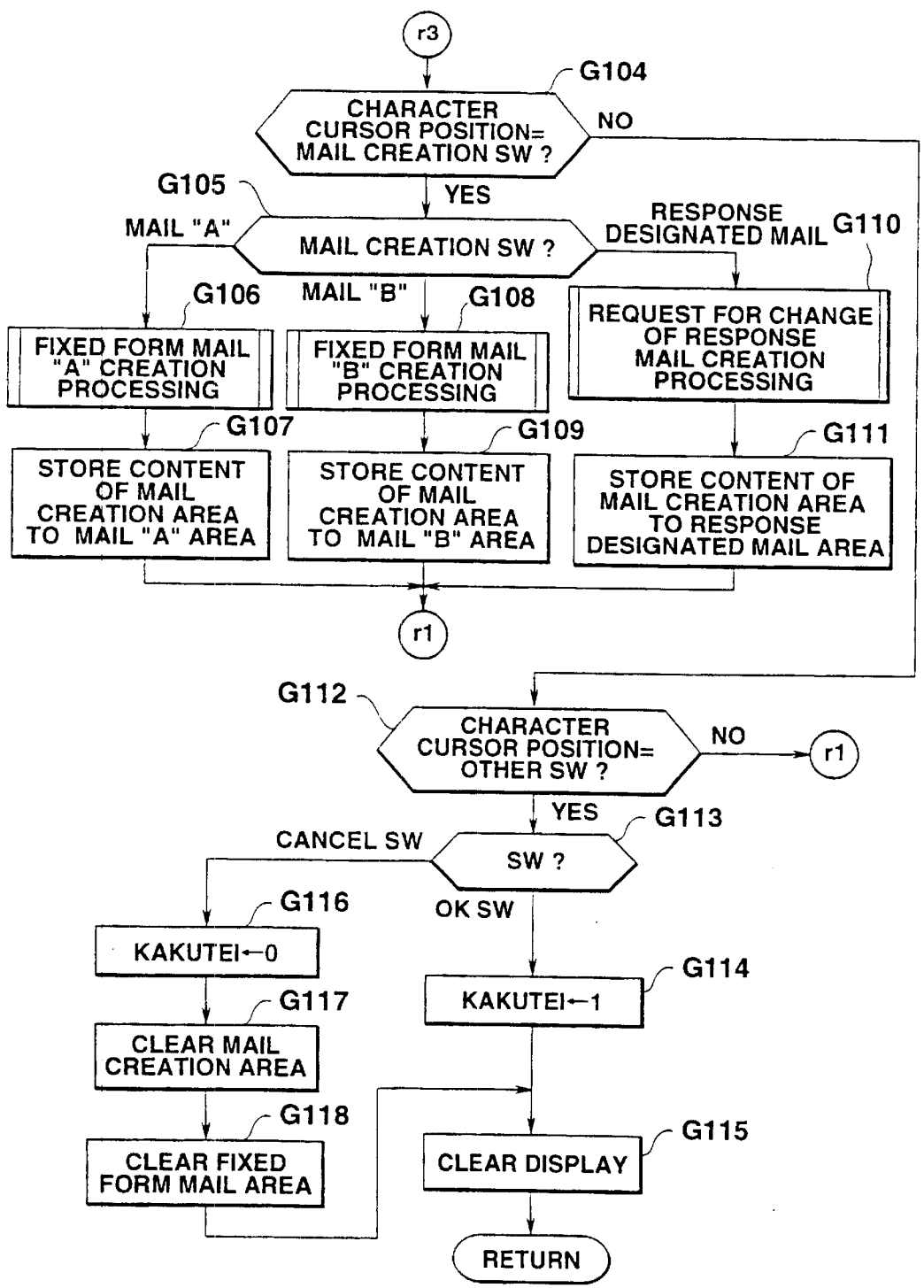
FIG. 80 is a flow chart of the absence setting processing of the seventh embodiment, continued from FIG. 78.

FIGS. 78 to 80 are flows of absence setting processing at step G28 of FIG. 70 and FIG. 81 is an absence setting processing screen image.

In FIG. 78, the absence setting processing screen image of FIG. 81 is displayed (step G86) and a character cursor is set at a start date and time area (step G87). Then, a cursor for the mouse 6 is displayed (step G88). Then, it is determined whether or not the mouse 6 has been moved (step G89) and if the mouse 6 has been moved, the cursor is moved in accordance with the movement (step G90). Then, it is determined whether or not the mouse 6 has been clicked (step G91). If the mouse 6 has been clicked, it is determined whether or not a cursor position is in the date and time areas (step G92).

If a cursor position is in the date and time area, it is determined which the date and time area is, a start date and time area or an end date and time area (step G93). If the cursor position is in the start date and time area, a character cursor is set at the start date and time area (step G94). On the other hand, if a cursor position is in the end date and time area, a character cursor is set at the end date and time area (step G95). After the character cursor position is moved, program flow goes to step G89 and a movement of the mouse 6 is checked.

At step G91, if the mouse 6 has not been clicked, program goes to a flow of FIG. 79 and it is determined whether or not data input has been made from the keyboard 4 (step G96). If the data input has been made, it is determined whether or not a character cursor position is in the start date and time area (step G97). If the character cursor position is this position, the data of the start date and time input in the start date and time area are displayed (step G98) and the data of the start date and time are stored in RAM 3 (step G99). Then, a character cursor is moved (step G100).

At step G97, if a character cursor is not in the start date and time area, it is determined whether or not the character cursor is an end date and time position (step G101). If the character cursor position is this position, the data of the end date and time input in the end date and time area are displayed (step G102) and the data of the end date and time are stored in RAM 3 (step G103). Then, the character cursor is moved (step G100).

After the character cursor is moved at step G100, or if the data input has not made at step G96 or if a character cursor position is not any one of the start date and time, and end date and time positions at steps G97 and G101, program flow goes to step G89 of FIG. 78 and a movement of the mouse 6 is checked.

At step G92 of FIG. 78, if a cursor position is not in the date and time areas, program flow does to a flow of FIG. 80 and it is determined whether or not a cursor position is a mail creation switch position on the screen image of FIG. 81 (step G104). If the cursor position is this position, it is determined which the mail creation switch is, a fixed form mail "A" creation switch, a fixed form mail "B" creation switch, or a response designated mail creation switch (step G105).

If a cursor position is the fixed form mail "A" creation switch, a fixed form mail "A" creation processing is executed (step G106). The fixed form mail "A" creation processing is the same as the flow of the third embodiment shown in FIG. 44 and a fixed form mail "A" screen image is also the same as the screen image of FIG. 45A. Then a content of a mail buffer is stored in the fixed form mail "A" area of RAM 3 (step G107). If a cursor position is a mail "B" creation switch position, a fixed form mail "B" creation processing is executed (step G108). The fixed form mail "B" creation processing is the same as the flow of the third embodiment shown in FIG. 44 and a fixed mail "B" screen image is also the same as the screen image of FIG. 45B. Then, a content of a mail buffer is stored in the fixed form mail "B" area of RAM 3 (step G109). If the cursor position is a response mail switch position, request for change of response mail creation processing is executed (step G110). Then, a content of the mail creation area is stored in the request for change of response date and time mail area of RAM 3 (step G111). After a content of the mail creation area is stored at step G107, G109 or G111, program flow goes to step G89 of FIG. 78 and a movement of the mouse 6 is checked.

At step G104, if a cursor position is not any one of the mail creation areas, it is determined whether or not the cursor position is one of the other switch positions of a screen image of FIG. 81 (step G112). If a cursor position is the one of the other switch positions, it is determined which the cursor position is, an OK switch position or a cancel switch position (step G113). If the cursor position is the OK switch position, the definite flag KAKUTEIF is set at "1" (step G114) and the absence setting processing screen image of FIG. 81 is cleared (step G115). Then the flow is terminated.

If a cursor position is a cancel switch position at step G113, the definite flag KAKUTEIF is reset at "0" (step G116) and the mail creation area of RAM 3 is cleared (step G117). In addition, the fixed form mail "A", the fixed form mail "B" and the request for change of response date and time mail areas of RAM 3 are cleared (step G118) and the absence setting processing screen image of FIG. 81 is cleared (step G115). Then, the flow is terminated.

If a cursor position is not any one of the other switch positions at step of G112, that is, if a cursor position is not any one of the above-mentioned positions, program flow goes to step G89 of FIG. 78 and a movement of the mouse 6 is checked.

Figure 82:
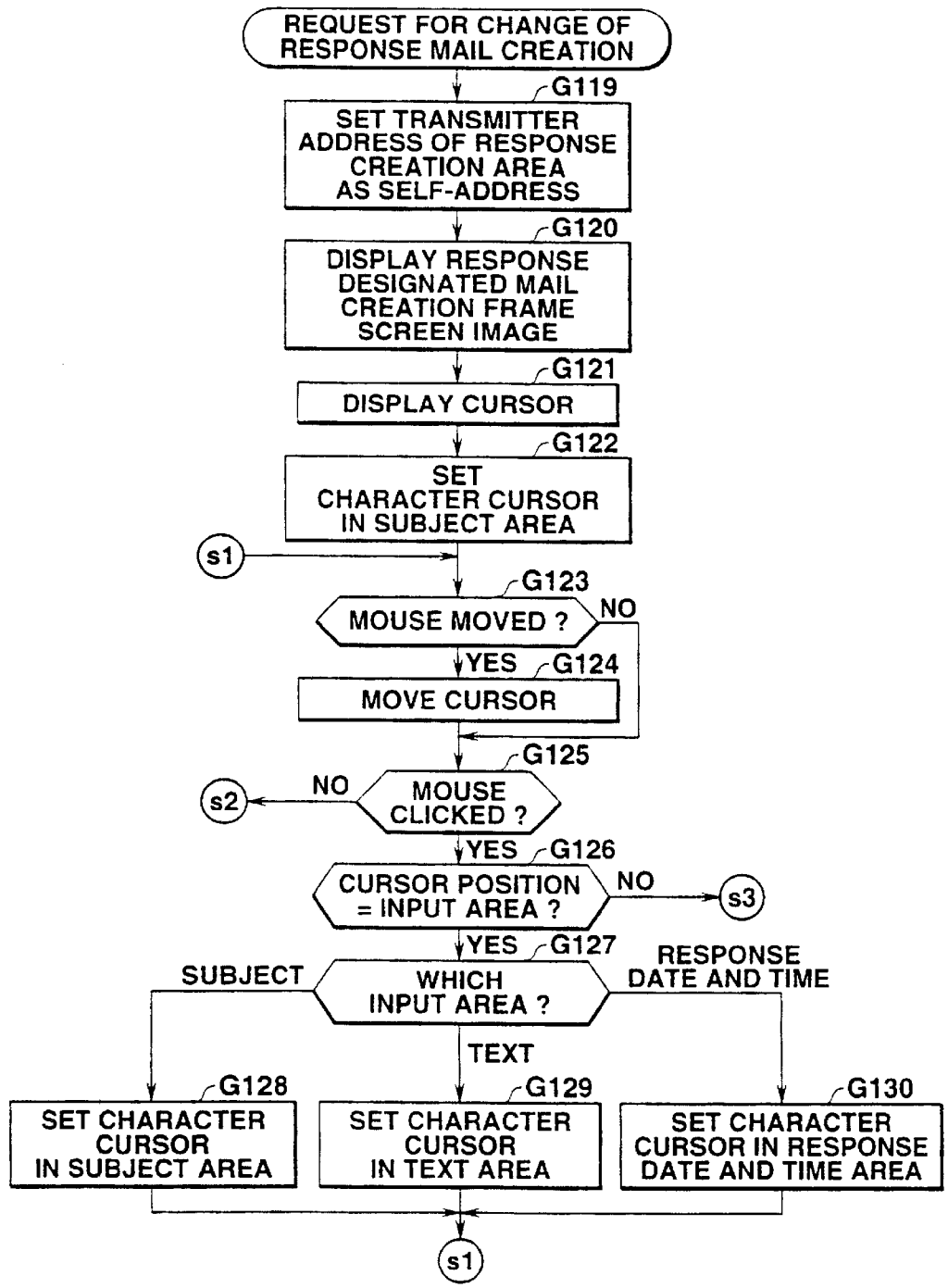
FIG. 82 is a flow chart of request for change of response mail creation of the seventh embodiment.
Figure 83:
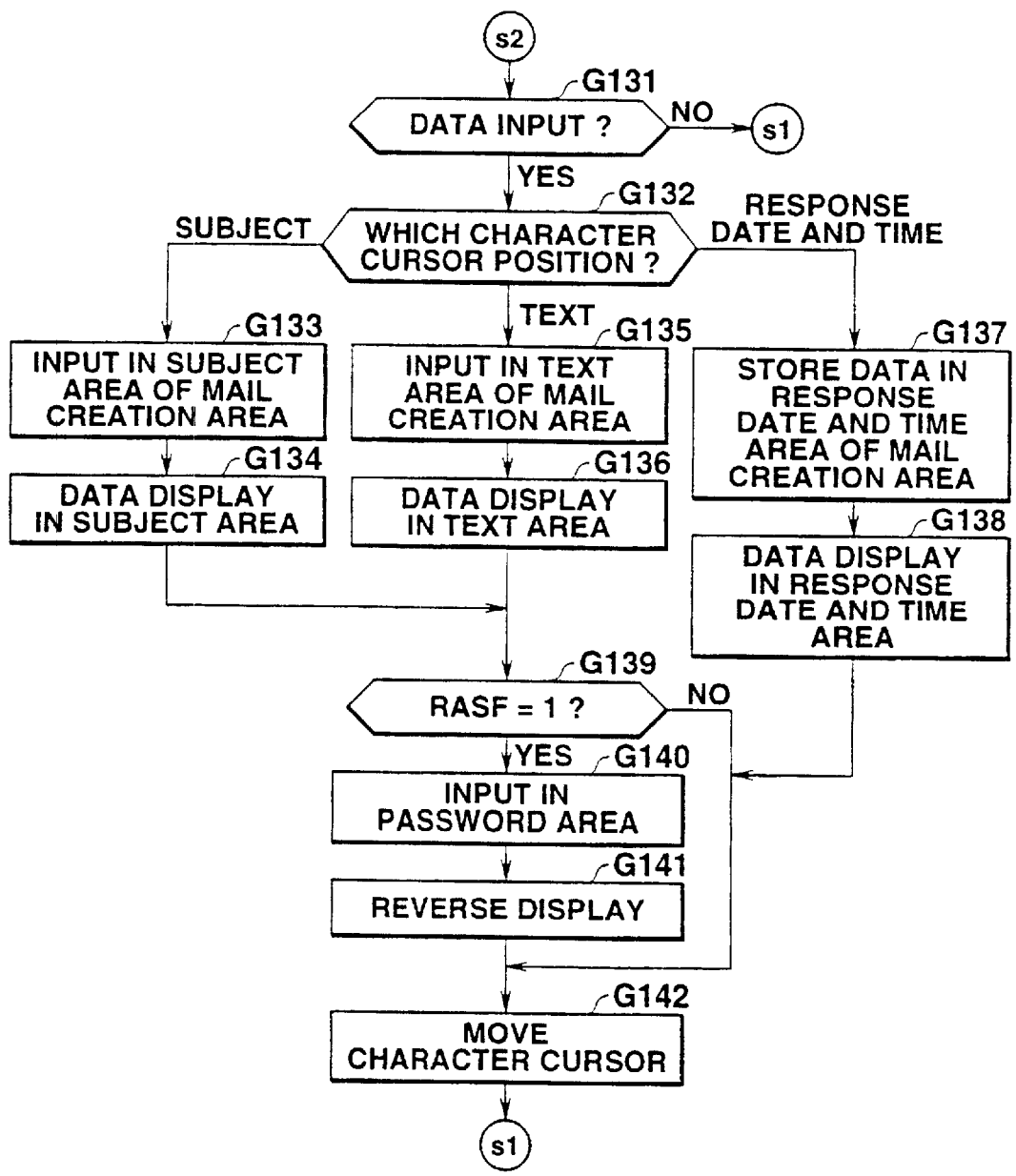
FIG. 83 is a flow chart of request for change of response mail creation of the seventh embodiment, continued from FIG. 82.
Figure 84:
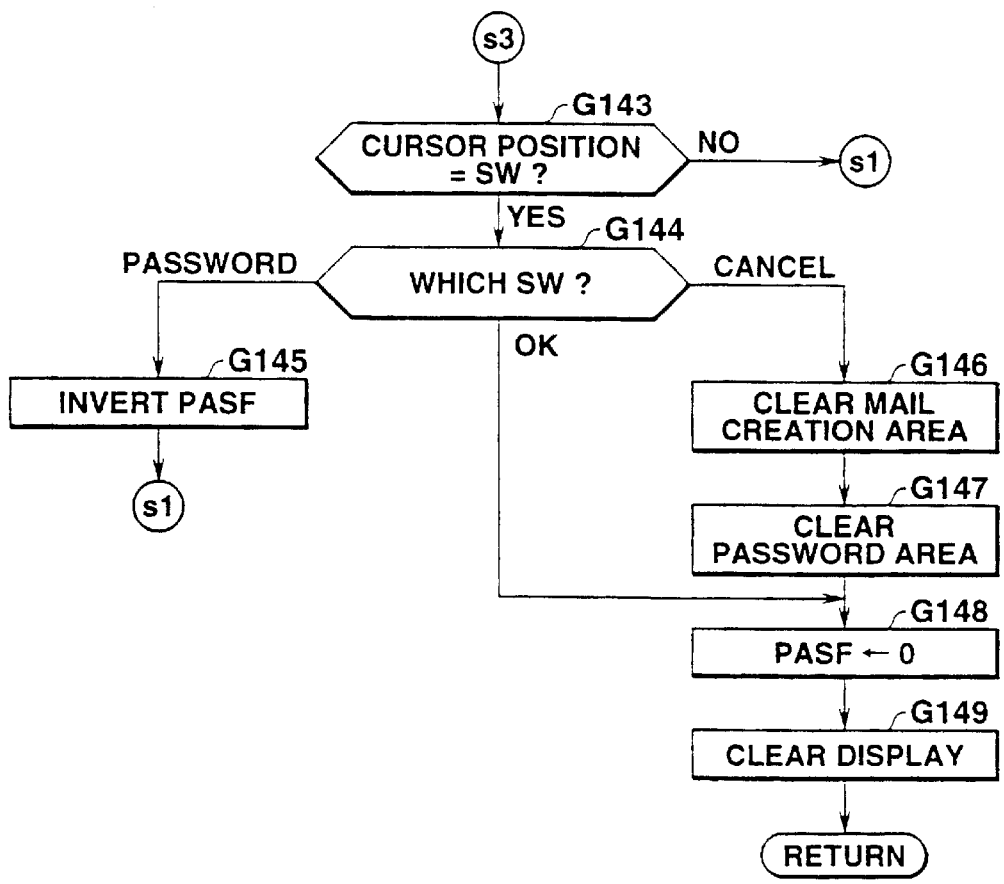
FIG. 84 is a flow chart of request for change of response mail creation of the seventh embodiment, continued from FIG. 82.

FIGS. 82 to 84 are flows of request for change of response mail creation processing at step G110 of FIG. 80 and FIG. 85 is a display screen image of the request for change of response mail. The screen image comprises, as input areas, an address area, a subject area, a text area and a response date and time area. In addition, the screen image further comprises an OK switch, a cancel switch and a password switch.

In FIG. 82, at first, a transmitter address of the mail creation area is set as a self-address (step G119). Then, a frame screen image for request for change of response mail creation is displayed (step G120). Then, a cursor for the mouse 6 is displayed (step G121) and a character cursor is displayed in the subject area (step G122).

Then, it is determined whether or not the mouse 6 has been moved (step G123) and if the mouse 6 has been moved, a cursor position on the screen image is moved in accordance with the movement (step G124). Then, it is determined whether or not the mouse 6 has been clicked (step G125). If the mouse 6 has been clicked, it is determined whether or not a cursor position is in an input area of the screen image of FIG. 85 (step G126). If a cursor position is in the input area, it is further determined which position in input areas the cursor position is (step G127).

If a cursor position is a position in the subject area, a character cursor is set at the subject area (step G128). If a cursor position is a position in the text area, a character cursor is set at the text area (step G129). If a cursor position is a position in the response date and time area, a character cursor is set at the response date and time area (step G130). After a character cursor is set, program goes to step G123 and a movement of the mouse 6 is checked.

If the mouse 6 has not clicked at G125, program goes to a flow of FIG. 83 and it is determined whether or not data input has been made from the key board 4 (step G131). If the data input has been made, it is determined which position in input areas a character cursor position is (step G132). If the character cursor position is in the subject area, data are input in the subject area of the mail creation area of RAM 3 (step G133) and the data are displayed in the subject area of a screen image of FIG. 85 (step G134). If a character cursor position is in a text area, data are input in the text area of the mail creation area of RAM 3 (step G135) and the data are displayed on a text area of the screen image of FIG. 85 (step G136). If a character cursor position is in the response date and time area, data are input in the response date and time area of the mail creation area of RAM 3 (step G137) and the data are displayed in the response date and time area of the screen image of FIG. 85 (step G138).

After the data are displayed in the subject area at step G134, or after the data are displayed in the text area at step G136, it is determined whether or not the flag PASF of RAM 3 is "1" (step G139). If the flag PASF is "1", password data are input in the password area of RAM 3 (step G140) and an input character, that is a character of the password is displayed in reverse (step G141). After the display in reverse, a character cursor is moved (step G142). If the flag PASF is "0" at step 139, program goes to step G142 and the character cursor is moved since the input character is not the password. Since a character displayed in the response date and time area is not a password, program flow goes to step G142 and the character cursor is moved without determination on the flag of step G139 after the data are displayed at step G138. After the movement of the character cursor, program flow goes to step G123 of FIG. 82 and the mouse 6 is checked.

If a character cursor position is not in the input area at step G126 of FIG. 82, program flow goes to a flow of FIG. 84 and it is determined whether or not the cursor position is one of the icon switches of FIG. 85 (step G143). If a cursor position is the one of the icon switches, it is determined which switch the cursor position is (step G144). If a cursor position is a password switch, the flag PASF of RAM 3 is inverted (step F145). Then, program flow goes to step G123 of FIG. 82 and a movement of the mouse 6 is checked.

If a cursor position is the cancel switch, the mail creation area of RAM 3 is cleared (step G146) and the password area is cleared (step G147). Then, the flag PASF of RAM 3 is reset at "0" (step G148) and a display of the screen image of FIG. 85 is cleared (step G149). If a cursor position is the OK switch at step G144, the flag PASF of RAM 3 is reset at "0" (step G148) and the display of the screen image of FIG. 85 is cleared (step G 149). After the display is cleared at step G149, the flow is terminated.

FIGS. 86 to 89 are flow charts of timer interrupt processing.

When timer interrupts occur at set intervals, the server 300 shown in FIG. 1 is accessed by CPU 1 of a terminal 100.

Figure 86:
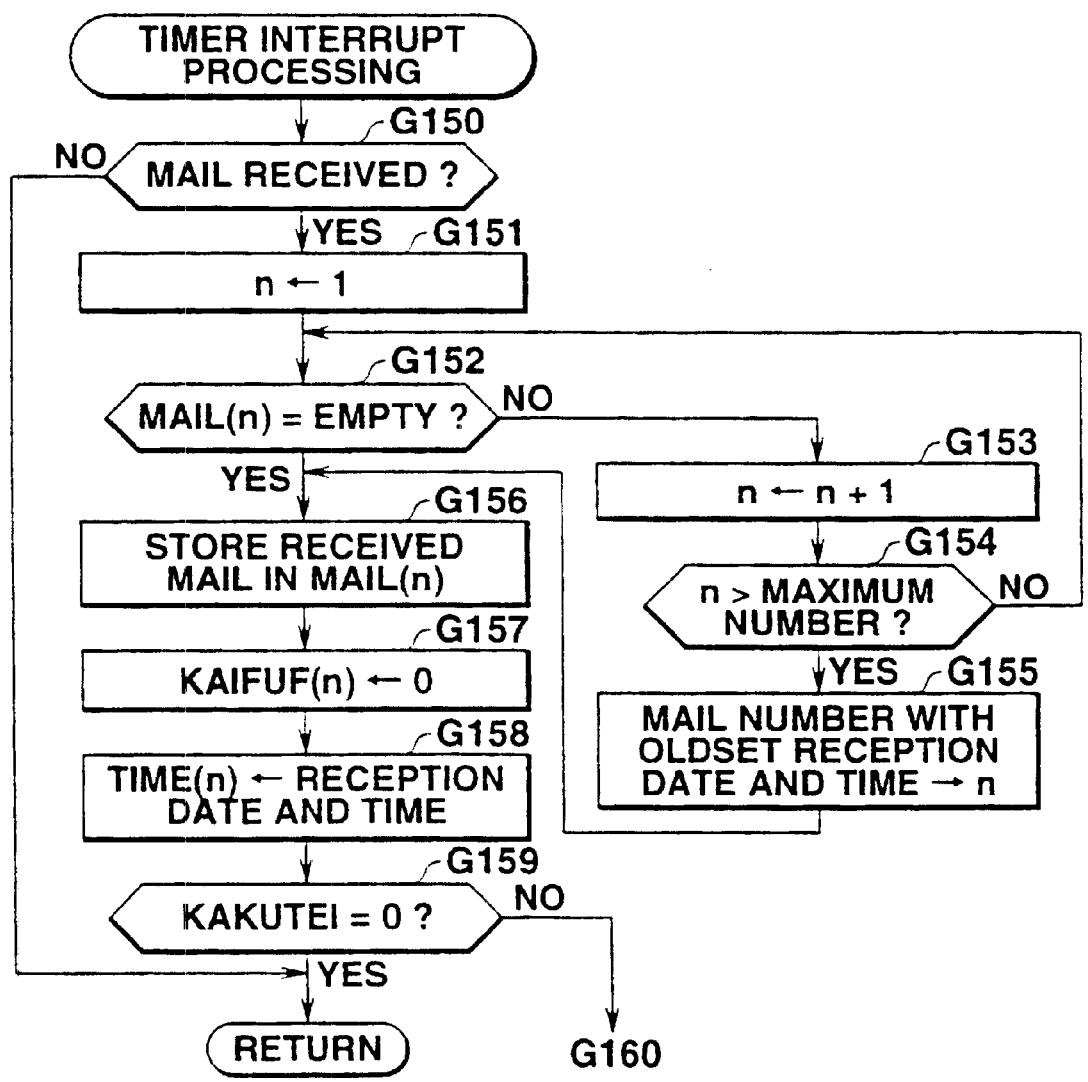
FIG. 86 is a flow chart of timer interrupt processing of the seventh embodiment.

In FIG. 86, it is determined whether or not a received mail is present in a mail box of the server 300 (step G150). If the received mail is not present, the flow is immediately terminated. If the received mail is present, a point "n" indicating the area numbers of MAIL(1) to MAIL(M) of the received mail storage area of RAM 3 is set at "1" (step G151). Then, it is determined whether or not an area of a RECEIVED MAIL(n) area designated by "n" is empty (step G152).

In other words, if the RECEIVED MAIL(n) area is not empty, "n" is incremented (step G153) and it is determined whether or not "n" exceeds the maximum number (step G154). If "n" has not exceeded the maximum number, program goes to step G152 and it is determined whether or not the RECEIVED MAIL(n) area is empty. A loop of steps G152, G153 and G154 is repeated to search a RECEIVED MAIL(n) area with an empty space. At step G154, if "n" exceeds the maximum number, that is when none of the MAIL(1) to MAIL(M) of the received mail storage area of RAM 3 is empty, a received mail with the oldest reception data and time is searched (step G155). Then, the pointer "n" is set at a mail number thereof (step G156).

If the designated RECEIVED MAIL(n) area is empty at step G152 or if "n" is set at the mail number with the oldest reception date and time at step G155, a received mail fetched from the server 300 is stored in the RECEIVED MAIL(n) area (step G156). Then, an unseal flag KAIFUF(n) is reset at "0" in order to indicate the sealed state (step G157) and TIME(n) is set at the reception date and time (step G158). Then it is determined whether or not the definite flag KAKUTEIF which is set in the absence setting processing of FIG. 80 is "0" (step G159).

If the definite flag KAITEIF is "0", the flow is terminated since an absence setting processing is not executed. If the flag is "1", the absence setting processing has been executed. In this case, program goes to a flow of FIG. 87 and it is determined whether or not the reception date and time at which TIME is set is in the period of a start date and time to an end date and time (step G160). In other words, it is determined whether or not a received mail is a received mail received in an absent period. If the received mail is not in the period, the flow is terminated, but when the received mail is in the period, it is determined whether or not the response flag HESINF of the received mail storage area of RAM 3 is "1", that is it is determined whether or not a RECEIVED MAIL(n) is a response designated mail (step G161). If the HESINF is "1", a pointer "k" is set at "1" (step G162). The pointer "k" is the number of WAITING ADDRESS(1) to WAITING ADDRESS(M) in a waiting address area of RAM 3 shown in FIG. 68. Then, the ADDRESS(k) is retrieved while "k" is incremented.

In this retrieval, it is determined whether or not the WAITING ADDRESS(k) coincides with a transmitter address of a RECEIVED MAIL(n) (step G163). If there is no coincidence therebetween, program flow goes to a flow of FIG. 88, "k" is incremented (step G164) and it is determined whether or not "k" exceeds the maximum number (step G165). If "k" has not exceeded the maximum number, program flow goes to step G163 and it is determined whether or not a WAITING ADDRESS(k) coincides with a transmitter address of a RECEIVED MAIL(n). Then a loop of steps G163, G164 and G165 is repeated to search the WAITING ADDRESS(k) in coincidence.

Figure 88:
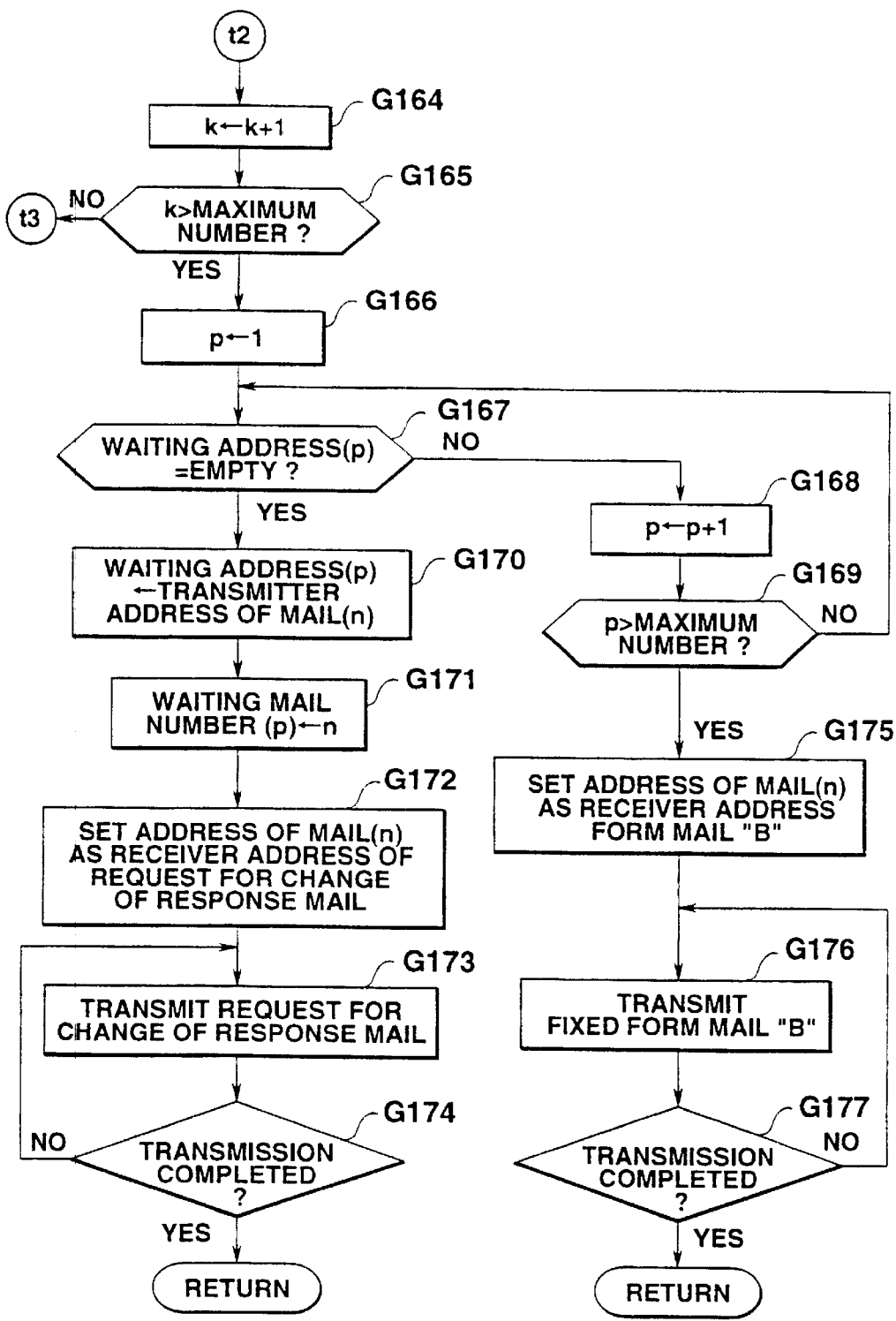
FIG. 88 is a flow chart of the timer interrupt processing of the seventh embodiment, continued from FIG. 86.
Figure 89:
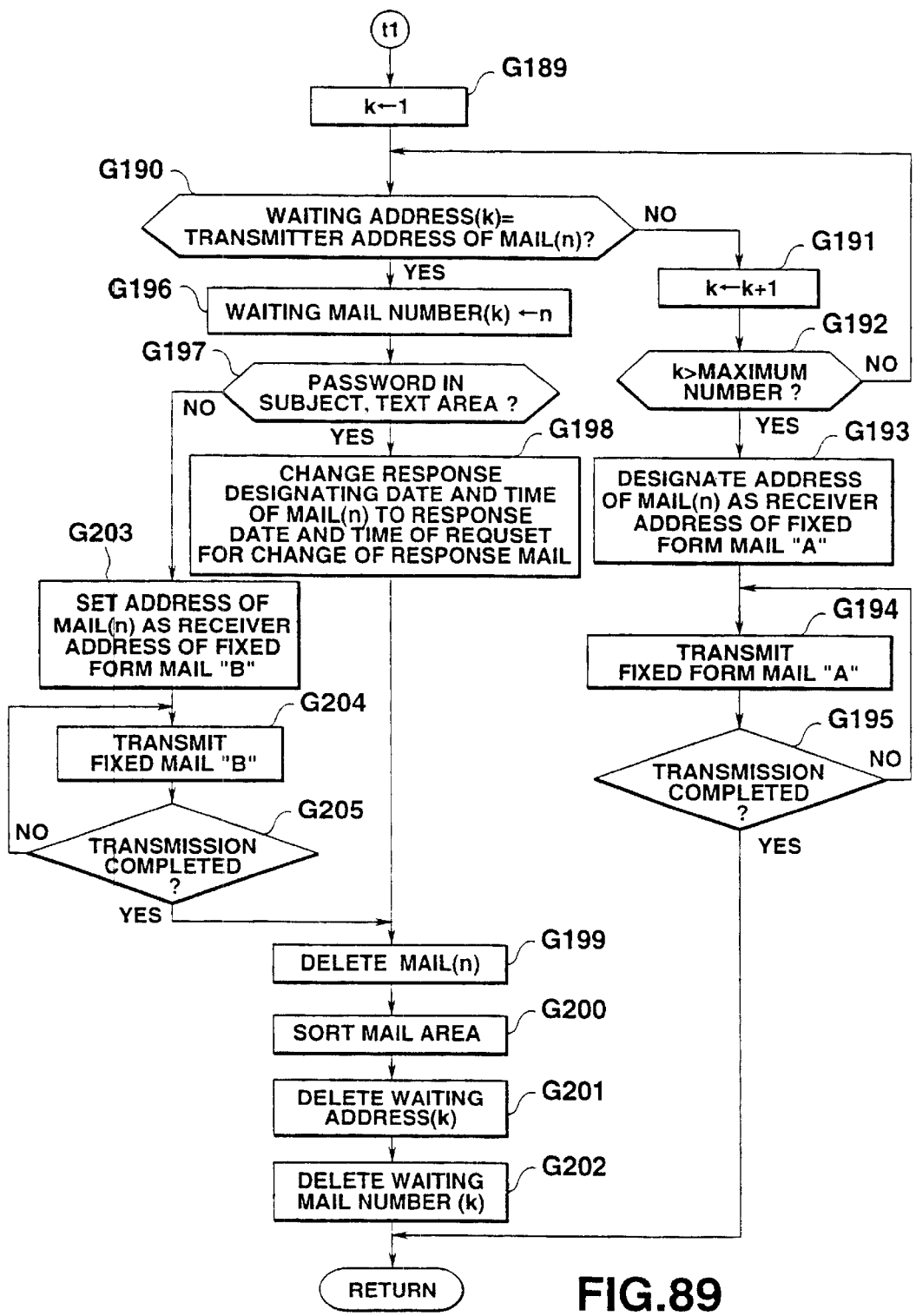
FIG. 89 is a flow chart of the timer interrupt processing of the seventh embodiment, continued from FIG. 87.

At step G165 of FIG. 88, if "k" exceeds the maximum number, that is when there is no waiting address in coincidence, since the received mail is a mail to which no response is transmitted, a transmitter address of the RECEIVED MAIL(n) and the number of the RECEIVED MAIL(n) is not registered in a waiting address area and a waiting mail number area of RAM 3 shown in FIG. 68. In this case, a new pointer "p" indicating a number of a waiting address is set at "1" (step G166) and it is determined whether or not the WAITING ADDRESS(p) is empty while p is incremented (step G167). If the WAITING ADDRESS(p) is not empty, "p" is incremented (step G168) and it is determined whether or not "p" exceeds the maximum number (step G169). If "p" has not exceeded the maximum number, program flow goes to step G167 and it is determined whether or not the WAITING ADDRESS(p) area is empty. Then, a loop of steps G167, G168 and G169 is repeated to search a WAITING ADDRESS(p) with an empty space.

If there is available a WAITING ADDRESS(p) with an empty space at step G167, the WAITING ADDRESS(p) is set as a transmitter address of the received mail (step G170). The WAITING ADDRESS NUMBER(p) corresponding to the WAITING ADDRESS(p) is set at "n" (step G171). Then, an address of the RECEIVED MAIL(n) is used as a receiver address of a request for change of response mail (step G172). Thereafter, a request for change of response mail shown in FIG. 85 is transmitted (step G173). Then, it is determined whether or not the transmission has been completed (step G174) and if the transmission has not been completed, transmitting processing is continued and if the transmission has been completed, the flow is terminated.

If "p" exceeds the maximum number at step G169, that is, if none of the areas of the WAITING ADDRESS(1) to WAITING ADDRESS(M) is empty, a transmitter address of a RECEIVED MAIL(n) is used as a receiver address of a fixed form mail "B" (step G175). In other words, since there is no available area with an empty space for a response, the transmitter address is used as an address of a fixed form mail "B" indicating an emergency contact place shown in FIG. 45B. Then, the fixed form mail "B" is transmitted (step G176) and it is determined whether or not the transmission has been completed (step G177). If the transmission has not been completed, transmitting processing of step G176 is continued. If the transmission has been completed, the flow is terminated.

Figure 87:
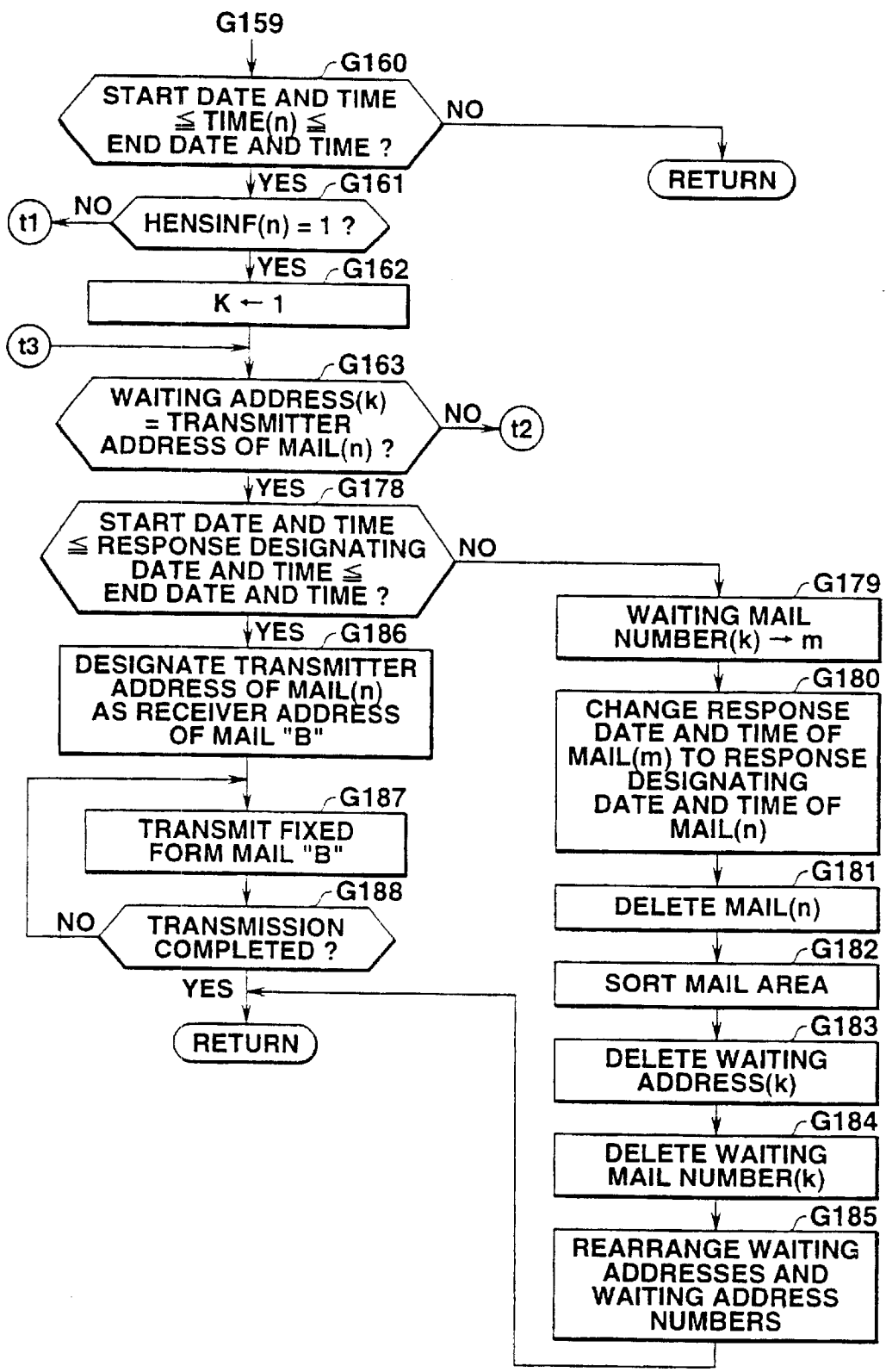
FIG. 87 is a flow chart of the timer interrupt processing of the seventh embodiment, continued from FIG. 86.

If the WAITING ADDRESS(k) coincides with a transmitter address of a RECEIVED MAIL(n) at step G163 of FIG. 87, since the RECEIVED MAIL(n) is the second received mail with response date and time designation from the same transmitter who responds to a response mail to the previous received mail, it is further considered that a response date and time has been changed. Therefore, it is determined whether or not a response date and time of the RECEIVED MAIL(n) is in the period of a start date and time to an end date and time in the absence (step G178). If the respond date and time is not in the period, since a response date and time has been changed, a point "m" is set at a WAITING MAIL NUMBER(k) (step G179) and the response date and time of the first RECEIVED MAIL(m) is changed to a response date and time of the second RECEIVED MAIL(n) (step G180). Then, the second RECEIVED MAIL(n) is deleted from the received mail storage area of RAM 3 (step G181) and the received mail area is sorted (step G182). The WAITING ADDRESS(k) is also deleted (step G183), the WAITING MAIL NUMBER (k) is deleted (step G184) and the waiting address area and the waiting mail number area are rearranged to a condition with no interposed empty areas (step G185). Then, the flow is terminated.

At step G178, if a response designating date and time of the second RECEIVED MAIL(n) also is in the period of a start date and time to an end date and time in the absence, this means that a transmitter of the RECEIVED MAIL(n) refuses a change of a response designating date and time. For this reason, a transmitter address of the RECEIVED MAIL(n) is set as an receiver address of a fixed form mail "B" clearly indicating an emergency contact place (step G186) and the fixed form mail "B" is transmitted (step G187). Then, it is determined whether or not the transmission has been completed (step G188) and if the transmission has not been completed, transmitting processing of step G187 is continued. If the transmission has been completed, the flow is terminated.

At step G161 of FIG. 87, if the HENSINF(n) is "0", a RECEIVED MAIL(n) is an ordinary mail which is not designated with a response date and time or a received mail responding to a request for change of response mail shown in FIG. 85 which is transmitted to a received mail with a response designating date and time. In this case, program flow goes to a flow of FIG. 89 and a pointer "k" is set at "1" (step G189). Then, it is determined whether or not a WAITING ADDRESS(k) coincides with a transmitter address of a RECEIVED MAIL(n) while "k" is incremented (step G190). If there is no available coincidence therebetween, "k" is incremented (step G191) and it is determined whether or not "k" exceeds the maximum number (step G192). If "k" has not exceeded the maximum number, program flow goes to step G190 and it is determined whether or not a WAITING ADDRESS(k) coincides with a transmitter address of a RECEIVED MAIL(n). Then, a loop of steps G190, G191 and G192 is repeated to search an address in coincidence.

If "k" exceeds the maximum number at step G192, that is when there is no available address in coincidence therebetween, a RECEIVED MAIL(n) is an ordinary mail. In this case, a transmitter address of the RECEIVED MAIL (n) is set as a receiver address of a fixed form mail "A" (step G193). In other words, the transmitter address is used as a receiver address of a fixed form mail "A" which clearly indicates the state of absence shown in FIG. 45A. Then, the fixed form mail "A" is transmitted (step G194) and it is determined whether or not the transmission has been completed (step G195). If the transmission has not been completed, transmitting processing of step G194 is continued. If the transmission has been completed, the flow is terminated.

At step G190, if there is available a WAITING ADDRESS (k) which coincides with a transmitter address of a RECEIVED MAIL(n), the RECEIVED MAIL(n) is a received mail which responds to a request for change of response mail. In this case, a WAITING MAIL NUMBER (k) is set at "n" (step G196). Then, it is determined whether or not, in a subject area or in a text area of the RECEIVED MAIL(n), there is available a password (identification information) which coincides with a password (Identification information) input in the password area of RAM 3 at step G140 of FIG. 83 (step G197). If there is available a password in coincidence therebetween, since this means that a transmitter of the RECEIVED MAIL(n) has accepted a change of response designating date and time, a response designating date and time of the RECEIVED MAIL(n) which as at first been designated with the response designating date and time is changed to a response designating date and time of a request for change of response mail (step G198). Then, the RECEIVED MAIL(n) is deleted (step G199) and the received mail storage area of RAM 3 is sorted (step G200). The WAITING ADDRESS(k) is also deleted (step G201) and the WAITING MAIL NUMBER(k) is deleted (step G202). Then, the flow is terminated.

At step G196, if the password is not available, since this means that the transmitter of the RECEIVED MAIL(n) has refused the change of response designating date and time, an address of the RECEIVED MAIL(n) is designated as a receiver address of a fixed form mail "B" clearly indicating an emergency contact place (step G203). then the fixed form mail "B" is transmitted (step G204) and it is determined whether or not the transmission has been completed (step G205). If the transmission has not been completed, the transmission processing of step G203 is continued. If the transmission has been completed, the RECEIVED MAIL(n) is deleted (step G199) and the received mail storage area of RAM 3 is sorted (step G200). Then, the WAITING ADDRESS(k) is deleted (step G201) and the WAITING MAIL NUMBER(k) is deleted (step G202). Then the flow is terminated.

As described above, according to the above mentioned seventh embodiment, the terminal of FIG. 1 comprises:

mail receiving means for receiving an electronic mail;

date and time setting means for setting a specific period of time;

reception date and time determining means for determining whether or not the electronic mail is received during the specific period of time by the mail receiving means;

mail determining means for determining whether or not the electronic mail which is determined to be received during the specific period of time by the reception date and time determining means is a response date and time designated mail which designates the response date and time;

response date and time determining means for determining whether or not the response date and time is in the specific period of time when the electronic mail is determined to be the response date and time designated mail by the mail determining means; and mail transmitting means for transmitting a response mail requesting for a change of the response date and time to a different response data and time except the specific period of time when the response date and time which is determined by the response date and time determining means is in the specific period of time.

If an electronic mail which designates a response date and time in a specific period of time is received, a response mail requesting for a change of the response date and time to a different response date and time except the specific period of time is transmitted.

In the above-mentioned seventh embodiment, there is described an electronic mail system in which a program to receive and transmit electronic mails is stored in ROM 2, but such constitutions may be adopted that a program to transmit or receive an electronic mail is stored in such media as a floppy disk, a compact disk and the like and an apparatus such as a personal computer or a word processor for general purpose use, or the like executes the program.

The machine readable storage medium stores a program for electronic mail processing, the program comprising:

(i) step of receiving an electronic mail;

(ii) step of setting a specific period of time;

(iii) step of determining whether or not the electronic mail is received during the specific period of time;

(iv) step of determining whether or not an electronic mail is received during the specific period of time is a response date and time designated mail which designates the response date and time;

(v) step of determining whether or not the response date and time designated by the response date and time designated mail is in the specific period of time; and (vi) step of transmitting a response mail requesting for a change of the response date and time to a different response data and time except the specific period of time when the response date and time is in the specific period of time.

The program is executed by an apparatus such as a personal computer or a word processor for general purpose use, or the like.

Next, the eighth embodiment will be described.

Figure 90:
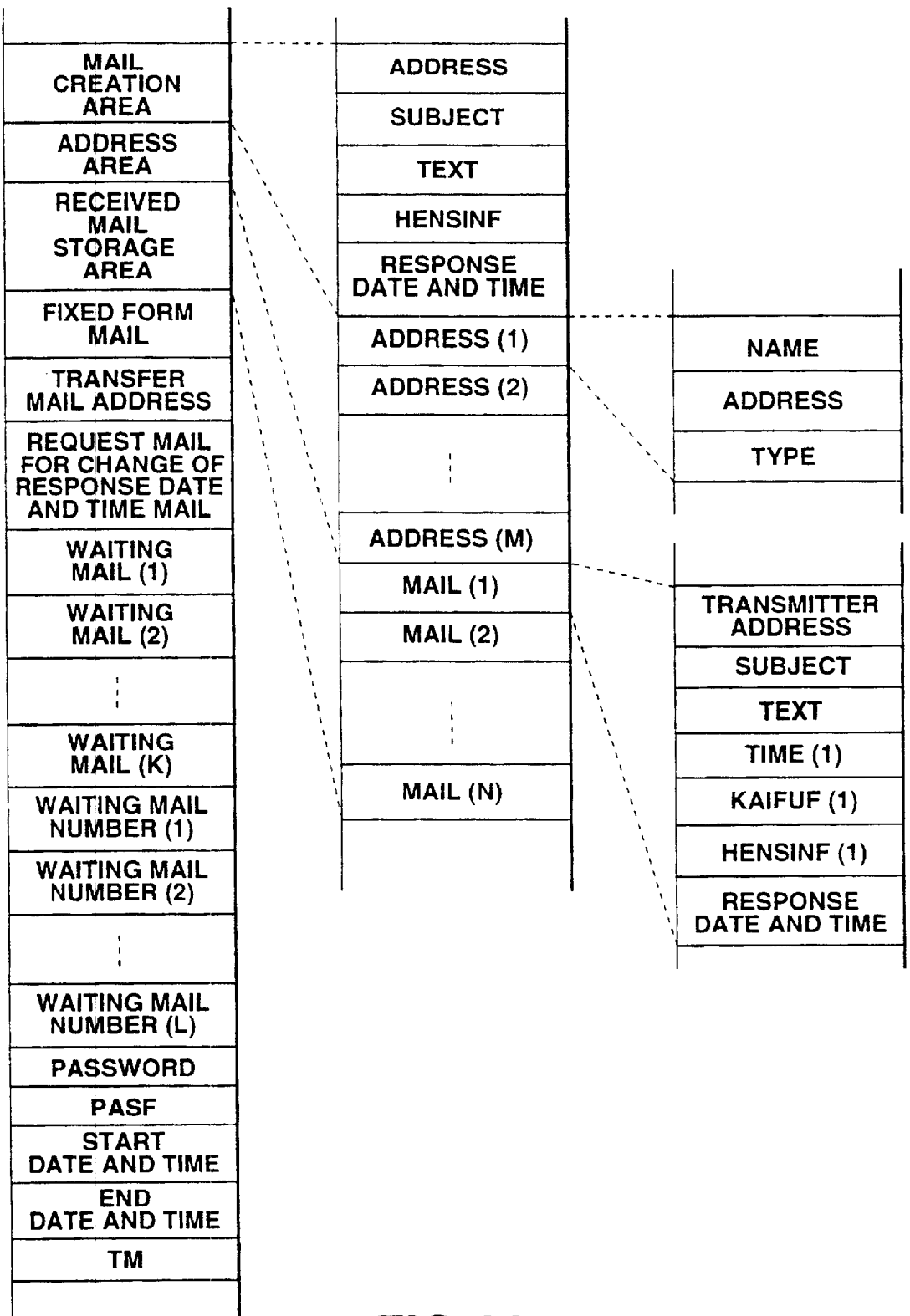
FIG. 90 shows a memory map of an eighth embodiment.

FIG. 90 is a memory map of RAM 3 in the eighth embodiment. As shown in the figure, the following areas are the same as in the seventh embodiment shown in FIG. 68: a mail creation area, an address area, a received mail storage area, and areas of a request for change of response date and time mail, a waiting mail number, a password, a flag PASF, and a start date and time and an end date and time in an absent period. However, a single kind of fixed form mail is available in the eighth embodiment and a fixed form mail is stored in a fixed form mail area. In addition, there are provided an area to store a plurality of WAITING MAIL(1) to WAITING MAIL(L), an area to store a plurality of WAITING MAIL NUMBER(1) to NUMBER(L) and a transfer mail address area for transferring a received mail in an absent period to an address of a portable terminal carried by a receiver on the road. Still in addition, a register "TM" area which is used in creation of a transfer mail.

Then, while operations of the eighth embodiment will be described, the operations are the same as those of the first embodiment only except absence setting processing and timer interrupt processing during reception display processing and therefore, figures and description will be omitted.

Figure 91:
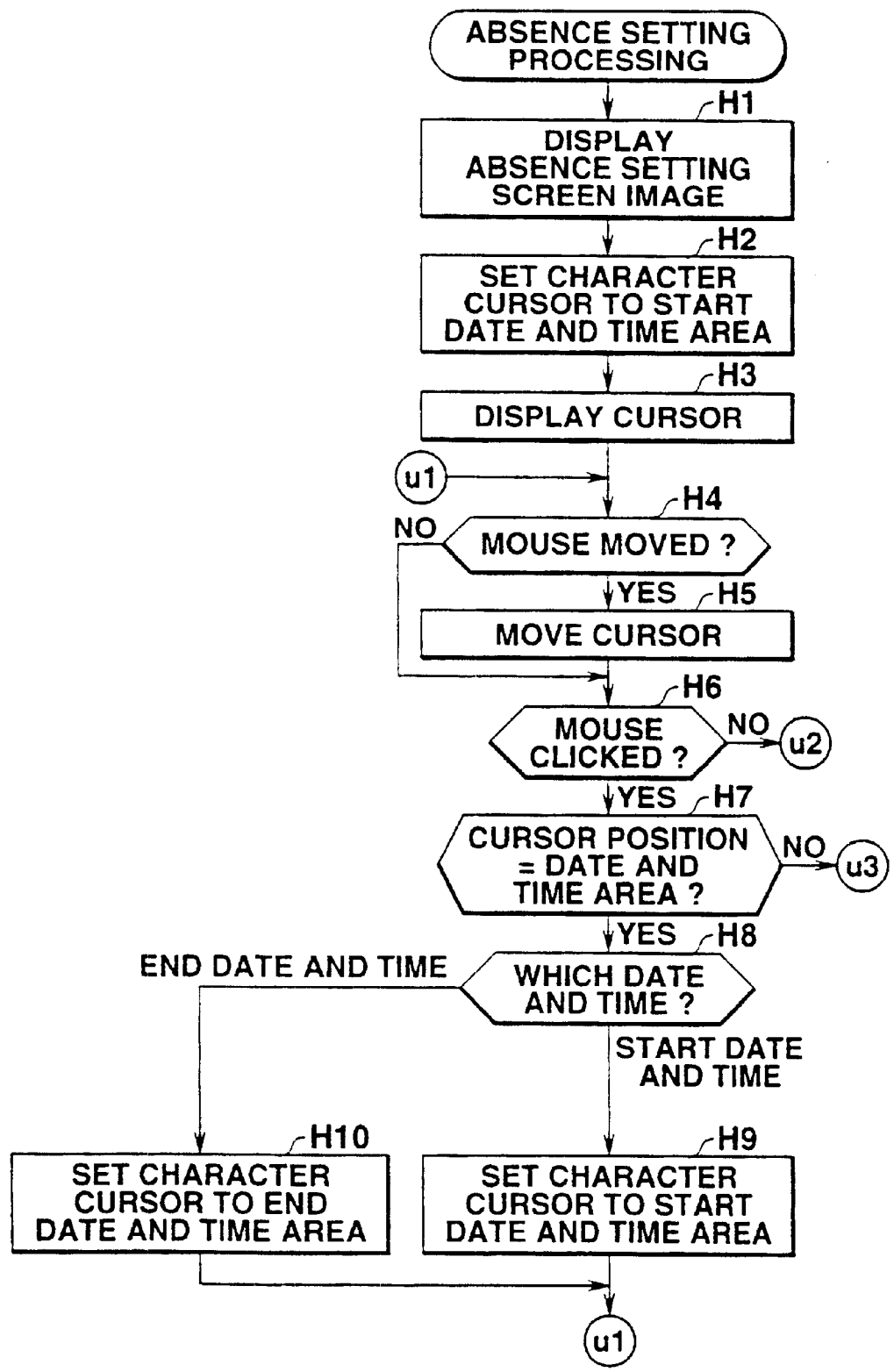
FIG. 91 is a flow chart of absence setting processing of the eighth embodiment.
Figure 92:
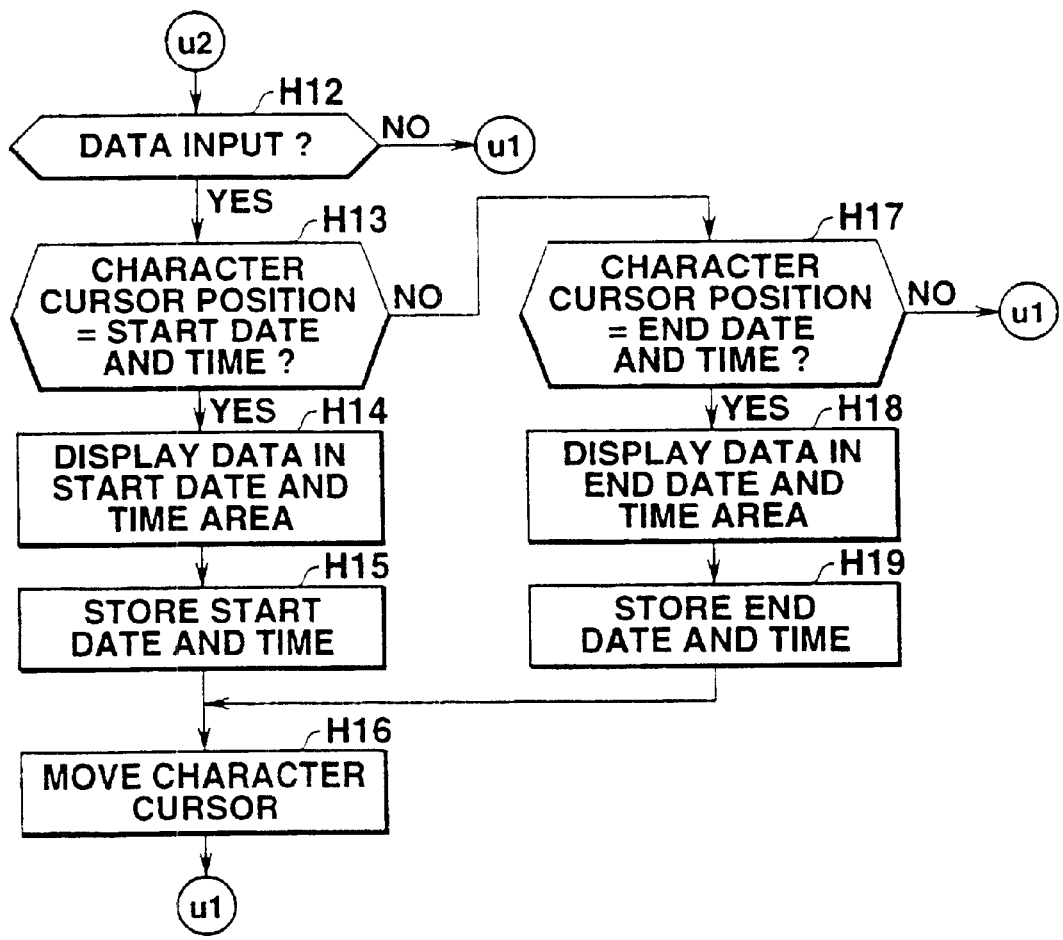
FIG. 92 is a flow chart of the absence setting processing of the eighth embodiment, continued from FIG. 91.
Figure 93:
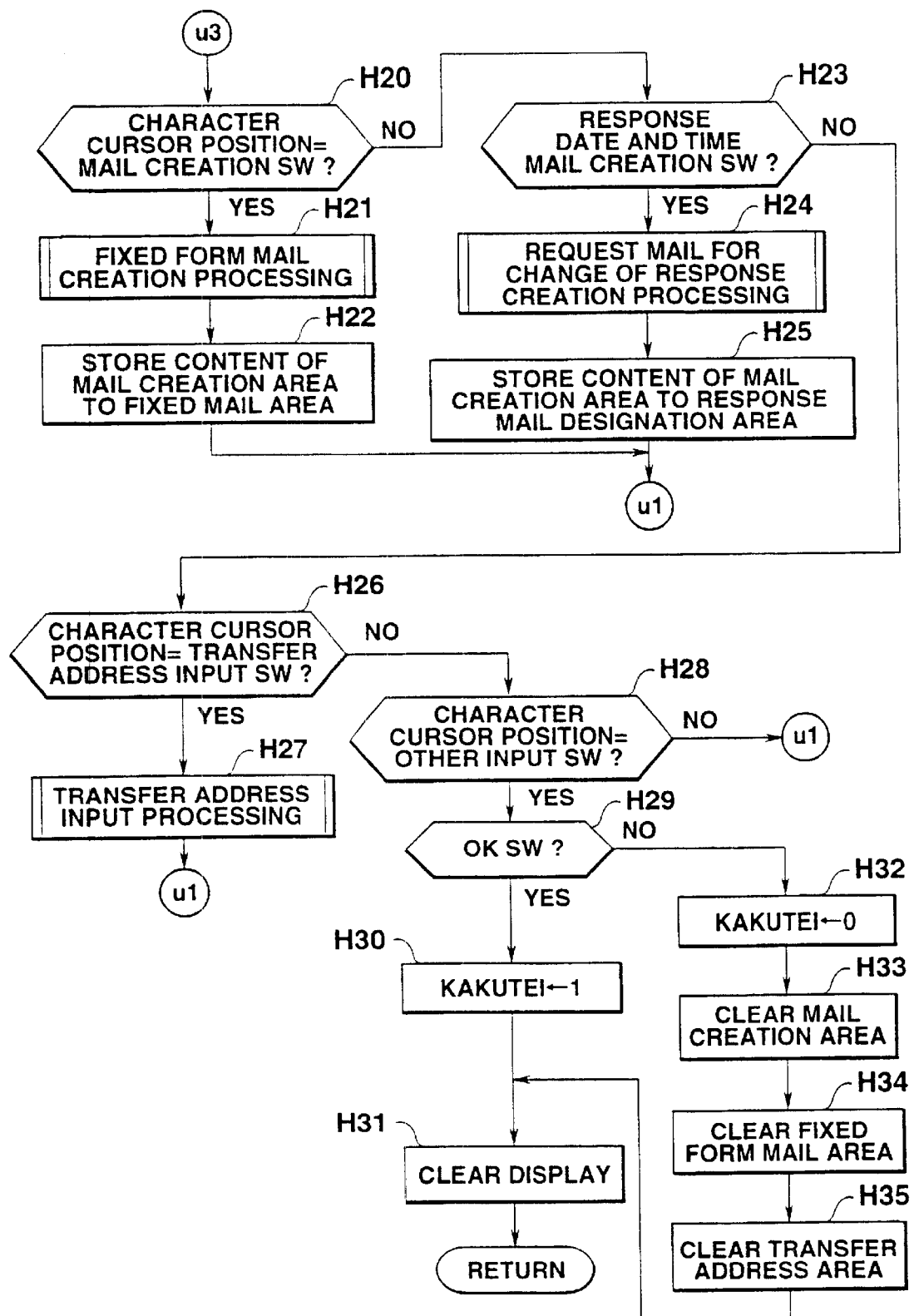
FIG. 93 is a flow chart of the absence setting processing of the eighth embodiment, continued from FIG. 91.

FIGS. 91 to 93 are flows of absence setting processing and FIG. 94 shows an absence setting processing screen image. In FIG. 91, the absence setting processing screen image of FIG. 94 is displayed (step H1) and a character cursor is set at the start date and time area (step H2). Then, a cursor for the mouse 6 is displayed (step H3). Then, it is determined whether or not the mouse 6 has been moved (step H4) and if the mouse 6 has been moved, the cursor is moved in accordance with the movement (step H5). Then, it is determined whether or not the mouse 6 has been clicked (step H6). If the mouse 6 has been clicked, it is determined whether or not a cursor position is in a date and time area (step H7).

If a cursor position is in the date and time area, it is determined which the date and time area is, the start date and time area or the end date and time area (step H8). If the date and time area is the start date and time area, a character cursor is set at the start date and time area (step H9). On the other hand, if a cursor position is in the end date and time area, a character cursor is set at the end date and time area (step H10). After the character cursor position is moved, program flow goes to step H4 and a movement of the mouse 6 is checked.

At step H6, if the mouse 6 has not been clicked, program flow goes to a flow of FIG. 92 and it is determined whether or not data input has been made from the key board 4 (step H12). If the date input has been made, it is determined whether or not a character cursor is in the start date and time area (step H13). If the character cursor position is this position, the data of the start date and time input in the start date and time area are displayed (step H14) and the data of the start date and time are stored in RAM 3 (step H15). Then, the character cursor is moved (step H16).

At step H13, if a character cursor position is not the start date and time position, it is determined whether or not the character cursor position is the end date and time position (step H17). If the character cursor position is this position, the data of the end date and time input in the end date and time area are displayed (step H18) and the data of the end date and time are stored in RAM 3 (step H19). Then, the character cursor is moved (step H16).

After the character cursor is moved at step H16, or if the data input has not been made at step H12, or if the character cursor position is not any one of the start date and time and end date and time positions at steps H13 and H17, program flow goes to step H4 of FIG. 91 and a movement of the mouse 6 is checked.

At step H7 of FIG. 91, if a cursor position is not in the date and time area, program flow goes to a flow of FIG. 93 and processing is executed according to at which icon switch positions of the screen image of FIG. 94 the character cursor position is. It is determined whether or not a cursor position is at a mail creation switch (step H20) and if the cursor position is this position, fixed form mail creation processing is executed (step H21). The fixed form mail creation processing is the same as the flow of the first embodiment shown in FIGS. 20 and 21, and a fixed form mail screen image is also the same as the screen image shown in FIG. 24A. After the fixed form mail creation processing, a content of the mail creation area of RAM 3 is stored in the fixed form mail area (step H22).

At step H20, if a character cursor position is not at the mail creation switch, it is determined whether or not the character cursor position is at a response date and time mail creation switch (step H23). If the character cursor position is this position, a request for change of response mail creation processing is executed (step H24). The request for a change of response mail creation processing is the same as the flow of the seventh embodiment shown in FIGS. 82 to 84. After the request for change of response mail creation processing, a content of the mail creation area of RAM 3 is stored in a response designation area (step H25).

At step H23, if a character cursor position is not at the response date and time mail creation switch, it is determined whether or not the character cursor position is at a transfer address input switch (step H26). If the character cursor position is this position, transfer address input processing is executed (step H27). The transfer address input processing is the same as the flow of the second embodiment shown in FIGS. 31 to 33.

At step H26, if a character cursor position is not at the transfer address input switch, it is determined whether or not the character cursor position is at any one of the other switches (step H28). If the character cursor position is at one of the other switches, it is determined whether or not the one of the other switches is an OK switch (step H29). If the one of the other switches is the OK switch, a definite flag KAKUTEIF is set at "1" (step H30) and a display of the absence setting processing screen image is cleared (step H31). Then, the flow is terminated.

At step H29, if a character cursor position is not at the OK switch, KAKUTEIF is reset at "0" (step H32), the mail creation area of RAM 3 is cleared (step F33), the fixed form mail area is cleared (step H34) and a transfer address area is cleared (step H35) since the character cursor position is at an erase switch. Then, the flow is terminated.

At either step H22 or step H25, after a content of the mail creation area is stored in a corresponding area, or after the transfer address input processing is completed, or at step H28, if a character cursor position is not at any one of the other switches, program flow goes to step H4 of FIG. 91 and a movement of the mouse 6 is checked.

FIGS. 95 to 99 are flows of timer interrupt processing.

Figure 95:
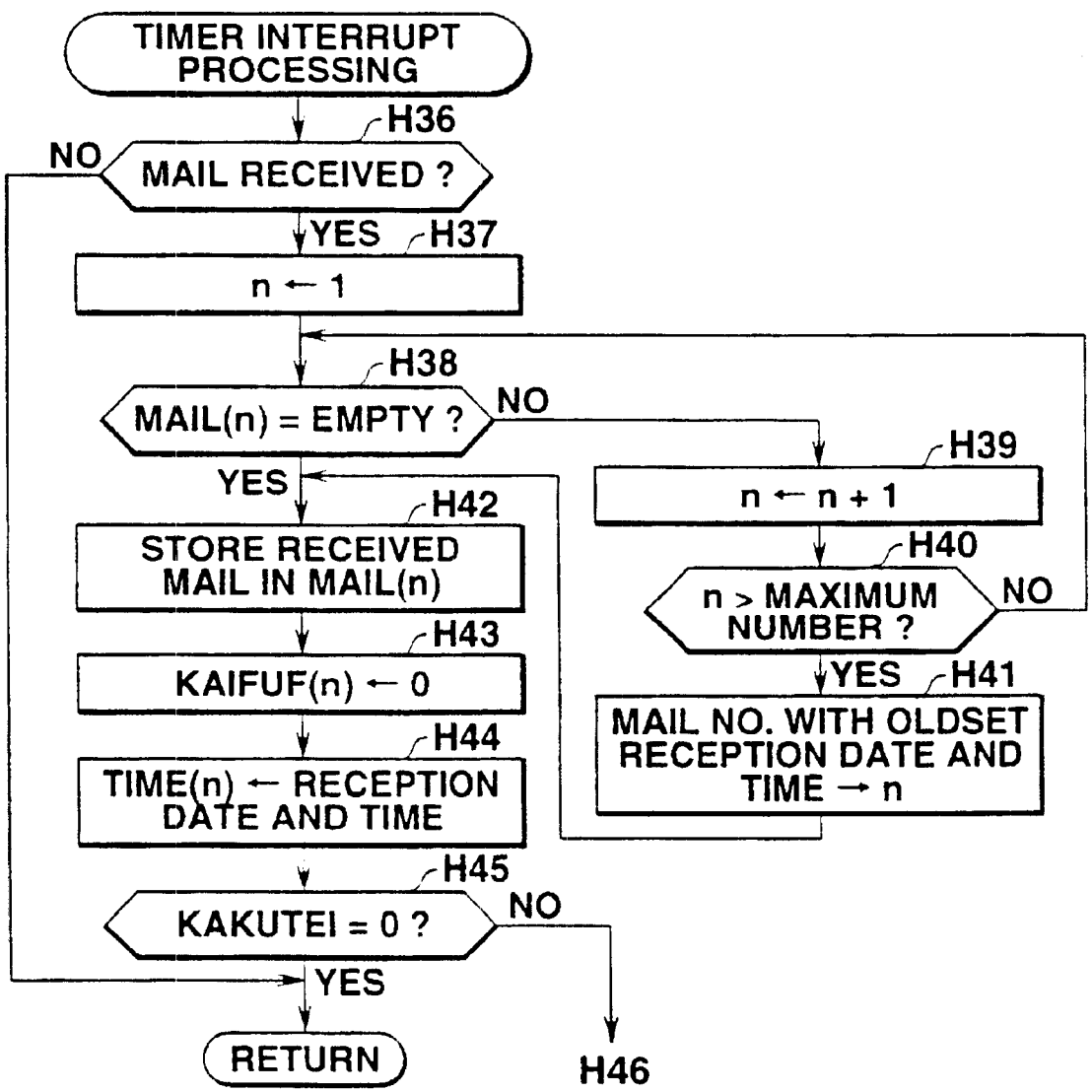
FIG. 95 is a flow chart of timer interrupt processing of the eighth embodiment.

When timer interrupts occur at set intervals, the server 300 shown in FIG. 1 is accessed by CPU 1 of a terminal 100. In FIG. 95, it is determined whether or not a received mail is present in a mail box of the server 300 (step H36). If the received mail is not present, the flow is immediately terminated. If the received mail is present, a pointer "n" indicating the area number of MAIL(1) to MAIL(N) of the received mail storage area of RAM 3 is set at "1" (step F31). Then, it is determined whether or not a RECEIVED MAIL(n) area designated by "n" is empty (step H38).

In other words, if the RECEIVED MAIL(n) area is not empty, "n" is incremented (step H39) and it is determined whether or not "n" exceeds the maximum number (step H40). If "n" has not exceeded the maximum number, program flow goes to step H38 and it is determined whether or not the RECEIVED MAIL(n) area is empty. A loop of steps H38, H39 and H40 is repeated while "n" is incremented to search a RECEIVED MAIL(n) area with an empty space. At step H40, if "n" exceeds the maximum number, that is when none of the RECEIVED MAIL(1) to RECEIVED MAIL(N) of the received mail storage area of RAM 3 is empty, a received mail with the oldest reception data and time is searched and the pointer "n" is set at the mail number (step H41).

If a designated RECEIVED MAIL(n) area is empty at step H38 or if "n" is set at a mail number of the oldest reception date and time at step H41, a received mail fetched from the server 300 is stored in the RECEIVED MAIL(n) area (step H42). Then, an unseal flag KAIFUF(n) is reset at "0" in order to indicate the seal state (step H43) and TIME(n) is set at a reception date and time (step H44). Then, it is determined whether or not the definite flag KAKUTEIF which is set in absence setting processing of FIG. 93 is "0"(step H45).

If the definite flag KAKUTEIF is "0", since an absence setting processing has not been executed, the flow is terminated. If the flag is "1", since the absence setting processing has been executed, program flow goes to a flow of FIG. 96 and it is determined whether or not the reception date and time at which the TIME(n) is set is in an absent period from a start date and time to an end date and time (step H46). In other words, it is determined whether or not a received mail is a received mail received in the absent period. If the received mail has not been received in the absent period, the flow is terminated, but when the received mail receives in the absent period, it is determined whether or not the response flag HENSINF in the received mail storage area of RAM 3 is "1", that is, it is determined whether or not the RECEIVED MAIL(n) is a response designated mail (step H47). If the response flag HENSINF is "1", a pointer "k" is set at "1" (step H48). The pointer "k" is a number of WAITING MAIL(1) to WAITING MAIL(K) of RAM 3 shown in FIG. 90. Then, a WAITING MAIL(k) is retrieved, while "k" is incremented.

In this retrieval, it is determined whether or not a WAITING MAIL(k) coincides with a transmitter address of a RECEIVED MAIL(n) (step H49). If the WAITING MAIL (k) does not coincide with the transmitter address of a RECEIVED MAIL(n), program flow goes to a flow of FIG. 97 and "k" is incremented (step H50) and it is determined whether or not "k" exceeds the maximum number (step H51). If "k" has not exceeded the maximum number, program flow goes to step H49 of FIG. 96 and it is determined whether or not the WAITING MAIL(k) coincides with the transmitter address of the RECEIVED MAIL(n). Then, a loop of steps H49, H50 and H51 is repeated to search the WAITING MAIL(k) in coincidence.

Figure 97:
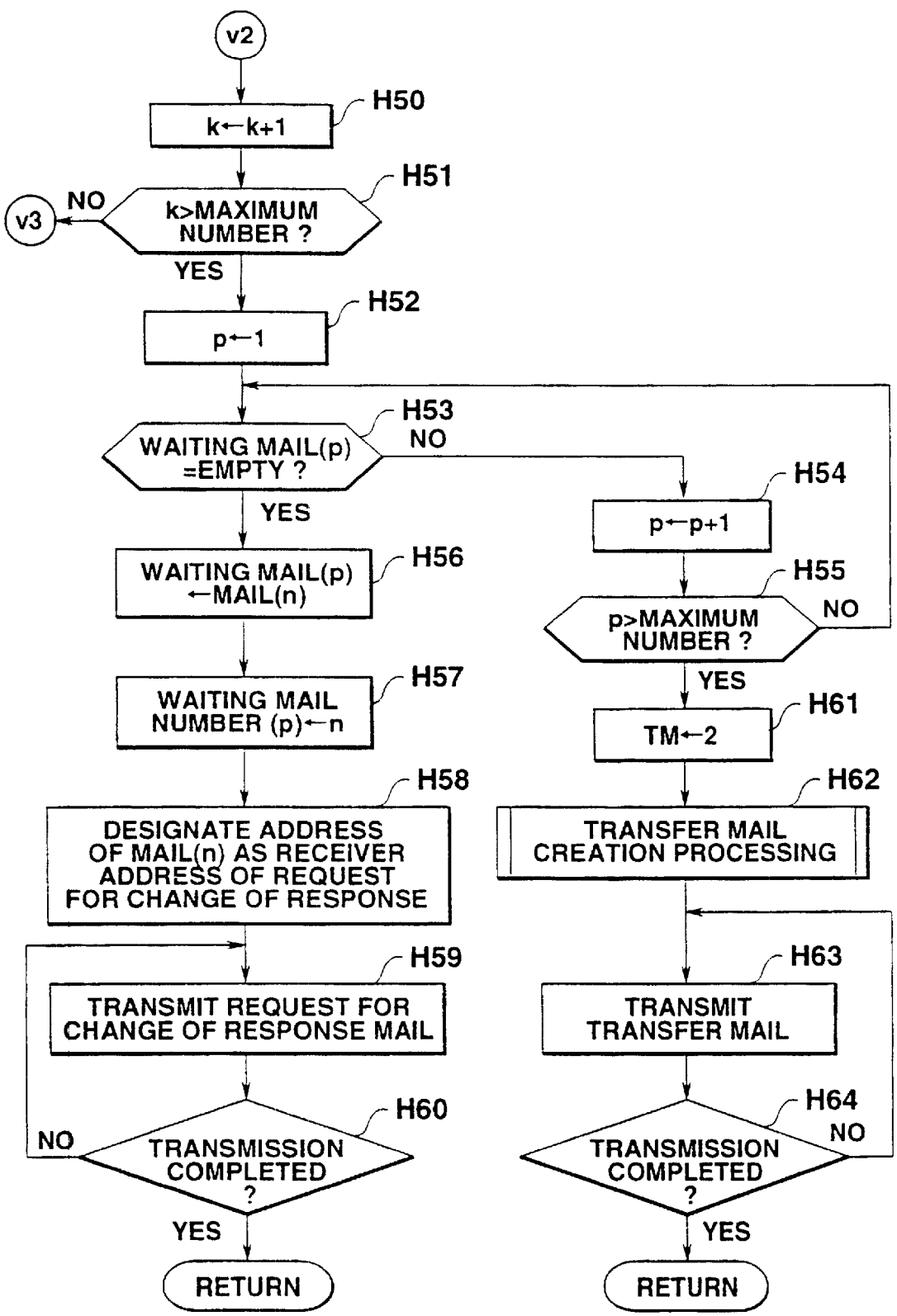
FIG. 97 is a flow chart of the timer interrupt processing of the eighth embodiment, continued from FIG. 96.

At step H51 of FIG. 97, if "k" exceeds the maximum number, that is when no waiting mail in coincidence is available, since the RECEIVED MAIL(n) has not been responded by a response mail, the RECEIVED MAIL(n) and the RECEIVED MAIL NUMNER(n) are not registered in either a waiting mail area or a waiting mail number area of RAM 3 shown in FIG. 90. In this case, a new pointer "p" indicating a waiting mail number is set at "1" (step H52) and it is determined whether or not a WAITING MAIL(p) is empty, while "p" is incremented (step H53). If a WAITING MAIL(p) is not empty, "p" is incremented (step H54) and it is determined whether or not "p" exceeds the maximum number (step H55). If "p" has not exceeded the maximum number, program goes to step H53 and it is determined whether a WAITING ADDRESS(p) area is empty. Then, a loop of steps H53, H54 and H55 is repeated to search a WAITING ADDRESS(p) with an empty space.

At step H53, if a WAITING ADDRESS(p) with an empty area is available, the WAITING MAIL(p) is set at a RECEIVED MAIL(n) (step H56). Then, a WAITING MAIL NUMBER(p) corresponding to the WAITING MAIL(p) is set at "n" in a waiting mail number area of RAM 3 (step H57). Then, an address of the received mail is designated as a receiver address of a request for change of response mail (step H58). Thereafter, the same mail as the request for change of response mail in the seventh embodiment shown in FIG. 85 is transmitted (step H59). Then, it is determined whether or not the transmission has been completed (step H60) and if the transmission has not been completed, the transmission processing of step H59 is continued and if the transmission has been completed, the flow is terminated.

At step H55, if "p" exceeds the maximum number, that is when none of WAITING ADDRESS(1) to WAITING ADDRESS(M) is empty, the register "TM" is set at 2 (step H61) and transfer mail creation processing is executed (step H62). Then, a transfer mail is transmitted (step H63) and it is determined whether or not the transmission has been completed (step H64). If the transmission has not been completed, the transmission processing of step H63 is continued. If the transmission has been completed, the flow is terminated.

Figure 96:
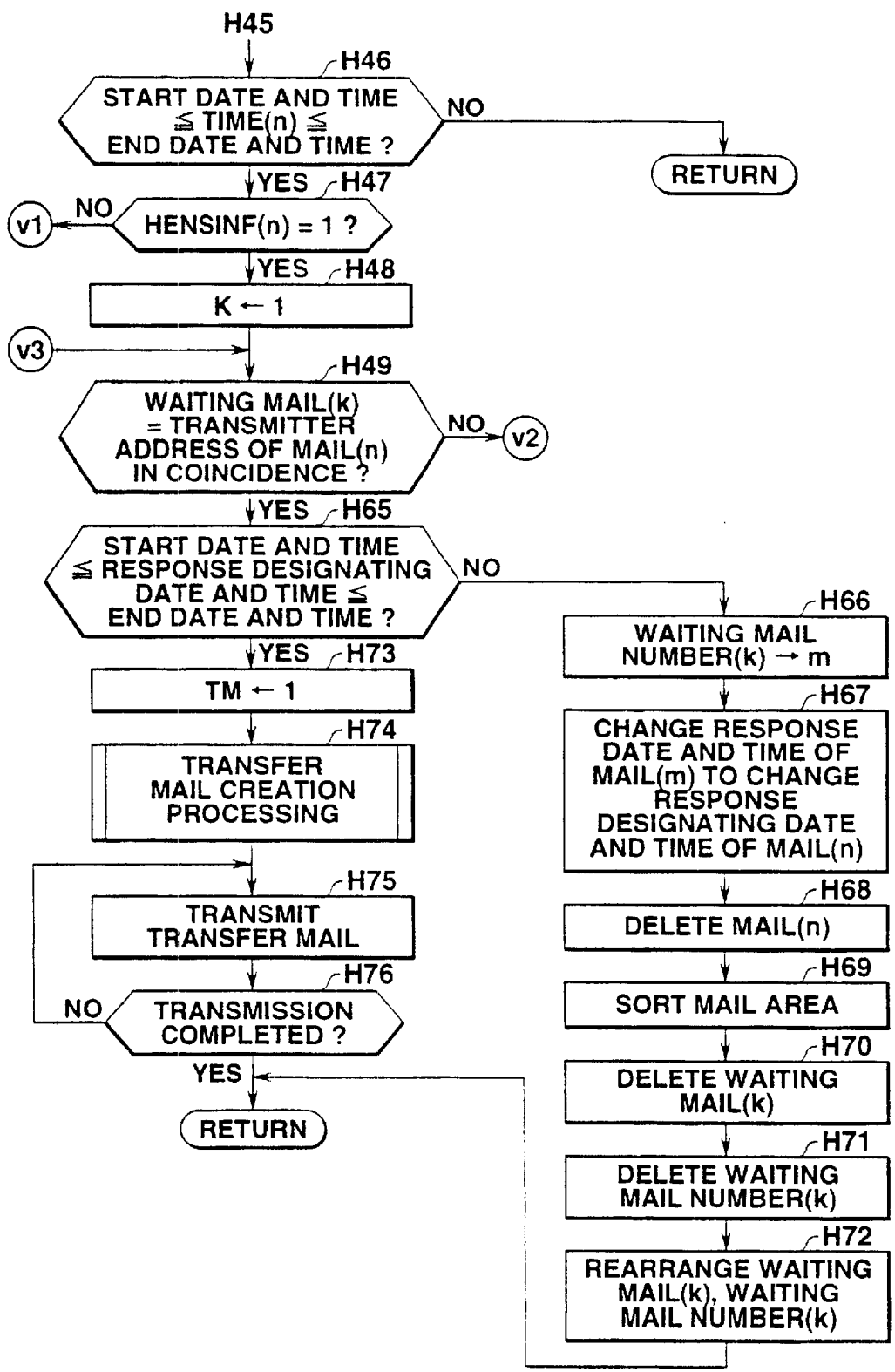
FIG. 96 is a flow chart of the timer interrupt processing of the eighth embodiment, continued from FIG. 95.

At step H49 of FIG. 96, if a WAITING MAIL(k) and a transmitter address of RECEIVED MAIL(n) coincide with each other, since the RECEIVED MAIL(n) is a second response date and time designated mail from the same transmitter who has responded to a response mail responding to the previous received mail, a change of the response date and time is conceivable. Therefore, it is determined whether or not a response designating date and time of the RECEIVED MAIL(n) is in a period between a start date and time and an end date and time in the absence (step H65). If the response date and time is not in the period, since the response date and time has been changed, a pointer "m" is set at a WAITING MAIL NUMBER(k) (step H66) and the response date and time of the RECEIVED MAIL(m) which is received in the first place is changed to a response date and time of the second RECEIVED MAIL(n) (step H67). Then, the RECEIVED MAIL(n) is deleted from the received mail storage area of RAM 3 (step H68) and a received mail area is sorted (step H69). Then, the WAITING MAIL(k) is deleted (step H70), the WAITING MAIL NUMBER(k) is deleted (step H71) and the waiting mail and the waiting mail number areas are rearranged Then, the flow is terminated.

At step H65, if the response designating date and time of the second RECEIVED MAIL(n) is also in the period between a start date and time and an end date and time in the absence, this means that a transmitter of the second RECEIVED MAIL(n) refuses a change of the response date and time to a date and time except the period. In this case, the register "TM" is set at "1" (step H73) and transfer mail creation processing is executed (step H74). The transfer mail creation processing is further described later. Then, a transfer mail is transmitted (step H75). Then, it is determined whether or not the transmission has been completed (step H76) and if the transmission has not been completed, the transmission processing of step H75 is continued. If the transmission has been completed, the flow is terminated.

At step H47 of FIG. 96, if HENSINF(n) is "0", a RECEIVED MAIL(n) is an ordinary MAIL(n) which does not designate a date and time or a received mail responding to the same request for change of response as that in the seventh embodiment shown in FIG. 85 which has been transmitted responding to the received date and time designated mail. In this case, program flow goes to a flow of FIG. 98 and a point "k" is set at "1" (step H77). Then, it is determined whether or not a WAITING MAIL(k) and a transmitter address of a RECEIVED MAIL(n) coincide with each other while "k" is incremented (step H78). If there is no coincidence therebetween, "k" is incremented (step H79) and it is determined whether or not "k" exceeds the maximum number (step H80). If "k" has not exceeded the maximum number, program goes to step H78 and it is determined whether or not a WAITING MAIL(k) and a transmitter address of a RECEIVED MAIL(n) coincide with each other. Then, a loop of steps H78, H79 and H80 is repeated to search an address in coincidence.

At step H80, if "k" exceeds the maximum number, that is when there is no address in coincidence therebetween, the RECEIVED MAIL(n) is an ordinary MAIL(n). In this case, a transmitter address of the RECEIVED MAIL(n) is designated as a receiver address of a fixed form mail "A" (step H81). In other words, the transmitter address is designated as a receiver address of a fixed form mail "A" which clearly indicates the state of absence shown in FIG. 45A. Then, the fixed form mail "A" is transmitted (step H82) and it is determined whether or not the transmission has been completed (step H83). If the transmission has not been completed, the transmission processing of step H82 is continued. If the transmission has been completed, the flow is terminated.

At step H78, if there is available a WAITING MAIL(k) which coincides with a transmitter address of a RECEIVED MAIL(n), the RECEIVED MAIL(n) is a received mail which responds to a request for change of response mail. In this case, a WAITING MAIL NUMBER(k) corresponding to the WAITING MAIL(k) is set at "n" (step H84). Then, it is determined whether or not, in a subject area or a text area of a RECEIVED MAIL(n), there is available a password (identification information) corresponding to a password (identification information) input in the password area of RAM 3 (step H85). If there is available a password in coincidence, since this means that a transmitter of the RECEIVED MAIL(n) accepts a change of a response designating date and time, the response date and time of the RECEIVED MAIL(n) which was designated in the first place is changed to a response designating date and time of the request for change of date and time mail (step H86). Then, the RECEIVED MAIL(n) is deleted (step H87) and the received mail storage area of RAM 3 is sorted (step H88). Then, the WAITING MAIL(k) is deleted (step H89) and a WAITING MAIL NUMBER(k) is deleted (step H90). Then, the flow is terminated.

At step H85, if a password is not available, this means that a transmitter refuses a change of response designating date and time. In this case, the register "TM" is set at 3 (step H91) and transfer mail creation processing is executed (step H92). Then, a transfer mail is transmitted (step H93) and it is determined whether or not the transmission has been completed (step H94). If the transmission has not been completed, the transmission processing of step H93 is continued. If the transmission has been completed, the RECEIVED MAIL(n) is deleted (step H87) and the received mail storage area of RAM 3 is sorted (step H88). The WAITING MAIL(k) is deleted (step H89) and the WAITING MAIL NUMBER(k) is deleted (step H90). Then the flow is terminated.

Figure 98:
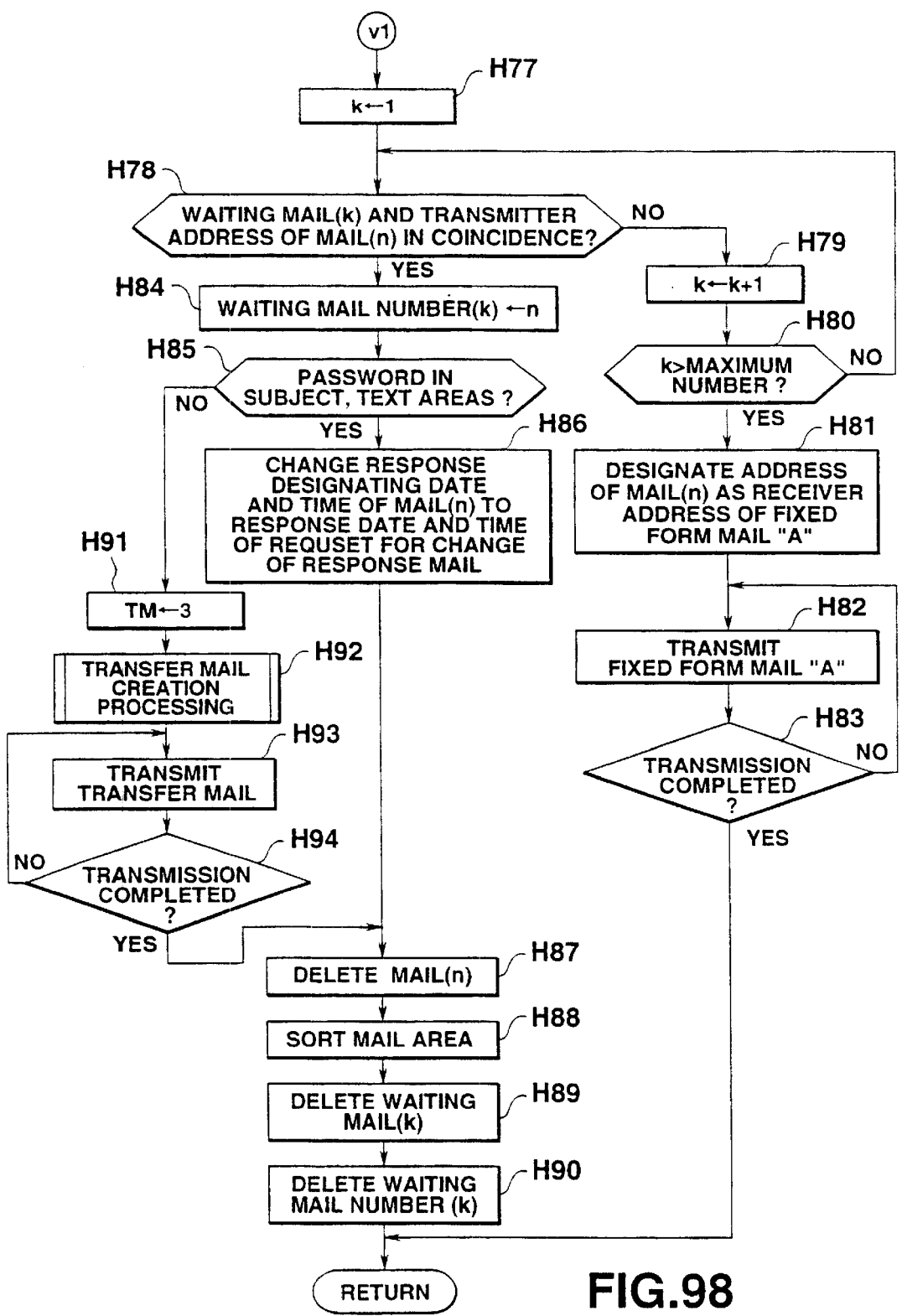
FIG. 98 is a flow chart of the timer interrupt processing of the eighth embodiment, continued from FIG. 96.
Figure 99:
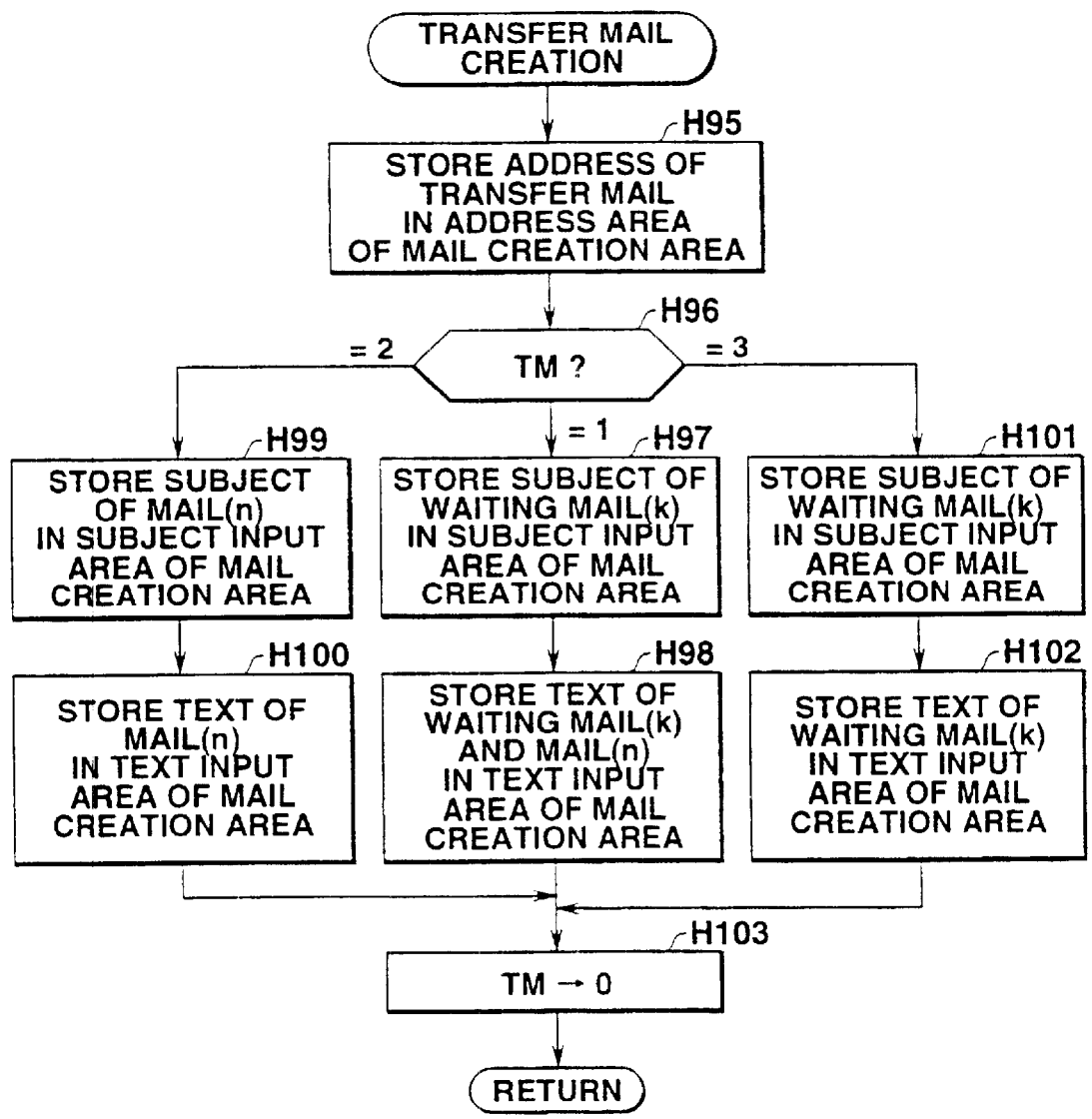
FIG. 99 is a flow chart of transfer mail processing of the eighth embodiment.

FIG. 99 is a flow of transfer mail creation processing at step H74 of FIG. 96, at step H62 of FIG. 97 and at step H92 of FIG. 98. At first, a transfer mail address is stored in an address area of the mail creation area of RAM 3 (step H95). Then a value of TM is determined (step H96).

If a value of TM is 1, a subject of a WAITING MAIL(k) is stored in a subject area of the mail creation area (step H97) and texts of the WAITING MAIL(k) and a RECEIVED MAIL(n) are stored in a text input area of the mail creation area (step H98). If a value of TM is 2, the subject of the RECEIVED MAIL(n) is stored in the subject area of the mail creation area (step H99) and the text of the RECEIVED MAIL(n) is stored in a text input area of the of the mail creation area (step H100). If a value of TM is 3, the subject of the WAITING MAIL(k) is stored in the subject input area of the mail creation area (step H101) and the text of the WAITING MAIL(k) is stored in a text input area of the mail creation area (step H102).

At steps H98, H100 and H102, after the text is stored, a value of TM is set at "0" (step H103). Then, the flow is terminated.

As described above, according to the above mentioned eighth embodiment, the terminal 100 of FIG. 1 comprises:

mail receiving means for receiving an electronic mail;

date and time setting means for setting a specific period of time;

reception date and time determining means for determining whether or not the electronic mail is received during the specific period of time by the mail receiving means;

mail determining means for determining whether or not the electronic mail which is determined to be received during the specific period of time by the reception date and time determining means is a response date and time designated mail which designates the response date and time;

response date and time determining means for determining whether or not the response date and time is in the specific period of time when the electronic mail is determined to be the response date and time designated mail by the mail determining means;

mail transmitting means for transmitting a request for a change mail requesting for a change in the response date and time to a different response data and time except the specific period of time when the response date and time which is determined by the response date and time determining means is in the specific period of time;

date and time changing means for changing the response date and time of the response date and time designated mail when the mail receiving means receives a response mail which indicates acceptance of the request for change after the request for change mail is transmitted by the mail transmitting means; and mail transfer means for transferring the response date and time designated mail to a predetermined address when the mail receiving means receives a response mail which refuses the request for change after the request for change mail is transmitted by the mail transmitting means.

If a response date and time designated mail which designates the response date and time had been received during the specific period of time, and if there is received a response mail which indicates acceptance of a request for change of the response date and time to a different response date and time except a specific period of time after the request for change mail requesting for the change of the response date and time is transmitted, the response date and time is changed to the different date and time or if there is received a response mail which refuses a request for change of the response date and time to a different response date and time except a specific period of time after a request for change mail requesting for the change of the response date and time is transmitted, the response date and time designated mail is transmitted to a designated address.

In the above-mentioned eighth embodiment, there is described an electronic mail system in which a program to receive and transmit electronic mails is stored in ROM 2, but such constitutions may be adopted that a program to transmit or receive an electronic mail is stored in such media as a floppy disk, a compact disk and the like and an apparatus such as a personal computer or a word processor for general purpose use, or the like executes the program.

The machine readable storage medium stores a program for electronic mail processing, the program comprising:

(i) step of receiving an electronic mail;

(ii) step of setting a specific period of time;

(iii) step of determining whether or not the electronic mail is received during the specific period of time by the step (i);

(iv) step of determining whether or not the electronic mail which is determined to be received during the specific period of time by the step (iii) is a response date and time designated mail which designates the response date and time;

(v) step of determining whether or not the response date and time is in the specific period of time when the electronic mail is determined to be the response date and time designated mail by the step (iv);

(vi) step of transmitting a request for change mail requesting for a change in the response date and time to a different response data and time except the specific period of time when the response date and time determined by the step (v) is in the specific period of time;

step (vii) of changing the response date and time of the response date and time designated mail when the step (i) receives a response mail which indicates acceptance of the request for a change after the request for change mail is transmitted by the step (vi); and step (viii) of transferring the response date and time designated mail to a predetermined address when the step (i) receives a response mail which refuses the request for change after the request for change mail is transmitted by the step (vi).

The program is executed by an apparatus such as a personal computer or a word processor for general purpose use, or the like.

Next, the ninth embodiment will be described.

Figure 100:
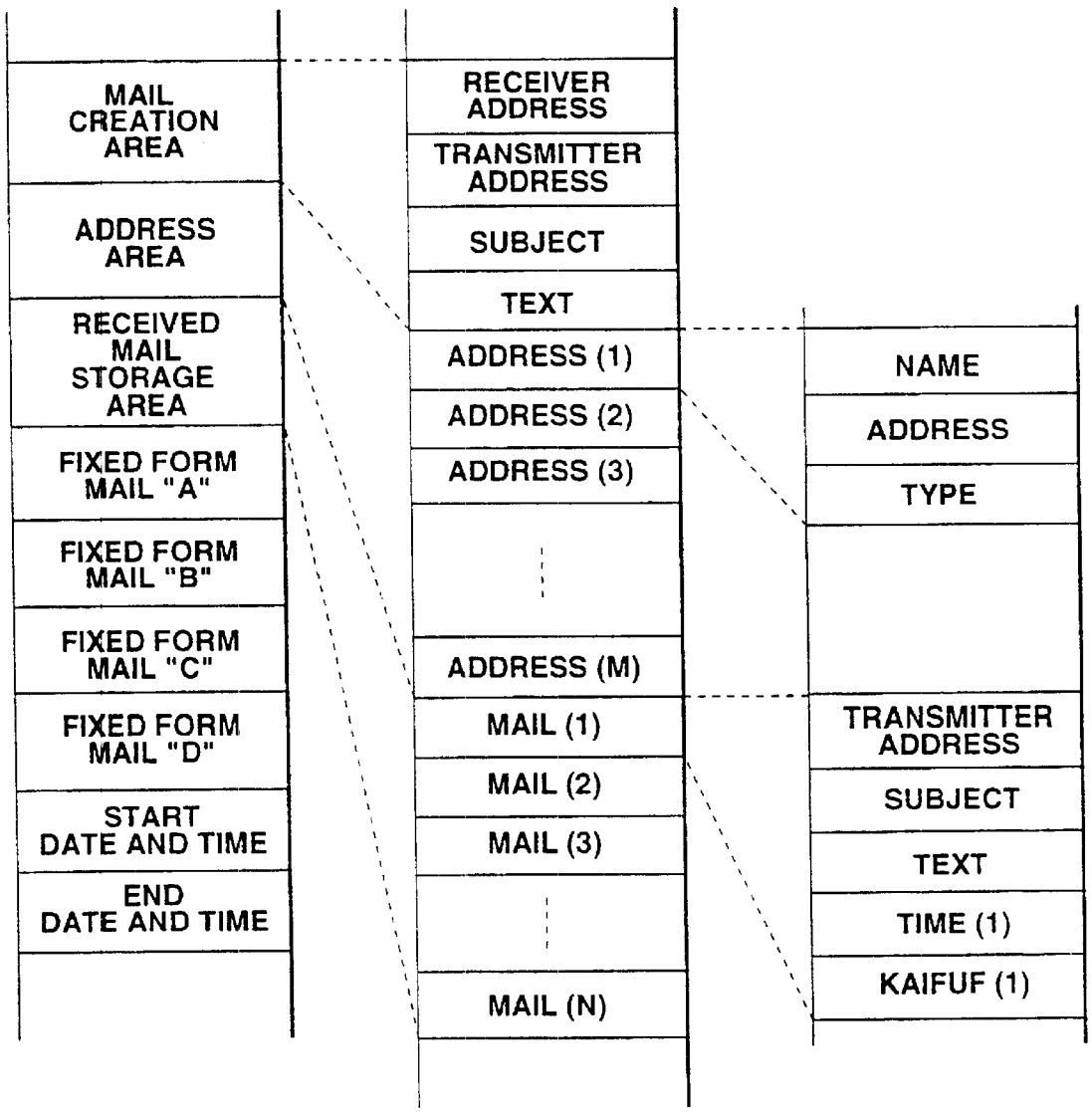
FIG. 100 shows a memory map of a ninth embodiment.

FIG. 100 is a memory map of RAM 3 in the ninth embodiment. As shown in the figure, the followings are the same as those of the first embodiments or the like: a mail creation area, an address area, a received mail storage area, and a start date and time and an end date and time in an absent setting period. In the ninth embodiment, four kinds of fixed form mails, that is fixed form mails "A", "B", "C" and "D", are used and stored in respective areas.

Figure 101A:
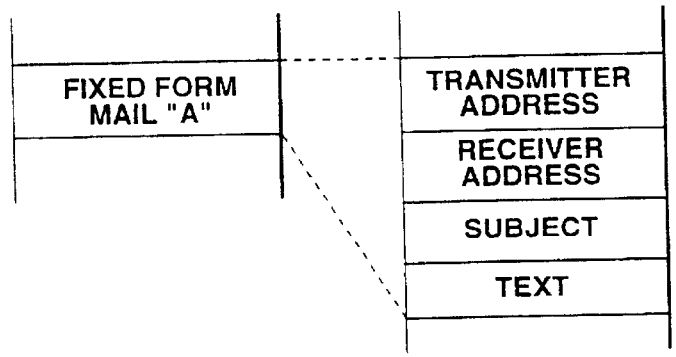
FIG. 101A and FIG. 101B show memory maps of fixed form mail "A" and fixed form mail "B" of the ninth embodiment.
Figure 101B:
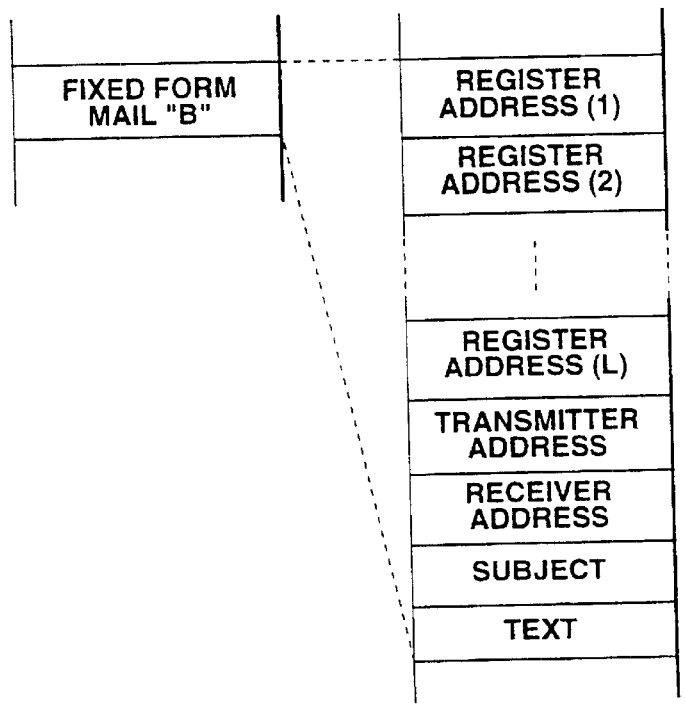

The data of the fixed form mail "A" area, as shown in FIG. 101A, comprises a transmitter address, a receiver address, a subject and a text. The data of the fixed mail form "B" area, as shown in FIG. 101B, comprises a plurality of REGISTERED ADDRESS(1) to REGISTERED ADDRESS(L), a transmitter address, a receiver address, a subject and a text. Each of the REGISTERED ADDRESS(1) to REGISTERED ADDRESS(L) comprises data name, address and type.

Figure 102:
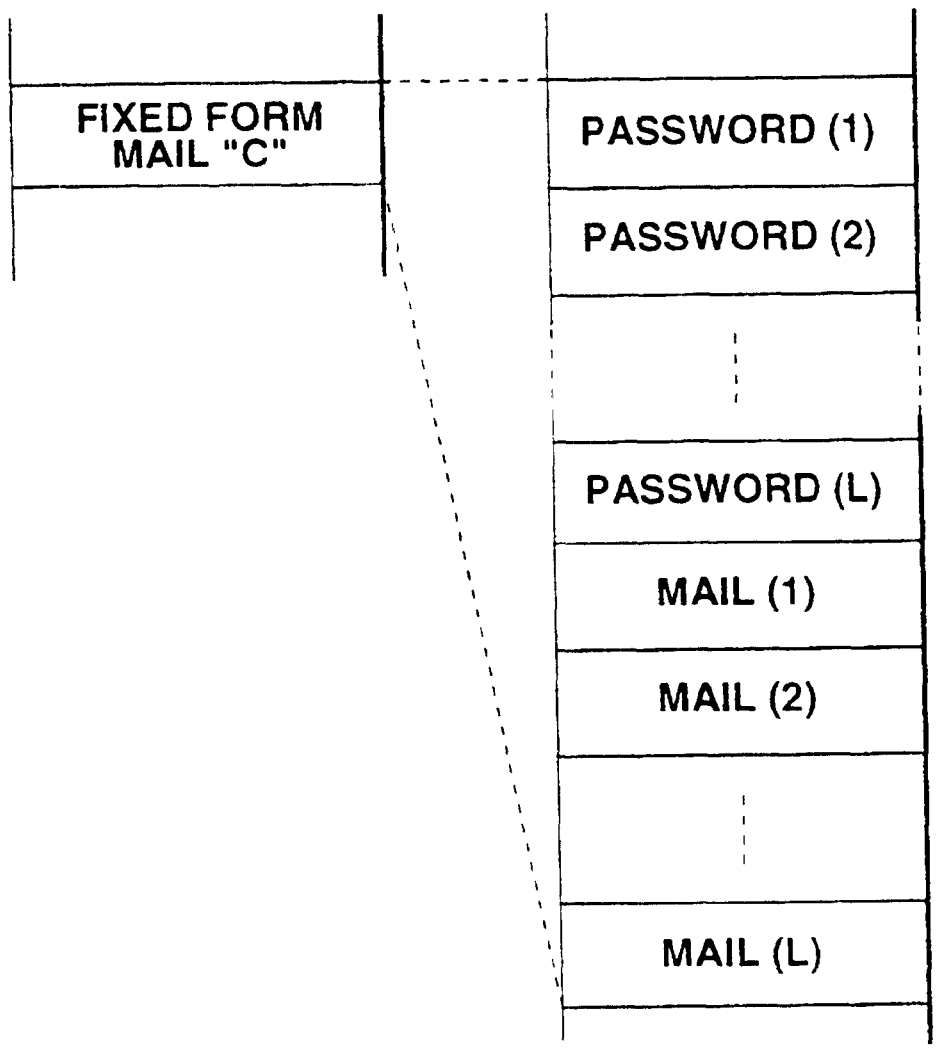
FIG. 102 shows a memory map of a fixed form mail "C" of the ninth embodiment.
Figure 103:
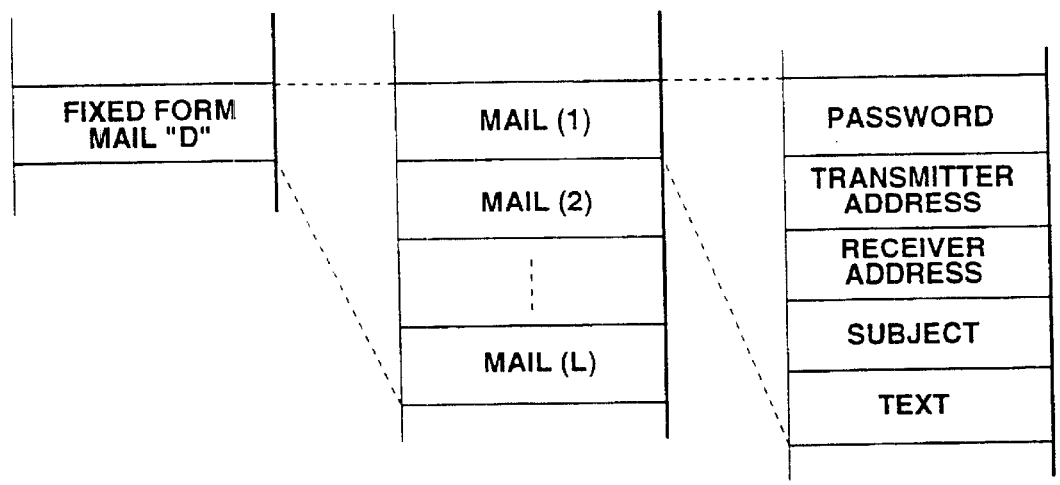
FIG. 103 shows a memory map of a fixed form mail "D" of the ninth embodiment.

The data of the fixed form mail "C" area, as shown in FIG. 102, comprises a plurality of PASSWORD(1) to PASSWORD(L) and MAIL(1) to MAIL(L) corresponding to the PASSWORD(1) to PASSWORD(L). Each of the MAIL(1) to MAIL(L) comprises a transmitter address, a receiver address, a subject and a text. The data of the fixed form mail "D" area, as shown in FIG. 103, comprises MAIL(1) to MAIL(L) and each of the mail data comprises a password, a transmitter address, a receiver address a subject and a text.

The fixed form mails "A" to "D" are used as a mail responding to the transmitter as an absence notice in an absent period. In other words, if a mail is received when a terminal 100 in the state of absence is set, attributes of the received mail (for example, a transmitter address, or a password) are considered to select one of the four kinds of fixed form mails "A" to "D" as a response mail which responds to what is to be responded and a selected fixed form mail is transmitted to the transmitter. Thereby, an absence notice corresponding to a content of the received mail can automatically be transmitted. The selection of a fixed form mail is described later.

Then, operations of the ninth embodiment is described. In reception display processing as a main flow, since a mail display processing, a mail creation processing and an address input processing are respectively the same as those of the first embodiment or the like, figures and description are omitted. In the ninth embodiment, absence setting processing and timer interrupt processing (reception processing) in the reception display processing are different from the other embodiments.

Figure 104:
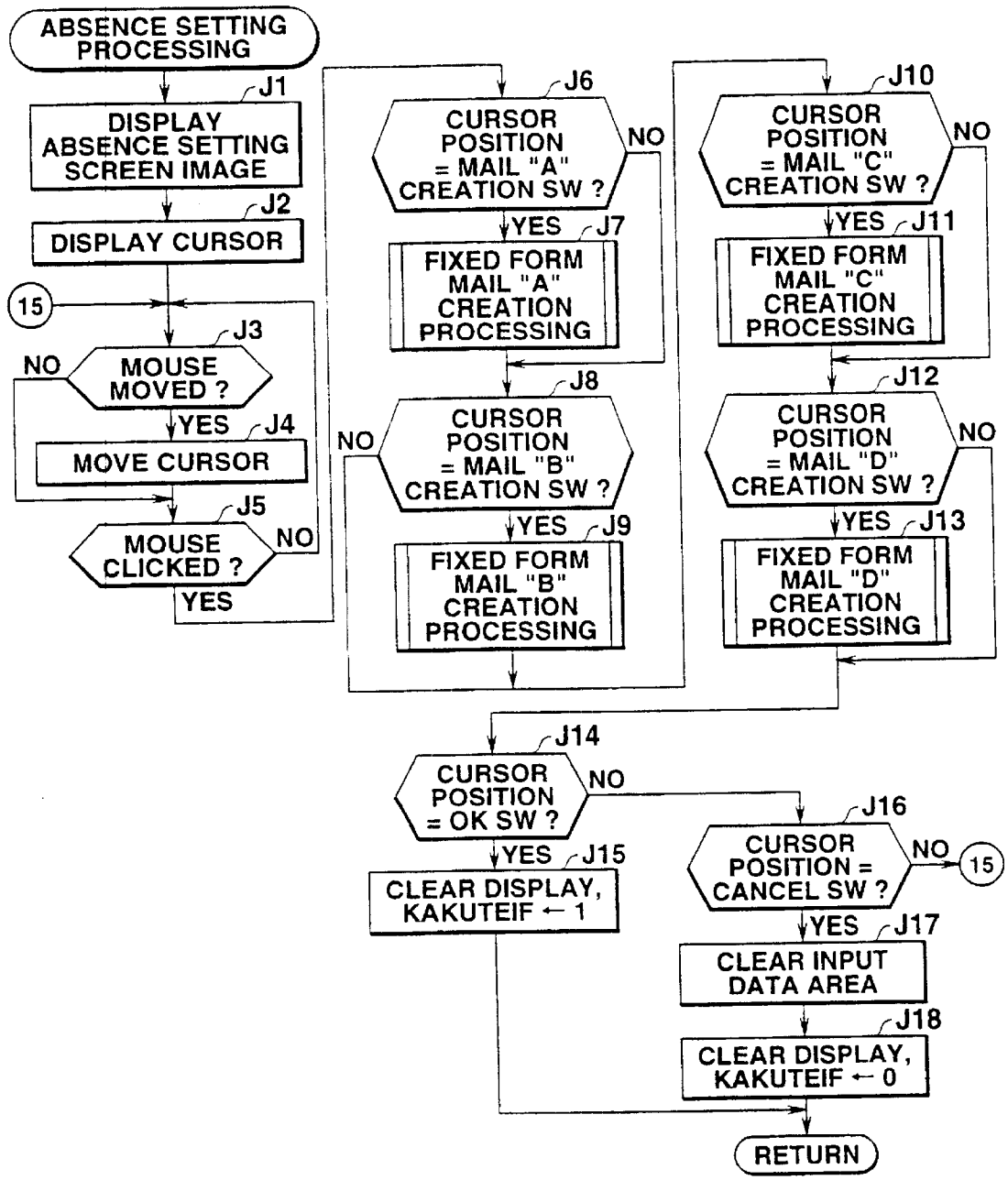
FIG. 104 is a flow chart of absence setting processing of the ninth embodiment.
Figure 105:
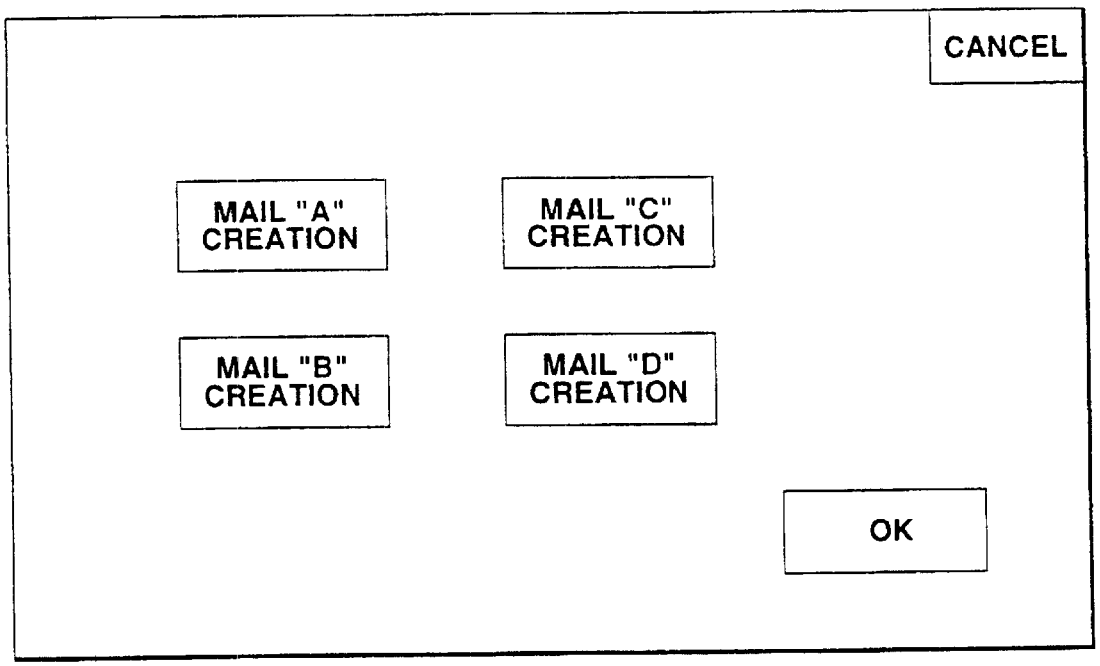
FIG. 105 shows an absence setting processing screen image of the ninth embodiment.

FIG. 104 is a flow of the absence setting processing. At first, at step J1, a absence setting screen image is displayed in the display section 5. The absence setting screen image, as shown in FIG. 105, comprises MAIL "A" to MAIL "D" creation switches each of which designates a kind of an absence notice, an OK switch which is clicked when the designation is confirmed and a cancel switch which is clicked when the designation is suspended.

The mail "A" creation switch is clicked when a fixed form mail is created under conditions that attributes of the received mail are not designated and a fixed form mails "A" (described later) to be transmitted in response to all received mails arrived in the state of absence are prepared. The mail "B" creation switch is clicked when a fixed form mail "B" (described later) to be transmitted in response to a designated address when a mail from a designated address is received in the state of absence is created.

The mail "C" creation switch is clicked when a fixed form mail "C" to be transmitted in response when a mail including a designated password is received in the state of absence is created. The mail "D" creation switch is clicked when a fixed form mail "D" (described later) to be transmitted in response only when a mail, which is a mail from a designated address, and which includes the designated password, is received in the state of absence is created.

After such an absence setting screen image is displayed, CPU 1 advances program flow to step J2 for processing and displays a cursor corresponding to the mouse 6. Then at steps J3 and J4, the cursor is moved and displayed in correspondence to a pointing operation of the mouse 6 and at step J5 it is determined whether or not the mouse has been clicked. Then when the mouse has been clicked, a determination result is YES, program flow goes to step J6 and to the following steps and processing is executed in accordance with a position at which clicking has done. The processings are described case by case.

If the mail "A" creation switch has been clicked, a determination result at step J6 is YES, program flow goes to next step J7 for another processing and a fixed form mail "A" creation processing routine described later is executed.

If the mail "B" creation switch has been clicked, program flow goes to step J8 through step J6 and when a determination result here is YES, program flow goes to step J9 for another processing and a fixed form mail "B" creation routine described later is executed.

If the mail "C" creation switch has been clicked, program flow goes to step J10 through steps J6 and J8 and when a determination result here is YES, program flow goes to step J11 for another processing and a fixed form mail "C" creation routine described later is executed.

If the mail "D" creation switch has been clicked, program flow goes to step J12 through steps J6, J8, and J10 and when a determination result here is YES, program flow goes to step J13 for another processing and a fixed form mail "D" creation routine described later is executed.

If the OK switch has been clicked for confirmation under condition where one of the above mentioned mail creation switches had been clicked and a kind of absence notice to be prepared had been designated and when a determination result at step J14 is YES, program flow goes to step J15 for another processing and not only is a screen image display of FIG. 105 is cleared but the flag KAKUTEIF is set at "1" there.

Thereby, the terminal 100 in the state of absence is set. Then, the routine is completed and program flow is returned to processing of the reception display processing routine.

If the cancel switch has been clicked in order to suspend absence setting, a determination result at step J16 is YES and program flow goes to step J17 for another processing and an input data area is cleared. The input data is data which is temporarily stored in a temporary register in correspondence to clicking at one of the above mentioned mail creation switches, that is indicates data which expresses a kind of absence notice. Therefore, data which expresses a kind of an absence notice, and which is temporarily stored in the temporary register are cleared in correspondence to the clicking of the cancel switch.

Thereafter, program flow goes to step J18 and not only is an absence setting screen image display is cleared but the flag KAKUTEIF is reset and thereafter, the routine is completed and program flow is returned to processing of the above mentioned reception display processing routine.

Next, operations of fixed form mail "A" creation processing are described.

Figure 106:
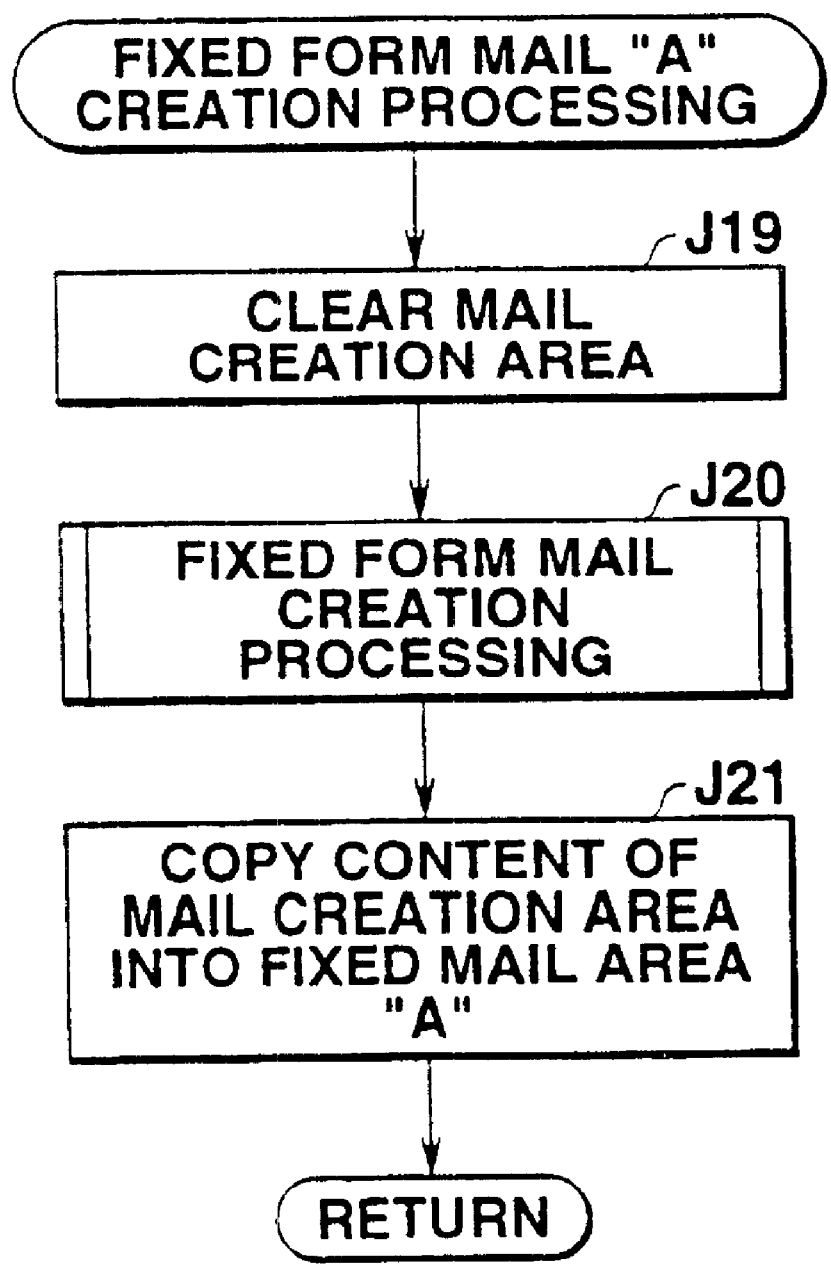
FIG. 106 is a flow chart of fixed form mail "A" creation processing of the ninth embodiment.

The operation of fixed form mail "A" creation processing routine are described in reference to FIG. 106. In an absence setting screen image of FIG. 105, if the mail creation switch has been clicked, program flow goes through step J17, then a fixed form mail "A" creation processing routine shown FIG. 106 is executed, program flow is further advanced to step J19 and a mail buffer of the mail creation area is cleared there.

Then, program flow goes to step J20, a fixed form mail creation processing routine described later is called, a fixed form mail "A" which constitutes an absence notice is created in a mail buffer in the mail creation area and thereafter, program flow goes to step J121 for processing.

At step J21, a fixed form mail "A" which has been prepared in the mail creation area MS is copied in the fixed form mail "A" area to complete the routine and thereafter, program flow is returned to processing of the above-mentioned absence setting processing routine.

Then, operations of fixed form mail creation processing are described.

There are described operations of a fixed form mail creation routine which is called from the above mentioned fixed form mail "A" creation processing routine or a fixed form mail "B" creation processing routine.

Figure 107:
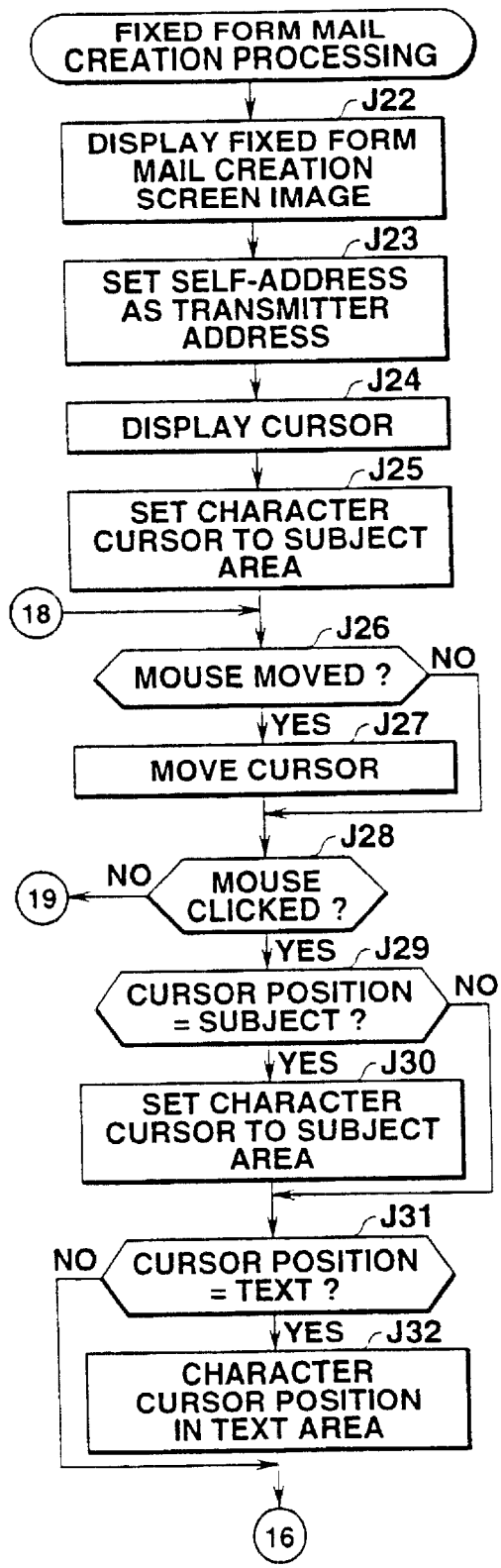
FIG. 107 is a flow chart of fixed form mail creation processing of the ninth embodiment.

After the routine is executed through the above mentioned step J20 (see FIG. 106) or step J48 (see FIG. 111) described later, CPU 1 advance program flow to step J22 shown in FIG. 107.

When program flow reaches step J22, CPU 1 displays the mail creation screen image on the display section 5 based on mail creation screen image data read out from the mail creation area.

For example, in the case where a fixed form mail "A" is created, a fixed form mail "A" creation screen image shown in FIG. 110 is displayed on the screen image. The fixed form mail "A" creation screen image comprises: an area where a transmitter address (including a name) is set; an area where a receiver address (including a name) is set; a subject input area in which a subject is individually input; and a text input area in which the text is input. Besides, in the fixed form mail "A" creation screen image, there are provided an OK switch which is clicked for input confirmation and a cancel switch which is clicked for suspension of creation.

Now, the case where, for example, a fixed form mail "A" is created is assumed. In this case, CPU 1 displays a fixed form mail "A" creation screen image on the screen image at the above-mentioned step J22 and subsequently advances program flow to step J23 and a self address is set in an area as a transmitter address.

Then, at step J23, a mouse cursor is displayed on the screen image and at the following step J25, a character cursor is set in a subject input area. Thereafter, at steps J26 and J27, a cursor is moved and displayed in accordance with a pointing operation of the mouse 6.

Then, at step J28, it is determined whether or not clicking has occurred and if there is the clicking, a determination result is YES, program flow goes to step J29 and to the following steps and processing in accordance with a position on the screen image where clicking has occurred is executed. Processings will be described case by case.

If the subject input area has been clicked for inputting a subject, program flow goes to step J29 through step J28. If a determination result here is YES, program flow goes to step J30 and a character cursor is set at the subject area and a subject input waiting condition is set.

Figure 109:
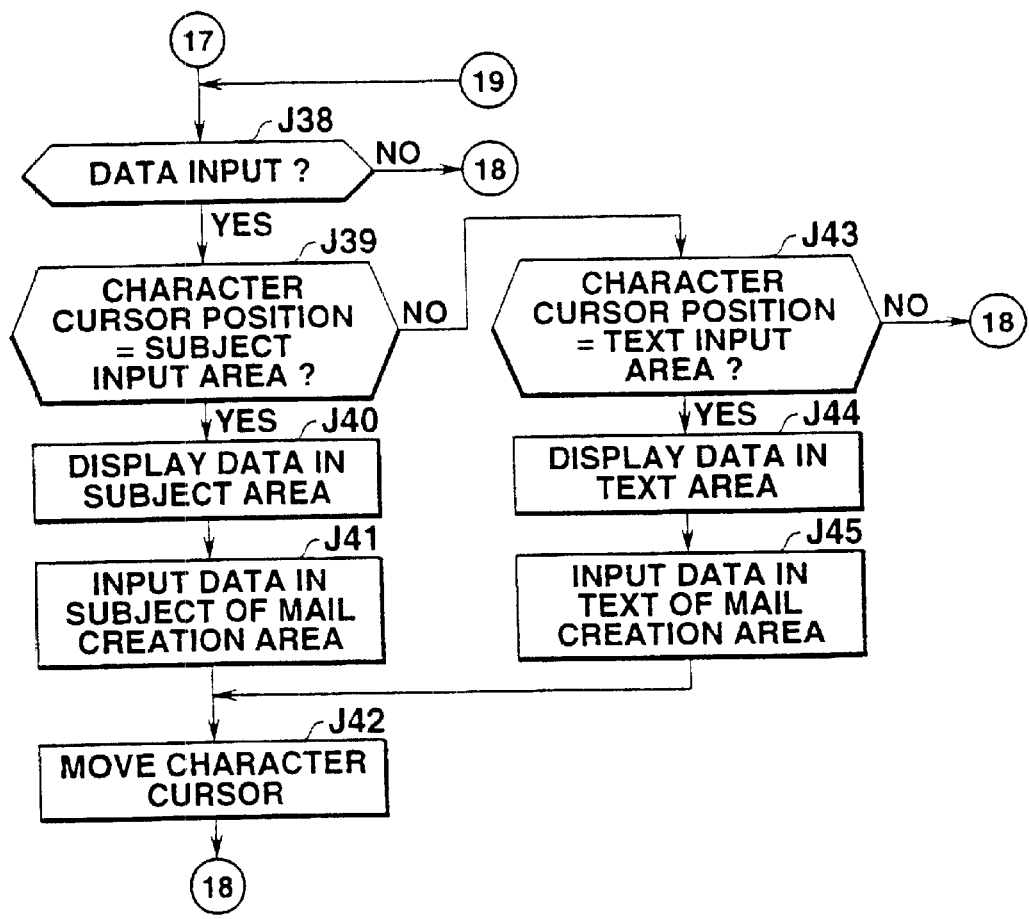
FIG. 109 is a flow chart of the fixed form mail creation processing of the ninth embodiment, continued from FIG. 108.

Then, a key input (data input) is performed in this condition, program flow goes to step J38 and to step J39 shown in FIG. 109 and it is determined whether or not a character position is in the subject input area.

In this case, since program flow is in the input waiting condition in the subject input area, if a determination result is YES, and data key-input in the subject input area are displayed through the following steps J40 to J42, whereas the data are stored in the subject area of the mail creation area (see FIG. 100) and at the same time the character cursor is moved and displayed in correspondence to an key input. In such as manner, after the subject input is completed, CPU 1 returns program flow to the above mentioned step J26.

If the text input area has been clicked for input a mail text, program flow goes to step J31 through step J29. In this case, if a determination result at step J31 is YES, program flow goes to step J32, a character cursor is set at the text input area and the text input waiting condition is set.

If key input has been made (data input) in this condition, program goes to step J43 through steps J38 and J39 shown in FIG. 109 and it is determined whether or not a character position in the text input area.

In this case, since program flow is in the input waiting condition in the text input area, if a determination result is YES, program flow goes through steps J44 and J45 and through J42 and not only is data which has been key-input displayed in the text input area, but a character cursor is moved and displayed in correspondence to the key input, while the data are stored in the text area of the mail creation area (see FIG. 100). Thus, if the text input has been completed, CPU 1 returns program flow to step J26.

Figure 108:
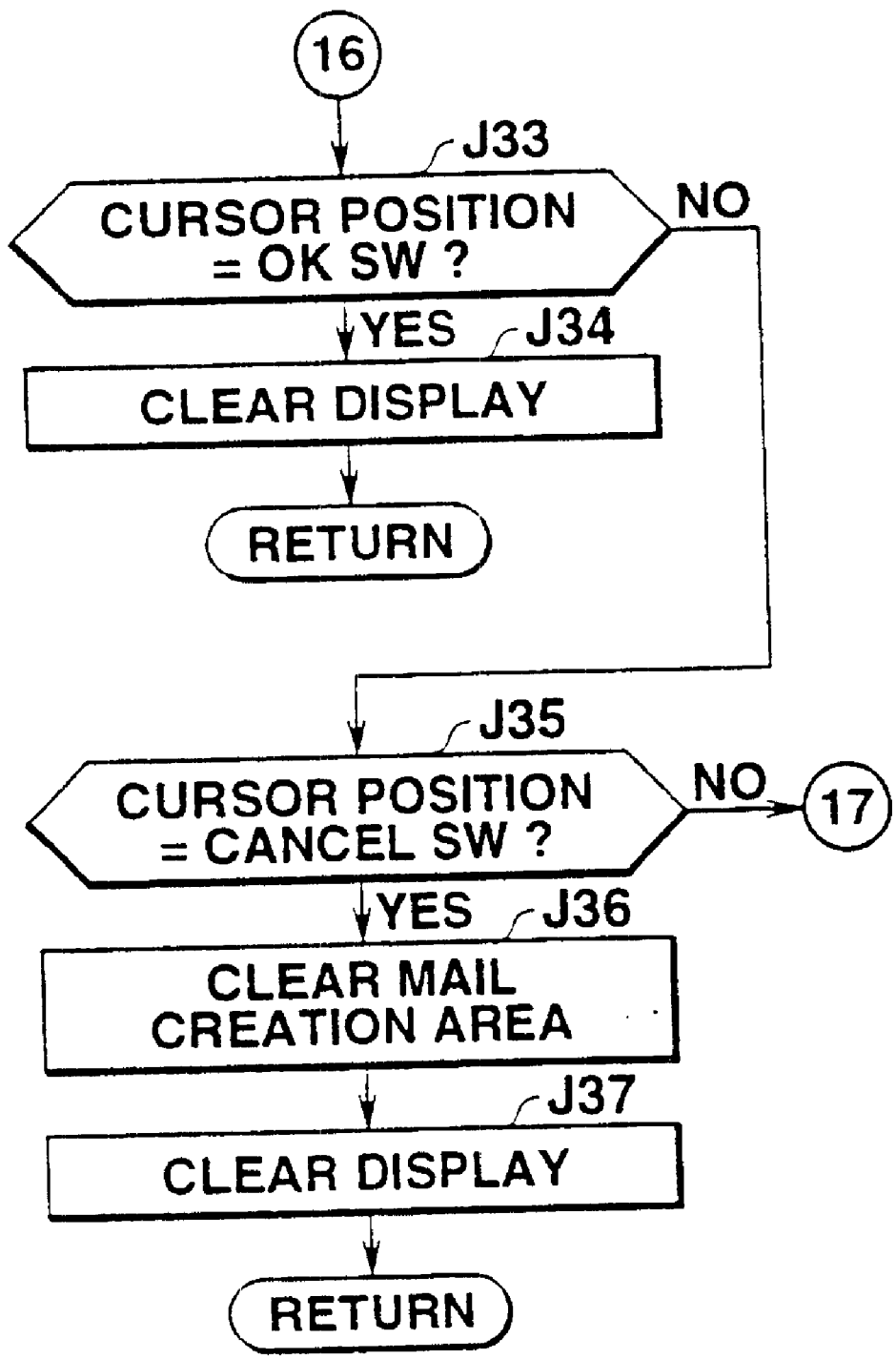
FIG. 108 is a flow chart of fixed form mail creation processing of the ninth embodiment, continued from FIG. 107.

If the OK switch has been clicked in a condition that necessary data have respectively been input in the input areas of the fixed form mail "A" creation screen image (see FIG. 110), program flow goes to step J33 shown in FIG. 108 through steps J29 and J31. Then when a determination result is YES, then program flow goes to step J34 and the screen image display is cleared to complete the routine.

If the cancel switch has been clicked, program flow gores through steps J29, J31 and J33 to step J35. In this case, if a determination result at step J35 is YES, program flow goes to step J36, after the mail creation area is cleared, the screen image display is cleared through step J37 to complete the routine.

Then, operations of a fixed form mail "B" creation processing are described.

Figure 111:
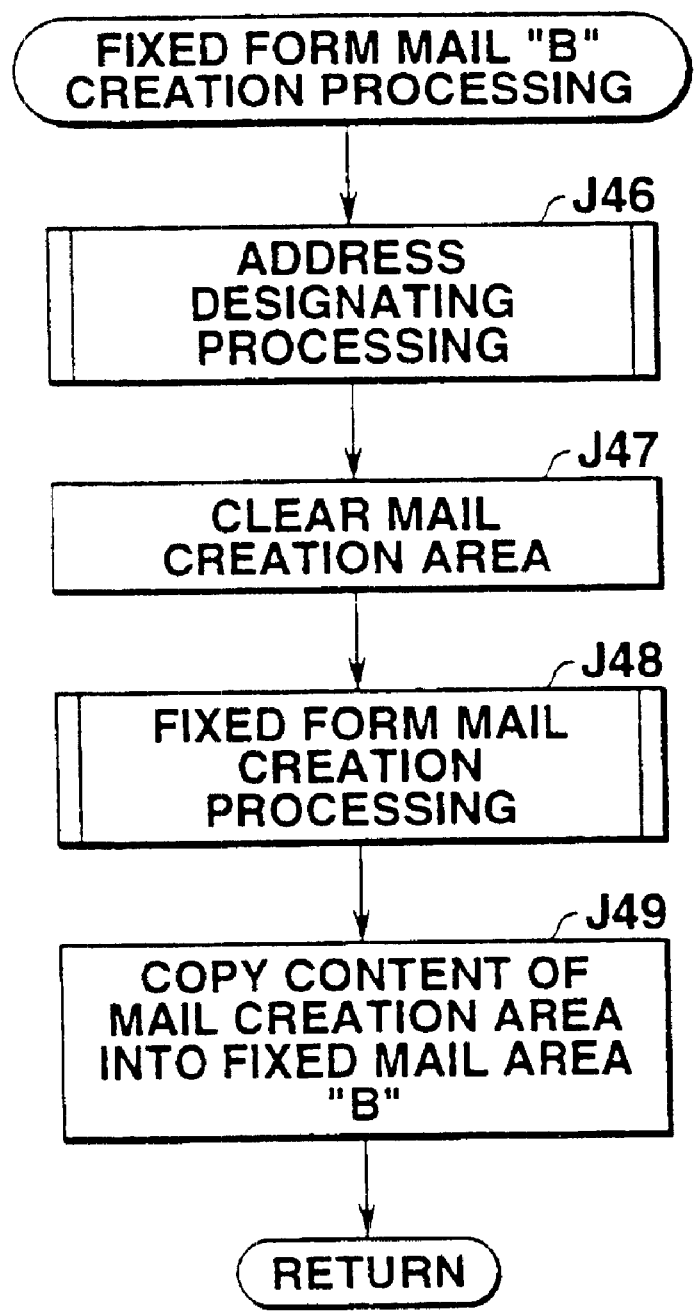
FIG. 111 is a flow chart of fixed form mail "B" creation processing of the ninth embodiment.

The operations of the fixed form mail "B" creation processing routine are described in reference to FIGS. 111 and 112.

In an absence setting screen image (see FIG. 105), if the mail "B" creation switch has been clicked, a fixed form mail "B" creation processing routine shown in FIG. 111 is executed at step J9 (see FIG. 104) and program goes to step J46 to execute address designating processing routine.

In this address designating processing routine, a mail address is designated as a precondition to transmit a fixed mail "B" as an absence notice and the details are described later.

If address designation has been completed which is a precondition for a response at an address designation processing routine, CPU 1 advances program flow to step J47 and the mail creation area (see FIG. 100) is cleared.

Then, if program flow goes to step J38, the above mentioned fixed form mail creation processing routine is called to produce a fixed mail "B" which constitutes an absence notice in the mail creation area. In this case, a fixed form mail "B" creation screen image exemplified in FIG. 112 is displayed.

The fixed form mail "B" creation screen image, as in the above mentioned fixed form mail "A" creation screen image (see FIG. 110), comprises: an area in which a transmitter address (including name) is stored, an area in which a receiver address (including name) is stored, a subject input area in which a subject is input, a text input area in which a text is input, an OK switch which is clicked in confirmation of an input and a cancel switch.

After a fixed form mail "B" has been prepared on the fixed form mail "B" creation screen image, CPU 1 advances program flow to step J49, where the fixed form mail "B" produced in the mail creation area is copied to reproduce the fixed form mail "B" in the fixed form mail "B" area (see, FIG. 101B) and after the reproduction, the routine is completed, program flow is thereafter returned to processing in the above mentioned absence setting processing routine (see FIG. 104).

Then, operations of address designating processing are described.

The operations of an address designating processing routine are described in reference to FIGS. 113 to 116.

Figure 113:
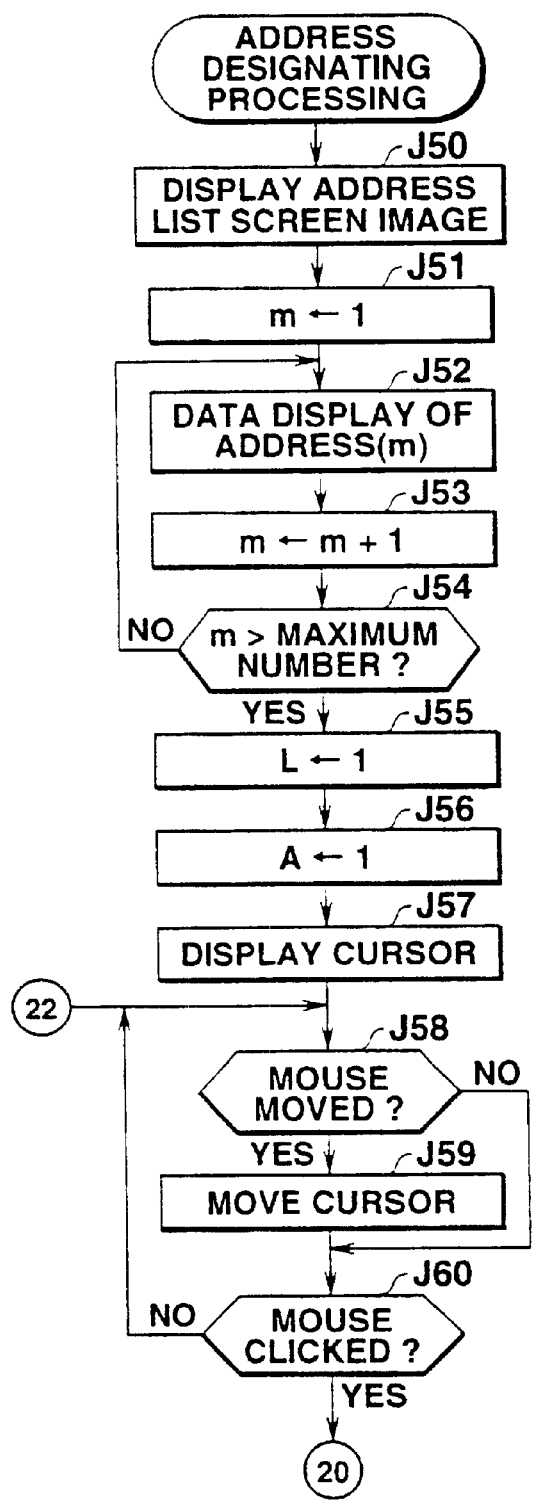
FIG. 113 is a flow chart of address designating processing of the ninth embodiment.
Figure 114:
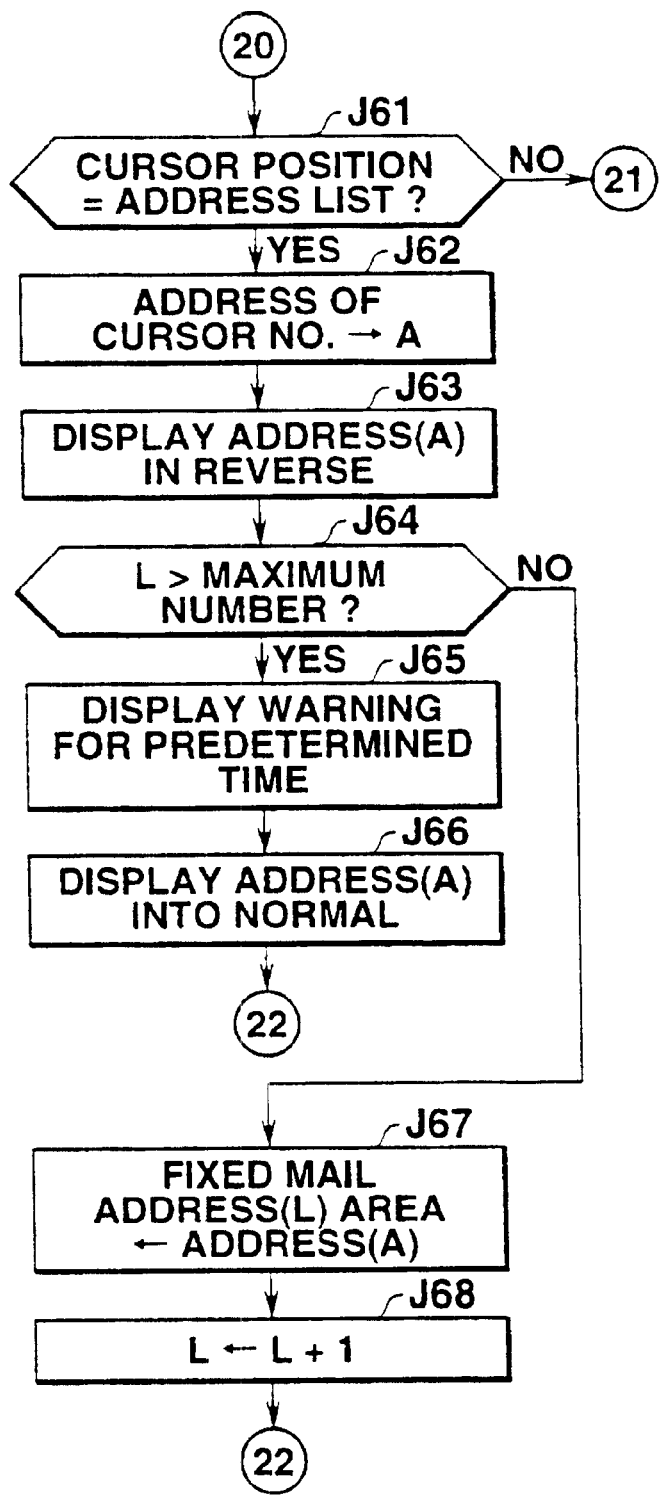
FIG. 114 is a flow chart of the address designating processing of the ninth embodiment, continued from FIG. 113.

If the address designating processing routine has been executed at step J46 of the above mentioned fixed form mail "B" creation processing routine, CPU 1 advances program flow to step J50 in FIG. 113 for processing and first, an address list screen image is displayed in the display section 5.

The address list screen image, as in an example shown in FIG. 116, comprises a display matrix for scroll display of ADDRESS(1) to ADDRESS(N) registered in the address area of RAM 3, an OK switch and a cancel switch disposed in the upper portion of the screen image.

Each row of the display matrix functions as an address list switch and in each row, there are provided name and address display areas. The address list switch is used when an address of a corresponding row is selected and designated and a display condition of each row is changed in response to clicking (for example, a display dot is reversed).

In the name and address display areas, there are respectively displayed an individual name or a handle name, an electronic mail address corresponding to ADDRESS(1) to ADDRESS(N).

After such a screen image has been displayed, CPU 1 advances program flow to step J51, a pointer register "m" is set at an initial value "1", at the following step J52 an ADDRESS(m) is read out from the address area corresponding to a value of the pointer register "m" and name and address forming the ADDRESS(m) are displayed in the name and address display areas of the first row of the display matrix.

Then, program flow goes to step J53, a value of the pointer register "m" is incremented by 1, and it is determined whether or not an incremented value of the pointer register "m" exceeds the maximum number, that is, it is determined whether or not read-out on all the ADDRESS(m) has been completed. If the readout has not been completed, a determination result is NO and program flow is returned to step J52 to conduct the readout. If the readout has been completed, a determination result is YES and program flow goes to next step J55.

At step J55, a pointer register "L" is set at "1" and at step J56, a counter register "A" to count display rows in the display matrix is set at "1". Then, at step J57, a cursor is displayed on the address list screen image.

Thereafter, at steps J58 and J59, the cursor is moved and displayed in response to a pointing operation of the mouse 6 and at step J60 it is determined whether or not the mouse has been clicked.

Then, If the mouse has been clicked, a determination result here is YES and program flow goes to step J61 and to the following steps and processing corresponding to a position at which is clicked is executed. The processing are described case by case.

If the address list switch is clicked, and when one of the address list switches which corresponds to a row of the display matrix has been clicked while pointing, a determination result of step J61 is YES, program flow goes to next step J62 and the counter register "A" is set at an address number of a row which has been clicked.

Then, at step J64, name and address display areas corresponding to a value of the counter register "A" are displayed in reverse. Thereby, it is shown that address designation has been made.

In succession, at step J64, it is determined whether or not a value of a pointer register "L" is larger than the maximum number, that is it is determined whether or not a value of a pointer register "L" exceeds the number of registered addresses which can be stored in the fixed form mail "B" area (see FIG. 101B).

Here, if the value of a pointer register "L" exceeds the number of registered addresses, a determination result is YES and program flow goes to step J65. At step J65, there is displayed for a predetermined period of time a warning with the effect that new registration cannot be made and at step J66, the name and address display areas which are displayed in reverse to step J36 is returned to a normal display condition. Thus after cancellation of address designation, program flow goes to step J58.

On the contrary, if a value of a pointer "L" has not exceeded the maximum number and when a condition in which new registration is possible available, a determination result is NO and program flow goes to step J67.

At step J67, an ADDRESS(A) designated at step J63 is stored as a REGISTERED ADDRESS(L) in the fixed form mail "B" area corresponding to a value of the pointer register "L". Thereby, a desired address selected from the address lists is decided as a condition for transmission of the fixed form mail "B" in response as an absence notice.

Then, program flow goes to step J68, a value of the pointer register "L" is incremented by 1 and thereafter program flow is returned to step J58.

Figure 115:
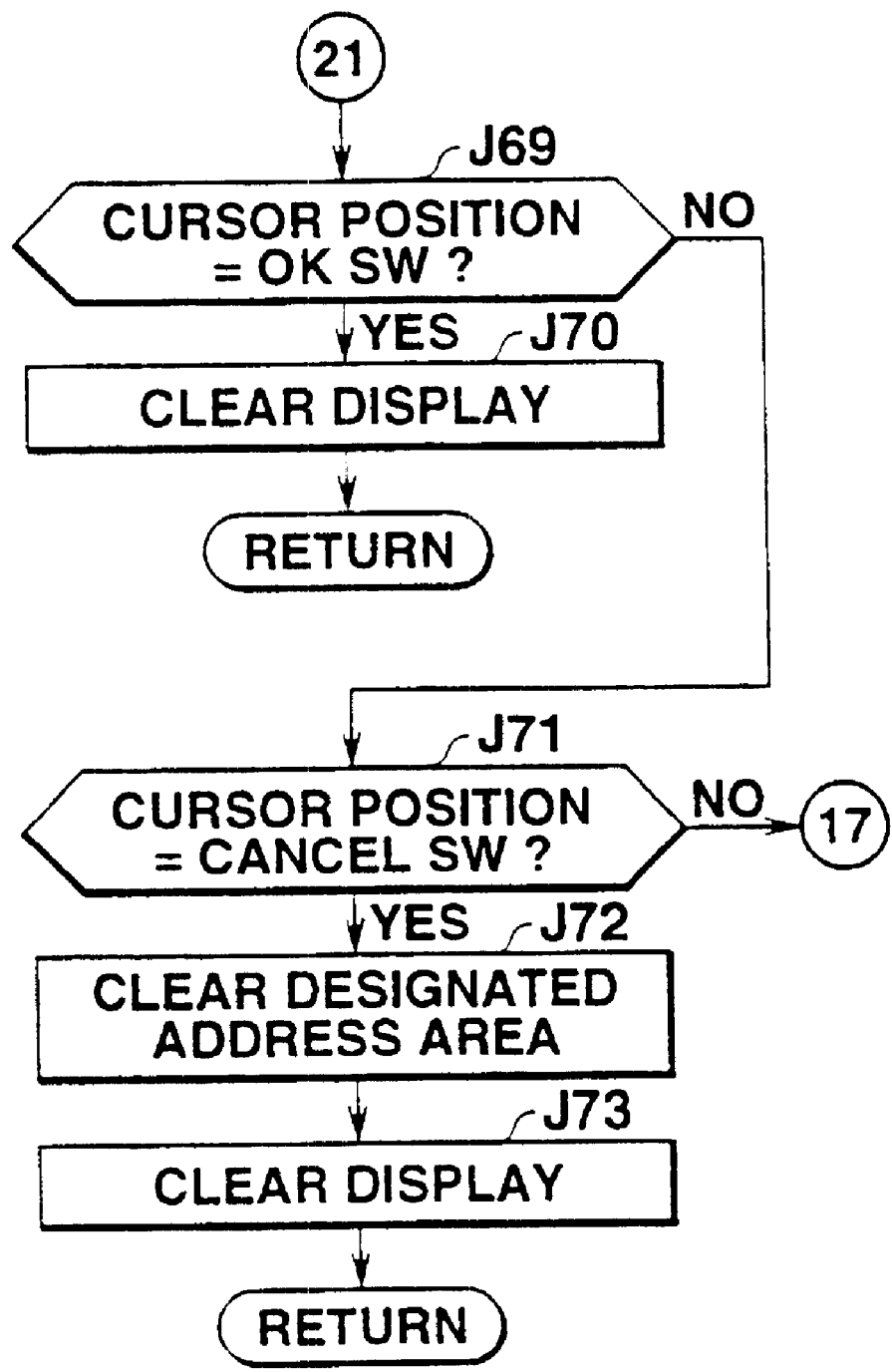
FIG. 115 is a flow chart of the address designating processing of the ninth embodiment, continued from FIG. 114.

If the OK switch has been clicked, program flow goes to step J69 shown in FIG. 115 through step J61, and when a determination result is YES, program flow goes to next step J70 and the address list screen image is cleared to complete the routine. Thereafter, program flow is returned to the above mentioned fixed form mail "B" creation routine.

If the cancel switch has been clicked, program flow goes to step J71 thorough step J69 and when a determination result is YES, program flow goes to step J72, where the REGISTERED ADDRESS(l) stored in the fixed form mail "B" area corresponding to value of the pointer register "L" is cleared. At next step J73, the address screen image is cleared to complete the routine.

Then, operations of a fixed form mail "C" creation processing are described.

The operations of a fixed form mail "C" creation processing routine are described in reference to FIGS. 117 to 120.

Figure 117:
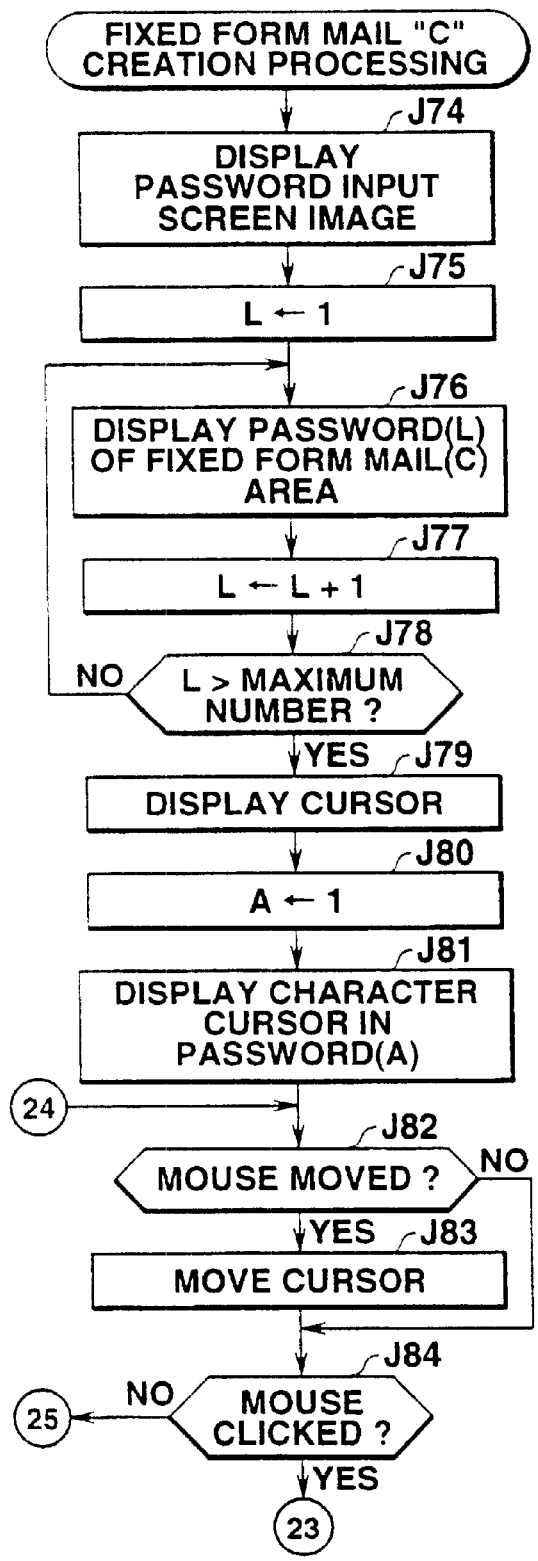
FIG. 117 is a flow chart of fixed form mail "C" creation processing of the ninth embodiment.

In an absence setting screen image (see FIG. 105), if the mail "C" creation switch has been clicked, the fixed form mail "C" creation processing routine shown in FIG. 117 is executed through step J11 and program flow goes to step J74, where a password input screen image is displayed on the display section 5.

Figure 119:
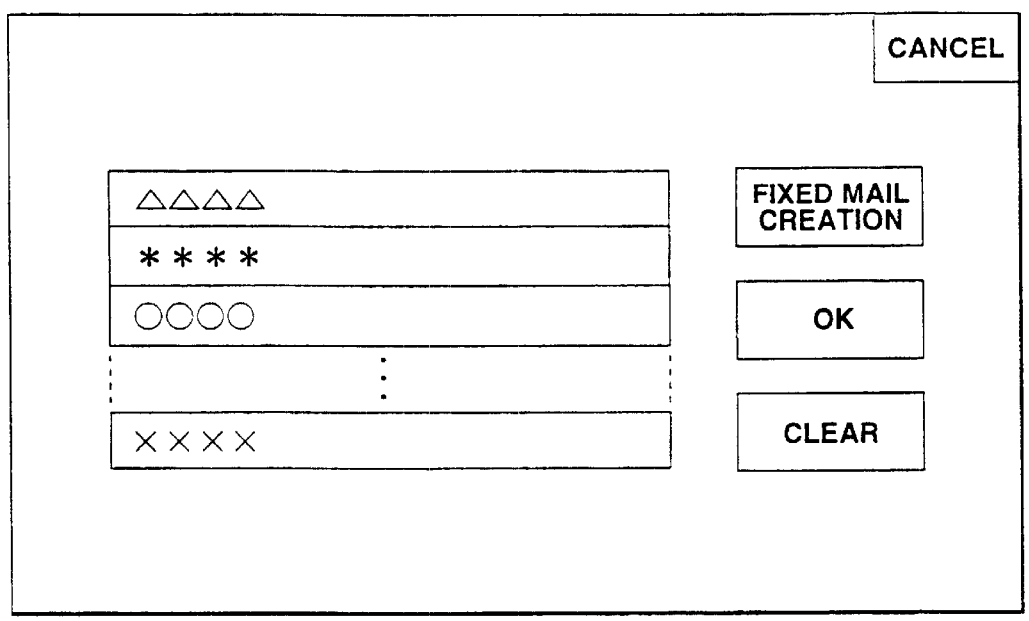

The pass word input screen image, as shown in FIG. 119, is provided with a display matrix to scroll-display a plurality of PASSWORD(1) to PASSWORD(l) which are registered in the fixed form mail "C"area (see FIG. 102) of RAM 3 and in addition, with a fixed form mail creation switch an OK switch, a clear switch and a cancel switch.

Each row of the display matrix functions as a password list switch and at the same time the display matrix is adapted to input a password in each row. The password list switch is used when a password of a corresponding row is selected, and a display condition of each row is changed in response to clicking (for example, a display dot is reversed).

Now, if the password input screen image has been displayed, CPU 1 advances program flow to step J75 and the pointer register "L" is set at an initial value "1". At the following step J76, a PASSWORD(L) readout from the fixed form mail "C" area in correspondence to a value of the pointer register "L" is displayed in the first row of the display matrix.

Then, at step J77, a value of the pointer register "L" is incremented by 1 and it is determined whether or not an incremented value of the pointer register "L" is larger than the maximum number, that is, it is determined whether or not readout of all the passwords has been completed. If readout of all of the passwords has not been completed, a determination result is NO and program flow goes to step J76 to continue the readout, but when the readout has been completed, a determination result is YES and program flow goes to next step J79.

At step J79, a cursor corresponding to the mouse 6 is displayed on the password input screen image and at the following step J80, the counter register "A" to count the designated rows in the display matrix is set at "1".

Thereafter, program flow goes to step J81 and a character cursor is placed in the first row of the display matrix in correspondence to a value of the counter resister "A", in other words in the PASSWORD(A).

Then, steps J82 and J83, a cursor is displayed and moved corresponding to a pointing operation of the mouse 6 and at step J84 it is determined whether or not the mouse 6 has been clicked.

Figure 118:
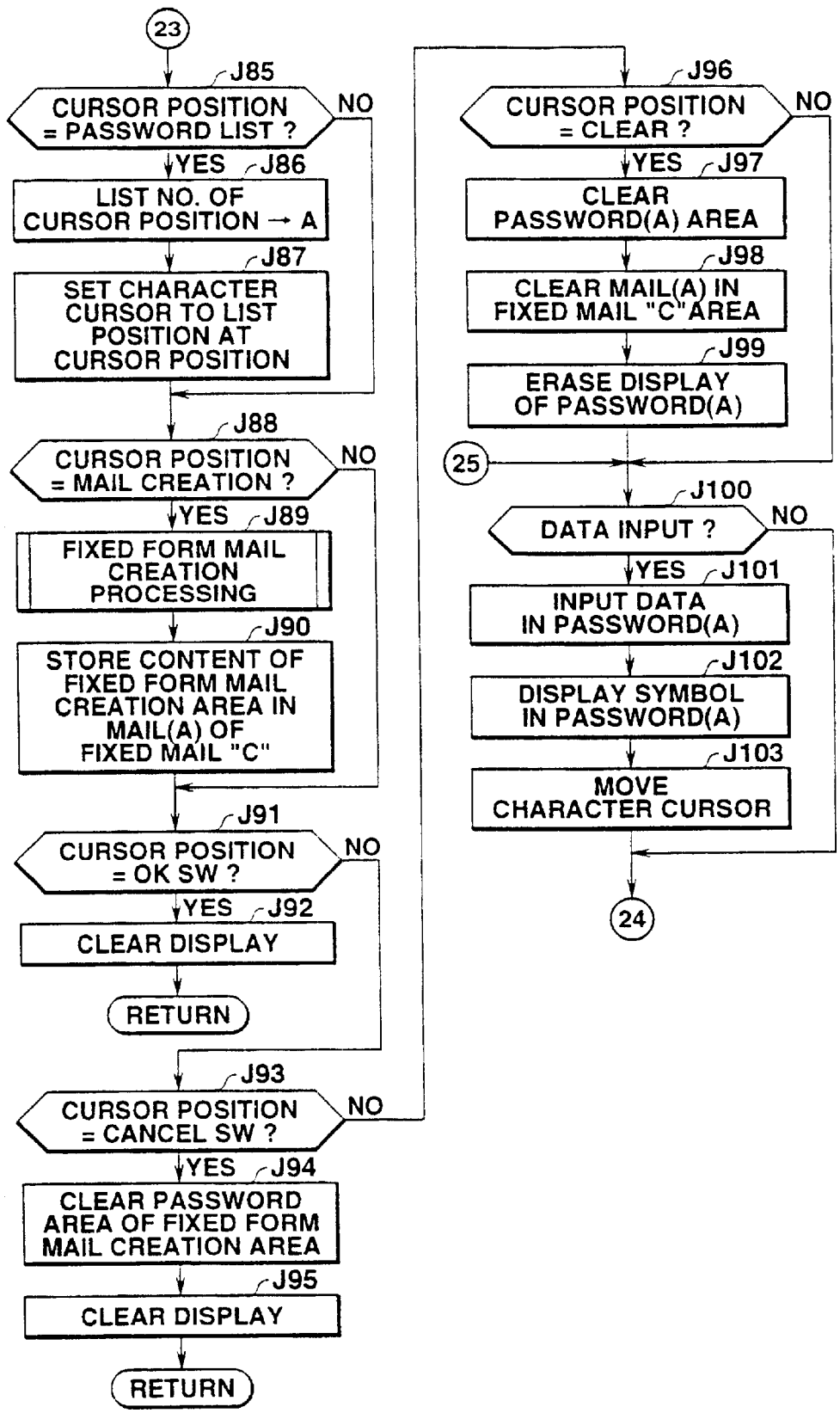
FIG. 118 is a flow chart of the fixed form mail "C" creation processing of the ninth embodiment, continued from FIG. 117.

Then, if the mouse 6 has been clicked, a determination result here is YES, program flow goes to step J85 and to the following steps shown in FIG. 118 and processing corresponding to a position at which clicking has been made is executed. Then, the processings are described case by case.

When the password list switch is clicked, and when one of the password list switches corresponding to rows of the display matrix has been clicked, a determination result of step J85 shown in FIG. 85 is YES, program flow goes to next step J86 and the counter register "A" is set at a password list number of a row at which clicking has been made. In succession, at step J87, the character cursor is set at a row of the PASSWORD(A) corresponding to a value of the counter register "A".

If key input (password input) has been made in this condition, then a determination result of step J84 (see FIG. 117) is NO and when a determination result of step J100 shown in FIG. 118 is YES, program flow goes to step J101.

At step J101, key input is made in the PASSWORD(A) and at the following step J102, a symbolic display is made in correspondence to the key input. The symbolic display is not to display a password to be input as it looks but a password is displayed by a substitution in the form of a symbol such as "★" or the like.

Then, at step J103, a password key-input is registered in the fixed form mail "C" area, whereas a character cursor is displayed and moved corresponding to key-inputting. Thereafter, CPU 1 advances program flow to step J82.

If the mail creation switch has been clicked in order that program flow is made to go to a fixed form mail "C" creation, wherein as mentioned above, a password registration which is a precondition for a fixed form mail "C" to be transmitted in response as an absence notice had been completed, program flow goes to step 88 through step J85 and when a determination result is YES, program flow is advanced to next step J89.

At step J89, the above mentioned fixed form mail creation processing routine (see FIGS. 107 to 109) is executed and a fixed form mail "C" which constitutes an absence notice is produced in the mail creation area. In this case, a fixed form mail "C" creation screen image is displayed on the screen exemplified in FIG. 120.

Then, at step J90, the fixed form mail "C" produced in the mail creation area is stored in the MAIL(A) area of a fixed form mail "C" area (see FIG. 102).

If the OK switch has been clicked after creation of a fixed form mail "C" has been completed, program flow goes to step J91 through steps J85 and J88. If a determination result here is YES, program flow further goes to next step J92, the password input screen image is cleared to complete the routine and program flow is returned to the absence setting processing routine (see FIG. 104).

If the cancel switch has been clicked when suspending password input, program flow goes to step J93 through steps J85, J88 and J91 and at step J93 when a determination result is YES, program flow goes to step J94. At step J94, after the password, which has been key input, is cleared, the routine is completed and program flow is returned to the absence setting processing routine.

If the clear switch has been clicked, program flow goes to step J96 through steps J85, J88, J99 and J93 and at step J93, if a determination result is YES, program flow goes to next step J97, where the password which is currently selected, that is the PASSWORD(A) stored in the fixed form mail "C" area, is cleared. At the following step J98, a MAIL(A) which is stored in the fixed form mail "C" is cleared in a corresponding manner. Thereafter, program flow goes to step J99, where a display of the PASSWORD(A) which is selected on the password input screen image is also cleared.

Then, operations of fixed form mail "D" creation processing are described.

The operators of a fixed form mail "D" creation processing routine are described in reference to FIGS. 121 to 124.

Figure 121:
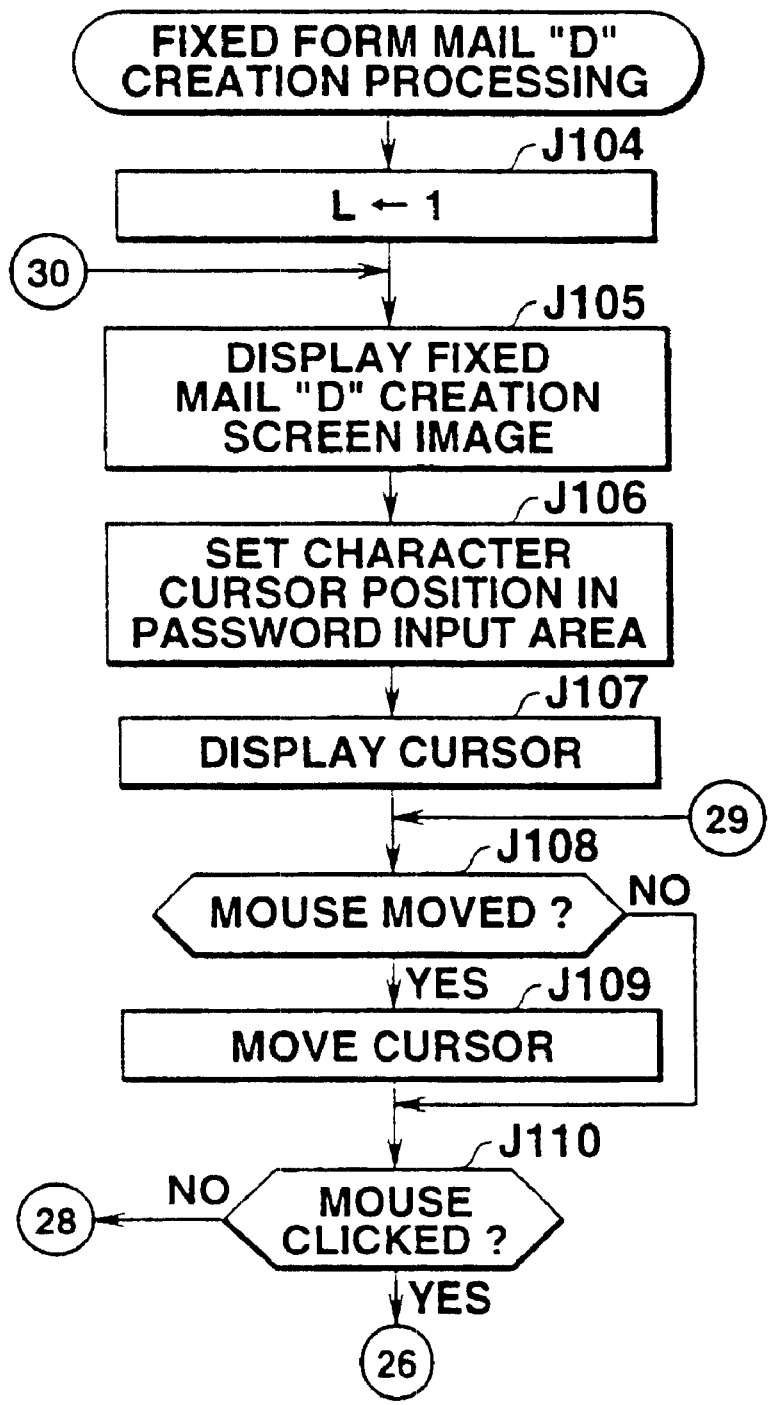

If a mail "D" creation switch has been clicked on the absence setting screen image (see FIG. 105), a fixed form mail "D" creation routine shown in FIG. 121 is executed at step J13 (see FIG. 104) and program flow goes to step J104, where a pointer register "L" is set at an initial value "1".

Then, at step J105, a fixed form mail "D" creation screen image is displayed on the display section 5. The fixed form mail "D" creation screen image, as an example shown in FIG. 124, is provided with a password input area in which a password is input, an area where a transmitter address (including name) is set, an area where a receiver address (including name) is set, a subject input area where a subject is input, a text input area where a mail text is input and in addition, an address switch, a next mail switch, an OK switch and a cancel switch.

In the transmitter address area, a self-address is automatically set as a transmitter address (including name).

Then, if such a fixed form mail "D" creation screen image has been displayed, CPU 1 advances program flow to step J106, where the character cursor is set in the password area. At step J107, a cursor is displayed on the fixed form mail "D" creation screen image.

Figure 122:
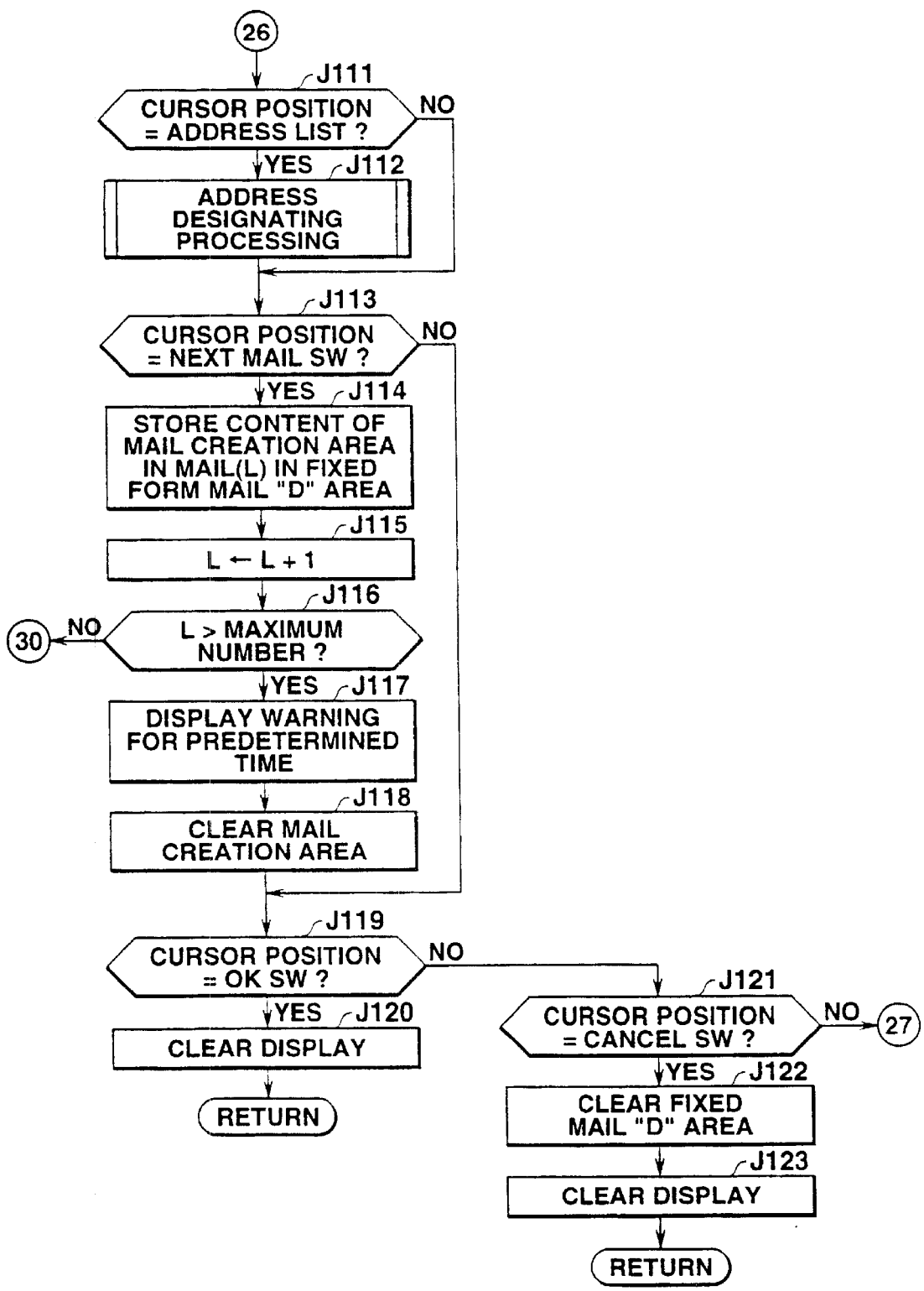

Then, at steps J108 and J109, a cursor is displayed by pointing operation of the mouse 6 and moved and at step J110, it is determined whether or not the mouse 6 has been clicked. If the mouse 6 has been clicked, a determination result is YES and program flow goes to step J111 and to the following steps as shown in FIG. 122 and processing corresponding to a position on the screen image at which the mouse 6 has been clicked is executed. Processings are described case by case.

Figure 123:
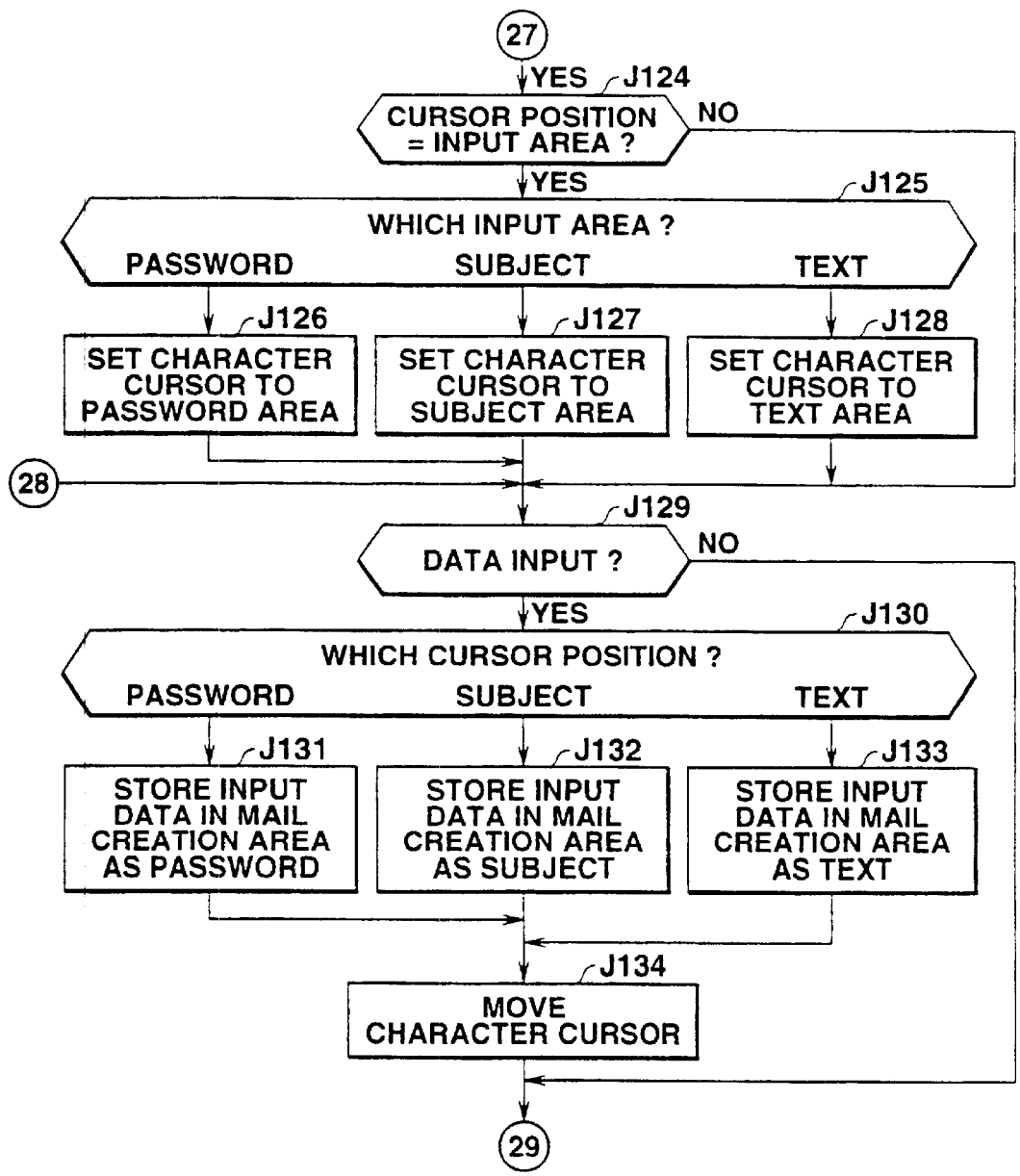

If the password-input area has been clicked, a determination result at step J124 shown in FIG. 123 is YES. Program flow goes to next step J125 and it is determined at which area the mouse 6 has been clicked, the password area, the subject area or the text input area. Then, the mouse 6 has been clicked in the password area, program flow goes to step J126, where a character cursor is set in the password area and a password input waiting condition is created.

Then, if key input (password input) has been conducted in this condition, a determination result at J129 is YES and program flow goes to step J130, where it is determined at which area the key input is made. If key input has been made in the password area, program flow goes to step J131 and not only is the password which has been key input displayed on the password area but it also is stored in the mail creation area. In succession, at step J134, a character cursor is displayed and moved in the password area. Thereafter, CPU 1 returns program flow to step J108.

If the subject area has been clicked, a determination result at step J124 shown in FIG. 123 is YES and program flow goes to step J125, where it is determined at which the mouse 6 has been clicked, the password area, the subject input area or the text input area. Then, if the subject area has been clicked, program flow goes to step J127, where a character cursor is set in the subject area and a subject waiting condition is created.

If key input has been made in this condition, a determination result at step J129 is YES, program flow goes to step J130 and it is determined at which area key input is made. If key input has been made at the subject input area, program flow goes to step J132, where not only is a subject which as been key input displayed in the subject area but it is also stored in the mail creation area. In succession, at step J134, the character cursor is moved and displayed in the subject area. Thereafter, CPU 1 returns program flow to step J108.

If the text input area has been clicked, a determination result at step J124 shown in FIG. 123 is YES, program flow goes to step J125, where it is determined at which the mouse is clicked, the password input area, the subject input area or the text input area. Then, if the text input area has been clicked, program flow goes to step J128, where the character cursor is set in the text input area and a mail text input waiting condition is created.

If key input has been made in this condition, a determination result at step J129 is YES and program flow goes to step J130, where it is determined at which area key-input is made. If key input has been made in the text input area, program flow goes to step J133, not only is a text key in which input has been made displayed in the text area but it is also stored in the mail creation area. In succession, at step J134, the character cursor is moved and displayed in the text area in correspondence to the key input. Thereafter, CPU 1 returns program flow to the above-mentioned step J110.

After inputs of the password, subject and text have been completed, the address list switch is clicked in order to designate a mail address which constitutes an address of a fixed form mail "D" (an absence notice).

If the address list switch has been clicked, a determination result at step J111 shown in FIG. 122 is YES and program flow goes to next step J112, where the above mentioned address designating processing routine (see FIGS. 113 to 115) is executed and an address of a received mail is designated as one of preconditions for transmission of a fixed form mail "D" in response as an absence notice.

Not only is the designated address stored as a receiver address in the mail creation area but it is also displayed in a receiver address area of the fixed form mail "D" creation screen image (see FIG. 124).

After the above mentioned processing have been executed and one fixed form mail "D" has been prepared in the mail creation area, the next mail switch is clicked when a fixed form mail "D" with a different content is desired to be prepared.

If the next mail switch has been clicked, a determination result step J113 shown in FIG. 122 is YES and program flow goes to step J112, where a fixed form mail "D" held in the mail creation area, that is, a fixed form mail "D" which has already been prepared is stored as a mail(L) in the fixed form mail "D" area (see FIG. 103).

Then, at step J115, the pointer register "L" is incremented by 1 and it is determined whether or not a value of the pointer register "L" which has been incremented is larger than the maximum number, that is, the value exceeds the number of mails which can be stored in the fixed form mail "D" area.

At this point, if the value has not exceeded the number of mails which can be stored in the fixed form mail "D" area, a determination result is NO and program flow is returned to the above mentioned step J105 (see FIG. 121) and goes to new creation of a fixed form mail "D".

On the contrary, if the value exceeds the number of mails which can be stored in the fixed form mail "D" area, a determination result at step J116 is YES and program flow goes to next step J117, where there is displayed for a predetermined period of time a warning with the effect that a new registration of a fixed form mail "D" cannot be made. Thereafter, program flow goes to step J118 and the mail creation area is cleared.

If the OK switch is clicked and if the OK switch has been clicked after a fixed form mail "D" is created, program flow goes to step J119 through steps J111 and J113, where when a determination result is YES, program flow goes to next step J120. At step J120, the fixed form mail "D" creation screen image is cleared to complete the routine and thereafter, program flow is returned to the abovementioned absence setting processing route (see FIG. 104).

If the cancel switch has been clicked in order to suspend creation of fixed mail "D", program flow goes to step J121 through steps J111, J113 and J119. At step J121, if a determination result is YES, program flow goes to next step J122, where a mail (L) stored in the fixed form mail "D" creation screen image is cleared and program flow goes to next step J123. At step J123, the fixed form mail "D" creation screen image is cleared to complete the routine and thereafter program flow is returned to the above mentioned absence setting processing routine (see FIG. 104).

Operation of a reception processing (timer interrupt) routine are described with reference to FIGS. 125 to 127.

Figure 125:
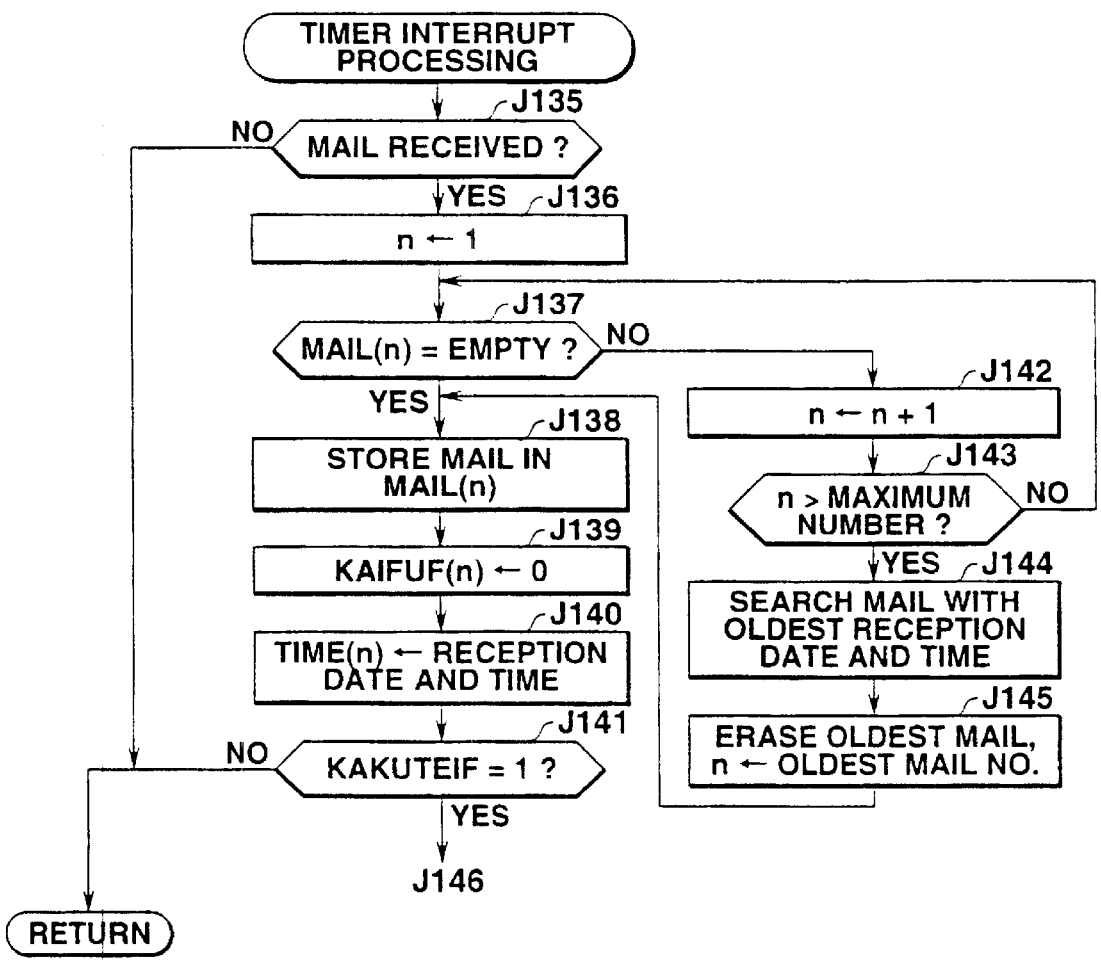

When a terminal 100 has entered a condition that the terminal 100 has accessed to the server 300 through the dedicated communication line 200, CPU 1 handles interrupts at set intervals to execute a reception processing (timer interrupts) routine shown in FIG. 125. If the routine has been executed, CPU 1 advances program flow to step J135 and from the server 300, it is determined whether or not there is a notice of mail arrival.

It is determined whether or not a received mail which corresponds to a mail address is present and if the received mail is present, the server 300 sends a response indicating a mail arrival to the terminal 100. In the terminal 100, if a determination result at step J135 is YES, program flow goes to next step J136.

On the other hand, if no response indicating a received mail is present, a determination result is NO, in this case the routine is terminated and program flow is returned to a main routine described later.

First of all, storage of a received mail is described.

If a mail reception has started, CPU 1 advances program flow to step J126, where a value of a pointer register "n" is set at an initial value 1. At the following step J137, it is determined whether or not a RECEIVED MAIL(n) in the received mail storage area (see FIG. 100), which corresponds to the value of the pointer register "n", is empty.

If the RECEIVED MAIL(n) is empty, a determination result at step J137 is YES, program flow goes to next step J138 and a received mail received from the server 300 is stored in the RECEIVED MAIL(n) area in the received mail storage area (see FIG. 100) which corresponds to the value of the pointer register "n".

Then, program flow goes to step J139, where CPU 1 sets an unseal flag KAIFUF (n) of the received mail at "0" in order to indicate a seal condition. In succession, at step J140, a reception date and time (including year, month and date) is stored in the register TIME of the RECEIVED MAIL (n) area and program goes to step J141 described later for another processing.

If not empty space is available in the RECEIVED MAIL (n) area, a determination result at step J137 is NO and program flow goes to step J142. At step J142, a value of the pointer register "n" is incremented by 1 and at the following step J143, it is determined whether or not "n" exceeds the maximum number of mails which can be stored in the received mail storage area.

Here, if "n" has not exceeded the maximum number, a determination result is NO and program flow is returned to step J137, where it is again determined whether or not there is an empty space in the RECEIVED MAIL (n) area.

On the other hand, if all the mail area MAIL have been filled with received mails and the received mail storage age (mail box) is filled to its full, a determination result at step J143 is YES and program flow goes to step J144. At step J144, a mail with the oldest reception date and time TIME (hereinafter referred to as an oldest mail) is retrieved among mails stored in the received mail storage area (mailbox).

Then, at step J145, not only is the retrieved oldest mail erased but the pointer register "n" is set at the number of the erased oldest mail. Thereafter, program flow is returned to step of J138 and a newly received mail is stored in the area of the oldest mail erased.

Then, processing in absence setting is described.

After processing in which a received mail is stored in the received mail storage area (mailbox) is completed as mentioned above, CPU 1 advances program flow to step J141, where it is determined whether or not the flag KAKUTEIF, which indicates that absence setting has been made or not, is set at "1", that is, whether or not the terminal 100 is in the state of absence.

Figure 126:
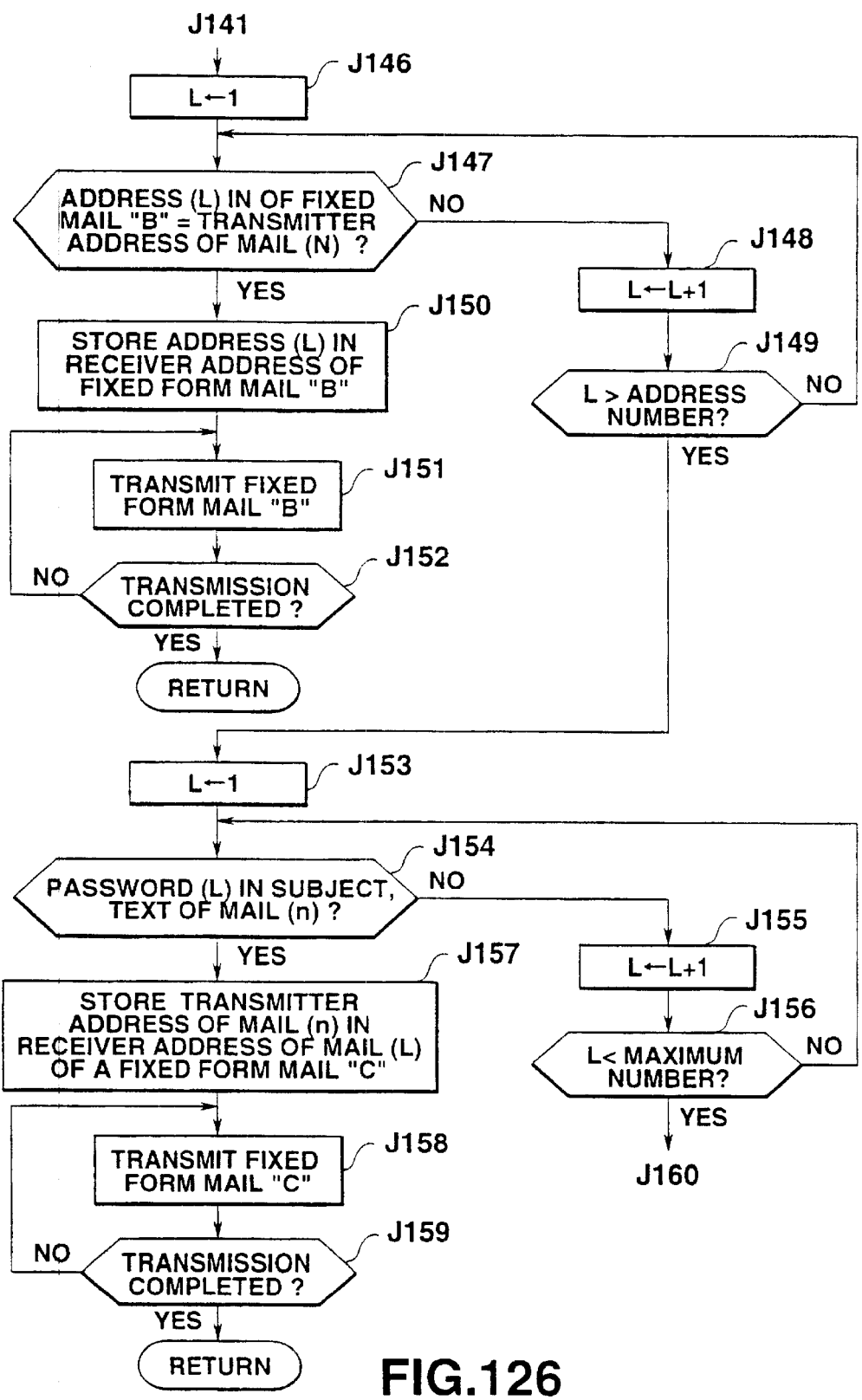

Here, if the terminal 100 in the state of absence is set by a user's operation, since the flag KAKUTEIF indicates "1" by the above mentioned absence setting processing routine (see FIG. 104), a determination result is YES and CPU 1 advances program flow to step J146 and to the following steps shown in FIG. 126. If the terminal in the state of absence is not set, a determination result is NO and the routine is temporarily completed.

Now, if the terminal 100 in the state of absence has been set by a user's operation and program flow has been made to go to step J146 and to the following steps shown in FIG. 126, CPU 1 selects and makes to transmit one of the fixed form mail "A" to the fixed form mail "D" which are stored in the fixed form mail "A" area to the fixed form mail "D" area of RAM 3 shown in FIG. 100. Then, cases, where the fixed form mail "A" to the fixed form mail "D" are automatically be transmitted are described case by case.

The case of response by fixed form mail "B" will be described.

At step J146 of FIG. 126, a value of the pointer register "L" is set at "1" and at the following step J147, it is determined whether or not a transmitter address which coincides with a REGISTERED ADDRESS(L) read out from the fixed form mail "B" area (see FIG. 101B) in correspondence to a value of the pointer register "L" is included in a received mail.

Here, if the transmitter address of a received mail does not coincides with the REGISTERED ADDRESS(L), a determination result at step J147 is NO and program flow goes to next step J148, where a value of the pointer register "L" is incremented by 1.

Then, at step J149, it is determined whether or not an incremented value of the pointer register "L" exceeds the number of addresses which can be registered in the fixed form mail "B" area, that is, whether or not address determinations which refers to all the REGISTERED ADDRESS (1) to REGISTERED ADDRESS(L) have been conducted.

If all the address determinations have not completed, a determination result is NO and program flow is returned to step J147 and the address determination is continued. Then, in the address determinations, if it is determined that the same transmitter address as the REGISTERED ADDRESS (L) is included in a received mail, a determination result at step J147 is YES and program flow goes to step J150.

At step J150, a REGISTERED ADDRESS(L) which has been retrieved by an address determination is stored in a receiver address of the fixed form mail "B" and at the following steps J151 and J152, transmission of the fixed form mail "B" is continued till its completion and at the sake time when the transmission is completed, the routine is terminated.

As described above, mail addresses which require a notice of absence are registered in the fixed form mail "B" area and when a transmitter address of a received mail which is received in the state of absence coincides with one of the mail addresses, a fixed form mail "B" is transmitted to the same address as the transmitter address in response.

Therefore, since a notice of absence is transmitted only to a mail from a predetermined transmitter, a content of the transmitted fixed form mail "B" is only required to be limited to information necessary to the transmitter, which makes it possible to transmit a notice of absence corresponding to a content of a received mail.

The case of response by a fixed form mail "C" will be described.

If it is determined that attributes of a received mail does not satisfy a response condition of a fixed form mail "B", a determination result at step J149 is YES and program flow goes to step J153 and to the following steps and it is determined whether or not the response condition of a fixed form mail "C" accepts the attributes of a received mail.

That is, program flow goes to step J153, a value of the pointer register "L" is reset at "1" there, and at the following step J154, it is determined whether or not a PASSWORD(L) read out from the fixed form mail "C" area (see FIG. 102)

in correspondence to a value of the pointer register "L" is included in a subject and text of a mail stored in the RECEIVED MAIL(n) in the received mail storage area.

Here, if the PASSWORD(L) is not included in a received mail, a determination result at step J154 is NO and program flow goes to next step J155, where a value of the pointer "L" is incremented by 1.

Then, at step 156, it is determined whether or not an incremented value of the pointer register "L" exceeds the number of passwords which can be registered in the fixed form mail "C" area, that is, whether or not password determination which refers to all the PASSWORD(1) to PASSWORD(L) has been completed.

If the password determination has not been completed, a determination result is NO and program flow is returned to step J154, where the password determination is repeated based on an incremented value of the pointer register "L". In the password determination, if a PASSWORD(L) is included in a received mail, a determination result at step J154 is YES and program flow goes to next step J157 for another processing.

At step J157, a MAIL(L) corresponding to the PASSWORD(L) retrieved by the password determination is read out from the fixed form mail "C" area (see FIG. 102) and a transmitter address of the RECEIVED MAIL(n) area is stored in a receiver address of the MAIL(L).

Then, at step J158, a fixed form mail "C" (MAIL(L)) whose receiver address is replaced by the transmitter address of the received mail MAIL (n) is transmitted.

Then, at step J159, transmission of the fixed form mail "C" (MAIL(L)) is continued till it completion and at the same time when the transmission has been completed, a determination result is YES and the routine is terminated.

As described above, a plurality of PASSWORD(1) to PASSWORD(L) and MAIL(1) to MAIL(L) of the fixed form mail "C" which respectively correspond with the passwords are registered in the fixed form mail "C" area, retrieval is conducted whether or not any of the above mentioned PASSWORD(1) to PASSWORD(L) is included in a subject and text of a received mail in the state of absence and if there is a password in coincidence, a fixed form mail "C" corresponding to a password in coincidence is transmitted to the same address as a transmitter. Therefore, a content of the fixed form mail "C" to be transmitted in response can be limited to information which the transmitter requires and as a result, it is made possible to transmit a notice of absence corresponding to a content of the received mail.

The case of response by a fixed form mail "D" will be described.

Figure 127:
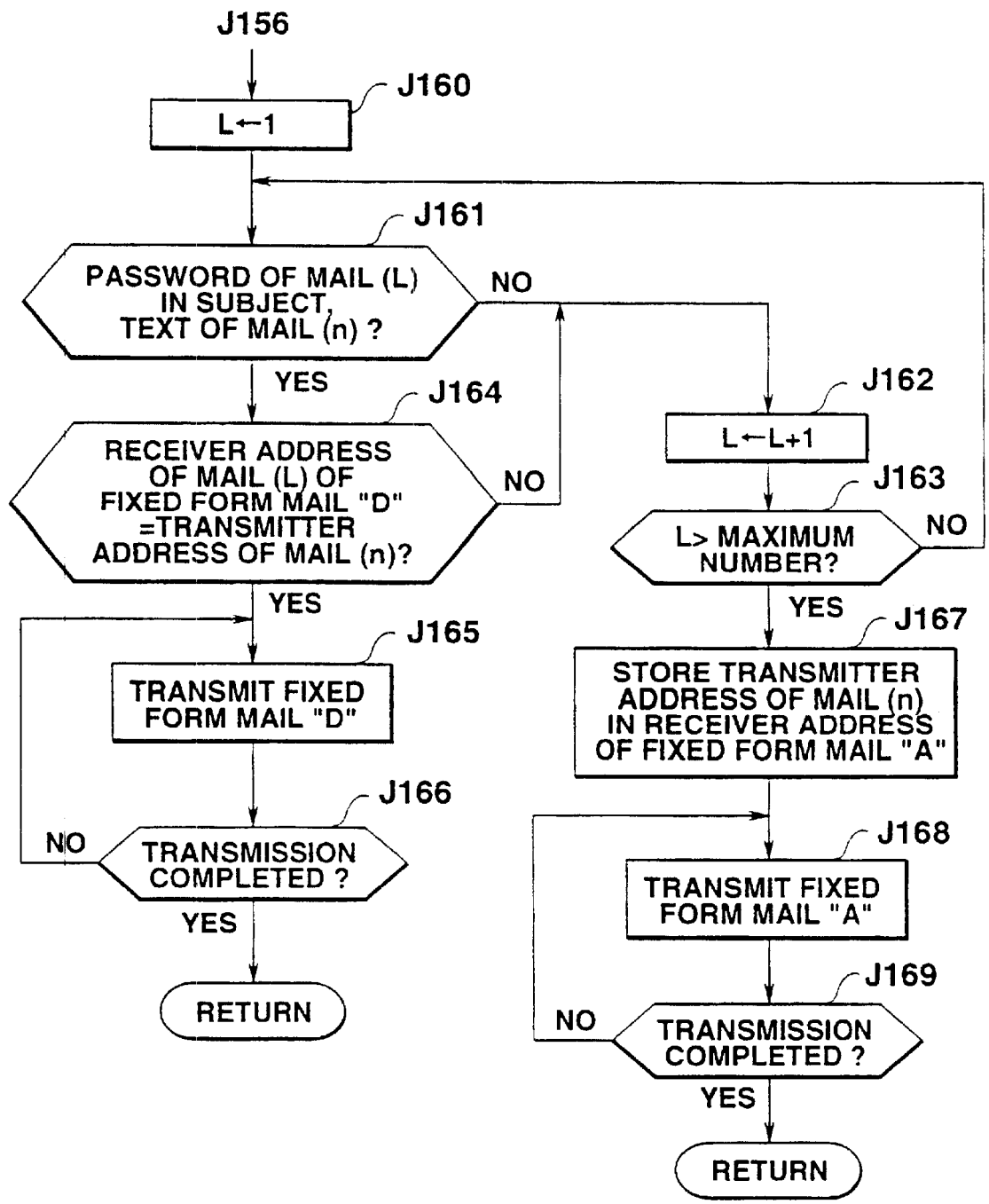

If it is determined by the above mentioned password determination that attributes of a received mail does not satisfy the response condition of a fixed form mail "C", a determination result at step J156 is YES and program flow goes to step J160 and to the following steps shown in FIG. 127, where it is determined whether or not a response condition of a fixed form mail "D" accepts the attributes of a received mail.

That is, program flow goes to step J160, where a value of the pointer register "L" is reset at "1". At next step J161, it is determined whether or not a password of a MAIL(L) read out from the fixed form mail "D" area (see FIG. 103) in correspondence to a value of the pointer register "L" is included in a subject and text of a mail stored in a RECEIVED MAIL(n) area of the received mail storage area.

Here, if a password is not included in the received mail, a determination result at step J161 is NO and program flow goes to next step J162, where a value of the pointer register "L" is incremented by 1.

Then, at step J163, it is determined whether or not an incremented value of the pointer register "L" exceeds the number of mails which can be registered in the fixed form mail "D" area, that is, it is determined whether or not password determination which refers to passwords of MAIL (1) to MAIL(L) has been completed.

If the password determination has not completed, a determination result is NO and program flow is returned to step J161, where the password determination is repeated based on an incremented value of the pointer register "L".

Then, in the password determination, if a password of a MAIL(L) is included in a subject and text of the received mail, a determination result at step J161 is YES and program flow goes to next step J164.

At step J164, it is determined whether or not a receiver address of a MAIL(L) retrieved by the password determination coincides with a transmitter address of a received mail (that is, a RECEIVED MAIL)n) area).

Here, if the receiver address of mail L does not coincide with the transmitter address of a received mail, since attributes of the received mail does not satisfy the response condition of a fixed form mail "D", a determination result is NO and program flow is returned to step J162, where a value of the pointer register "L" is incremented and the password determination is continued.

On the other hand, if the receiver address of a MAIL(L) coincides with the transmitter address of a received mail, since attributes of the received mail satisfy the response condition of a fixed form mail "D", a determination result is YES and program flow goes to next step J165, where the MAIL(L) of the fixed form mail "D" area which satisfy the response condition of the fixed form mail "D" is transmitted as a fixed form mail "D".

As described above, a fixed form mail "D" including a password which has been set in advance and having a receiver address which coincides with a transmitter address of a received mail is retrieved in the fixed from mail "D" area and if the fixed form mail "D" which satisfy the condition is available, the fixed form mail "D" is transmitted to the same address as the transmitter address. Therefore, a content of the fixed form mail "D" to be transmitted can be limited to information necessary to the transmitter and thus a notice of absence which corresponds to the content of the received mail can be transmitted.

The case of response by a fixed form mail "A" will be described.

In the case of a received mail having attributes which do not satisfy any of the response conditions for the above mentioned fixed form mails "B", "C" and "D", a determination result at step J163 is YES and program flow goes to step J167.

At step J167, a transmitter address of a received mail (that is, a RECEIVED MAIL(n) area) is stored in an receiver address of a fixed form mail "A" read out from the fixed mail form "A" area (see FIG. 10A) and at next step J168, the fixed form mail "A" is transmitted to the transmitter. Thereafter, at step J169, transmission of the fixed form mail "A" is continues till its completion and at the same time when the transmission has been completed, a determination results is YES and the routine is completed.

As described above, if a received mail having attributes which does not satisfy any of the response conditions for the fixed form mails "B", "C" and "D", a fixed form mail "A" is transmitted indiscriminately to the transmitter in response as a notice of absence.

As mentioned above, in a reception processing routine, if any empty space is available in a mail box (the received mail storage area), a RECEIVED MAIL(n) is stored in a RECEIVED MAIL(n) area. Thereafter, not only is the flag KAIFUF of the mail set at "1" in order to indicate a seal condition, but a reception time is stored in TIME while being set. However, if the mail box is full, a mail with the oldest reception time in the mail box is erased and then a new received mail is stored.

If the state of absence is set when a received mail is stored, it is determined which of the response conditions set in advance for fixed form mails "A" to "D" attributes of the received mail satisfy and a fixed form mail which satisfies one of the response conditions is transmitted in response.

As described above, according to the above mentioned ninth embodiment, the terminal 100 of FIG. 1 comprises:

mail receiving means for receiving an electronic mail;

absence setting means for setting an apparatus operation in an absence mode;

fixed form mail storage means for storing a plurality of kinds of fixed form mail in advance;

mail determining means for determining attributes of the received electronic mail when the mail receiving means receives the electronic mail in the absence mode;

mail selecting means for selecting one of fixed form mails stored in said mail storage means corresponding to the attributes determined by the mail determining means from the plurality of kinds of fixed form mail stored in the fixed form mail storage means; and automatic response means for transmitting the fixed form mail selected by the mail selecting means in response to the same address as a transmitter of the received electronic mail.

The most optimal fixed form mail is selected among a plurality of kinds of fixed form mail corresponding to attributes of a received mail received in an absent time and the selected fixed form mail is transmitted.

In the above mentioned ninth embodiment, there is described an electronic mail system in which a program to receive and transmit electronic mails is stored in ROM 2, but such constitutions may be adopted that a program to transmit or receive an electronic mail is stored in such media as a floppy disk, a compact disk and the like and an apparatus such as a personal computer or a word processor for general purpose use, or the like executes the program.

The machine readable storage medium stores a program for electronic mail processing, the program comprising:

(i) step of receiving an electronic mail;

(ii) step of setting an apparatus operation in an absence mode;

(iii) step of storing a plurality of kinds of fixed form mail on fixed form mail storage means in advance;

(iv) step of determining attributes of a received electronic mail when the electronic mail is received by the step (i) in the absence mode;

(v) step of selecting one of fixed form mails stored in said mail storage means corresponding to the attributes determined by the step (iv) from the plurality of kinds of fixed form mail stored in the fixed form mail storage means; and (vi) step of transmitting the fixed form mail selected by the step (v) in response to the same address as a transmitter of the received electronic mail.

The program is executed by an apparatus such as a personal computer or a word processor for general purpose use, or the like.

Industrial Applicability

According to the present invention, there is provided an electronic mail system which facilitates a receiver to be delivered an electronic mail of emergency when the receiver is absent without any inconvenience occurred to the receiver in terms of privacy and other aspects.

What is claimed is:

1. An electronic mail system comprising:

mail receiving means for receiving an electronic mail;

absence mode setting means for setting an absence mode indicating the state of absence of a receiver of the electronic mail;

mail transmitting means for transmitting a predetermined fixed form mail responding to a first electronic mail received by the mail receiving means in the absence mode; and control means for making the mail transmitting means to transmit a specific fixed form mail when the control means determines that a second electronic mail from a receiver responding to the predetermined fixed form mail satisfies a specific condition.

2. An electronic mail system according to claim 1, wherein said absence mode setting means sets the absence mode only a specific period.

3. An electronic mail system according to claim 1, wherein said control means determines that the specific condition is satisfied when a transmitter of the first electronic mail and a transmitter of the second electronic mail coincide with each other and if the second electronic mail includes a password.

4. An electronic mail system according to claim 3, wherein the password is included in the predetermined fixed form mail.

5. An electronic mail system according to claim 1, wherein the specific fixed form mail includes information on a contact place to a receiver of the electronic mail in an absent period.

6. An electronic mail system comprising:

mail receiving means for receiving an electronic mail;

absence mode setting means for setting an absence mode indicating the state of absence of a receiver of the electronic mail;

mail transmitting means for transmitting to a third party a predetermined fixed form mail responding to a first electronic mail received by the mail receiving means in the absence mode; and mail transfer means for, when said mail receiving means receives a second electronic mail responding to the predetermined fixed form mail and transmitted from the third party and the second electronic mail satisfies a specific condition, causing the mail transmitting means to transmit the first electronic mail to a predetermined address.

7. An electronic mail system according to claim 6, wherein said absence mode setting means sets the absence mode only a specific period.

8. An electronic mail system according to claim 6, wherein said mail transfer means determines that the specific condition is satisfied when a transmitter of the first electronic mail and a transmitter of the second electronic mail coincide with each other and if the second electronic mail includes a password.

9. An electronic mail system according to claim 8, wherein the password is included in the predetermined fixed form mail.

10. An electronic mail system comprising:

mail storage means for storing a plurality of fixed form mails;

mail receiving means for receiving an electronic mail;

address designating means for designating an address of a specific receiver;

mail determining means for determining whether or not a transmitter address of the received electronic mail is an address designated by said address designating means when said mail receiving means receives the electronic mail;

mail selecting means for selecting one of fixed form mails stored in said mail storage means based on a determination result by said mail determining means; and mail transmitting means for transmitting the fixed form mail selected by said mail selecting means to the same address as the transmitter address of the received electronic mail.

11. An electronic mail system comprising:

mail storage means for storing a plurality of fixed form mails;

mail receiving means for receiving an electronic mail;

mail determining means for determining whether or not identification information is included in the electronic mail when said mail receiving means receives the electronic mail;

mail selecting means for selecting one of fixed form mails stored in said mail storage means based on a determination result by said mail determining means; and mail transmitting means for transmitting the fixed form mail selected by said mail selecting means to the same address as a transmitter address of the received electronic mail.

12. An electronic mail system according to claim 10, wherein said mail determining means, said mail selecting means and said mail transmitting means are operated only in a predetermined period.

13. An electronic mail system according to claim 11, wherein said mail determining means, said mail selecting means and said mail transmitting means are operated only in a predetermined period.

14. An electronic mail system according to claim 10, wherein said address designating means comprises an all address designating means for designating all the addresses in one operation.

15. An electronic mail system according to claim 11, wherein the identification information is information indicating a content of the received electronic mail is an emergency.

16. An electronic mail system comprising:

mail receiving means for receiving an electronic mail;

address designating means for designating an address of a specific receiver;

mail determining means for determining whether or not a transmitter address of the received electronic mail is the address designated by said address designating means when said mail receiving means receives the electronic mail;

mail transmitting means for transmitting a fixed form mail to the same address as the transmitter address of the received electronic mail when said mail determining means determines that the transmitter address of the received electronic mail is not the address designated by said address designating means; and mail transfer means for transferring the received electronic mail to a predetermined address when said mail determining means determines that the transmitter address of the received electronic mail is the address designated by said address designating means.

17. An electronic mail system comprising:

mail receiving means for receiving an electronic mail;

mail determining means for determining whether or not a password is included in the electronic mail when said mail receiving means receives the electronic mail;

mail transmitting means for transmitting a fixed form mail to the same address as a transmitter address of the received electronic mail when said mail determining means determines that a password is not included in the electronics mail; and mail transfer means for transferring the received electronic mail to a predetermined address when said mail determining means determines that a password is included in the electronic mail.

18. An electronic mail system according to claim 17, wherein the password is information indicating a content of the received electronic mail is an emergency.

19. An electronic mail system comprising:

mail receiving means for receiving an electronic mail;

date and time setting means for setting a specific period of time;

reception date and time determining means for determining whether or not said mail receiving means receives the electronic mail during the specific period of time;

mail determining means for determining whether or not the electronic mail which is determined to be received during the specific period of time by the reception date and time determining means is a response date and time designated mail which designates the response date and time;

response date and time determining means for determining whether or not the response date and time is in the specific period of time when the electronic mail is determined to be the response date and time designated mail by said mail determining means; and mail transmitting means for transmitting a response mail requesting for a change of the response date and time to a different response date and time except the specific period of time when said response date and time determining means determines that the response date and time is in the specific period of time.

20. An electronic mail system according to claim 19, wherein said mail transmitting means transmits a further response mail including different receiver address information when said mail receiving means receives the electronic mail which refuses a change to the different response date and time in response to the response mail.

21. An electronic mail system according to claim 19, which further comprises date and time changing means for changing the response date and time designated by the response date and time designated mail to the different response date and time when said mail receiving means receives the electronic mail which accepts a change to the different response date and time in response to the response mail.

22. An electronic mail system according to claim 21, wherein said date and time changing means comprises mail erasing means for erasing the electronic mail of the acceptance when the response date and time designated by the response date and time designated mail is changed to the different response date and time.

23. An electronic mail system according to claim 21, wherein said date and time changing means changes the response date and time designated by the response date and time designated mail to a new response date and time when said mail receiving means receives an electronic mail which designates the new response date and time except the specific period of time, different form the different response date and time in response to the response mail.

24. An electronic mail system according to claim 23, wherein said date and time changing means comprises mail erasing means for erasing the electronic mail which designates the new response date and time when the response date and time designated by the response date and time designated mail is changed to the new response date and time.

25. An electronic mail system according to claim 19, wherein said mail transmitting means transmits a further response mail including different receiver address information when said mail receiving means receives an electronic mail which designates a new response date and time in the specific period of time in response to the response mail.

26. An electronic mail system according to claim 19, wherein said mail receiving means recognizes that an electronic mail received in response to the response mail is effective when identification information of a transmitter of the electronic mail received in response to the response mail coincides with identification information of a transmitter of the response designated mail.

27. An electronic mail system comprising:
mail receiving means for receiving an electronic mail;
date and time setting means for setting a specific period of time;
reception date and time determining means for determining whether or not said mail receiving means receives the electronic mail during the specific period of time;
mail determining means for determining whether or not the electronic mail which is determined to be received during the specific period of time by the reception date and time determining means is a response date and time designated mail which designates the response date and time;
response date and time determining means for determining whether or not the response date and time is in the specific period of time when the electronic mail is determined to be the response date and time designated mail by said mail determining means;
mail transmitting means for transmitting a request for change mail requesting for a change in the response date and time to a different response date and time except the specific period of time when the response date and time which is determined by the response date and time determining means is in the specific period of time;
date and time changing means for changing the response date and time of the response date and time designated mail when said mail receiving means receives a response mail which indicates acceptance of the request for change after the request for change mail is transmitted by said mail transmitting means; and
mail transfer means for transferring the response date and time designated mail to a predetermined address when said mail receiving means receives a response mail which refuses the request for change after the request for change mail is transmitted by said mail transmitting means.

28. An electronic mail system according to claim 27, wherein said date and time changing means changes the response date and time of the response date and time designated mail when a response mail received by said mail receiving means from the same transmitter as a transmitter of the response date and time designated mail includes a specific password and the acceptance after said mail transmitting means transmits the request for change mail.

29. An electronic mail system according to claim 27, wherein said mail transfer means transfers the response date and time designated mail to the predetermined address when a response mail received by said mail receiving means from the same transmitter as a transmitter of the response date and time designated mail date includes a specific password and the refusal after said mail transmitting means transmits the request for change mail.

30. An electronic mail system comprising:
mail receiving means for receiving an electronic mail;
absence setting means for setting an apparatus operation in an absence mode;
fixed form mail storage means for storing a plurality of kinds of fixed form mail;
mail determining means for determining attributes of the received electronic mail when said mail receiving means receives the electronic mail in the absence mode;
mail selecting means for selecting one of fixed form mails stored in said mail storage means corresponding to the attributes determined by said mail determining means from the plurality of kinds of fixed form mail stored in said fixed form mail storage means; and
automatic response means for transmitting the fixed form mail selected by said mail selecting means in response to the same address as a transmitter of the received electronic mail.

31. An electronic mail system according to claim 30, wherein said mail determining means determines whether or not a transmitter address of the received electronic mail coincides with a predetermined address and if there is a coincidence therebetween, said mail selecting means selects a fixed form mail corresponding to the transmitter address from said fixed form mail storage means.

32. An electronic mail system according to claim 30, wherein said mail determining means determines whether or not a predetermined password is included in the received electronic mail and if the predetermined password is included, said mail selecting means selects a fixed form mail corresponding to the password from said fixed form mail storage means.

33. An electronic mail system according to claim 30, wherein said mail determining means determines whether or not a transmitter address of the received electronic mail coincides with a predetermined address, if there is a coincidence therebetween, said mail determining means determines whether or not a predetermined password is included in the received electronic mail and if the predetermined password is included, said mail selecting means selects a fixed form mail corresponding to the password from the fixed form mail storage means.

34. An electronic mail system according to claim 30, wherein said mail determining means determines whether or not a predetermined password is included in the received electronic mail, if the predetermined password is included, said mail determining means determines whether or not a transmitter address of the received electronic mail coincides with a predetermined address and if there is a coincidence therebetween, said mail selecting means selects a fixed form mail corresponding to the transmitter address from said fixed form mail storage means.

35. An electronic mail system comprising:
mail receiving means for receiving an electronic mail;
absence setting means for setting an apparatus operation in an absence mode;

absence notice creation means for creating a plurality of response conditions for determining whether or not an absence notice is issued and the absence notice having a content corresponding to the plurality of response conditions;

fixed form mail storage means for storing a plurality of response conditions created by said absence notice creation means and a plurality of fixed form mails, one constituting the absence notice corresponding to the plurality of response conditions;

mail attribute determining means for determining which plurality of response conditions stored in said fixed form mail storage means attributes of the received electronic mail satisfy when said mail receiving means receives the electronic mail in the absence mode; and absence notice transmitting means for selecting one of fixed form mails stored in said mail storage means having a content corresponding to satisfied response conditions to read the fixed form mail from said fixed form mail storage means and to transmit the fixed form mail in response to the same address as a transmitter of the received electronic mail as an absence notice when said mail attribute determining means finds the response conditions which satisfy the attributes of the received electronic mail.

36. A computer readable storage medium for storing a program for electronic mail processing, the program comprising:

(i) step of receiving an electronic mail;

(ii) step of setting an absence mode indicating the state of absence of a receiver of the electronic mail;

(iii) step of transmitting a predetermined fixed form mail responding to a first electronic mail received by the step (i) in the absence mode;

(iv) step of determining whether or not a second electronic mail from a receiver responding to the predetermined fixed form mail satisfies a specific condition; and (v) step of transmitting a specific fixed form mail when it is determined by the step (iv) that the specific condition is satisfied.

37. A computer readable storage medium for storing a program for electronic mail processing, the program comprising:

(i) step of receiving an electronic mail;

(ii) step of setting an absence mode indicating the state of absence of a receiver of the electronic mail;

(iii) step of transmitting to a third party a predetermined fixed form mail responding to a first electronic mail received by the step (i) in the absence mode; and (iv) step of causing the step (iii), to transmit the first electronic mail to a predetermined address when said mail receiving step receives a second electronic mail responding to the predetermined fixed form mail and transmitted from the third party and the second electronic mail satisfies a specific condition.

38. A computer readable storage medium for storing a program for electronic mail processing, the program comprising:

(i) step of storing a plurality of fixed form mails;

(ii) step of receiving an electronic mail;

(iii) step of designating an address of a specific receiver;

(iv) step of determining whether or not a transmitter address of the received electronic mail is an address designated by the step (iii) when the electronic mail is received by the step (ii);

(v) step of selecting one of fixed form mails stored based on a determination result by the step (iv) from the plurality of fixed form mails stored by the step (i); and (vi) step of transmitting the fixed form mail selected by the step (v) to the same address as a transmitter address of the received electronic mail.

39. A computer readable storage medium for storing a program for electronic mail processing, the program comprising:

(i) step of storing a plurality of fixed form mails;

(ii) step of receiving an electronic mail;

(iii) step of determining whether or not a password is included in the electronic mail when the electronic mail is received by the step (ii);

(iv) step of selecting one of fixed form mails from the plurality of fixed form mails stored by the step (i) based on a determination result by the step (iii); and (v) step of transmitting the fixed form mail selected by the step (iv) to the same address as a transmitter address of the received electronic mail.

40. A computer readable storage medium for storing a program for electronic mail processing, the program comprising:

(i) step of receiving an electronic mail;

(ii) step of designating an address of a specific receiver;

(iii) step of determining whether or not a transmitter address of the received electronic mail is the address designated by the step (ii) when the electronic mail is received by the step (i);

(iv) step of transmitting a fixed form mail to the same address as the transmitter address of the received electronic mail when a determination result by the step (iii) is not the designated address; and (v) step of transferring the received electronic mail to a predetermined address when a determination result by the step (iii) is the designated address.

41. A computer readable storage medium for storing a program for electronic mail processing, the program comprising:

(i) step of receiving an electronic mail;

(ii) step of determining whether or not a password is included in the electronic mail when the electronic mail is received by the step (i);

(iii) step of transmitting a fixed form mail to the same address as a transmitter address of the received electronic mail when the step (ii) determines that the password is not included; and (iv) step of transferring the received electronic mail to a predetermined address when the step (ii) determines that the password is included.

42. A computer readable storage medium for storing a program for electronic mail processing, the program comprising:

(i) step of receiving an electronic mail;

(ii) step of setting a specific period of time;

(iii) step of determining whether or to the electronic mail is received during the specific period of time;

(iv) step of determining whether or not the electronic mail is received during the specific period of time is a response date and time designated mail which designates the response date and time;

(v) step of determining whether or not the response date and time designated by the reception date and time designated mail is in the specific period of time; and (vi) step of transmitting a response mail requesting for a change of the response date and time to a different response date and time except the specific period of time when the response date and time is in the specific period of time.

43. A computer readable storage medium for storing a program for electronic mail processing, the program comprising:

(i) step of receiving an electronic mail;

(ii) step of setting a specific period of time;

(iii) step of determining whether or not the electronic mail is received during the specific period of time by the step (i);

(iv) step of determining whether or not the electronic mail which is determined to be received during the specific period of time by the step (iii) is a response date and time designated mail which designates the response date and time;

(v) step of determining whether or not the response date and time is in the specific period of time when the electronic mail is determined to be the response date and time designated mail by the step (iv);

(vi) step of transmitting a request for change mail requesting for a change in the response date and time to a different response date and time except the specific period of time when the response date and time determined by the step (v) is in the specific period of time;

(vii) step of changing the response date and time of the response date and time designated mail when a response mail which indicates acceptance of the request for a change is received by the step (i) after the request for change mail is transmitted by the step (vi); and (viii) step of transferring the response date and time designated mail to a predetermined address when a response mail which refuses the request for change is received by the step (i) after the request for change mail is transmitted by the step (vi).

44. A computer readable storage medium for storing a program for electronic mail processing, the program comprising:

(i) step of receiving an electronic mail;

(ii) step of setting an apparatus operation in an absence mode;

(iii) step of storing a plurality of kinds of fixed form mail to fixed form mail storage means;

(iv) step of determining attributes of the received electronic mail when the electronic mail is received by the step (i) in the absence mode set by the step (ii);

(v) step of selecting one of fixed form mails from the plurality of kinds of fixed form mail stored in the fixed form mail storage means at the step (iii) corresponding to the attributes determined by the step (iv); and (vi) step of transmitting the fixed form mail selected by the step (v) in response to the same address as a transmitter of the received electronic mail.

45. A computer readable storage medium for storing a program for electronic mail processing, the program comprising:

(i) step of receiving an electronic mail;

(ii) step of setting an apparatus operation in an absence mode;

(iii) step of creating a plurality of response conditions for determining whether or not an absence notice is issued and the absence notice having a content corresponding to the plurality of response conditions;

(iv) step of storing a plurality of response conditions produced by the step (iii) and a plurality of fixed form mails constituting the absence notice corresponding to the plurality of response conditions to fixed form mail storage means;

(v) step of determining which plurality of response conditions stored in the fixed form mail storage means attributes of the received electronic mail satisfy when the electronic mail is received in the absence mode by the step (i); and (vi) step of selecting one of fixed form mails stored in said mail storage means having a content corresponding to satisfied response conditions to read the fixed form mail from the fixed form mail storage means and to transmit the fixed form mail in response to the same address as a transmitter of the received electronic mail as an absence notice when the step (v) finds the response conditions which satisfy the attributes of the received electronic mail.

* * * * *